(12) United States Patent
Auld et al.

(10) Patent No.: US 10,125,321 B2
(45) Date of Patent: Nov. 13, 2018

(54) METHOD AND SYSTEMS FOR TRANSPORTING BITUMEN IN SOLIDIFIED FORM

(71) Applicant: CANADIAN NATIONAL RAILWAY COMPANY, Montreal, Quebec (CA)

(72) Inventors: James Auld, Calgary (CA); John Bleile, Calmar (CA); Kasra Nikooyeh, Edmonton (CA); Amanda Prefontaine, Legal (CA); Derek Stanger, Vancouver (CA); Jesse White, Calgary (CA)

(*) Notice: Subject to any disclaimer, the term of this patent is extended or adjusted under 35 U.S.C. 154(b) by 0 days.

(21) Appl. No.: 15/435,948

(22) Filed: Feb. 17, 2017

(65) Prior Publication Data

US 2017/0253737 A1 Sep. 7, 2017

Related U.S. Application Data

(60) Provisional application No. 62/304,589, filed on Mar. 7, 2016, provisional application No. 62/323,240, filed on Apr. 15, 2016, provisional application No. 62/409,200, filed on Oct. 17, 2016, provisional application No. 62/411,888, filed on Oct. 24, 2016, provisional application No. 62/449,310, filed on Jan. 23, 2017.

(51) Int. Cl.
*C08L 95/00* (2006.01)
*C10G 1/00* (2006.01)
*C08J 3/12* (2006.01)

(52) U.S. Cl.
CPC ............... *C10G 1/00* (2013.01); *C08J 3/126* (2013.01); *C08L 95/00* (2013.01); *C08J 2395/00* (2013.01); *C08J 2423/06* (2013.01); *C08L 2201/56* (2013.01); *C08L 2207/062* (2013.01); *C08L 2207/066* (2013.01); *C08L 2207/53* (2013.01); *C08L 2555/32* (2013.01); *C08L 2555/86* (2013.01)

(58) Field of Classification Search
CPC ....... C08J 3/126; C08L 95/00; C08L 2555/32; C08L 2555/86
See application file for complete search history.

(56) References Cited

U.S. PATENT DOCUMENTS

| | | | |
|---|---|---|---|
| 3,313,606 | A | 4/1967 | Greguoli et al. |
| 3,756,948 | A | 9/1973 | Weinberg |

(Continued)

FOREIGN PATENT DOCUMENTS

| | | |
|---|---|---|
| CA | 1282513 | 4/1991 |
| CA | 2036396 | 8/1992 |

(Continued)

OTHER PUBLICATIONS

Alberta Oil Magazine, Fawcett, M., 'His Invention Could Save the Oil Sands. But Will Anyone Give It a Chance?', Sep. 9, 2015, retrieved from: http://www.albertaoilmagazine.com/2015/09/cal-broders-bitcrude-invention/, consulted on: Oct. 21, 2016.

(Continued)

*Primary Examiner* — Peter D. Mulcahy
(74) *Attorney, Agent, or Firm* — Fish & Richardson P.C.

(57) ABSTRACT

A solid bitumen pellet, including a mixture of bitumen and an additive, where the additive operates to increase the viscosity of the mixture. Optionally, the pellet includes a protective shell.

30 Claims, 42 Drawing Sheets

(56) References Cited

U.S. PATENT DOCUMENTS

| | | | |
|---|---|---|---|
| 4,129,431 A | 12/1978 | Ross et al. | |
| 4,306,657 A | 12/1981 | Levy | |
| 5,019,610 A * | 5/1991 | Sitz | C08K 5/20 |
| | | | 524/59 |
| 5,068,270 A * | 11/1991 | Isobe | C08F 255/00 |
| | | | 524/68 |
| 5,076,938 A | 12/1991 | Noonan et al. | |
| 5,085,701 A | 2/1992 | Muller et al. | |
| 5,254,385 A | 10/1993 | Hazlett | |
| 5,476,993 A | 12/1995 | Richmond | |
| 5,637,350 A * | 6/1997 | Ross | B01F 3/0865 |
| | | | 264/13 |
| 6,180,697 B1 | 1/2001 | Kelly et al. | |
| 7,101,499 B1 | 9/2006 | Bronicki et al. | |
| 8,114,494 B2 | 2/2012 | Marchal | |
| 8,258,212 B2 | 9/2012 | Lopez | |
| 8,277,949 B2 * | 10/2012 | Smith | C08L 95/00 |
| | | | 428/489 |
| 8,404,164 B2 | 3/2013 | Sockwell | |
| 8,841,365 B2 * | 9/2014 | Marzouki | C08L 95/00 |
| | | | 524/59 |
| 2007/0027235 A1 | 2/2007 | Marchal | |
| 2009/0145331 A1 | 6/2009 | Swann et al. | |
| 2011/0233105 A1 * | 9/2011 | Bailey | C09D 195/00 |
| | | | 206/525 |
| 2013/0036714 A1 * | 2/2013 | Bolton | C08L 95/00 |
| | | | 53/473 |
| 2014/0134705 A1 * | 5/2014 | Henry | A62D 3/02 |
| | | | 435/253.6 |
| 2014/0377563 A1 | 12/2014 | Sousa et al. | |
| 2015/0291798 A1 | 10/2015 | Sautel et al. | |
| 2015/0307713 A1 | 10/2015 | Krafft et al. | |

FOREIGN PATENT DOCUMENTS

| | | |
|---|---|---|
| CA | 2234329 | 4/1998 |
| CA | 2281590 | 8/1998 |
| CA | 2228197 | 10/1999 |
| CA | 2509284 | 7/2004 |
| CA | 2765698 | 12/2010 |
| CA | 2797085 | 11/2011 |
| CA | 2819151 | 6/2012 |
| CA | 2797773 | 11/2012 |
| CA | 2782382 | 1/2013 |
| CA | 2855240 | 5/2013 |
| CA | 2799973 | 6/2013 |
| CA | 2800483 | 6/2013 |
| CA | 2811578 | 11/2013 |
| CA | 2883204 | 3/2014 |
| CA | 2892066 | 5/2015 |
| CA | 2922767 | 3/2016 |
| WO | WO2015/139017 | 9/2015 |
| WO | WO2015/144689 | 10/2015 |
| WO | WO 2016/134476 | 9/2016 |

OTHER PUBLICATIONS

BFH Corporation website, '*About us*', Sep. 14, 2016, retrieved from: http://www.bitcrude.ca/about-us.html, consulted on: Oct. 21, 2016.

CBC News "Balls of bitumen: Calgary breakthrough could bypass pipeline problem, researcher says", retrieved from: http://www.cbc.ca/news/canada/calgary/bitumten-balls-pellets-pipelines-rail-train-transport-energy-alberta-technology-1.4277320 [retrieved on Sep. 13, 2017].

Global News "*Calgary professor thinks oilsands crude pellets could be cure for industry's bitumen transport problems*", retrieved from: http://globalnews.ca/news/3721682/calgary-professor-thinks-oilsands-crude-pellets-could-be-cure-for-industrys-bitumen-transport-problems/ [retrieved on Sep. 13, 2017].

The Toronto Star "*New technology converting crude oil into solid pellets may prevent oil spills from pipelines*", retrieved from: https://www.thestar.com/business/2017/09/06/new-technology-converting-crude-oil-into-solid-pellets-may-prevent-oil-spills-from-pipelines.html [retrieved on Sep. 13, 2017].

The Chronicle Herald "*Oilsands crude pellets touted as cure for industry's bitumen transport ills*", retrieved from: http://thechronicleherald.ca/business/1500649-oilsands-crude-pellets-touted-as-cure-for-industrys-bitumen-transport-ills [retrieved on Sep. 13, 2017].

Metro News Calgary "*Oilsands crude pellets touted as cure for industry's bitumen transport ills*", retrieved from: http://www.metronews.ca/news/calgary/2017/09/06/oilsands-crude-pellets-touted-as-cure-for-industry-s-bitumen-transport-ills.html [retrieved on Sep. 13, 2017].

The Westman Journal "*Oilsands crude pellets touted as cure for industry's bitumen transport ills*", retrieved from: http://www.westmanjournal.com/news/national/oilsands-crude-pellets-touted-as-cure-for-industry-s-bitumen-transport-ills-1.22464266 [retrieved on Sep. 13, 2017].

U Today "*Pipeline pain relief on horizon with spill-resistant bitumen*", retrieved https://www.ucalgary.ca/utodav/issue/2017-09-06/pipeline-pain-relief-horizon-spill-resistant-bitumen [retrieved on Sep. 13, 2017].

Innovate Calgary "*Bitumen Pellets*", retrieved from: http://www.innovatecalgary.com/files/public-files/inca-categories-documents/bitamen-pellets.pdf, created Apr. 3, 2017 [retrieved on Sep. 13, 2017].

* cited by examiner

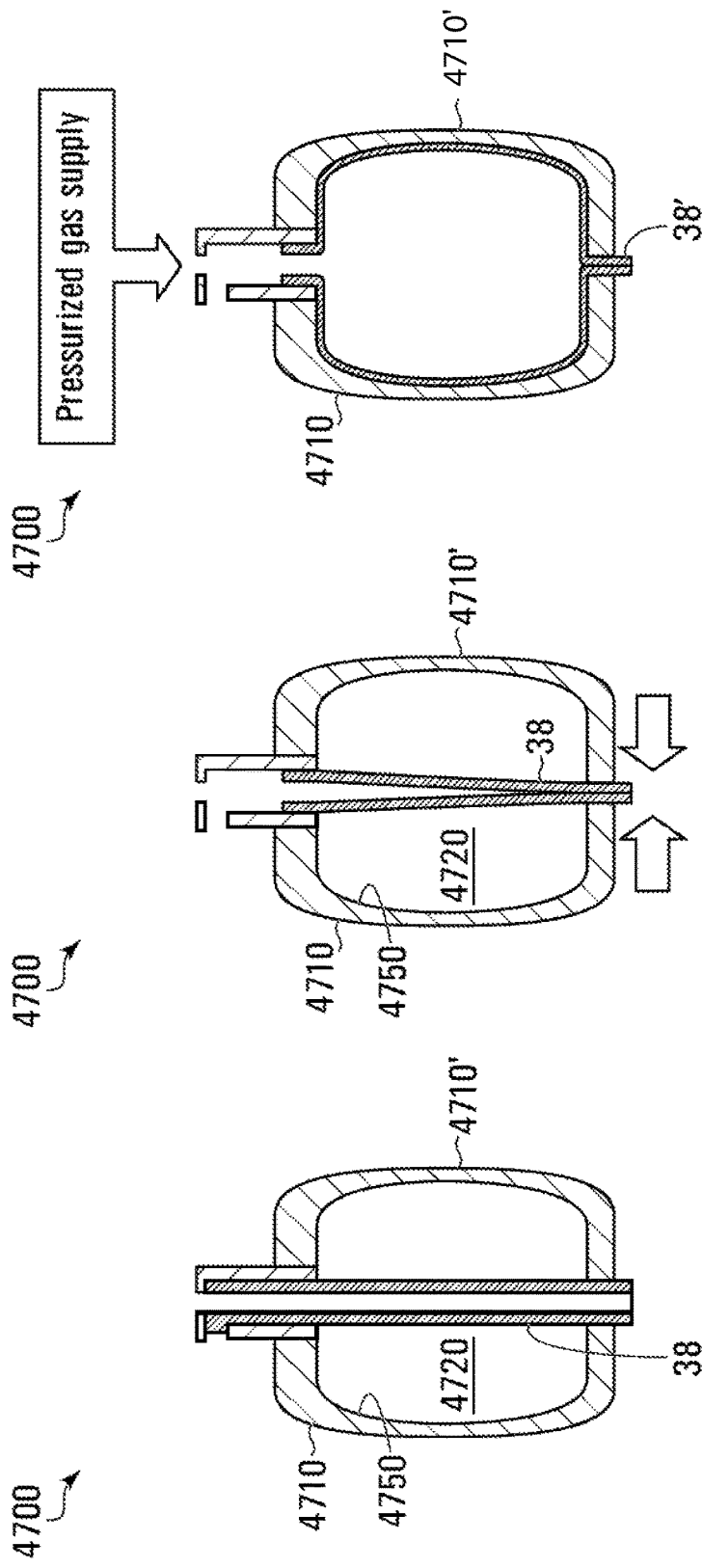

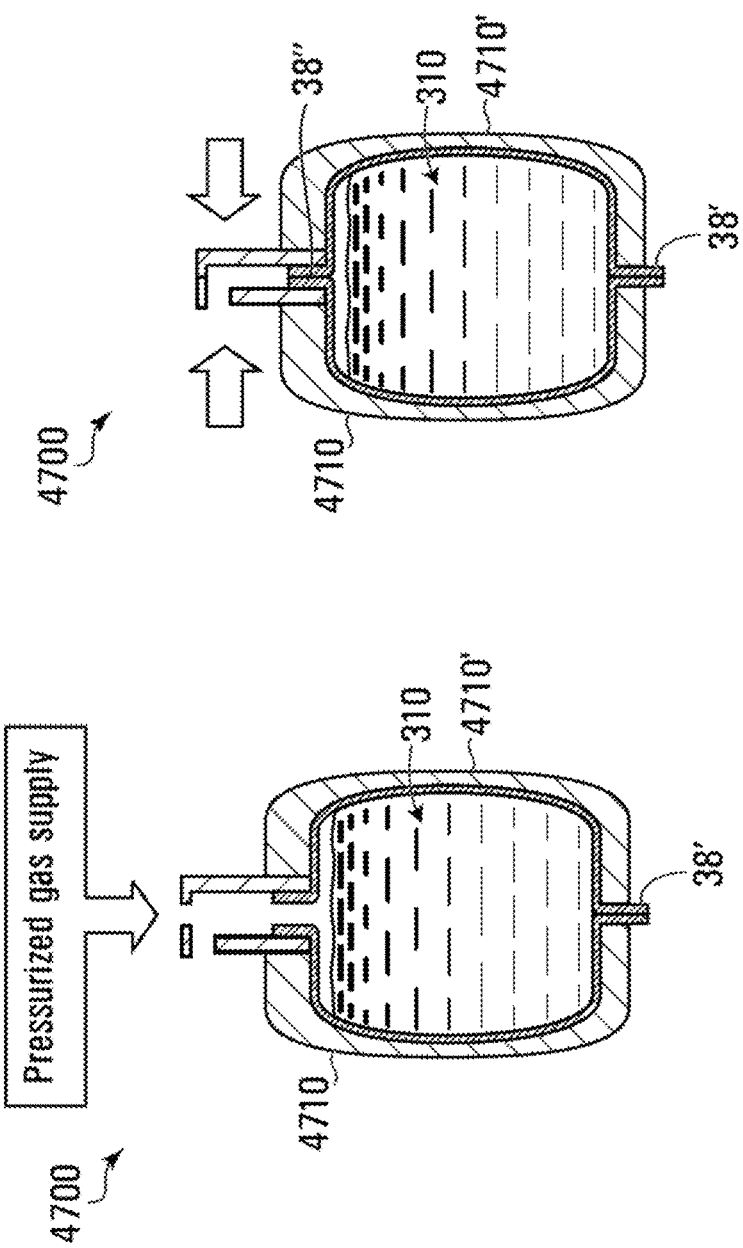

METHOD AND SYSTEMS FOR TRANSPORTING BITUMEN IN SOLIDIFIED FORM

CROSS REFERENCE TO RELATED APPLICATIONS

This application claims benefit of prior U.S. Provisional Application 62/304,589, filed on Mar. 7, 2016, U.S. Provisional Application 62/323,240, filed on Apr. 15, 2016, U.S. Provisional Application 62/409,200, filed on Oct. 17, 2016, U.S. Provisional Application 62/411,888, filed on Oct. 24, 2016 and U.S. Provisional Application 62/449,310, filed on Jan. 23, 2017. Each of these applications is incorporated by reference in its entirety.

FIELD OF TECHNOLOGY

The present invention relates to methods and systems for transporting bitumen.

BACKGROUND

Historically, bitumen from oil sands has been carried over land using trucks, pipelines, or by rail, and over water using tankers. Each mode of transportation faces economic or technical challenges of its own.

Transportation by truck may not be able to sustain the expanding need of the oil industry for moving bitumen to market. For example, transportation by trucks can be seasonally restricted and relatively inefficient and expensive compared to other means of transportation when transporting large bitumen quantities over large distances.

The pipeline option also faces challenges. Bitumen is so thick and viscous at ambient temperatures that it cannot flow through pipelines on its own and instead, bitumen must be thinned with diluents, typically natural-gas condensates and/or natural gasolines, to sufficiently increase its fluidity to carry it through a pipe over long distances. The blend ratio may consist of 25% to 55% diluent by volume, depending on characteristics of the bitumen and diluent, pipeline specifications, operating conditions, and refinery requirements. The diluent is expensive and reduces the amount of bitumen that can be transported but has become accepted by the industry as the "cost" to move the product to refineries. That diluent must then be carried back to the oil sands to thin the next batch of bitumen, which adds further costs to the process.

The use of rail tank cars to transport bitumen has increased rapidly over the past several years. While less or no diluent is required when transporting bitumen in railcars, representing a significant savings in diluent costs relative to the pipeline option, however, producers have continued to transport diluted bitumen (i.e., dilbit). This is because most oil producers use pipeline, and therefore dilbit, to reach intermediate transport points, at which further pipeline capacity isn't available. To carry the bitumen to destination, it is loaded on railcars at these points. Since Diluent Recovery Units (DRUs) needed to remove the diluent from the bitumen are not likely to be available at the intermediate transport points, the dilbit is directly loaded into the railcars. The cost to install the DRU isn't worth the marginal increase in safety or economic benefits to shippers—which explain why no such DRUs have been built to-date.

Over water, bitumen is transported by tanker. However, Canada is currently formalizing the West Coast Tanker moratorium, which effectively bans all maritime transport of crude bitumen over British Columbia's North Coast waters. Such moratorium renders impossible the maritime transport of bitumen extracted in Canada towards the west.

Accordingly, there is a need in the industry for a different bitumen management and transportation technology, which would alleviate at least some of the above-mentioned deficiencies.

SUMMARY

As embodied and broadly described herein, the invention provides a set of 100 solid bitumen pellets, the set having a probability of failing a crush-resistance test per pellet that does not exceed 0.25, when subjected to a load of pellets having a height of 1 meter.

As embodied and broadly described herein, the invention provides a set of 100 solid bitumen pellets, the set having a probability of failing a crush-resistance test per pellet that does not exceed 0.25, when subjected to a load of pellets having a height of 5 meters.

As embodied and broadly described herein, the invention provides a set of 100 solid bitumen pellets, the set having a probability of failing a crush-resistance test per pellet that does not exceed 0.25, when subjected to a load of pellets having a height of 10 meters.

As embodied and broadly described herein, the invention provides a set of 100 solid bitumen pellets, the set having a probability of failing a crush-resistance test per pellet that does not exceed 0.25, when subjected to a load of pellets having a height of 20 meters.

As embodied and broadly described herein, the invention provides a set of 100 solid bitumen pellets, the set having a probability of failing a crush-resistance test per pellet that does not exceed 0.25, when subjected to a load of pellets having a height of 30 meters.

As embodied and broadly described herein, the invention provides a set of 100 solid bitumen pellets, the set having a probability of failing a crush-resistance test per pellet that does not exceed 0.25, when subjected to a load of pellets having a height of 40 meters.

As embodied and broadly described herein, the invention provides a set of 100 solid bitumen pellets, the set having a probability of failing a crush-resistance test per pellet that does not exceed 0.25, when subjected to a load of pellets having a height of 50 meters.

As embodied and broadly described herein, the invention provides a set of 100 solid bitumen pellets, the set having a probability of failing an impact-resistance test, per pellet that does not exceed 0.25, when the height of drop is of 1 meter.

As embodied and broadly described herein, the invention provides a set of 100 solid bitumen pellets, the set having a probability of failing an impact-resistance test, per pellet that does not exceed 0.25, when the height of drop is of 5 meters.

As embodied and broadly described herein, the invention provides a set of 100 solid bitumen pellets, the set having a probability of failing an impact-resistance test, per pellet that does not exceed 0.25, when the height of drop is of 10 meters.

As embodied and broadly described herein, the invention provides a set of 100 solid bitumen pellets, the set having a probability of failing an impact-resistance test, per pellet that does not exceed 0.25, when the height of drop is of 20 meters.

As embodied and broadly described herein, the invention provides a set of 100 solid bitumen pellets, the set having a probability of failing an impact-resistance test, per pellet that does not exceed 0.25, when the height of drop is of 30 meters.

As embodied and broadly described herein, the invention provides a set of 100 solid bitumen pellets, the set having a probability of failing an impact-resistance test, per pellet that does not exceed 0.25, when the height of drop is of 40 meters.

As embodied and broadly described herein, the invention provides a set of 100 solid bitumen pellets, the set having a probability of failing an impact-resistance test, per pellet that does not exceed 0.25, when the height of drop is of 50 meters.

As embodied and broadly described herein, the invention provides a pile of solid bitumen pellets having an angle of repose in the range of from about 20 degrees to about 45 degrees.

As embodied and broadly described herein, the invention provides a solid bitumen pellet including an emulsion of bitumen and a hydrocarbonaceous polymer.

As embodied and broadly described herein, the invention provides a method for storing bitumen, the method comprising discharging solid bitumen pellets to form a pile of pellets, the pile including 100 solid bitumen pellets characterized by having a probability, per pellet of failing a crush-resistance test that does not exceed 0.25, when the height of the load of pellets is of H meters, the step of discharging said solid bitumen pellets to form the pile including controlling a height of the pile such that it does not exceed H.

As embodied and broadly described herein, the invention provides a method for storing bitumen, the method comprising discharging solid bitumen pellets to form a pile of pellets, the pile including 100 solid bitumen pellets characterized by having a probability, per pellet of failing a crush-resistance test that does not exceed 0.20, when the height of the load of pellets is of H meters, the step of discharging said solid bitumen pellets to form the pile including controlling a height of the pile such that it does not exceed H.

As embodied and broadly described herein, the invention provides a method for storing bitumen, the method comprising discharging solid bitumen pellets to form a pile of pellets, the pile including 100 solid bitumen pellets characterized by having a probability, per pellet of failing a crush-resistance test that does not exceed 0.15, when the height of the load of pellets is of H meters, the step of discharging said solid bitumen pellets to form the pile including controlling a height of the pile such that it does not exceed H.

As embodied and broadly described herein, the invention provides a method for storing bitumen comprising discharging solid bitumen pellets to form a pile of pellets, the pile including 100 solid bitumen pellets characterized by having a probability, per pellet of failing a crush-resistance test that does not exceed 0.10, when the height of the load of pellets is of H meters, the step of discharging said solid bitumen pellets to form the pile including controlling a height of the pile such that it does not exceed H.

As embodied and broadly described herein, the invention provides a method comprising discharging solid bitumen pellets to form a pile of pellets, the pile including 100 solid bitumen pellets characterized by having a probability, per pellet, of failing an impact-resistance test that does not exceed 0.25, when the pellets are dropped from a height H, the step of discharging the solid bitumen pellets to form the pile including controlling the height from which the pellets are dropped to form the pile such that the height does not exceed H.

As embodied and broadly described herein, the invention provides a method comprising discharging solid bitumen pellets to form a pile of pellets, the pile including 100 solid bitumen pellets characterized by having a probability, per pellet, of failing an impact-resistance test that does not exceed 0.20, when the pellets are dropped from a height H, the step of discharging the solid bitumen pellets to form the pile including controlling the height from which the pellets are dropped to form the pile such that the height does not exceed H.

As embodied and broadly described herein, the invention provides a method comprising discharging solid bitumen pellets to form a pile of pellets, the pile including 100 solid bitumen pellets characterized by having a probability, per pellet, of failing an impact-resistance test that does not exceed 0.15, when the pellets are dropped from a height H, the step of discharging the solid bitumen pellets to form the pile including controlling the height from which the pellets are dropped to form the pile such that the height does not exceed H.

As embodied and broadly described herein, the invention provides a method comprising discharging solid bitumen pellets to form a pile of pellets, the pile including 100 solid bitumen pellets characterized by having a probability, per pellet, of failing an impact-resistance test that does not exceed 0.10, when the pellets are dropped from a height H, the step of discharging the solid bitumen pellets to form the pile including controlling the height from which the pellets are dropped to form the pile such that the height does not exceed H.

As embodied and broadly described herein, the invention provides a method for environmental risk reduction during transport of bitumen, the method comprising placing a load of solid bitumen pellets in a shipping container at an origin, bringing the shipping container with the load to a destination, wherein the load includes 100 solid bitumen pellets having a probability, per pellet of failing a crush-resistance test that does not exceed 0.25 when the height of the pellet load is of 1 meter.

As embodied and broadly described herein, the invention provides a method for environmental risk reduction during transport of bitumen, the method comprising placing a load of solid bitumen pellets in a shipping container at an origin, bringing the shipping container with the load to a destination, wherein the load includes 100 solid bitumen pellets having a probability, per pellet of failing a crush-resistance test that does not exceed 0.25 when the height of the pellet load is of 5 meters.

As embodied and broadly described herein, the invention provides a method for environmental risk reduction during transport of bitumen, the method comprising placing a load of solid bitumen pellets in a shipping container at an origin, bringing the shipping container with the load to a destination, wherein the load includes 100 solid bitumen pellets having a probability, per pellet of failing a crush-resistance test that does not exceed 0.25 when the height of the pellet load is of 10 meters.

As embodied and broadly described herein, the invention provides a method for environmental risk reduction during transport of bitumen, the method comprising placing a load of solid bitumen pellets in a shipping container at an origin, bringing the shipping container with the load to a destination, wherein the load includes 100 solid bitumen pellets having a probability, per pellet of failing a crush-resistance test that does not exceed 0.25 when the height of the pellet load is of 20 meters.

As embodied and broadly described herein, the invention provides a method for environmental risk reduction during transport of bitumen, the method comprising placing a load of solid bitumen pellets in a shipping container at an origin, bringing the shipping container with the load to a destination, wherein the load includes 100 solid bitumen pellets having a probability, per pellet of failing a crush-resistance test that does not exceed 0.25 when the height of the pellet load is of 30 meters.

As embodied and broadly described herein, the invention provides a method for environmental risk reduction during transport of bitumen, the method comprising placing a load of solid bitumen pellets in a shipping container at an origin, bringing the shipping container with the load to a destination, wherein the load includes 100 solid bitumen pellets having a probability, per pellet of failing a crush-resistance test that does not exceed 0.25 when the height of the pellet load is of 40 meters.

As embodied and broadly described herein, the invention provides a method for environmental risk reduction during transport of bitumen, the method comprising placing a load of solid bitumen pellets in a shipping container at an origin, bringing the shipping container with the load to a destination, wherein the load includes 100 solid bitumen pellets having a probability, per pellet of failing a crush-resistance test that does not exceed 0.25 when the height of the pellet load is of 50 meters.

As embodied and broadly described herein, the invention provides a method for environmental risk reduction during transport of bitumen, the method comprising placing a load of solid bitumen pellets in a shipping container at an origin, bringing the shipping container with the load to a destination, the load including 100 pellets having a probability, per pellet of failing an impact-resistance test that does not exceed 0.25, when the dropping height is of 1 meter.

As embodied and broadly described herein, the invention provides a method for environmental risk reduction during transport of bitumen, the method comprising placing a load of solid bitumen pellets in a shipping container at an origin, bringing the shipping container with the load to a destination, the load including 100 pellets having a probability, per pellet of failing an impact-resistance test that does not exceed 0.25, when the dropping height is of 5 meters.

As embodied and broadly described herein, the invention provides a method for environmental risk reduction during transport of bitumen, the method comprising placing a load of solid bitumen pellets in a shipping container at an origin, bringing the shipping container with the load to a destination, the load including 100 pellets having a probability, per pellet of failing an impact-resistance test that does not exceed 0.25, when the dropping height is of 10 meters.

As embodied and broadly described herein, the invention provides a method for environmental risk reduction during transport of bitumen, the method comprising placing a load of solid bitumen pellets in a shipping container at an origin, bringing the shipping container with the load to a destination, the load including 100 pellets having a probability, per pellet of failing an impact-resistance test that does not exceed 0.25, when the dropping height is of 20 meters.

As embodied and broadly described herein, the invention provides a method for environmental risk reduction during transport of bitumen, the method comprising placing a load of solid bitumen pellets in a shipping container at an origin, bringing the shipping container with the load to a destination, the load including 100 pellets having a probability, per pellet of failing an impact-resistance test that does not exceed 0.25, when the dropping height is of 30 meters.

As embodied and broadly described herein, the invention provides a method for environmental risk reduction during transport of bitumen, the method comprising placing a load of solid bitumen pellets in a shipping container at an origin, bringing the shipping container with the load to a destination, the load including 100 pellets having a probability, per pellet of failing an impact-resistance test that does not exceed 0.25, when the dropping height is of 40 meters.

As embodied and broadly described herein, the invention provides a method for environmental risk reduction during transport of bitumen, the method comprising placing a load of solid bitumen pellets in a shipping container at an origin, bringing the shipping container with the load to a destination, the load including 100 pellets having a probability, per pellet of failing an impact-resistance test that does not exceed 0.25, when the dropping height is of 50 meters.

As embodied and broadly described herein, the invention provides a method for reducing a risk of contaminating a shipping container during transport of bitumen by transfer of bitumen material to walls of the shipping container, the method comprising placing a load of solid bitumen pellets in the shipping container, the load including 100 bitumen pellets having a probability, per pellet of failing a crush-resistance test that does not exceed 0.25 when the height of the pellet load is of 1 meter.

As embodied and broadly described herein, the invention provides a method for reducing a risk of contaminating a shipping container during transport of bitumen by transfer of bitumen material to walls of the shipping container, the method comprising placing a load of solid bitumen pellets in the shipping container, the load including 100 bitumen pellets having a probability, per pellet of failing a crush-resistance test that does not exceed 0.25 when the height of the pellet load is of 5 meters.

As embodied and broadly described herein, the invention provides a method for reducing a risk of contaminating a shipping container during transport of bitumen by transfer of bitumen material to walls of the shipping container, the method comprising placing a load of solid bitumen pellets in the shipping container, the load including 100 bitumen pellets having a probability, per pellet of failing a crush-resistance test that does not exceed 0.25 when the height of the pellet load is of 10 meters.

As embodied and broadly described herein, the invention provides a method for reducing a risk of contaminating a shipping container during transport of bitumen by transfer of bitumen material to walls of the shipping container, the method comprising placing a load of solid bitumen pellets in the shipping container, the load including 100 bitumen pellets having a probability, per pellet of failing a crush-resistance test that does not exceed 0.25 when the height of the pellet load is of 20 meters.

As embodied and broadly described herein, the invention provides a method for reducing a risk of contaminating a shipping container during transport of bitumen by transfer of bitumen material to walls of the shipping container, the method comprising placing a load of solid bitumen pellets in the shipping container, the load including 100 bitumen pellets having a probability, per pellet of failing a crush-resistance test that does not exceed 0.25 when the height of the pellet load is of 30 meters.

As embodied and broadly described herein, the invention provides a method for reducing a risk of contaminating a shipping container during transport of bitumen by transfer of bitumen material to walls of the shipping container, the method comprising placing a load of solid bitumen pellets in the shipping container, the load including 100 bitumen pellets having a probability, per pellet of failing a crush-resistance test that does not exceed 0.25 when the height of the pellet load is of 40 meters.

As embodied and broadly described herein, the invention provides a method for reducing a risk of contaminating a shipping container during transport of bitumen by transfer of bitumen material to walls of the shipping container, the method comprising placing a load of solid bitumen pellets in the shipping container, the load including 100 bitumen pellets having a probability, per pellet of failing a crush-resistance test that does not exceed 0.25 when the height of the pellet load is of 50 meters.

As embodied and broadly described herein, the invention provides a solid bitumen pellet, including a mixture of bitumen and an additive, where the additive operates to increase the viscosity of the mixture.

As embodied and broadly described herein, the invention provides a method of making a solid bitumen pellet, the method including mixing bitumen with an additive operating to increase the viscosity of the bitumen.

As embodied and broadly described herein, the invention provides an apparatus for making a solid bitumen pellet, comprising an inlet for receiving bitumen and a shell forming station for forming a shell around a bituminous core made from bitumen introduced at the inlet.

As embodied and broadly described herein, the invention provides bitumen material retrieved from a solid bitumen pellet, the bitumen material being suitable for processing in an oil refinery to separate the bitumen material into constituents that can be used as fuels, lubricants and feedstocks in petrochemical processes, the bitumen material including a content of hydrocarbonaceous polymer, wherein the content of the hydrocarbonaceous polymer does not exceed about 0.5 wt. % relative to bitumen.

As embodied and broadly described herein, the invention provides a method for reducing the risk of fire when transporting bitumen, comprising transporting an emulsion of bitumen and additive operating to provide the emulsion with a flash point that is higher than compared to the flash point of bitumen without the additive.

As embodied and broadly described herein, the invention provides a method for retrieving bitumen from a solid bitumen pellet, the pellet including bitumen and material contributing to maintain the pellet in solid form, the method comprising separating the material at least partially from the bitumen.

As embodied and broadly described herein, the invention provides a method for retrieving bitumen from a solid bitumen pellet, the pellet including a bituminous core and a shell protecting the core, the method including processing the pellet to retrieve bitumen from the pellet in a condition such that the bitumen is suitable for processing in an oil refinery to separate the bitumen material into constituents that can be used as fuels, lubricants and feedstocks in petrochemical processes, the processing of the pellet including a step of separating the shell from the bituminous core.

As embodied and broadly described herein, the invention provides a method for facilitating retrieval of spilled solid bitumen pellets during transport by rail over rail tracks, comprising providing the pellets with a color signal configured to make the pellets visually distinguishable from an environment of the rail track.

As embodied and broadly described herein, the invention also provides a pellet with an external shell, which manifests a reduction in strength in response to a temperature increase. A shell having such property is advantageous in that a moderate temperature increase is sufficient to weaken the shell, thereby lowering the energy required for removing the shell to expose the bituminous core.

As embodied and broadly described herein, the invention provides a bitumen pellet including a bitumen core surrounded by an external shell. The bitumen core includes a mixture of bitumen and a 1st polymeric material effective to increase the viscosity of the bitumen. The shell includes a 2nd polymeric material which may be the same or different from the 1st polymeric material.

As embodied in broadly described herein, the invention also provides a bitumen pellet which is provided with a colour signal designed to visually communicate to an observer a property of the pellet. One example of a property is pellet presence; it may be desirable to make the pellet more visible in certain environments. For instance, if the pellets are transported and there is a spill, the colour signal will make the pellets more easily identifiable such that they can be picked up. The color signal can be adjusted depending on the environment. In a snowy environment, the color signal is such as to make the pellet of dark colour, thus being more visible against a white background. In a maritime environment, the colour signal would be selected to make the pellet appear lighter such that it is more visible against a darker background. In addition, the colour signal can also convey other information such as the grade of the bitumen, flammability characteristics and origin of the pellet (trademark information), among others. In a specific example of implementation, adding dye to the pellet shell provides the colour signal. For instance, the dye can be added to the polymer material used to make the shell.

As embodied and broadly described herein, the invention also provides a bitumen pellet that has a non-stick surface. The advantage of the non-stick surface is that the pellets will not adhere to each other or to surfaces when transported in bulk or when they are in contact with transportation/handling equipment.

As embodied and broadly described herein, the invention also provides an additive (a single material or a combination of different materials) for mixing with bitumen to increase the viscosity of a mixture which includes the bitumen, the additive being characterized by a melting point of at least about 50° C.

As embodied and broadly described herein, the invention also provides an additive for mixing with bitumen to increase the viscosity of a mixture, which includes the bitumen, the additive comprising a hydrocarbonaceous polymer.

As embodied and broadly described herein, the invention further provides a solid bitumen pellet comprising a bituminous core and a shell enclosing the core, the pellet being responsive to a compression applied externally on the shell and of sufficient magnitude to deform the pellet to develop an internal gaseous pressure increase which operates to counterbalance, at least partially the compression, wherein the internal gaseous pressure increases with an increase of the compression applied externally on the shell.

As embodied and broadly described herein, the invention further provides a solid bitumen pellet comprising a bituminous core and a shell enclosing the core, the shell being configured to reduce the exposure of the bituminous core to ambient oxygen.

As embodied and broadly described herein, the invention further provides a method for reducing a risk of contaminating automated unloading equipment during unloading of bitumen from a shipping container as a result of bitumen material sticking to the unloading equipment, the method comprising unloading a load of solid bitumen pellets with the unloading equipment from the shipping container, the load including at least 100 bitumen pellets having a probability, per pellet, of failing a crush-resistance test that does not exceed 0.25 when the height of the pellet load is of 1 meter.

As embodied and broadly described herein, the invention further provides a method for reducing a risk of contaminating automated unloading equipment during unloading of bitumen from a shipping container as a result of bitumen material sticking to the unloading equipment, the method comprising unloading a load of solid bitumen pellets with the unloading equipment from the shipping container, the load including at least 100 bitumen pellets having a probability, per pellet, of failing a crush-resistance test that does not exceed 0.25 when the height of the pellet load is of 5 meters.

As embodied and broadly described herein, the invention further provides a method for reducing a risk of contaminating automated unloading equipment during unloading of bitumen from a shipping container as a result of bitumen material sticking to the unloading equipment, the method comprising unloading a load of solid bitumen pellets with the unloading equipment from the shipping container, the load including at least 100 bitumen pellets having a probability, per pellet, of failing a crush-resistance test that does not exceed 0.25 when the height of the pellet load is of 10 meters.

As embodied and broadly described herein, the invention further provides a method for reducing a risk of contaminating automated unloading equipment during unloading of bitumen from a shipping container as a result of bitumen material sticking to the unloading equipment, the method comprising unloading a load of solid bitumen pellets with the unloading equipment from the shipping container, the load including at least 100 bitumen pellets having a probability, per pellet, of failing a crush-resistance test that does not exceed 0.25 when the height of the pellet load is of 20 meters.

As embodied and broadly described herein, the invention further provides a method for reducing a risk of contaminating automated unloading equipment during unloading of bitumen from a shipping container as a result of bitumen material sticking to the unloading equipment, the method comprising unloading a load of solid bitumen pellets with the unloading equipment from the shipping container, the load including at least 100 bitumen pellets having a probability, per pellet, of failing a crush-resistance test that does not exceed 0.25 when the height of the pellet load is of 30 meters.

As embodied and broadly described herein, the invention further provides a method for reducing a risk of contaminating automated unloading equipment during unloading of bitumen from a shipping container as a result of bitumen material sticking to the unloading equipment, the method comprising unloading a load of solid bitumen pellets with the unloading equipment from the shipping container, the load including at least 100 bitumen pellets having a probability, per pellet, of failing a crush-resistance test that does not exceed 0.25 when the height of the pellet load is of 40 meters.

As embodied and broadly described herein, the invention further provides a method for reducing a risk of contaminating automated unloading equipment during unloading of bitumen from a shipping container as a result of bitumen material sticking to the unloading equipment, the method comprising unloading a load of solid bitumen pellets with the unloading equipment from the shipping container, the load including at least 100 bitumen pellets having a probability, per pellet, of failing a crush-resistance test that does not exceed 0.25 when the height of the pellet load is of 50 meters.

As embodied and broadly described herein, the invention further provides a method for unloading of bitumen from a shipping container, the method comprising unloading a load of solid bitumen pellets with automated unloading equipment from the shipping container, the load including at least 100 bitumen pellets having a probability, per pellet, of failing an impact-resistance test that does not exceed 0.25, when the dropping height is of 1 meters.

As embodied and broadly described herein, the invention further provides a method for unloading of bitumen from a shipping container, the method comprising unloading a load of solid bitumen pellets with automated unloading equipment from the shipping container, the load including at least 100 bitumen pellets having a probability, per pellet, of failing an impact-resistance test that does not exceed 0.25, when the dropping height is of 5 meters.

As embodied and broadly described herein, the invention further provides a method for unloading of bitumen from a shipping container, the method comprising unloading a load of solid bitumen pellets with automated unloading equipment from the shipping container, the load including at least 100 bitumen pellets having a probability, per pellet, of failing an impact-resistance test that does not exceed 0.25, when the dropping height is of 10 meters.

As embodied and broadly described herein, the invention further provides a method for unloading of bitumen from a shipping container, the method comprising unloading a load of solid bitumen pellets with automated unloading equipment from the shipping container, the load including at least 100 bitumen pellets having a probability, per pellet, of failing an impact-resistance test that does not exceed 0.25, when the dropping height is of 20 meters.

As embodied and broadly described herein, the invention further provides a method for unloading of bitumen from a shipping container, the method comprising unloading a load of solid bitumen pellets with automated unloading equipment from the shipping container, the load including at least 100 bitumen pellets having a probability, per pellet, of failing an impact-resistance test that does not exceed 0.25, when the dropping height is of 30 meters.

As embodied and broadly described herein, the invention further provides a method for unloading of bitumen from a shipping container, the method comprising unloading a load of solid bitumen pellets with automated unloading equipment from the shipping container, the load including at least 100 bitumen pellets having a probability, per pellet, of failing an impact-resistance test that does not exceed 0.25, when the dropping height is of 40 meters.

As embodied and broadly described herein, the invention further provides a method for unloading of bitumen from a shipping container, the method comprising unloading a load of solid bitumen pellets with automated unloading equipment from the shipping container, the load including at least 100 bitumen pellets having a probability, per pellet, of failing an impact-resistance test that does not exceed 0.25, when the dropping height is of 50 meters.

As embodied and broadly described herein, the invention also provides an additive material retrieved from a solid bitumen pellet, the additive material comprising a component operative to increase the viscosity of bitumen when the component is admixed with the bitumen, and the additive material further including bitumen material.

As embodied and broadly described herein, the invention provides a method of making a solid bitumen pellet, the method including mixing bitumen with an additive material, the additive material including a component operative to increase the viscosity of bitumen when the component is admixed with the bitumen, and the additive material further including bitumen material.

As embodied and broadly described herein, the invention also provides a solid bitumen pellet comprising an external shell and an internal bituminous core, the shell operating to protect the core, the pellet having a burst pressure of 0.5 psi or more.

As embodied and broadly described herein, the invention also provides bitumen recovered from a load of solid bitumen pellets, the bitumen incorporating by weight percentage a non-nil quantity of additive used to increase the viscosity of the bitumen in the pellets.

As embodied and broadly described herein, the invention provides a transportation container for carrying a load of solid bitumen pellets, the transportation container including a sensor for detecting an occurrence of pellet softening that can compromise the structural integrity of the pellets. In a non-limiting example of implementation, the sensor is a temperature sensor, which detects an increase of the temperature in the transportation container above a threshold at which the pellets start softening. Optionally, the transportation container is provided with a cooling device to lower the temperature and prevent the pellets from softening. The cooling device can be an active cooling device, using a refrigeration cycle. Alternatively, the cooling device can include air vents to allow air to circulate in the transportation container and cool the load of bitumen pellets.

The following non-limiting embodiments provide a further description of non-limiting examples of the invention:

1. A set of 100 solid bitumen pellets, the set having a probability of failing a crush-resistance test per pellet that does not exceed 0.25, when subjected to a load of pellets having a height of 1 meter.
2. A set of 100 solid bitumen pellets, the set having a probability of failing a crush-resistance test per pellet that does not exceed 0.25, when subjected to a load of pellets having a height of 5 meters.
3. A set of 100 solid bitumen pellets, the set having a probability of failing a crush-resistance test per pellet that does not exceed 0.25, when subjected to a load of pellets having a height of 10 meters.
4. A set of 100 solid bitumen pellets, the set having a probability of failing a crush-resistance test per pellet that does not exceed 0.25, when subjected to a load of pellets having a height of 20 meters.
5. A set of 100 solid bitumen pellets, the set having a probability of failing a crush-resistance test per pellet that does not exceed 0.25, when subjected to a load of pellets having a height of 30 meters.
6. A set of 100 solid bitumen pellets, the set having a probability of failing a crush-resistance test per pellet that does not exceed 0.25, when subjected to a load of pellets having a height of 40 meters.
7. A set of 100 solid bitumen pellets, the set having a probability of failing a crush-resistance test per pellet that does not exceed 0.25, when subjected to a load of pellets having a height of 50 meters.
8. The set of bitumen pellets according to any one of embodiments 1 to 7, wherein each pellet includes a mixture of bitumen and an additive operating to increase a viscosity of the bitumen.
9. The set of bitumen pellets according to embodiment 8, wherein a solubility of the additive into bitumen at a temperature of 150° C. is less than 5 wt. %.
10. The set of bitumen pellets according to embodiment 9, wherein the solubility of the additive into bitumen at a temperature of 150° C. is less than 1 wt. %.
11. The set of bitumen pellets according to embodiment 9, wherein the solubility of the additive into bitumen at a temperature of 150° C. is less than 0.5 wt. %.
12. The set of bitumen pellets according to embodiment 9, wherein the solubility of the additive into bitumen at a temperature of 150° C. is less than 0.05 wt. %.
13. The set of bitumen pellets according to embodiment 8, wherein the additive includes a hydrocarbonaceous polymer.
14. The set of bitumen pellets according to embodiment 13, wherein the hydrocarbonaceous polymer has a melting point temperature of at least 50° C.
15. The set of bitumen pellets according to embodiment 13, wherein the hydrocarbonaceous polymer has a melting point temperature within the range of from about 50° C. to about 150° C.
16. The set of bitumen pellets according to embodiment 13, wherein the hydrocarbonaceous polymer includes a polyethylene.
17. The set of bitumen pellets according to embodiment 13, wherein the hydrocarbonaceous polymer includes high density polyethylene (HDPE), polypropylene (PP), polyethylene-co-vinyl acetate (PEVA), linear low-density polyethylene (LLDPE), low-density polyethylene (LDPE), or any combinations thereof.
18. The set of bitumen pellets according to any one of embodiments 13 to 17, wherein the hydrocarbonaceous polymer is present in a relative quantity of from about 1 wt. % to about 20 wt. % relative to bitumen.
19. The set of bitumen pellets according to any one of embodiments 13 to 17, wherein the hydrocarbonaceous polymer is present in a relative quantity of at least 10 wt. % relative to bitumen.
20. The set of bitumen pellets according to embodiment 18, wherein the hydrocarbonaceous polymer is present in a relative quantity of from about 8 wt. % to about 10 wt. % relative to bitumen.
21. The set of bitumen pellets according to any one of embodiments 1 to 7, wherein each pellet includes an external shell and an internal bituminous core, the shell operating to protect the core.
22. The set of bitumen pellets according to embodiment 21, wherein the shell is harder than the core.
23. The set of bitumen pellets according to embodiment 22, wherein each pellet includes an internal pressure which is above ambient pressure, wherein the shell is hermetically sealed to maintain the internal pressure of the pellet.
24. The set of bitumen pellets according to embodiment 23, wherein the internal pressure is above ambient pressure by an amount up to about 15 psi.
25. The set of bitumen pellets according to embodiment 22, wherein the shell includes an outwardly extending flash.
26. The set of bitumen pellets according to embodiment 22, wherein the shell has an outer surface including irregularities to reduce slipperiness of the pellet.
27. The set of bitumen pellets according to embodiment 22, wherein the shell includes a crimp seal.

28. The set of bitumen pellets according to embodiment 27, wherein the crimp seal extends transversally to a longitudinal axis of the pellet.
29. The set of bitumen pellets according to embodiment 22, wherein the shell includes first and second crimp seals in a spaced apart relationship to one another.
30. The set of bitumen pellets according to embodiment 27, wherein the crimp seal extends along a longitudinal axis of the pellet.
31. The set of bitumen pellets according to embodiment 30, wherein the crimp seal is formed by thermally sealing to each other opposing walls of the shell.
32. The set of bitumen pellets according to embodiment 27, wherein the crimp seal is substantially free of bitumen.
33. The set of bitumen pellets according to embodiment 22, wherein the core includes a mixture of bitumen and an additive operating to increase viscosity of the bitumen.
34. The set of bitumen pellets according to embodiment 33, wherein solubility of the additive into bitumen at a temperature of 150° C. is less than 5 wt. %.
35. The set of bitumen pellets according to embodiment 34, wherein the solubility of the additive into bitumen at a temperature of 150° C. is less than 1 wt. %.
36. The set of bitumen pellets according to embodiment 34, wherein the solubility of the additive into bitumen at a temperature of 150° C. is less than 0.5 wt. %.
37. The set of bitumen pellets according to embodiment 34, wherein the solubility of the additive into bitumen at a temperature of 150° C. is less than 0.05 wt. %.
38. The set of bitumen pellets according to embodiment 33, wherein the additive includes hydrocarbonaceous polymer.
39. The set of bitumen pellets according to embodiment 38, wherein the hydrocarbonaceous polymer has a melting point temperature of at least 50° C.
40. The set of bitumen pellets according to embodiment 38, wherein the hydrocarbonaceous polymer has a melting point temperature within the range of from about 50° C. to about 150° C.
41. The set of bitumen pellets according to embodiment 38, wherein the hydrocarbonaceous polymer includes a polyethylene.
42. The set of bitumen pellets according to embodiment 38, wherein the hydrocarbonaceous polymer includes high density polyethylene (HDPE), polypropylene (PP), polyethylene-co-vinyl acetate (PEVA), linear low-density polyethylene (LLDPE), low-density polyethylene (LDPE), or any combinations thereof.
43. The set of bitumen pellets according to any one of embodiments 38 to 42, wherein the hydrocarbonaceous polymer is present in the core in a relative quantity of from about 1 wt. % to about 20 wt. % relative to bitumen.
44. The set of bitumen pellets according to embodiment 43, wherein the hydrocarbonaceous polymer is present in the core in a relative quantity of from about 1 wt. % to about 5 wt. % relative to bitumen.
45. The set of bitumen pellets according to any one of embodiments 38 to 42, wherein the hydrocarbonaceous polymer is present in the core in a relative quantity of at least 10 wt. % relative to bitumen.
46. The set of bitumen pellets according to any one of embodiments 1 to 45, each pellet having a maximal extent of less than a quarter inch.
47. The set of bitumen pellets according to any one of embodiments 1 to 45, each pellet having a maximal extent of less than half an inch.
48. The set of bitumen pellets according to any one of embodiments 1 to 45, each pellet having a maximal extent of less than an inch.
49. The set of bitumen pellets according to any one of embodiments 1 to 45, each pellet having a maximal extent of less than 2 inches.
50. The set of bitumen pellets according to any one of embodiments 1 to 45, each pellet having a maximal extent of less than 3 inches.
51. The set of bitumen pellets according to any one of embodiments 1 to 45, each pellet having a maximal extent of less than 4 inches.
52. The set of bitumen pellets according to any one of embodiments 1 to 45, each pellet having a maximal extent of less than 5 inches.
53. The set of bitumen pellets according to any one of embodiments 1 to 45, each pellet having a maximal extent of less than 12 inches.
54. A set of 100 solid bitumen pellets, the set having a probability of failing an impact-resistance test, per pellet that does not exceed 0.25, when the height of drop is of 1 meter.
55. A set of 100 solid bitumen pellets, the set having a probability of failing an impact-resistance test, per pellet that does not exceed 0.25, when the height of drop is of 5 meters.
56. A set of 100 solid bitumen pellets, the set having a probability of failing an impact-resistance test, per pellet that does not exceed 0.25, when the height of drop is of 10 meters.
57. A set of 100 solid bitumen pellets, the set having a probability of failing an impact-resistance test, per pellet that does not exceed 0.25, when the height of drop is of 20 meters.
58. A set of 100 solid bitumen pellets, the set having a probability of failing an impact-resistance test, per pellet that does not exceed 0.25, when the height of drop is of 30 meters.
59. A set of 100 solid bitumen pellets, the set having a probability of failing an impact-resistance test, per pellet that does not exceed 0.25, when the height of drop is of 40 meters.
60. A set of 100 solid bitumen pellets, the set having a probability of failing an impact-resistance test, per pellet that does not exceed 0.25, when the height of drop is of 50 meters.
61. The set of bitumen pellets according to any one of embodiments 54 to 60, wherein the pellet includes a mixture of bitumen and an additive operating to increase viscosity of the bitumen.
62. The set of bitumen pellets according to embodiment 61, wherein solubility of the additive into bitumen at a temperature of 150° C. is less than 5 wt. %.
63. The set of bitumen pellets according to embodiment 62, wherein the solubility of the additive into bitumen at a temperature of 150° C. is less than 1 wt. %.
64. The set of bitumen pellets according to embodiment 62, wherein the solubility of the additive into bitumen at a temperature of 150° C. is less than 0.5 wt. %.
65. The set of bitumen pellets according to embodiment 62, wherein the solubility of the additive into bitumen at a temperature of 150° C. is less than 0.05 wt. %.
66. The set of bitumen pellets according to embodiment 61, wherein the additive includes hydrocarbonaceous polymer.

67. The set of bitumen pellets according to embodiment 66, wherein the hydrocarbonaceous polymer has a melting point temperature of at least 50° C.
68. The set of bitumen pellets according to embodiment 66, wherein the hydrocarbonaceous polymer has a melting point temperature within the range of from about 50° C. to about 150° C.
69. The set of bitumen pellets according to embodiment 66, wherein the hydrocarbonaceous polymer includes a polyethylene.
70. The set of bitumen pellets according to embodiment 66, wherein the polyethylene includes high density polyethylene (HDPE), polypropylene (PP), polyethylene-co-vinyl acetate (PEVA) linear low-density polyethylene (LLDPE), low-density polyethylene (LDPE), or any combinations thereof.
71. The set of bitumen pellets according to any one of embodiments 63 to 70, wherein the hydrocarbonaceous polymer is present in a relative quantity of from about 1 wt. % to about 20 wt. % relative to bitumen.
72. The set of bitumen pellets according to any one of embodiments 63 to 70, wherein the hydrocarbonaceous polymer is present in a relative quantity of at least 10 wt. % relative to bitumen.
73. The set of bitumen pellets according to embodiment 71, wherein the hydrocarbonaceous polymer is present in a relative quantity of from about 8 wt. % to about 10 wt. % relative to bitumen.
74. The set of bitumen pellets according to any one of embodiments 54 to 60, wherein each pellet includes an external shell and an internal bituminous core, the shell operating to protect the core.
75. The set of bitumen pellets according to embodiment 74, wherein the shell is harder than the core.
76. The set of bitumen pellets according to embodiment 75, wherein each pellet includes an internal pressure which is above ambient pressure, wherein the shell is hermetically sealed to maintain the internal pressure of the pellet.
77. The set of bitumen pellets according to embodiment 76, wherein the internal pressure is above ambient pressure by an amount up to about 15 psi.
78. The set of bitumen pellets according to embodiment 75, wherein the shell includes an outwardly extending flash.
79. The set of bitumen pellets according to embodiment 75, wherein the shell has an outer surface including irregularities to reduce slipperiness of the pellet.
80. The set of bitumen pellets according to embodiment 75, wherein the shell includes a crimp seal.
81. The set of bitumen pellets according to embodiment 80, wherein the crimp seal extends transversally to a longitudinal axis of the pellet.
82. The set of bitumen pellets according to embodiment 80, wherein the crimp seal extends along a longitudinal axis of the pellet.
83. The set of bitumen pellets according to embodiment 82, wherein the crimp seal is formed by thermally sealing to each other opposing walls of the shell.
84. The set of bitumen pellets according to embodiment 80, wherein the crimp seal is substantially free of bitumen.
85. The set of bitumen pellets according to embodiment 75, wherein the shell includes first and second crimp seals in a spaced apart relationship to one another.
86. The set of bitumen pellets according to embodiment 75, wherein the core includes a mixture of bitumen and an additive operating to increase viscosity of the bitumen.
87. The set of bitumen pellets according to embodiment 86, wherein solubility of the additive into bitumen at a temperature of 150° C. is less than 5 wt. %.
88. The set of bitumen pellets according to embodiment 86, wherein the additive includes a hydrocarbonaceous polymer.
89. The set of bitumen pellets according to embodiment 88, wherein the hydrocarbonaceous polymer has a melting point temperature of at least 50° C.
90. The set of bitumen pellets according to embodiment 88, wherein the hydrocarbonaceous polymer has a melting point temperature within the range of from about 50° C. to about 150° C.
91. The set of bitumen pellets according to embodiment 88, wherein the hydrocarbonaceous polymer includes a polyethylene.
92. The set of bitumen pellets according to embodiment 88, wherein the hydrocarbonaceous polymer includes high density polyethylene (HDPE), polypropylene (PP), polyethylene-co-vinyl acetate (PEVA) linear low-density polyethylene (LLDPE), low-density polyethylene (LDPE), or any combinations thereof.
93. The set of bitumen pellets according to any one of embodiments 88 to 92, wherein the hydrocarbonaceous polymer is present in the core in a relative quantity of from about 1 wt. % to about 20 wt. % relative to bitumen.
94. The set of bitumen pellets according to embodiment 93, wherein the hydrocarbonaceous polymer is present in the core in a relative quantity of from about 8 wt. % to about 10 wt. % relative to bitumen.
95. The set of bitumen pellets according to any one of embodiments 88 to 92, wherein the hydrocarbonaceous polymer is present in the core in a relative quantity of at least 10 wt. % relative to bitumen.
96. The set of bitumen pellets according to any one of embodiments 54 to 95, each pellet having a maximal extent of less than a quarter inch.
97. The set of bitumen pellets according to any one of embodiments 54 to 95, each pellet having a maximal extent of less than half an inch.
98. The set of bitumen pellets according to any one of embodiments 54 to 95, each pellet having a maximal extent of less than an inch.
99. The set of bitumen pellets according to any one of embodiments 54 to 95, each pellet having a maximal extent of less than 2 inches.
100. The set of bitumen pellets according to any one of embodiments 54 to 95, each pellet having a maximal extent of less than 3 inches.
101. The set of bitumen pellets according to any one of embodiments 54 to 95, each pellet having a maximal extent of less than 4 inches.
102. The set of bitumen pellets according to any one of embodiments 54 to 95, each pellet having a maximal extent of less than 5 inches.
103. The set of bitumen pellets according to any one of embodiments 54 to 95, each pellet having a maximal extent of less than 12 inches.
104. A pile of solid bitumen pellets having an angle of repose in the range of from about 20 degrees to about 45 degrees.
105. The pile of bitumen pellets according to embodiment 104, having an angle of repose in the range of from about 25 degrees to about 40 degrees.
106. The pile of bitumen pellets according to embodiment 104, having an angle of repose in the range of from about 30 degrees to about 40 degrees.

107. The pile of bitumen pellets according to any one of embodiments 104 to 106, each pellet including a mixture of bitumen and an additive operating to increase viscosity of the bitumen.
108. The pile of bitumen pellets according to embodiment 107, wherein solubility of the additive into bitumen at a temperature of 150° C. is less than 5 wt. %.
109. The pile of bitumen pellets according to embodiment 108, wherein the solubility of the additive into bitumen at a temperature of 150° C. is less than 1 wt. %.
110. The pile of bitumen pellets according to embodiment 108, wherein the solubility of the additive into bitumen at a temperature of 150° C. is less than 0.5 wt. %.
111. The pile of bitumen pellets according to embodiment 108, wherein the solubility of the additive into bitumen at a temperature of 150° C. is less than 0.1 wt. %.
112. The pile of bitumen pellets according to embodiment 108, wherein the solubility of the additive into bitumen at a temperature of 150° C. is less than 0.05 wt. %.
113. The pile of bitumen pellets according to embodiment 107, wherein the additive includes a hydrocarbonaceous polymer.
114. The pile of bitumen pellets according to embodiment 113, wherein the hydrocarbonaceous polymer has a melting point temperature of at least 50° C.
115. The pile of bitumen pellets according to embodiment 113, wherein the hydrocarbonaceous polymer has a melting point temperature within the range of from about 50° C. to about 150° C.
116. The pile of bitumen pellets according to embodiment 113, wherein the hydrocarbonaceous polymer includes a polyethylene.
117. The pile of bitumen pellets according to embodiment 113, wherein the hydrocarbonaceous polymer includes high density polyethylene (HDPE), polypropylene (PP), polyethylene-co-vinyl acetate (PEVA), linear low-density polyethylene (LLDPE), low-density polyethylene (LDPE), or any combinations thereof.
118. The pile of bitumen pellets according to any one of embodiments 113 to 117, wherein the hydrocarbonaceous polymer is present in a relative quantity of from about 1 wt. % to about 20 wt. % relative to bitumen.
119. The pile of bitumen pellets according to any one of embodiments 113 to 117, wherein the hydrocarbonaceous polymer is present in a relative quantity of at least 10 wt. % relative to bitumen.
120. The pile of bitumen pellets according to embodiment 118, wherein the hydrocarbonaceous polymer is present in a relative quantity of from about 8 to about 10 wt. % relative to bitumen.
121. The pile of bitumen pellets according to any one of embodiments 104 to 106, each pellet including an external shell and an internal bituminous core, the shell operating to protect the core.
122. The pile of bitumen pellets according to embodiment 121, wherein the shell is harder than the core.
123. The pile of bitumen pellets according to embodiment 122, each pellet including an internal pressure which is above ambient pressure, wherein the shell is hermetically sealed to maintain the internal pressure of the pellet.
124. The pile of bitumen pellets according to embodiment 123, wherein the internal pressure is above ambient pressure by an amount up to about 15 psi.
125. The pile of bitumen pellets according to embodiment 122, wherein the shell includes an outwardly extending flash.
126. The pile of bitumen pellets according to embodiment 122, wherein the shell has an outer surface including irregularities to reduce slipperiness of the pellet.
127. The pile of bitumen pellet according to embodiment 122, wherein the shell includes a crimp seal.
128. The pile of bitumen pellet according to embodiment 127, wherein the crimp seal extends transversally to a longitudinal axis of the pellet.
129. The pile of bitumen pellet according to embodiment 127, wherein the crimp seal extends along a longitudinal axis of the pellet.
130. The pile of bitumen pellet according to embodiment 129, wherein the crimp seal is formed by thermally sealing to each other opposing walls of the shell.
131. The pile of bitumen pellet according to embodiment 127, wherein the crimp seal is substantially free of bitumen.
132. The pile of bitumen pellet according to embodiment 122, wherein the shell includes first and second crimp seals in a spaced apart relationship to one another.
133. The pile of bitumen pellets according to embodiment 122, wherein the core includes a mixture of bitumen and an additive operating to increase viscosity of the bitumen.
134. The pile of bitumen pellets according to embodiment 133, wherein solubility of the additive into bitumen at a temperature of 150° C. is less than 5 wt. %.
135. The pile of bitumen pellets according to embodiment 133, wherein the additive includes a hydrocarbonaceous polymer.
136. The pile of bitumen pellets according to embodiment 135, wherein the hydrocarbonaceous polymer has a melting point temperature of at least 50° C.
137. The pile of bitumen pellets according to embodiment 135, wherein the hydrocarbonaceous polymer has a melting point temperature within the range of from about 50° C. to about 150° C.
138. The pile of bitumen pellets according to embodiment 135, wherein the hydrocarbonaceous polymer includes a polyethylene.
139. The pile of bitumen pellets according to embodiment 135, wherein the hydrocarbonaceous polymer includes high density polyethylene (HDPE), polypropylene (PP), polyethylene-co-vinyl acetate (PEVA) linear low-density polyethylene (LLDPE), low-density polyethylene (LDPE), or any combinations thereof.
140. The pile of bitumen pellets according to any one of embodiments 135 to 139, wherein the hydrocarbonaceous polymer is present in the core in a relative quantity of from about 1 wt. % to about 20 wt. % relative to bitumen.
141. The pile of bitumen pellets according to any one of embodiments 135 to 139, wherein the hydrocarbonaceous polymer is present in the core in a relative quantity of at least 10 wt. % relative to bitumen.
142. The pile of bitumen pellets according to any one of embodiments 104 to 141, each pellet having a maximal extent of less than a quarter inch.
143. The pile of bitumen pellets according to any one of embodiments 104 to 141, each pellet having a maximal extent of less than half an inch.
144. The pile of bitumen pellets according to any one of embodiments 104 to 141, each pellet having a maximal extent of less than an inch.
145. The pile of bitumen pellets according to any one of embodiments 104 to 141, each pellet having a maximal extent of less than 2 inches.

146. The pile of bitumen pellets according to any one of embodiments 104 to 141, each pellet having a maximal extent of less than 3 inches.
147. The pile of bitumen pellets according to any one of embodiments 104 to 141, each pellet having a maximal extent of less than 4 inches.
148. The pile of bitumen pellets according to any one of embodiments 104 to 141, each pellet having a maximal extent of less than 5 inches.
149. The pile of bitumen pellets according to any one of embodiments 104 to 141, each pellet having a maximal extent of less than 12 inches.
150. A solid bitumen pellet, including a mixture of bitumen and an additive, where the additive operates to increase the viscosity of the mixture.
151. The bitumen pellet according to embodiment 150, wherein solubility of the additive into bitumen at a temperature of 150° C. is less than 5 wt. %.
152. The bitumen pellet according to embodiment 150, wherein solubility of the additive into bitumen at a temperature of 150° C. is less than 1 wt. %.
153. The bitumen pellet according to embodiment 150, wherein solubility of the additive into bitumen at a temperature of 150° C. is less than 0.5 wt. %.
154. The bitumen pellet according to embodiment 150, wherein solubility of the additive into bitumen at a temperature of 150° C. is less than 0.1 wt. %
155. The bitumen pellet according to embodiment 150, wherein solubility of the additive into bitumen at a temperature of 150° C. is less than 0.05 wt. %.
156. The bitumen pellet according to any one of embodiments 150 to 155, wherein the additive includes a hydrocarbonaceous polymer.
157. The bitumen pellet according to embodiment 156, wherein the hydrocarbonaceous polymer has a melting point temperature of at least 50° C.
158. The bitumen pellet according to embodiment 156, wherein the hydrocarbonaceous polymer has a melting point temperature within the range of from about 50° C. to about 150° C.
159. The bitumen pellet according to embodiment 156, wherein the hydrocarbonaceous polymer includes a polyethylene.
160. The bitumen pellet according to embodiment 156, wherein the hydrocarbonaceous polymer includes high density polyethylene (HDPE), polypropylene (PP), polyethylene-co-vinyl acetate (PEVA) linear low-density polyethylene (LLDPE), low-density polyethylene (LDPE), or any combinations thereof.
161. The bitumen pellet according to embodiment 156, wherein the hydrocarbonaceous polymer is present in a relative quantity of from about 1 wt. % to about 20 wt. % relative to bitumen.
162. The bitumen pellet according to embodiment 156, wherein the hydrocarbonaceous polymer is present in a relative quantity of at least 10 wt. % relative to bitumen.
163. The bitumen pellet according to any one of embodiments 150 to 162, wherein the pellet includes an external shell.
164. The bitumen pellet according to embodiment 163, wherein the pellet has a core and the shell surrounds the core.
165. The bitumen pellet according to embodiment 164, wherein the shell includes a hydrocarbonaceous polymer.
166. The bitumen pellet according to embodiment 164, wherein the shell includes a hydrocarbonaceous polymer which includes a polyethylene.
167. The bitumen pellet according to embodiment 164, wherein the shell includes a hydrocarbonaceous polymer which includes a cross-linked polyethylene.
168. The bitumen pellet according to embodiment 164, wherein the shell includes a hydrocarbonaceous polymer which includes high density polyethylene (HDPE), polypropylene (PP), polyethylene-co-vinyl acetate (PEVA) linear low-density polyethylene (LLDPE), low-density polyethylene (LDPE), or any combinations thereof.
169. The bitumen pellet according to embodiment 164, wherein the shell includes a hydrocarbonaceous polymer in an amount within the range of from about 0.01 to about 20 wt. % relative to bitumen.
170. The bitumen pellet according to embodiment 164, wherein the shell includes a hydrocarbonaceous polymer in an amount within the range of from about 0.01 to about 5 wt. % relative to bitumen.
171. The bitumen pellet according to any one of embodiments 164 to 170, wherein the shell includes a hydrocarbonaceous polymer which is different from the additive.
172. The bitumen pellet according to embodiment 164, wherein the shell fully surrounds the core.
173. The bitumen pellet according to embodiment 164, wherein the shell partially surrounds the core.
174. The bitumen pellet according to embodiment 164, wherein the shell is substantially free of bitumen.
175. The bitumen pellet according to any one of embodiments 163 to 174, wherein the shell has a thickness less than about 5 mm.
176. The bitumen pellet according to embodiment 175, wherein the shell has a thickness within the range of from about 10 μm to about 4.5 mm.
177. The bitumen pellet according to embodiment 175, wherein the shell has a thickness within the range of from about 20 μm to about 3 mm.
178. The bitumen pellet according to embodiment 175, wherein the shell has a thickness within the range of about 20 μm to about 2 mm.
179. The bitumen pellet according to embodiment 175, wherein the shell has a thickness within the range of about 20 μm to about 1 mm.
180. The bitumen pellet according to any one of embodiments 175 to 179, wherein the shell includes an outwardly extending flash.
181. The bitumen pellet according to any one of embodiments 164 to 174, wherein the shell is harder than the core.
182. The bitumen pellet according to embodiment 181, wherein the shell includes a crimp seal.
183. The bitumen pellet according to embodiment 182, wherein the crimp seal extends transversally to a longitudinal axis of the pellet.
184. The bitumen pellet according to embodiment 182, wherein the crimp seal extends along a longitudinal axis of the pellet.
185. The bitumen pellet according to embodiment 184, wherein the crimp seal is formed by thermally sealing to each other opposing walls of the shell.
186. The bitumen pellet according to embodiment 182, wherein the crimp seal is substantially free of bitumen.
187. The bitumen pellet according to embodiment 181, wherein the shell includes first and second crimp seals in a spaced apart relationship to one another.
188. The bitumen pellet according to any one of embodiments 164 to 174, wherein the shell is in the form of a film.

189. The bitumen pellet according to any one of embodiments 164 to 174, wherein the pellet includes an internal pressure which is above ambient pressure, wherein the shell is hermetically sealed to maintain the internal pressure of the pellet.

190. The bitumen pellet according to embodiment 189, wherein the internal pressure is above ambient pressure by an amount up to about 15 psi.

191. The bitumen pellet according to any one of embodiments 163 to 188, the shell having a shape selected from generally spherical, generally lozenge-like, generally cylindrical, generally discoidal, generally tabular, generally ellipsoidal, generally flaky, generally acicular, generally ovoidal, generally pillow shaped and any combinations thereof.

192. The bitumen pellet according to any one of embodiments 163 to 188, wherein the pellet has a maximal extent of less than a quarter inch.

193. The bitumen pellet according to any one of embodiments 163 to 188, wherein the pellet has a maximal extent of less than half an inch.

194. The bitumen pellet according to any one of embodiments 163 to 188, wherein the pellet has a maximal extent of less than an inch.

195. The bitumen pellet according to any one of embodiments 163 to 188, wherein the pellet has a maximal extent of less than 2 inches.

196. The bitumen pellet according to any one of embodiments 163 to 188, wherein the pellet has a maximal extent of less than 3 inches.

197. The bitumen pellet according to any one of embodiments 163 to 188, wherein the pellet has a maximal extent of less than 4 inches.

198. The bitumen pellet according to any one of embodiments 163 to 188, wherein the pellet has a maximal extent of less than 5 inches.

199. The bitumen pellet according to any one of embodiments 163 to 188, wherein the pellet has a maximal extent of less than 12 inches.

200. A set of 100 bitumen pellets, wherein each pellets has a structure as defined in embodiment 150, wherein the set has a probability, per pellet, of failing a crush-resistance test that does not exceed 0.25, when the pellet load height is of 5 meters.

201. A set of 100 bitumen pellets, wherein each pellets has a structure as defined in embodiment 150, wherein the set has a probability, per pellet, of failing an impact-resistance test that does not exceed 0.25, when the height of drop is of 5 meters.

202. A pile of bitumen pellets, wherein each pellets has a structure as defined in embodiment 150, wherein the pile has an angle of repose in the range from about 20 degrees to about 45 degrees.

203. A solid bitumen pellet including an emulsion of bitumen and a hydrocarbonaceous polymer.

204. The bitumen pellet according to embodiment 203, wherein the emulsion includes discrete droplets of said hydrocarbonaceous polymer dispersed throughout the bitumen.

205. The bitumen pellet according to embodiment 204, wherein subjecting the pellet to a recovery process including a coalescence step, results in a fusion of at least a portion of said discrete droplets of said hydrocarbonaceous polymer.

206. The bitumen pellet according to any one of embodiments 203 to 205, wherein the hydrocarbonaceous polymer has a melting point temperature of at least 50° C.

207. The bitumen pellet according to any one of embodiments 203 to 205, wherein the hydrocarbonaceous polymer has a melting point temperature within the range of from about 50° C. to about 150° C.

208. The bitumen pellet according to any one of embodiments 203 to 205, wherein the hydrocarbonaceous polymer includes a polyethylene.

209. The bitumen pellet according to any one of embodiments 203 to 205, wherein the hydrocarbonaceous polymer includes high density polyethylene (HDPE), polypropylene (PP), polyethylene-co-vinyl acetate (PEVA) linear low-density polyethylene (LLDPE), low-density polyethylene (LDPE), or any combinations thereof.

210. The bitumen pellet according to any one of embodiments 203 to 209, wherein the hydrocarbonaceous polymer is present in a relative quantity of from about 1 wt. % to about 20 wt. % relative to bitumen.

211. The bitumen pellet according to any one of embodiments 203 to 209, wherein the hydrocarbonaceous polymer is present in a relative quantity of at least 10 wt. % relative to bitumen.

212. The bitumen pellet according to any one of embodiments 203 to 211, wherein the pellet includes an external shell.

213. The bitumen pellet according to embodiment 212, wherein the pellet has a core and the shell surrounds the core, the emulsion being in the core.

214. The bitumen pellet according to embodiment 213, wherein the shell includes a hydrocarbonaceous polymer.

1. The bitumen pellet according to embodiment 213, wherein the shell includes a hydrocarbonaceous polymer which includes a polyethylene.

2. The bitumen pellet according to embodiment 213, wherein the shell includes a hydrocarbonaceous polymer which includes a cross-linked polyethylene.

215. The bitumen pellet according to embodiment 213, wherein the shell includes a hydrocarbonaceous polymer which includes high density polyethylene (HDPE), polypropylene (PP), polyethylene-co-vinyl acetate (PEVA) linear low-density polyethylene (LLDPE), low-density polyethylene (LDPE), or any combinations thereof.

216. The bitumen pellet according to embodiment 213, wherein the shell includes a hydrocarbonaceous polymer in an amount within the range of from about 0.01 to about 20 wt. % relative to bitumen.

217. The bitumen pellet according to embodiment 213, wherein the shell includes a hydrocarbonaceous polymer in an amount within the range of from about 0.01 to about 5 wt. % relative to bitumen.

218. The bitumen pellet according to any one of embodiments 213 to 219, wherein the shell includes a hydrocarbonaceous polymer being different from the additive.

219. The bitumen pellet according to embodiment 213, wherein the shell fully surrounds the core.

220. The bitumen pellet according to embodiment 213, wherein the shell partially surrounds the core.

221. The bitumen pellet according to any one of embodiments 212 to 222, wherein the shell has a thickness of less than about 5 mm.

222. The bitumen pellet according to embodiment 223, wherein the shell has a thickness within the range of from about 10 µm to about 4.5 mm.

223. The bitumen pellet according to embodiment 223, wherein the shell has a thickness within the range of from about 20 µm to about 3 mm.

224. The bitumen pellet according to embodiment 223, wherein the shell has a thickness within the range of from about 20 μm to about 2 mm.
225. The bitumen pellet according to embodiment 223, wherein the shell has a thickness within the range of from about 20 μm to about 1 mm.
226. The bitumen pellet according to any one of embodiments 223 to 227, wherein the shell includes an outwardly extending flash.
227. The bitumen pellet according to any one of embodiments 213 to 222, wherein the shell is harder than the core.
228. The bitumen pellet according to embodiment 229, wherein the shell includes a crimp seal.
229. The bitumen pellet according to embodiment 230, wherein the crimp seal extends transversally to a longitudinal axis of the pellet.
230. The bitumen pellet according to embodiment 230, wherein the crimp seal extends along a longitudinal axis of the pellet.
231. The bitumen pellet according to embodiment 232, wherein the crimp seal is formed by thermally sealing to each other opposing walls of the shell.
232. The bitumen pellet according to embodiment 230, wherein the crimp seal is substantially free of bitumen.
233. The bitumen pellet according to embodiment 229, wherein the shell includes first and second crimp seals in a spaced apart relationship to one another.
234. The bitumen pellet according to any one of embodiments 212 to 222, wherein the shell is in the form of a flexible film.
235. The bitumen pellet according to any one of embodiments 212 to 222, wherein the pellet includes an internal pressure which is above ambient pressure, wherein the shell is hermetically sealed to maintain the internal pressure of the pellet.
236. The bitumen pellet according to embodiment 237, wherein the internal pressure is above ambient pressure by an amount up to about 15 psi.
237. The bitumen pellet according to any one of embodiments 212 to 236, the shell having a shape selected from generally spherical, generally lozenge-like, generally cylindrical, generally discoidal, generally tabular, generally ellipsoidal, generally flaky, generally acicular, generally ovoidal, generally pillow shaped and any combinations thereof.
238. The bitumen pellet according to any one of embodiments 212 to 239, having a maximal extent of less than a quarter inch.
239. The bitumen pellet according to any one of embodiments 212 to 239, having a maximal extent of less than half an inch.
240. The bitumen pellet according to any one of embodiments 212 to 239, having a maximal extent of less than an inch.
241. The bitumen pellet according to any one of embodiments 212 to 239, having a maximal extent of less than 2 inches.
242. The bitumen pellet according to any one of embodiments 212 to 239, having a maximal extent of less than 3 inches.
243. The bitumen pellet according to any one of embodiments 212 to 239, having a maximal extent of less than 4 inches.
244. The bitumen pellet according to any one of embodiments 212 to 239, having a maximal extent of less than 5 inches.
245. The bitumen pellet according to any one of embodiments 212 to 239, having a maximal extent of less than 12 inches.
246. A set of 100 bitumen pellets, wherein each pellets has a structure as defined in any one of embodiments 203 to 247, wherein the set has a probability, per pellet, of failing a crush-resistance test that does not exceed 0.25, when the pellet load height is of 5 meters.
247. A set of 100 bitumen pellets, wherein each pellets has a structure as defined in any one of embodiments 203 to 247, wherein the set has a probability, per pellet, of failing an impact-resistance test that does not exceed 0.25, when the height of drop is of 5 meters.
248. A pile of bitumen pellets, wherein each pellets has a structure as defined in any one of embodiments 203 to 247, wherein the pile has an angle of repose in the range from about 20 degrees to about 45 degrees.
249. A method for storing bitumen, the method comprising discharging solid bitumen pellets to form a pile of pellets, the pile including 100 solid bitumen pellets characterized by having a probability, per pellet of failing a crush-resistance test that does not exceed 0.25, when the height of the load of pellets is of H meters, the step of discharging said solid bitumen pellets to form the pile including controlling a height of the pile such that it does not exceed H.
250. A method for storing bitumen, the method comprising discharging solid bitumen pellets to form a pile of pellets, the pile including 100 solid bitumen pellets characterized by having a probability, per pellet of failing a crush-resistance test that does not exceed 0.20, when the height of the load of pellets is of H meters, the step of discharging said solid bitumen pellets to form the pile including controlling a height of the pile such that it does not exceed H.
251. A method for storing bitumen, the method comprising discharging solid bitumen pellets to form a pile of pellets, the pile including 100 solid bitumen pellets characterized by having a probability, per pellet of failing a crush-resistance test that does not exceed 0.15, when the height of the load of pellets is of H meters, the step of discharging said solid bitumen pellets to form the pile including controlling a height of the pile such that it does not exceed H.
252. A method for storing bitumen, the method comprising discharging solid bitumen pellets to form a pile of pellets, the pile including 100 solid bitumen pellets characterized by having a probability, per pellet of failing a crush-resistance test that does not exceed 0.10, when the height of the load of pellets is of H meters, the step of discharging said solid bitumen pellets to form the pile including controlling a height of the pile such that it does not exceed H.
253. The method according to any one of embodiments 251 to 254, wherein each pellet include a mixture of bitumen and an additive operating to increase a viscosity of the mixture.
254. The method according to embodiment 255, wherein a solubility of the additive into bitumen at a temperature of 150° C. is less than 5 wt. %.
255. The method according to embodiment 255, wherein a solubility of the additive into bitumen at a temperature of 150° C. is less than 1 wt. %.
256. The method according to embodiment 255, wherein a solubility of the additive into bitumen at a temperature of 150° C. is less than 0.5 wt. %.

257. The method according to embodiment 255, wherein a solubility of the additive into bitumen at a temperature of 150° C. is less than 0.1 wt. %.
258. The method according to embodiment 255, wherein a solubility of the additive into bitumen at a temperature of 150° C. is less than 0.05 wt. %.
259. The method according to any one of embodiments 255 to 260, wherein the additive includes a hydrocarbonaceous polymer.
260. The method according to embodiment 261, wherein the hydrocarbonaceous polymer includes a polyethylene.
261. The method according to embodiment 261, wherein the hydrocarbonaceous polymer includes high density polyethylene (HDPE), polypropylene (PP), polyethylene-co-vinyl acetate (PEVA) linear low-density polyethylene (LLDPE), low-density polyethylene (LDPE), or any combinations thereof.
262. The method according to embodiment 261, wherein the hydrocarbonaceous polymer is present in a relative quantity of from about 1 to about 20 wt. % relative to bitumen.
263. The method according to embodiment 261, wherein the hydrocarbonaceous polymer is present in a relative quantity of at least 10 wt. % relative to bitumen.
264. The method according to embodiment 264, wherein the hydrocarbonaceous polymer is present in a relative quantity of from about 8 wt. % to about 10 wt. % relative to bitumen.
265. The method according to any one of embodiments 251 to 254, wherein each pellet includes an external shell.
266. The method according to embodiment 267, wherein each pellet has a core and the shell surrounds the core.
267. The method according to embodiment 268, wherein the shell fully surrounds the core.
268. The method according to embodiment 268, wherein the shell partially surrounds the core.
269. The method according to embodiment 268, each pellet including an internal pressure which is above ambient pressure, wherein the shell is hermetically sealed to maintain the internal pressure of the pellet.
270. The method according to embodiment 271, wherein the internal pressure is above ambient pressure by an amount up to about 15 psi.
271. The method according to embodiment 268, wherein the shell is harder than the core.
272. The method according to embodiment 273, the shell having a shape selected from generally spherical, generally lozenge-like, generally cylindrical, generally discoidal, generally tabular, generally ellipsoidal, generally flaky, generally acicular, generally ovoidal, generally pillow shaped and any combinations thereof.
273. The method according to embodiment 273, wherein the shell has a thickness within the range of from about 10 μm to about 4.5 mm.
274. The method according to embodiment 275, wherein the shell has a thickness within the range of from about 20 μm to about 1 mm.
275. The method according to embodiment 275, wherein the shell has a thickness within the range of from about 20 μm to about 2 mm.
276. The method according to embodiment 275, wherein the shell has a thickness within the range of from about 20 μm to about 3 mm.
277. The method according to embodiment 275, wherein the shell has a thickness within the range of from about 20 μm to about 4 mm.
278. The method according to any one of embodiments 275 to 279, wherein the shell includes an outwardly extending flash.
279. The method according to embodiment 273, wherein the shell includes a crimp seal.
280. The method according to embodiment 281, wherein the crimp seal extends transversally to a longitudinal axis of the pellet.
281. The method according to embodiment 281, wherein the crimp seal extends along a longitudinal axis of the pellet.
282. The method according to embodiment 283, wherein the crimp seal is formed by thermally sealing to each other opposing walls of the shell.
283. The method according to embodiment 281, wherein the crimp seal is substantially free of bitumen.
284. The method according to embodiment 273, wherein the shell includes a first and second crimp seals which are in a spaced apart relationship to one another.
285. A method for storing bitumen, the method comprising discharging solid bitumen pellets to form a pile of pellets, the pile including 100 pellets characterized by having a probability, per pellet, of failing an impact-resistance test that does not exceed 0.25, when the pellets are dropped from a height H, the step of discharging the solid bitumen pellets to form the pile including controlling the height from which the pellets are dropped to form the pile such that the height does not exceed H.
286. A method for storing bitumen, the method comprising discharging solid bitumen pellets to form a pile of pellets, the pile including 100 solid bitumen pellets characterized by having a probability, per pellet, of failing an impact-resistance test of that does not exceed 0.20, when the pellets are dropped from a height H, the step of discharging the solid bitumen pellets to form the pile including controlling the height from which the pellets are dropped to form the pile such that the height does not exceed H.
287. A method for storing bitumen, the method comprising discharging solid bitumen pellets to form a pile of pellets, the pile including 100 solid bitumen pellets characterized by having a probability, per pellet, of failing an impact-resistance test that does not exceed 0.15, when the pellets are dropped from a height H, the step of discharging the pellets to form the pile including controlling the height from which the pellets are dropped to form the pile such that the height does not exceed H.
288. A method for storing bitumen, the method comprising discharging solid bitumen pellets to form a pile of pellets, the pile including 100 solid bitumen pellets characterized by having a probability, per pellet, of failing an impact-resistance test that does not exceed 0.10, when the pellets are dropped from a height H, the step of discharging the pellets to form the pile including controlling the height from which the pellets are dropped to form the pile such that the height does not exceed H.
289. The method according to any one of embodiments 287 to 290, each pellet including a mixture of bitumen and an additive operating to increase viscosity of the mixture.
290. The method according to embodiment 291, wherein solubility of the additive into bitumen at a temperature of 150° C. is less than 5 wt. %.
291. The method according to embodiment 291, wherein the additive includes a hydrocarbonaceous polymer.
292. The method according to embodiment 293, wherein the hydrocarbonaceous polymer includes a polyethylene.
293. The method according to embodiment 293, wherein the hydrocarbonaceous polymer includes high density polyethylene (HDPE), polypropylene (PP), polyethylene-covinyl acetate (PEVA) linear low-density polyethylene (LLDPE), low-density polyethylene (LDPE), or any combinations thereof.

294. The method according to embodiment 293, wherein the hydrocarbonaceous polymer is present in a relative quantity of from about 1 to about 20 wt. % relative to bitumen.

295. The method according to embodiment 293, wherein the hydrocarbonaceous polymer is present in a relative quantity of at least 10 wt. % relative to bitumen.

296. The method according to any one of embodiments 287 to 290, wherein each pellet includes an external shell.

297. The method according to embodiment 298, wherein each pellet has a core and the shell surrounds the core.

298. The method according to embodiment 299, wherein the shell fully surrounds the core.

299. The method according to embodiment 299, wherein the shell partially surrounds the core.

300. The method according to embodiment 299, each pellet including an internal pressure which is above ambient pressure, wherein the shell is hermetically sealed to maintain the internal pressure of the pellet.

301. The method according to embodiment 302, wherein the internal pressure is above ambient pressure by an amount up to about 15 psi.

302. The method according to embodiment 299, wherein the shell is harder than the core.

303. The method according to embodiment 304, the shell having a shape selected from generally spherical, generally lozenge-like, generally cylindrical, generally discoidal, generally tabular, generally ellipsoidal, generally flaky, generally acicular, generally ovoidal, generally pillow shaped and any combinations thereof.

304. The method according to embodiment 304, wherein the shell has a thickness less than about 5 mm.

305. The method according to embodiment 306, wherein the shell has a thickness within the range of from about 10 μm to about 4.5 mm.

306. The method according to embodiment 306, wherein the shell has a thickness within the range of from about 20 μm to about 3 mm.

307. The method according to embodiment 306, wherein the shell has a thickness within the range of from about 20 μm to about 2 mm.

308. The method according to embodiment 306, wherein the shell has a thickness within the range of from about 20 μm to about 1 mm.

309. The method according to any one of embodiments 306 to 310, wherein the shell includes an outwardly extending flash.

310. The method according to embodiment 304, wherein the shell includes a crimp seal.

311. The method according to embodiment 312, wherein the crimp seal extends transversally to a longitudinal axis of the pellet.

312. The method according to embodiment 312, wherein the crimp seal extends along a longitudinal axis of the pellet.

313. The method according to embodiment 314, wherein the crimp seal is formed by thermally sealing to each other opposing walls of the shell.

314. The method according to embodiment 312, wherein the crimp seal is substantially free of bitumen.

315. The method according to embodiment 304, wherein the shell includes first and second crimp seals in a spaced apart relationship to one another.

316. A method for environmental risk reduction during transport of bitumen, the method comprising placing a load of solid bitumen pellets in a shipping container at an origin, bringing the shipping container with the load to a destination, wherein the load includes 100 solid bitumen pellets having a probability, per pellet of failing a crush-resistance test that does not exceed 0.25 when the height of the pellet load is of 1 meter.

317. A method for environmental risk reduction during transport of bitumen, the method comprising placing a load of solid bitumen pellets in a shipping container at an origin, bringing the shipping container with the load to a destination, the load including 100 solid bitumen pellets having a probability, per pellet of failing a crush-resistance test that does not exceed 0.25 when the height of the pellet load is of 5 meters.

318. A method for environmental risk reduction during transport of bitumen, the method comprising placing a load of solid bitumen pellets in a shipping container at an origin, bringing the shipping container with the load to a destination, the load including 100 solid bitumen pellets having a probability, per pellet of failing a crush-resistance test that does not exceed 0.25 when the height of the pellet load is of 10 meters.

319. A method for environmental risk reduction during transport of bitumen, the method comprising placing a load of solid bitumen pellets in a shipping container at an origin, bringing the shipping container with the load to a destination, the load including 100 solid bitumen pellets having a probability, per pellet of failing a crush-resistance test that does not exceed 0.25 when the height of the pellet load is of 20 meters.

320. A method for environmental risk reduction during transport of bitumen, the method comprising placing a load of solid bitumen pellets in a shipping container at an origin, bringing the shipping container with the load to a destination, the load including 100 solid bitumen pellets having a probability, per pellet of failing a crush-resistance test that does not exceed 0.25 when the height of the pellet load is of 30 meters.

321. A method for environmental risk reduction during transport of bitumen, the method comprising placing a load of solid bitumen pellets in a shipping container at an origin, bringing the shipping container with the load to a destination, the load including 100 solid bitumen pellets having a probability, per pellet of failing a crush-resistance test that does not exceed 0.25 when the height of the pellet load is of 40 meters.

322. A method for environmental risk reduction during transport of bitumen, the method comprising placing a load of solid bitumen pellets in a shipping container at an origin, bringing the shipping container with the load to a destination, the load including 100 solid bitumen pellets having a probability, per pellet of failing a crush-resistance test that does not exceed 0.25 when the height of the pellet load is of 50 meters.

323. The method according to any one of embodiments 318 to 324, the method including unloading the pellets from the shipping container at the destination.

324. The method according to any one of embodiments 318 to 324, the method including loading the pellets into the shipping container at the origin using automated loading equipment.

325. The method according to any one of embodiments 318 to 326, wherein the shipping container is a maritime vessel.

326. The method according to any one of embodiments 318 to 326, wherein the shipping container is a railcar.

327. The method according to any one of embodiments 318 to 324, each pellet including a mixture of bitumen and an additive operating to increase viscosity of the mixture.
328. The method according to embodiment 329, wherein solubility of the additive into bitumen at a temperature of 150° C. is less than 5 wt. %.
329. The method according to embodiment 329, wherein solubility of the additive into bitumen at a temperature of 150° C. is less than 1 wt. %.
330. The method according to embodiment 329, wherein solubility of the additive into bitumen at a temperature of 150° C. is less than 0.5 wt. %.
331. The method according to embodiment 329, wherein solubility of the additive into bitumen at a temperature of 150° C. is less than 0.1 wt. %.
332. The method according to embodiment 329, wherein solubility of the additive into bitumen at a temperature of 150° C. is less than 0.05 wt. %.
333. The method according to any one of embodiments 329 to 334, wherein the additive includes a hydrocarbonaceous polymer.
334. The method according to embodiment 335, wherein the hydrocarbonaceous polymer includes a polyethylene.
335. The method according to embodiment 335, wherein the hydrocarbonaceous polymer includes high density polyethylene (HDPE), polypropylene (PP), polyethylene-co-vinyl acetate (PEVA) linear low-density polyethylene (LLDPE), low-density polyethylene (LDPE), or any combinations thereof.
336. The method according to embodiment 335, wherein the hydrocarbonaceous polymer is present in a relative quantity of from about 1 to about 20 wt. % relative to bitumen.
337. The method according to embodiment 335, wherein the hydrocarbonaceous polymer is present in a relative quantity of at least 10 wt. % relative to bitumen.
338. The method according to embodiment 338, wherein the hydrocarbonaceous polymer is present in a relative quantity of from about 8 wt. % to about 10 wt. %.
339. The method according to any one of embodiments 318 to 324, each pellet including an external shell.
340. The method according to embodiment 341, each pellet having a core and the shell surrounding the core.
341. The method according to embodiment 342, wherein the shell fully surrounds the core.
342. The method according to embodiment 342, wherein the shell partially surrounds the core.
343. The method according to embodiment 342, each pellet including an internal pressure which is above ambient pressure, wherein the shell is hermetically sealed to maintain the internal pressure of the pellet.
344. The method according to embodiment 345, wherein the internal pressure is above ambient pressure by an amount up to about 15 psi.
345. The method according to embodiment 342, wherein the shell is harder than the core.
346. The method according to embodiment 347, the shell having a shape selected from generally spherical, generally lozenge-like, generally cylindrical, generally discoidal, generally tabular, generally ellipsoidal, generally flaky, generally acicular, generally ovoidal, generally pillow shaped and any combinations thereof.
347. The method according to embodiment 347, wherein the shell has a thickness less than about 5 mm.
348. The method according to embodiment 347, wherein the shell has a thickness within the range of from about 10 μm to about 4.5 mm.
349. The method according to embodiment 347, wherein the shell has a thickness within the range of from about 20 μm to about 3 mm.
350. The method according to embodiment 347, wherein the shell has a thickness within the range of from about 20 μm to about 2 mm.
351. The method according to embodiment 347, wherein the shell has a thickness within the range of from about 20 μm to about 1 mm.
352. The method according to any one of embodiments 347 to 353, wherein the shell includes an outwardly extending flash.
353. The method according to embodiment 347, wherein the shell includes a crimp seal.
354. The method according to embodiment 355, wherein the crimp seal extends transversally to a longitudinal axis of the pellet.
355. The method according to embodiment 355, wherein the crimp seal extends along a longitudinal axis of the pellet.
356. The method according to embodiment 357, wherein the crimp seal is formed by thermally sealing to each other opposing walls of the shell.
357. The method according to embodiment 355, wherein the crimp seal is substantially free of bitumen.
358. The method according to embodiment 347, wherein the shell includes first and second crimp seals which are in a spaced apart relationship to one another.
359. A method for environmental risk reduction during transport of bitumen, the method comprising placing a load of solid bitumen pellets in a shipping container at an origin, bringing the shipping container with the load to a destination, the load including 100 pellets having a probability, per pellet of failing an impact-resistance test that does not exceed 0.25, when the dropping height is of 1 meter.
360. A method for environmental risk reduction during transport of bitumen, the method comprising placing a load of solid bitumen pellets in a shipping container at an origin, bringing the shipping container with the load to a destination, the load including 100 pellets having a probability, per pellet of failing an impact-resistance test that does not exceed 0.25, when the dropping height is of 5 meters.
361. A method for environmental risk reduction during transport of bitumen, the method comprising placing a load of solid bitumen pellets in a shipping container at an origin, bringing the shipping container with the load to a destination, the load including 100 pellets having a probability, per pellet of failing an impact-resistance test that does not exceed 0.25, when the dropping height is of 10 meters.
362. A method for environmental risk reduction during transport of bitumen, the method comprising placing a load of solid bitumen pellets in a shipping container at an origin, bringing the shipping container with the load to a destination, the load including 100 pellets having a probability, per pellet of failing an impact-resistance test that does not exceed 0.25, when the dropping height is of 20 meters.
363. A method for environmental risk reduction during transport of bitumen, the method comprising placing a load of solid bitumen pellets in a shipping container at an origin, bringing the shipping container with the load to a destination, the load including 100 pellets having a probability, per pellet of failing an impact-resistance test that does not exceed 0.25, when the dropping height is of 30 meters.

364. A method for environmental risk reduction during transport of bitumen, the method comprising placing a load of solid bitumen pellets in a shipping container at an origin, bringing the shipping container with the load to a destination, the load including 100 pellets having a probability, per pellet of failing an impact-resistance test that does not exceed 0.25, when the dropping height is of 40 meters.

365. A method for environmental risk reduction during transport of bitumen, the method comprising placing a load of solid bitumen pellets in a shipping container at an origin, bringing the shipping container with the load to a destination, the load including 100 pellets having a probability, per pellet of failing an impact-resistance test that does not exceed 0.25, when the dropping height is of 50 meters.

366. The method according to any one of embodiments 361 to 367, the method including unloading the pellets from the shipping container at the destination.

367. The method according to any one of embodiments 361 to 368, the method including loading the pellets into the shipping container at the origin using automated loading equipment.

368. The method according to any one of embodiments 361 to 369, wherein the shipping container is a railcar.

369. The method according to any one of embodiments 361 to 369, wherein the shipping container is a maritime vessel.

370. The method according to any one of embodiments 361 to 367, each pellet including a mixture of bitumen and an additive operating to increase viscosity of the mixture.

371. The method according to embodiment 372, wherein solubility of the additive into bitumen at a temperature of 150° C. is less than 5 wt. %.

372. The method according to embodiment 372, wherein solubility of the additive into bitumen at a temperature of 150° C. is less than 1 wt. %.

373. The method according to embodiment 372, wherein solubility of the additive into bitumen at a temperature of 150° C. is less than 0.5 wt. %.

374. The method according to embodiment 372, wherein solubility of the additive into bitumen at a temperature of 150° C. is less than 0.1 wt. %.

375. The method according to embodiment 372, wherein solubility of the additive into bitumen at a temperature of 150° C. is less than 0.05 wt. %.

376. The method according to any one of embodiments 372 to 377, wherein the additive includes a hydrocarbonaceous polymer.

377. The method according to embodiment 378, wherein the hydrocarbonaceous polymer includes a polyethylene.

378. The method according to embodiment 378, wherein the hydrocarbonaceous polymer includes high density polyethylene (HDPE), polypropylene (PP), polyethylene-co-vinyl acetate (PEVA) linear low-density polyethylene (LLDPE), low-density polyethylene (LDPE), or any combinations thereof.

379. The method according to embodiment 378, wherein the hydrocarbonaceous polymer is present in a relative quantity of from about 1 to about 20 wt. % relative to bitumen.

380. The method according to embodiment 378, wherein the hydrocarbonaceous polymer is present in a relative quantity of at least 10 wt. % relative to bitumen.

381. The method according to any one of embodiments 361 to 367, each pellet including an external shell.

382. The method according to embodiment 383, each pellet having a core and the shell surrounding the core.

383. The method according to embodiment 384, wherein the shell fully surrounds the core.

384. The method according to embodiment 384, wherein the shell partially surrounds the core.

385. The method according to embodiment 384, each pellet including an internal pressure which is above ambient pressure, wherein the shell is hermetically sealed to maintain the internal pressure of the pellet.

386. The method according to embodiment 387, wherein the internal pressure is above ambient pressure by an amount up to about 15 psi.

387. The method according to embodiment 384, wherein the shell is harder than the core.

388. The method according to embodiment 389, the shell having a shape selected from generally spherical, generally lozenge-like, generally cylindrical, generally discoidal, generally tabular, generally ellipsoidal, generally flaky, generally acicular, generally ovoidal, generally pillow shaped and any combinations thereof.

389. The method according to embodiment 389, wherein the shell has a thickness less than about 5 mm.

390. The method according to embodiment 389, wherein the shell has a thickness within the range of from about 10 μm to about 4.5 mm.

391. The method according to embodiment 389, wherein the shell has a thickness within the range of from about 20 μm to about 3 mm.

392. The method according to embodiment 389, wherein the shell has a thickness within the range of from about 20 μm to about 2 mm.

393. The method according to embodiment 389, wherein the shell has a thickness within the range of from about 20 μm to about 1 mm.

394. The method according to any one of embodiments 389 to 395, wherein the shell includes an outwardly extending flash.

395. The method according to embodiment 389, wherein the shell includes a crimp seal.

396. The method according to embodiment 397, wherein the crimp seal extends transversally to a longitudinal axis of the pellet.

397. The method according to embodiment 397, wherein the crimp seal extends along a longitudinal axis of the pellet.

398. The method according to embodiment 399, wherein the crimp seal is formed by thermally sealing to each other opposing walls of the shell.

399. The method according to embodiment 397, wherein the crimp seal is substantially free of bitumen.

400. The method according to embodiment 389, wherein the shell includes first and second crimp seals which are in a spaced apart relationship to one another.

401. A method for reducing a risk of contaminating a shipping container during transport of bitumen by transfer of bitumen material to walls of the shipping container, the method comprising placing a load of solid bitumen pellets in the shipping container, the load including 100 bitumen pellets having a probability, per pellet of failing a crush-resistance test that does not exceed 0.25 when the height of the pellet load is of 1 meter.

402. A method for reducing a risk of contaminating a shipping container during transport of bitumen by transfer of bitumen material to walls of the shipping container, the method comprising placing a load of solid bitumen pellets in the shipping container, the load including 100 bitumen pellets having a probability, per pellet of failing a crush-resistance test that does not exceed 0.25 when the height of the pellet load is of 5 meters.

403. A method for reducing a risk of contaminating a shipping container during transport of bitumen by transfer of bitumen material to walls of the shipping container, the method comprising placing a load of solid bitumen pellets in the shipping container, the load including 100 bitumen pellets having a probability, per pellet of failing a crush-resistance test that does not exceed 0.25 when the height of the pellet load is of 10 meters.
404. A method for reducing a risk of contaminating a shipping container during transport of bitumen by transfer of bitumen material to walls of the shipping container, the method comprising placing a load of solid bitumen pellets in the shipping container, the load including 100 bitumen pellets having a probability, per pellet of failing a crush-resistance test that does not exceed 0.25 when the height of the pellet load is of 20 meters.
405. A method for reducing a risk of contaminating a shipping container during transport of bitumen by transfer of bitumen material to walls of the shipping container, the method comprising placing a load of solid bitumen pellets in the shipping container, the load including 100 bitumen pellets having a probability, per pellet of failing a crush-resistance test that does not exceed 0.25 when the height of the pellet load is of 30 meters.
406. A method for reducing a risk of contaminating a shipping container during transport of bitumen by transfer of bitumen material to walls of the shipping container, the method comprising placing a load of solid bitumen pellets in the shipping container, the load including 100 bitumen pellets having a probability, per pellet of failing a crush-resistance test that does not exceed 0.25 when the height of the pellet load is of 40 meters.
407. A method for reducing a risk of contaminating a shipping container during transport of bitumen by transfer of bitumen material to walls of the shipping container, the method comprising placing a load of solid bitumen pellets in the shipping container, the load including 100 bitumen pellets having a probability, per pellet of failing a crush-resistance test that does not exceed 0.25 when the height of the pellet load is of 50 meters.
408. The method according to any one of embodiments 403 to 409, the method including unloading the pellets from the shipping container at the destination.
409. The method according to any one of embodiments 403 to 410, the method including loading the pellets into the shipping container at the origin using automated loading equipment.
410. The method according to any one of embodiments 403 to 411, wherein the shipping container is a railcar.
411. The method according to any one of embodiments 403 to 411, wherein the shipping container is a maritime vessel.
412. The method according to any one of embodiments 403 to 409, each pellet including a mixture of bitumen and an additive operating to increase viscosity of the mixture.
413. The method according to embodiment 414, wherein solubility of the additive into bitumen at a temperature of 150° C. is less than 5 wt. %.
414. The method according to embodiment 414, wherein solubility of the additive into bitumen at a temperature of 150° C. is less than 1 wt. %.
415. The method according to embodiment 414, wherein solubility of the additive into bitumen at a temperature of 150° C. is less than 0.5 wt. %.
416. The method according to embodiment 414, wherein solubility of the additive into bitumen at a temperature of 150° C. is less than 0.1 wt. %.
417. The method according to embodiment 414, wherein solubility of the additive into bitumen at a temperature of 150° C. is less than 0.05 wt. %.
418. The method according to any one of embodiments 414 to 419, wherein the additive includes a hydrocarbonaceous polymer.
419. The method according to embodiment 420, wherein the hydrocarbonaceous polymer includes a polyethylene.
420. The method according to embodiment 420, wherein the hydrocarbonaceous polymer includes high density polyethylene (HDPE), polypropylene (PP), polyethylene-co-vinyl acetate (PEVA), linear low-density polyethylene (LLDPE), low-density polyethylene (LDPE), or any combinations thereof.
421. The method according to embodiment 420, wherein the hydrocarbonaceous polymer is present in a relative quantity of from about 1 to about 20 wt. % relative to bitumen.
422. The method according to embodiment 420, wherein the hydrocarbonaceous polymer is present in a relative quantity of at least 10 wt. % relative to bitumen.
423. The method according to embodiment 423, wherein the hydrocarbonaceous polymer is present in a relative quantity of from about 8 wt. % to about 10 wt. %.
424. The method according to any one of embodiments 403 to 409, each pellet including an external shell.
425. The method according to embodiment 426, each pellet having a core and the shell surrounding the core.
426. The method according to embodiment 427, wherein the shell fully surrounds the core.
427. The method according to embodiment 427, wherein the shell partially surrounds the core.
428. The method according to embodiment 427, each pellet including an internal pressure which is above ambient pressure, wherein the shell is hermetically sealed to maintain the internal pressure of the pellet.
429. The method according to embodiment 430, wherein the internal pressure is above ambient pressure by an amount up to about 15 psi.
430. The method according to embodiment 427, wherein the shell is harder than the core.
431. The method according to embodiment 432, the shell having a shape selected from generally spherical, generally lozenge-like, generally cylindrical, generally discoidal, generally tabular, generally ellipsoidal, generally flaky, generally acicular, generally ovoidal, generally pillow shaped and any combinations thereof.
432. The method according to embodiment 432, wherein the shell has a thickness within the range of from about 10 μm to about 4.5 mm.
433. The method according to embodiment 432, wherein the shell has a thickness within the range of from about 20 μm to about 3 mm.
434. The method according to embodiment 432, wherein the shell has a thickness within the range of from about 20 μm to about 2 mm.
435. The method according to embodiment 432, wherein the shell has a thickness within the range of from about 20 μm to about 1 mm.
436. The method according to embodiment 432, wherein the shell has a thickness of less than about 5 mm.
437. The method according to any one of embodiments 432 to 438, wherein the shell includes an outwardly extending flash.
438. The method according to embodiment 432, wherein the shell includes a crimp seal.

439. The method according to embodiment 440, wherein the crimp seal extends transversally to a longitudinal axis of the pellet.
440. The method according to embodiment 440, wherein the crimp seal extends along a longitudinal axis of the pellet.
441. The method according to embodiment 442, wherein the crimp seal is formed by thermally sealing to each other opposing walls of the shell.
442. The method according to embodiment 440, wherein the crimp seal is substantially free of bitumen.
443. The method according to embodiment 432, wherein the shell includes first and second crimp seals which are in a spaced apart relationship to one another.
444. The method according to embodiment 426, wherein the shell is in the form of a flexible film.
445. A method of making a solid bitumen pellet, the method including mixing bitumen with an additive operating to provide a mixture which has a viscosity higher comparatively to a viscosity of the bitumen before inclusion of the additive.
446. The method according to embodiment 447, wherein a solubility of the additive into bitumen at a temperature of 150° C. is less than 5 wt. %.
447. The method according to embodiment 447, wherein a solubility of the additive into bitumen at a temperature of 150° C. is less than 1 wt. %.
448. The method according to embodiment 447, wherein a solubility of the additive into bitumen at a temperature of 150° C. is less than 0.5 wt. %.
449. The method according to embodiment 447, wherein a solubility of the additive into bitumen at a temperature of 150° C. is less than 0.1 wt. %.
450. The method according to any one of embodiments 447 to 451, wherein the additive includes a hydrocarbonaceous polymer.
451. The method according to embodiment 452, wherein the hydrocarbonaceous polymer includes a polyethylene.
452. The method according to embodiment 452, wherein the hydrocarbonaceous polymer includes high density polyethylene (HDPE), polypropylene (PP), polyethylene-co-vinyl acetate (PEVA) linear low-density polyethylene (LLDPE), low-density polyethylene (LDPE), or any combinations thereof.
453. The method according to embodiment 452, wherein the hydrocarbonaceous polymer is present in a relative quantity of from about 1 wt. % to about 20 wt. % relative to bitumen.
454. The method according to embodiment 455, wherein the hydrocarbonaceous polymer is present in a relative quantity of at least 10 wt. % relative to bitumen.
455. The method according to embodiment 452, the method including heating the bitumen and the polymer such that the polymer liquefies, and mixing when the polymer is in liquid state.
456. The method according to embodiment 457, wherein said heating is performed to a temperature in the range of from about 50° C. and about 150° C.
457. The method according to embodiment 457, the method including extruding the mixture.
458. The method according to embodiment 457, the method including molding the mixture.
459. The method according to embodiment 457, the method including forming a shell around a core made of the mixture.
460. The method according to embodiment 461, wherein the hydrocarbonaceous polymer is a first hydrocarbonaceous polymer, the method including co-extruding the mixture with a material including a second hydrocarbonaceous polymer to form the shell.
461. The method according to embodiment 461, the method including spraying the mixture with a material which upon solidification forms the shell.
462. The method according to embodiment 461, the method including enclosing the mixture into a container forming the shell.
463. The method according to embodiment 464, the method including extruding the container and filling the container with the mixture.
464. The method according to embodiment 465, the method including sealing the container that is filled with the mixture.
465. The method according to embodiment 466, the method being a blow-fill-seal process.
466. The method according to embodiment 464, the method including providing material in sheet form and forming the container from the material in sheet form around the core.
467. The method according to embodiment 468, the method including forming a tube from the sheet material and depositing the core into the tube.
468. The method according to embodiment 469, the method including sealing longitudinal edges of the sheet material to form a crimp seal extending longitudinally on the tube.
469. The method according to embodiment 469, the method including making spaced apart crimp seals to close the tube.
470. The method according to embodiment 471, the method being a fill-form-seal process.
471. The method according to embodiment 468, the method including providing opposing sheets and sealing the opposing sheets to each other to enclose the core between the sheets.
472. The method according to any one of embodiments 447, wherein the pellet includes an external shell.
473. The method according to embodiment 474, wherein the pellet has a core and the shell surrounds the core.
474. The method according to embodiment 475, wherein the shell fully surrounds the core.
475. The method according to embodiment 475, wherein the shell partially surrounds the core.
476. The method according to embodiment 475, wherein the pellet includes an internal pressure which is above ambient pressure, wherein the shell is hermetically sealed to maintain the internal pressure of the pellet.
477. The method according to embodiment 478, wherein the internal pressure is above ambient pressure by an amount up to about 15 psi.
478. The method according to embodiment 475, wherein the shell includes an outwardly extending flash.
479. The method according to embodiment 475, wherein the shell is harder than the core.
480. The method according to embodiment 481, the shell having a shape selected from generally spherical, generally lozenge-like, generally cylindrical, generally discoidal, generally tabular, generally ellipsoidal, generally flaky, generally acicular, generally ovoidal, generally pillow shaped and any combinations thereof.
481. The method according to embodiment 481, wherein the shell has a thickness less than about 5 mm.
482. The method according to embodiment 481, wherein the shell has a thickness within the range of from about 10 µm to about 4.5 mm.

483. The method according to embodiment 481, wherein the shell has a thickness within the range of from about 20 μm to about 3 mm.
484. The method according to embodiment 481, wherein the shell has a thickness within the range of from about 20 μm to about 2 mm.
485. The method according to embodiment 481, wherein the shell has a thickness within the range of from about 20 μm to about 1 mm.
486. The method according to embodiment 475, wherein the shell includes a crimp seal.
487. The method according to embodiment 488, wherein the crimp seal extends transversally to a longitudinal axis of the pellet.
488. The method according to embodiment 488, wherein the crimp seal extends along a longitudinal axis of the pellet.
489. The method according to embodiment 490, wherein the crimp seal is formed by thermally sealing to each other opposing walls of the shell.
490. The method according to embodiment 488, wherein the crimp seal is substantially free of bitumen.
491. The method according to embodiment 475, wherein the shell includes first and second crimp seals, in opposing relationship.
492. An apparatus for making a solid bitumen pellet, comprising an inlet for receiving bitumen and a shell forming station for forming a shell around a bituminous core made from bitumen introduced at the inlet.
493. The apparatus according to embodiment 494, comprising a mixer for mixing bitumen and an additive operating as a thickening agent to produce a bituminous mixture.
494. The apparatus according to embodiment 495, wherein solubility of the additive into bitumen at a temperature of 150° C. is less than 5 wt. %.
495. The apparatus according to embodiment 495, wherein the mixer is in communication with the shell forming station to supply the mixture under pressure to the shell forming station.
496. The apparatus according to embodiment 497, wherein the mixer including a heater to heat the bitumen and the additive.
497. The apparatus according to embodiment 498, wherein the mixer including a feed screw.
498. The apparatus according to any one of embodiments 497 to 499, wherein the apparatus includes an extruder to extrude the mixture through an extrusion die.
499. The apparatus according to embodiment 500, wherein the shell forming station is part of the extruder to co-extrude the shell on the core.
500. The apparatus according to embodiment 498, wherein the additive includes a hydrocarbonaceous polymer.
501. The apparatus according to embodiment 502, wherein the hydrocarbonaceous polymer includes a polyethylene.
502. The apparatus according to embodiment 502, wherein the hydrocarbonaceous polymer includes high density polyethylene (HDPE), polypropylene (PP), polyethylene-co-vinyl acetate (PEVA) linear low-density polyethylene (LLDPE), low-density polyethylene (LDPE), or any combinations thereof.
503. The apparatus according to embodiment 502, wherein the hydrocarbonaceous polymer is present in a relative quantity of from about 1 wt. % to about 20 wt. % relative to bitumen.
504. The apparatus according to embodiment 502, wherein the hydrocarbonaceous polymer is present in a relative quantity of at least 10 wt. % relative to bitumen.
505. The apparatus according to any one of embodiments 502 to 506, wherein the hydrocarbonaceous polymer has a melting point temperature of at least 50° C.
506. The apparatus according to any one of embodiments 502 to 506, wherein the hydrocarbonaceous polymer has a melting point temperature within the range of from about 50° C. to about 150° C.
507. The apparatus according to embodiment 507 or 508, wherein the heater maintains the temperature of the mixer in range of the melting point temperature.
508. The apparatus according to embodiment 495, wherein the shell forming station includes a device for forming the shell from a hydrocarbonaceous polymer and filling the shell with the bituminous mixture.
509. The apparatus according to embodiment 510, wherein the shell forming station includes an extruder for extruding the shell.
510. The apparatus according to embodiment 511, wherein the shell forming station includes a device for sealing the shell once the shell is filled.
511. The apparatus according to embodiment 512, wherein the apparatus is a blow-fill-seal apparatus.
512. The apparatus according to embodiment 510, wherein the shell forming station includes a device for forming the shell from polymer film and filling the shell with the bituminous mixture.
513. The apparatus according to embodiment 514, wherein the shell forming station includes a device for forming the film into a tube.
514. The apparatus according to embodiment 515, wherein the shell forming station includes a device for forming a longitudinal crimp seal.
515. The apparatus according to embodiment 516, wherein the shell forming station includes a device for forming a transverse crimp seal on the tube.
516. The apparatus according to embodiment 517, wherein the apparatus is a form-fill-seal apparatus.
517. Bitumen material retrieved from a solid bitumen pellet, the bitumen material being suitable for processing in an oil refinery to separate the bitumen material into constituents that can be used as fuels, lubricants and feedstocks in petrochemical processes, the bitumen material including a content of hydrocarbonaceous polymer, wherein the content of the hydrocarbonaceous polymer does not exceed about 0.5 wt. % relative to bitumen.
518. The bitumen material according to embodiment 519, wherein the content of said hydrocarbonaceous polymer does not exceed about 0.3 wt. % relative to bitumen.
519. The bitumen material according to embodiment 519, wherein the content of said hydrocarbonaceous polymer does not exceed about 0.1 wt. % relative to bitumen.
520. The bitumen material according to any one of embodiments 519 to 521, wherein the bitumen material is an emulsion including droplets of said hydrocarbonaceous polymer dispersed throughout the bitumen.
521. The bitumen material according to embodiment 522, wherein the majority of the droplets have a diameter size in the range of between 10 μm and 50 μm.
522. The bitumen material according to embodiment 522, wherein the majority of the droplets have a diameter size of less than 10 μm.
523. A method for reducing the risk of fire when transporting bitumen, comprising transporting an emulsion of bitumen and additive operating to provide the emulsion with a flash point that is higher than compared to the flash point of bitumen without the additive.

524. The method according to embodiment 525, wherein the additive includes a hydrocarbonaceous polymer.
525. The method according to embodiment 526, wherein the hydrocarbonaceous polymer has a melting point temperature of at least 50° C.
526. The method according to embodiment 526, wherein the hydrocarbonaceous polymer has a melting point temperature within the range of from about 50° C. to about 150° C.
527. The method according to embodiment 526, wherein the hydrocarbonaceous polymer includes a polyethylene.
528. The method according to embodiment 526, wherein the hydrocarbonaceous polymer includes high density polyethylene (HDPE), polypropylene (PP), polyethylene-co-vinyl acetate (PEVA) linear low-density polyethylene (LLDPE), low-density polyethylene (LDPE), or any combinations thereof.
529. The method according to any one of embodiments 526 to 530, wherein the hydrocarbonaceous polymer is present in a relative quantity of from about 1 wt. % to about 20 wt. % relative to bitumen.
530. The method according to any one of embodiments 526 to 530, wherein the hydrocarbonaceous polymer is present in a relative quantity of at least 10 wt. % relative to bitumen.
531. The method according to any one of embodiments 525 to 532, wherein the emulsion of bitumen is in the form of a bitumen pellet including an external shell.
532. The method according to embodiment 533, wherein the pellet has a core and the shell surrounds the core.
533. The method according to embodiment 534, wherein the shell includes a hydrocarbonaceous polymer.
534. The method according to embodiment 534, wherein the shell includes a hydrocarbonaceous polymer which includes a polyethylene.
535. The method according to embodiment 534, wherein the shell includes a hydrocarbonaceous polymer which includes a cross-linked polyethylene.
536. The method according to embodiment 534, wherein the shell includes a hydrocarbonaceous polymer which includes high density polyethylene (HDPE), polypropylene (PP), polyethylene-co-vinyl acetate (PEVA) linear low-density polyethylene (LLDPE), low-density polyethylene (LDPE), or any combinations thereof.
537. The method according to embodiment 534, wherein the shell includes a hydrocarbonaceous polymer in an amount within the range of from about 0.01 to about 20 wt. % relative to bitumen.
538. The method according to embodiment 534, wherein the shell includes a hydrocarbonaceous polymer in an amount within the range of from about 0.01 to about 5 wt. % relative to bitumen.
539. The method according to any one of embodiments 534 to 540, wherein the shell includes a hydrocarbonaceous polymer being different from the additive.
540. The method according to embodiment 534, wherein the shell fully surrounds the core. 541. The method according to embodiment 534, wherein shell partially surrounds the core. 542. The method according to any one of embodiments 534 to 543, wherein the shell has a thickness within the range of from about 10 µm to about 4.5 mm.
543. The method according to embodiment 544, wherein the shell has a thickness within the range of from about 20 µm to about 4 mm.
544. The method according to embodiment 544, wherein the shell has a thickness within the range of from about 20 µm to about 2 mm.
545. The method according to embodiment 544, wherein the shell has a thickness within the range of from about 20 µm to about 3 mm.
546. The method according to embodiment 544, wherein the shell has a thickness less than about 5 mm.
547. The method according to any one of embodiments 544 to 548, wherein the shell includes an outwardly extending flash.
548. The method according to any one of embodiments 534 to 543, wherein the shell is harder than the core.
549. The method according to embodiment 550, wherein the shell includes a crimp seal.
550. The method according to embodiment 551, wherein the crimp seal extends transversally to a longitudinal axis of the pellet.
551. The method according to embodiment 551, wherein the crimp seal extends along a longitudinal axis of the pellet.
552. The method according to embodiment 553, wherein the crimp seal is sealed at opposing extremities portions thereof.
553. The method according to embodiment 551, wherein the crimp seal is formed by thermally sealing to each other opposing walls of the shell.
554. The method according to embodiment 550, wherein the shell includes first and second crimp seals which are in a spaced apart relationship to one another.
555. The method according to any one of embodiments 534 to 543, wherein the shell is in the form of a film.
556. The method according to any one of embodiments 534 to 543, wherein the pellet includes an internal pressure which is above ambient pressure, wherein the shell is hermetically sealed to maintain the internal pressure of the pellet.
557. The method according to embodiment 558, wherein the internal pressure is above ambient pressure by an amount up to about 15 psi.
558. The method according to any one of embodiments 544 to 557, the shell having a shape selected from generally spherical, generally lozenge-like, generally cylindrical, generally discoidal, generally tabular, generally ellipsoidal, generally flaky, generally acicular, generally ovoidal, generally pillow shaped and any combinations thereof.
559. The method according to any one of embodiments 533 to 560, each pellet having a maximal extent of less than a quarter inch.
560. The method according to any one of embodiments 533 to 560, each pellet having a maximal extent of less than half an inch.
561. The method according to any one of embodiments 533 to 560, each pellet having a maximal extent of less than an inch.
562. The method according to any one of embodiments 533 to 560, each pellet having a maximal extent of less than 2 inches.
563. The method according to any one of embodiments 533 to 560, each pellet having a maximal extent of less than 3 inches.
564. The method according to any one of embodiments 533 to 560, each pellet having a maximal extent of less than 4 inches.
565. The method according to any one of embodiments 533 to 560, each pellet having a maximal extent of less than 5 inches.
566. The method according to any one of embodiments 533 to 560, each pellet having a maximal extent of less than 12 inches.

567. A method for retrieving bitumen from a solid bitumen pellet, the pellet including bitumen and material contributing to maintain the pellet in solid form, the method comprising separating the material at least partially from the bitumen.

568. The method according to embodiment 569, wherein the material includes a hydrocarbonaceous polymer.

569. The method according to embodiment 570, wherein the hydrocarbonaceous polymer is admixed with bitumen.

570. The method according to embodiment 571, wherein the hydrocarbonaceous polymer forms an emulsion.

571. The method according to embodiment 571 or 572, wherein the pellet includes a mixture of bitumen and the hydrocarbonaceous polymer, where the hydrocarbonaceous polymer operates to increase the viscosity of the mixture.

572. The method according to embodiment 573, wherein the hydrocarbonaceous polymer includes a polyethylene.

573. The method according to embodiment 573, wherein the hydrocarbonaceous polymer includes high density polyethylene (HDPE), polypropylene (PP), polyethylene-co-vinyl acetate (PEVA) linear low-density polyethylene (LLDPE), low-density polyethylene (LDPE), or any combinations thereof.

574. The method according to embodiment 573, wherein the hydrocarbonaceous polymer is present in a relative quantity of from about 1 wt. % to about 20 wt. % relative to bitumen.

575. The method according to embodiment 573, wherein the hydrocarbonaceous polymer is present in a relative quantity of at least 10 wt. % relative to bitumen.

576. The method according to embodiment 573, wherein a solubility of the hydrocarbonaceous polymer into bitumen at a temperature of 150° C. is less than 5 wt. %.

577. The method according to embodiment 573, wherein a solubility of the hydrocarbonaceous polymer into bitumen at a temperature of 150° C. is less than 1 wt. %.

578. The method according to embodiment 573, wherein a solubility of the hydrocarbonaceous polymer into bitumen at a temperature of 150° C. is less than 0.5 wt. %.

579. The method according to embodiment 573, wherein a solubility of the hydrocarbonaceous polymer into bitumen at a temperature of 150° C. is less than 0.1 wt. %.

580. The method according to embodiment 573, wherein a solubility of the hydrocarbonaceous polymer into bitumen at a temperature of 150° C. is less than 0.05 wt. %.

581. The method according to embodiment 570, wherein the pellet includes an external shell.

582. The method according to embodiment 583, wherein the pellet has a core and the shell surrounds the core.

583. The method according to embodiment 584, wherein the shell fully surrounds the core.

584. The method according to embodiment 584, wherein the shell partially surrounds the core.

585. The method according to embodiment 584, wherein the pellet includes an internal pressure which is above ambient pressure, wherein the shell is hermetically sealed to maintain the internal pressure of the pellet.

586. The method according to embodiment 587, wherein the internal pressure is above ambient pressure by an amount up to about 15 psi.

587. The method according to embodiment 584, wherein the shell is harder than the core.

588. The method according to embodiment 589, wherein the shell has a thickness less than about 5 mm.

589. The method according to embodiment 589, wherein the shell has a thickness within the range of from about 10 μm to about 4.5 mm.

590. The method according to embodiment 589, wherein the shell has a thickness within the range of from about 20 μm to about 3 mm.

591. The method according to embodiment 589, wherein the shell has a thickness within the range of from about 20 μm to about 2 mm.

592. The method according to embodiment 589, wherein the shell has a thickness within the range of from about 20 μm to about 1 mm.

593. The method according to embodiment 589, the shell having a shape selected from generally spherical, generally lozenge-like, generally cylindrical, generally discoidal, generally tabular, generally ellipsoidal, generally flaky, generally acicular, generally ovoidal, generally pillow shaped and any combinations thereof.

594. The method according to embodiment 589, the pellet having a maximal extent of less than a quarter inch.

595. The method according to embodiment 589, the pellet having a maximal extent of less than half an inch.

596. The method according to embodiment 589, the pellet having a maximal extent of less than an inch.

597. The method according to embodiment 589, the pellet having a maximal extent of less than 2 inches.

598. The method according to embodiment 589, the pellet having a maximal extent of less than 3 inches.

599. The method according to embodiment 589, the pellet having a maximal extent of less than 4 inches.

600. The method according to embodiment 589, the pellet having a maximal extent of less than 5 inches.

601. The method according to embodiment 589, the pellet having a maximal extent of less than 12 inches.

602. The method according to embodiment 589, wherein the shell includes an outwardly extending flash.

603. The method according to embodiment 589, wherein the shell includes a crimp seal.

604. The method according to embodiment 605, wherein the crimp seal extends transversally to a longitudinal axis of the pellet.

605. The method according to embodiment 605, wherein the crimp seal extends along a longitudinal axis of the pellet.

606. The method according to embodiment 607, wherein the crimp seal is formed by thermally sealing to each other opposing walls of the shell.

607. The method according to embodiment 605, wherein the crimp seal is substantially free of bitumen.

608. The method according to embodiment 589, wherein the shell includes first and second crimp seals which are in a spaced apart relationship to one another.

609. The method according to any one of embodiments 569 to 610, including heating the pellet to convert the pellet into liquid.

610. The method according to embodiment 611, including removing the material at least partially from said liquid.

611. The method according to embodiment 612, including removing the material by gravity separation.

612. The method according to embodiment 584, including processing the pellet to separate the shell from the core material.

613. The method according to embodiment 614, said processing including heating the pellet.

614. The method according to embodiment 615, said processing further including mechanically separating the shell from the core material.

615. A method for retrieving bitumen from a solid bitumen pellet, the pellet including a bituminous core and a shell protecting the core, the method including processing the pellet to retrieve bitumen from the pellet in a condition such that the bitumen is suitable for processing in an oil refinery to separate the bitumen material into constituents that can be used as fuels, lubricants and feedstocks in petrochemical processes, the processing of the pellet including a step of separating the shell from the bituminous core.

616. The method according to embodiment 617, the core including a mixture of bitumen and additive operating as a thickening agent.

617. The method according to embodiment 618, wherein the additive includes a hydrocarbonaceous polymer.

618. The method according to embodiment 619, wherein the pellet includes a mixture of bitumen and the hydrocarbonaceous polymer, where the hydrocarbonaceous polymer operates to increase the viscosity of the mixture.

619. The method according to embodiment 620, wherein the hydrocarbonaceous polymer includes a polyethylene.

620. The method according to embodiment 620, wherein the hydrocarbonaceous polymer includes high density polyethylene (HDPE), polypropylene (PP), polyethylene-co-vinyl acetate (PEVA) linear low-density polyethylene (LLDPE), low-density polyethylene (LDPE), or any combinations thereof.

621. The method according to embodiment 620, wherein the hydrocarbonaceous polymer is present in a relative quantity of from about 1 wt. % to about 20 wt. % relative to bitumen.

622. The method according to embodiment 620, wherein the hydrocarbonaceous polymer is present in a relative quantity of at least 10 wt. % relative to bitumen.

623. The method according to embodiment 620, wherein solubility of the additive into bitumen at a temperature of 150° C. is less than 5 wt. %.

624. The method according to embodiment 620, wherein solubility of the additive into bitumen at a temperature of 150° C. is less than 1 wt. %.

625. The method according to embodiment 620, wherein solubility of the additive into bitumen at a temperature of 150° C. is less than 0.5 wt. %.

626. The method according to embodiment 620, wherein solubility of the additive into bitumen at a temperature of 150° C. is less than 0.1 wt. %.

627. The method according to embodiment 620, wherein solubility of the additive into bitumen at a temperature of 150° C. is less than 0.05 wt. %.

628. The method according to embodiment 617, wherein the shell is harder than the core.

629. The method according to embodiment 630, wherein the shell partially surrounds the core.

630. The method according to embodiment 630, wherein the shell fully surrounds the core.

631. The method according to embodiment 632, wherein the pellet includes an internal pressure which is above ambient pressure, wherein the shell is hermetically sealed to maintain the internal pressure of the pellet.

632. The method according to embodiment 633, wherein the internal pressure is above ambient pressure by an amount up to about 15 psi.

633. The method according to embodiment 630, wherein the shell has a thickness less than about 5 mm.

634. The method according to embodiment 630, wherein the shell has a thickness within the range of from about 10 μm to about 4.5 mm.

635. The method according to embodiment 630, wherein the shell has a thickness within the range of from about 20 μm to about 3 mm.

636. The method according to embodiment 630, wherein the shell has a thickness within the range of from about 20 μm to about 2 mm.

637. The method according to embodiment 630, wherein the shell has a thickness within the range of from about 20 μm to about 1 mm.

638. The method according to embodiment 630, the shell having a shape selected from generally spherical, generally lozenge-like, generally cylindrical, generally discoidal, generally tabular, generally ellipsoidal, generally flaky, generally acicular, generally ovoidal, generally pillow shaped and any combinations thereof.

639. The method according to embodiment 630, the pellet having a maximal extent of less than a quarter inch.

640. The method according to embodiment 630, the pellet having a maximal extent of less than half an inch.

641. The method according to embodiment 630, the pellet having a maximal extent of less than an inch.

642. The method according to embodiment 630, the pellet having a maximal extent of less than 2 inches.

643. The method according to embodiment 630, the pellet having a maximal extent of less than 3 inches.

644. The method according to embodiment 630, the pellet having a maximal extent of less than 4 inches.

645. The method according to embodiment 630, the pellet having a maximal extent of less than 5 inches.

646. The method according to embodiment 630, the pellet having a maximal extent of less than 12 inches.

647. The method according to embodiment 630, wherein the shell includes an outwardly extending flash.

648. The method according to embodiment 630, wherein the shell includes a crimp seal.

649. The method according to embodiment 650, wherein the crimp seal extends transversally to a longitudinal axis of the pellet.

650. The method according to embodiment 650, wherein the crimp seal extends along a longitudinal axis of the pellet.

651. The method according to embodiment 652, wherein the crimp seal is formed by thermally sealing to each other opposing walls of the shell.

652. The method according to embodiment 650, wherein the crimp seal is substantially free of bitumen.

653. The method according to embodiment 630, wherein the shell includes first and second crimp seals in a spaced apart relationship to one another.

654. The method according to any one of embodiments 617 to 655, including heating the pellet to convert same into a liquid.

655. The method according to embodiment 656, including removing the material at least partially from said liquid.

656. The method according to embodiment 657, including removing the material by gravity separation.

657. A method for facilitating retrieval of spilled solid bitumen pellets during transport by rail over rail tracks, comprising providing the pellets with a color signal configured to make the pellets visually distinguishable from an environment of the rail track.

658. The method according to embodiment 659, wherein the environment includes a body of water, the method including providing the pellets with a color signal that is visually contrasting with the body of water when the pellets float on the body of water.

659. The method according to embodiment 660, wherein each pellet includes a bituminous core and shell protecting the core.
660. The method according to embodiment 661, the method including applying the color signal to the shell.
661. The method according to embodiment 662, wherein the shell is harder than the core.
662. The method according to embodiment 663, wherein the shell partially surrounds the core.
663. The method according to embodiment 663, wherein the shell fully surrounds the core.
664. The method according to embodiment 665, wherein the pellet includes an internal pressure which is above ambient pressure, wherein the shell is hermetically sealed to maintain the internal pressure of the pellet.
665. The method according to embodiment 666, wherein the internal pressure is above ambient pressure by an amount up to about 15 psi.
666. The method according to embodiment 663, wherein the shell has a thickness less than about 5 mm.
667. The method according to embodiment 663, wherein the shell has a thickness within the range of from about 10 μm to about 4.5 mm.
668. The method according to embodiment 663, wherein the shell has a thickness within the range of from about 20 μm to about 3 mm.
669. The method according to embodiment 663, wherein the shell has a thickness within the range of from about 20 μm to about 2 mm.
670. The method according to embodiment 663, wherein the shell has a thickness within the range of from about 20 μm to about 1 mm.
671. The method according to embodiment 663, the shell having a shape selected from generally spherical, generally lozenge-like, generally cylindrical, generally discoidal, generally tabular, generally ellipsoidal, generally flaky, generally acicular, generally ovoidal, generally pillow shaped and any combinations thereof.
672. The method according to embodiment 663, the pellet having a maximal extent of less than a quarter inch.
673. The method according to embodiment 663, the pellet having a maximal extent of less than half an inch.
674. The method according to embodiment 663, the pellet having a maximal extent of less than an inch.
675. The method according to embodiment 663, the pellet having a maximal extent of less than 2 inches.
676. The method according to embodiment 663, the pellet having a maximal extent of less than 3 inches.
677. The method according to embodiment 663, the pellet having a maximal extent of less than 4 inches.
678. The method according to embodiment 663, the pellet having a maximal extent of less than 5 inches.
679. The method according to embodiment 663, the pellet having a maximal extent of less than 12 inches.
680. The method according to embodiment 663, wherein the shell includes an outwardly extending flash.
681. The method according to embodiment 663, wherein the shell includes a crimp seal.
682. The method according to embodiment 683, wherein the crimp seal extends transversally to a longitudinal axis of the pellet.
683. The method according to embodiment 683, wherein the crimp seal extends along a longitudinal axis of the pellet.
684. The method according to embodiment 685, wherein the crimp seal formally by thermally sealing to each other opposing walls of the shell.
685. The method according to embodiment 683, wherein the crimp seal is substantially free of bitumen.
686. The method according to embodiment 663, wherein the shell includes first and second crimp seals which are positioned in a spaced apart relationship to one another.
687. The method as defined in any one of embodiments 287 to 317 wherein the pellets in the pile are substantially identical to each other.
688. The method as defined in any one of embodiments 318 to 360 wherein the pellets in the load are substantially identical to each other.
689. The method as defined in any one of embodiments 361 to 402, wherein the pellets in the load are substantially identical.
690. The method as defined in anyone of embodiments 403 to 446, wherein the pellets in the load are substantially identical.
691. The method as defined in anyone of embodiments 251 to 286 wherein the pellets in the pile are substantially identical to each other.
692. A solid bitumen pellet comprising a bituminous core and a shell enclosing the core, the pellet being responsive to a compression applied externally on the shell and of sufficient magnitude to deform the pellet to develop an internal gaseous pressure increase which operates to counterbalance, at least partially the compression, wherein the internal gaseous pressure increases with an increase of the compression applied externally on the shell.
693. The bitumen pellet according to embodiment 694, wherein the core includes a mixture of bitumen and an additive, where the additive operates to increase the viscosity of the mixture.
694. The bitumen pellet according to embodiment 695, wherein solubility of the additive into bitumen at a temperature of 150° C. is less than 5 wt. %.
695. The bitumen pellet according to embodiment 695, wherein solubility of the additive into bitumen at a temperature of 150° C. is less than 1 wt. %.
696. The bitumen pellet according to embodiment 695, wherein solubility of the additive into bitumen at a temperature of 150° C. is less than 0.5 wt. %.
697. The bitumen pellet according to embodiment 695, wherein solubility of the additive into bitumen at a temperature of 150° C. is less than 0.1 wt. %
698. The bitumen pellet according to embodiment 695, wherein solubility of the additive into bitumen at a temperature of 150° C. is less than 0.05 wt. %.
699. The bitumen pellet according to any one of embodiments 695 to 700, wherein the additive includes a hydrocarbonaceous polymer.
700. The bitumen pellet according to embodiment 701, wherein the hydrocarbonaceous polymer has a melting point temperature of at least 50° C.
701. The bitumen pellet according to embodiment 701, wherein the hydrocarbonaceous polymer has a melting point temperature within the range of from about 50° C. to about 150° C.
702. The bitumen pellet according to embodiment 701, wherein the hydrocarbonaceous polymer includes a polyethylene.
703. The bitumen pellet according to embodiment 701, wherein the hydrocarbonaceous polymer includes high density polyethylene (HDPE), polypropylene (PP), poly-ethylene-co-vinyl acetate (PEVA) linear low-density polyethylene (LLDPE), low-density polyethylene (LDPE), or any combinations thereof.

704. The bitumen pellet according to embodiment 701, wherein the hydrocarbonaceous polymer is present in a relative quantity of from about 1 wt. % to about 20 wt. % relative to bitumen.

705. The bitumen pellet according to embodiment 701, wherein the hydrocarbonaceous polymer is present in a relative quantity of at least 10 wt. % relative to bitumen.

706. The bitumen pellet according to embodiment 694, wherein the shell includes a hydrocarbonaceous polymer.

707. The bitumen pellet according to embodiment 694, wherein the shell includes a hydrocarbonaceous polymer which includes a polyethylene.

708. The bitumen pellet according to embodiment 694, wherein the shell includes a hydrocarbonaceous polymer which includes a cross-linked polyethylene.

709. The bitumen pellet according to embodiment 694, wherein the shell includes a hydrocarbonaceous polymer which includes high density polyethylene (HDPE), polypropylene (PP), polyethylene-co-vinyl acetate (PEVA) linear low-density polyethylene (LLDPE), low-density polyethylene (LDPE), or any combinations thereof.

710. The bitumen pellet according to embodiment 694, wherein the shell includes a hydrocarbonaceous polymer in an amount within the range of from about 0.01 to about 20 wt. % relative to bitumen.

711. The bitumen pellet according to embodiment 694, wherein the shell includes a hydrocarbonaceous polymer in an amount within the range of from about 0.01 to about 5 wt. % relative to bitumen.

712. The bitumen pellet according to any one of embodiments 695 to 713, wherein the shell includes a hydrocarbonaceous polymer which is different from the additive.

713. The bitumen pellet according to embodiment 694, wherein the shell fully surrounds the core.

714. The bitumen pellet according to embodiment 694, wherein the shell partially surrounds the core.

715. The bitumen pellet according to embodiment 694, wherein the shell is substantially free of bitumen.

716. The bitumen pellet according to any one of embodiments 694 to 717, wherein the shell has a thickness less than about 5 mm.

717. The bitumen pellet according to embodiment 718, wherein the shell has a thickness within the range of from about 10 μm to about 4.5 mm.

718. The bitumen pellet according to embodiment 718, wherein the shell has a thickness within the range of from about 20 μm to about 3 mm.

719. The bitumen pellet according to embodiment 718, wherein the shell has a thickness within the range of from about 20 μm to about 2 mm.

720. The bitumen pellet according to embodiment 718, wherein the shell has a thickness within the range of from about 20 μm to about 1 mm.

721. The bitumen pellet according to any one of embodiments 718 to 722, wherein the shell includes an outwardly extending flash.

722. The bitumen pellet according to any one of embodiments 694 to 723, wherein the shell is harder than the core.

723. The bitumen pellet according to embodiment 724, wherein the shell includes a crimp seal.

724. The bitumen pellet according to embodiment 725, wherein the crimp seal extends transversally to a longitudinal axis of the pellet.

725. The bitumen pellet according to embodiment 725, wherein the crimp seal extends along a longitudinal axis of the pellet.

726. The bitumen pellet according to embodiment 727, wherein the crimp seal is formed by thermally sealing to each other opposing walls of the shell.

727. The bitumen pellet according to embodiment 725, wherein the crimp seal is substantially free of bitumen.

728. The bitumen pellet according to embodiment 724, wherein the shell includes first and second crimp seals in a spaced apart relationship to one another.

729. The bitumen pellet according to any one of embodiments 694 to 717, wherein the shell is in the form of a film.

730. The bitumen pellet according to any one of embodiments 694 to 731, the shell having a shape selected from generally spherical, generally lozenge-like, generally cylindrical, generally discoidal, generally tabular, generally ellipsoidal, generally flaky, generally acicular, generally ovoidal, generally pillow shaped and any combinations thereof.

731. The bitumen pellet according to any one of embodiments 694 to 731, wherein the pellet has a maximal extent of less than a quarter inch.

732. The bitumen pellet according to any one of embodiments 694 to 731, wherein the pellet has a maximal extent of less than half an inch.

733. The bitumen pellet according to any one of embodiments 694 to 731, wherein the pellet has a maximal extent of less than an inch.

734. The bitumen pellet according to any one of embodiments 694 to 731, wherein the pellet has a maximal extent of less than 2 inches.

735. The bitumen pellet according to any one of embodiments 694 to 731, wherein the pellet has a maximal extent of less than 3 inches.

736. The bitumen pellet according to any one of embodiments 694 to 731, wherein the pellet has a maximal extent of less than 4 inches.

737. The bitumen pellet according to any one of embodiments 694 to 731, wherein the pellet has a maximal extent of less than 5 inches.

738. The bitumen pellet according to any one of embodiments 694 to 731, wherein the pellet has a maximal extent of less than 12 inches.

739. The bitumen pellet according to any one of embodiments 694 to 740, having a burst pressure of at least 0.5 psi.

740. The bitumen pellet according to any one of embodiments 694 to 740, having a burst pressure of at least 1 psi.

741. The bitumen pellet according to any one of embodiments 694 to 740, having a burst pressure of at least 2 psi.

742. The bitumen pellet according to any one of embodiments 694 to 740, having a burst pressure of at least 3 psi.

743. The bitumen pellet according to any one of embodiments 694 to 740, having a burst pressure of at least 5 psi.

744. The bitumen pellet according to any one of embodiments 694 to 740, having a burst pressure of at least 7 psi.

745. The bitumen pellet according to any one of embodiments 694 to 740, having a burst pressure of at least 10 psi.

746. A solid bitumen pellet comprising a bituminous core and a shell enclosing the core, the shell being configured to reduce the exposure of the bituminous core to ambient oxygen.

747. The bitumen pellet according to embodiment 748, wherein the core includes a mixture of bitumen and an additive, where the additive operates to increase the viscosity of the mixture.

748. The bitumen pellet according to embodiment 749, wherein solubility of the additive into bitumen at a temperature of 150° C. is less than 5 wt. %.
749. The bitumen pellet according to embodiment 749, wherein solubility of the additive into bitumen at a temperature of 150° C. is less than 1 wt. %.
750. The bitumen pellet according to embodiment 749, wherein solubility of the additive into bitumen at a temperature of 150° C. is less than 0.5 wt. %.
751. The bitumen pellet according to embodiment 749, wherein solubility of the additive into bitumen at a temperature of 150° C. is less than 0.1 wt. %
752. The bitumen pellet according to embodiment 749, wherein solubility of the additive into bitumen at a temperature of 150° C. is less than 0.05 wt. %.
753. The bitumen pellet according to any one of embodiments 749 to 754, wherein the additive includes a hydrocarbonaceous polymer.
754. The bitumen pellet according to embodiment 755, wherein the hydrocarbonaceous polymer has a melting point temperature of at least 50° C.
755. The bitumen pellet according to embodiment 755, wherein the hydrocarbonaceous polymer has a melting point temperature within the range of from about 50° C. to about 150° C.
756. The bitumen pellet according to embodiment 755, wherein the hydrocarbonaceous polymer includes a polyethylene.
757. The bitumen pellet according to embodiment 755, wherein the hydrocarbonaceous polymer includes high density polyethylene (HDPE), polypropylene (PP), polyethylene-co-vinyl acetate (PEVA) linear low-density polyethylene (LLDPE), low-density polyethylene (LDPE), or any combinations thereof.
758. The bitumen pellet according to embodiment 755, wherein the hydrocarbonaceous polymer is present in a relative quantity of from about 1 wt. % to about 20 wt. % relative to bitumen.
759. The bitumen pellet according to embodiment 755, wherein the hydrocarbonaceous polymer is present in a relative quantity of at least 10 wt. % relative to bitumen.
760. The bitumen pellet according to embodiment 748, wherein the shell includes a hydrocarbonaceous polymer.
761. The bitumen pellet according to embodiment 748, wherein the shell includes a hydrocarbonaceous polymer which includes a polyethylene.
762. The bitumen pellet according to embodiment 748, wherein the shell includes a hydrocarbonaceous polymer which includes a cross-linked polyethylene.
763. The bitumen pellet according to embodiment 748, wherein the shell includes a hydrocarbonaceous polymer which includes high density polyethylene (HDPE), polypropylene (PP), polyethylene-co-vinyl acetate (PEVA) linear low-density polyethylene (LLDPE), low-density polyethylene (LDPE), or any combinations thereof.
764. The bitumen pellet according to embodiment 748, wherein the shell includes a hydrocarbonaceous polymer in an amount within the range of from about 0.01 to about 20 wt. % relative to bitumen.
765. The bitumen pellet according to embodiment 748, wherein the shell includes a hydrocarbonaceous polymer in an amount within the range of from about 0.01 to about 5 wt. % relative to bitumen.
766. The bitumen pellet according to any one of embodiments 749 to 767, wherein the shell includes a hydrocarbonaceous polymer which is different from the additive.
767. The bitumen pellet according to embodiment 748, wherein the shell fully surrounds the core.
768. The bitumen pellet according to embodiment 748, wherein the shell partially surrounds the core.
769. The bitumen pellet according to embodiment 748, wherein the shell is substantially free of bitumen.
770. The bitumen pellet according to any one of embodiments 748 to 771, wherein the shell has a thickness less than about 5 mm.
771. The bitumen pellet according to embodiment 772, wherein the shell has a thickness within the range of from about 10 μm to about 4.5 mm.
772. The bitumen pellet according to embodiment 772, wherein the shell has a thickness within the range of from about 20 μm to about 3 mm.
773. The bitumen pellet according to embodiment 772, wherein the shell has a thickness within the range of from about 20 μm to about 2 mm.
774. The bitumen pellet according to embodiment 772, wherein the shell has a thickness within the range of from about 20 μm to about 1 mm.
775. The bitumen pellet according to any one of embodiments 772 to 776, wherein the shell includes an outwardly extending flash.
776. The bitumen pellet according to any one of embodiments 748 to 771, wherein the shell is harder than the core.
777. The bitumen pellet according to embodiment 778, wherein the shell includes a crimp seal.
778. The bitumen pellet according to embodiment 779, wherein the crimp seal extends transversally to a longitudinal axis of the pellet.
779. The bitumen pellet according to embodiment 779, wherein the crimp seal extends along a longitudinal axis of the pellet.
780. The bitumen pellet according to embodiment 781, wherein the crimp seal is formed by thermally sealing to each other opposing walls of the shell.
781. The bitumen pellet according to embodiment 779, wherein the crimp seal is substantially free of bitumen.
782. The bitumen pellet according to embodiment 778, wherein the shell includes first and second crimp seals in a spaced apart relationship to one another.
783. The bitumen pellet according to any one of embodiments 748 to 778, wherein the shell is in the form of a film.
784. The bitumen pellet according to any one of embodiments 748 to 785, the shell having a shape selected from generally spherical, generally lozenge-like, generally cylindrical, generally discoidal, generally tabular, generally ellipsoidal, generally flaky, generally acicular, generally ovoidal, generally pillow shaped and any combinations thereof.
785. The bitumen pellet according to any one of embodiments 748 to 786, wherein the pellet has a maximal extent of less than a quarter inch.
786. The bitumen pellet according to any one of embodiments 748 to 786, wherein the pellet has a maximal extent of less than half an inch.
787. The bitumen pellet according to any one of embodiments 748 to 786, wherein the pellet has a maximal extent of less than an inch.
788. The bitumen pellet according to any one of embodiments 748 to 786, wherein the pellet has a maximal extent of less than 2 inches.

789. The bitumen pellet according to any one of embodiments 748 to 786, wherein the pellet has a maximal extent of less than 3 inches.
790. The bitumen pellet according to any one of embodiments 748 to 786, wherein the pellet has a maximal extent of less than 4 inches.
791. The bitumen pellet according to any one of embodiments 748 to 786, wherein the pellet has a maximal extent of less than 5 inches.
792. The bitumen pellet according to any one of embodiments 748 to 786, wherein the pellet has a maximal extent of less than 12 inches.
793. The set of bitumen pellets according to embodiment 9, wherein the solubility of the additive into bitumen at a temperature of 150° C. is less than 0.1%.
794. The set of bitumen pellets according to embodiment 34, wherein the solubility of the additive into bitumen at a temperature of 150° C. is less than 0.1%.
795. The set of bitumen pellets according to embodiment 62, wherein the solubility of the additive into bitumen at a temperature of 150° C. is less than 0.1%.
796. The set of bitumen pellets according to embodiment 86, wherein solubility of the additive into bitumen at a temperature of 150° C. is less than 1 wt. %.
797. The set of bitumen pellets according to embodiment 86, wherein solubility of the additive into bitumen at a temperature of 150° C. is less than 0.5 wt. %.
798. The set of bitumen pellets according to embodiment 86, wherein solubility of the additive into bitumen at a temperature of 150° C. is less than 0.1 wt. %.
799. The set of bitumen pellets according to embodiment 86, wherein solubility of the additive into bitumen at a temperature of 150° C. is less than 0.05 wt. %.
800. The pile of bitumen pellets according to embodiment 133, wherein solubility of the additive into bitumen at a temperature of 150° C. is less than 1 wt. %.
801. The pile of bitumen pellets according to embodiment 133, wherein solubility of the additive into bitumen at a temperature of 150° C. is less than 0.5 wt. %.
802. The pile of bitumen pellets according to embodiment 133, wherein solubility of the additive into bitumen at a temperature of 150° C. is less than 0.1 wt. %.
803. The pile of bitumen pellets according to embodiment 133, wherein solubility of the additive into bitumen at a temperature of 150° C. is less than 0.05 wt. %.
804. The method according to embodiment 291, wherein solubility of the additive into bitumen at a temperature of 150° C. is less than 1 wt. %.
805. The method according to embodiment 291, wherein solubility of the additive into bitumen at a temperature of 150° C. is less than 0.5 wt. %.
806. The method according to embodiment 291, wherein solubility of the additive into bitumen at a temperature of 150° C. is less than 0.1 wt. %.
807. The method according to embodiment 291, wherein solubility of the additive into bitumen at a temperature of 150° C. is less than 0.05 wt. %.
808. The method according to embodiment 447, wherein a solubility of the additive into bitumen at a temperature of 150° C. is less than 0.05 wt. %.
809. A method for reducing a risk of contaminating automated unloading equipment during unloading of bitumen from a shipping container as a result of bitumen material sticking to the unloading equipment, the method comprising unloading a load of solid bitumen pellets with the unloading equipment from the shipping container, the load including at least 100 bitumen pellets having a probability, per pellet, of failing a crush-resistance test that does not exceed 0.25 when the height of the pellet load is of 1 meter.
810. A method for reducing a risk of contaminating automated unloading equipment during unloading of bitumen from a shipping container as a result of bitumen material sticking to the unloading equipment, the method comprising unloading a load of solid bitumen pellets with the unloading equipment from the shipping container, the load including at least 100 bitumen pellets having a probability, per pellet, of failing a crush-resistance test that does not exceed 0.25 when the height of the pellet load is of 5 meters.
811. A method for reducing a risk of contaminating automated unloading equipment during unloading of bitumen from a shipping container as a result of bitumen material sticking to the unloading equipment, the method comprising unloading a load of solid bitumen pellets with the unloading equipment from the shipping container, the load including at least 100 bitumen pellets having a probability, per pellet, of failing a crush-resistance test that does not exceed 0.25 when the height of the pellet load is of 10 meters.
812. A method for reducing a risk of contaminating automated unloading equipment during unloading of bitumen from a shipping container as a result of bitumen material sticking to the unloading equipment, the method comprising unloading a load of solid bitumen pellets with the unloading equipment from the shipping container, the load including at least 100 bitumen pellets having a probability, per pellet, of failing a crush-resistance test that does not exceed 0.25 when the height of the pellet load is of 20 meters.
813. A method for reducing a risk of contaminating automated unloading equipment during unloading of bitumen from a shipping container as a result of bitumen material sticking to the unloading equipment, the method comprising unloading a load of solid bitumen pellets with the unloading equipment from the shipping container, the load including at least 100 bitumen pellets having a probability, per pellet, of failing a crush-resistance test that does not exceed 0.25 when the height of the pellet load is of 30 meters.
814. A method for reducing a risk of contaminating automated unloading equipment during unloading of bitumen from a shipping container as a result of bitumen material sticking to the unloading equipment, the method comprising unloading a load of solid bitumen pellets with the unloading equipment from the shipping container, the load including at least 100 bitumen pellets having a probability, per pellet, of failing a crush-resistance test that does not exceed 0.25 when the height of the pellet load is of 40 meters.
815. A method for reducing a risk of contaminating automated unloading equipment during unloading of bitumen from a shipping container as a result of bitumen material sticking to the unloading equipment, the method comprising unloading a load of solid bitumen pellets with the unloading equipment from the shipping container, the load including at least 100 bitumen pellets having a probability, per pellet, of failing a crush-resistance test that does not exceed 0.25 when the height of the pellet load is of 50 meters.
816. The method according to any one of embodiments 811 to 817, wherein said shipping container is a maritime vessel.

817. The method according to embodiment 818, wherein said shipping maritime vessel is a bulk freighter.
818. The method according to any one of embodiments 811 to 819, wherein said unloading equipment includes a mechanized conveyor, a clamshell scoop or mechanical bucket.
819. The method according to embodiment 820, wherein said shipping container includes a cargo hatch, and wherein said unloading equipment is maneuvered through the cargo hatch of the shipping container such as to pick up the load of pellets.
820. The method according to any one of embodiments 811 to 819, wherein said unloading equipment includes a conveyor belt, a pneumatic transfer system or a gravity loading system.
821. The method according to any one of embodiments 811 to 822, each pellet including a mixture of bitumen and an additive operating to increase viscosity of the mixture.
822. The method according to embodiment 823, wherein solubility of the additive into bitumen at a temperature of 150° C. is less than 5 wt. %.
823. The method according to embodiment 823, wherein solubility of the additive into bitumen at a temperature of 150° C. is less than 1 wt. %.
824. The method according to embodiment 823, wherein solubility of the additive into bitumen at a temperature of 150° C. is less than 0.5 wt. %.
825. The method according to embodiment 823, wherein solubility of the additive into bitumen at a temperature of 150° C. is less than 0.1 wt. %.
826. The method according to embodiment 823, wherein solubility of the additive into bitumen at a temperature of 150° C. is less than 0.05 wt. %.
827. The method according to any one of embodiments 823 to 828, wherein the additive includes a hydrocarbonaceous polymer.
828. The method according to embodiment 829, wherein the hydrocarbonaceous polymer includes a polyethylene.
829. The method according to embodiment 829, wherein the hydrocarbonaceous polymer includes high density polyethylene (HDPE), polypropylene (PP), polyethylene-co-vinyl acetate (PEVA), linear low-density polyethylene (LLDPE), low-density polyethylene (LDPE), or any combinations thereof.
830. The method according to any of embodiments 829 to 831, wherein the hydrocarbonaceous polymer is present in a relative quantity of from about 1 to about 20 wt. % relative to bitumen.
831. The method according to any of embodiments 829 to 831, wherein the hydrocarbonaceous polymer is present in a relative quantity of at least 10 wt. % relative to bitumen.
832. The method according to any one of embodiments 823 to 833, each pellet including an external shell.
833. The method according to embodiment 834, each pellet having a core and the shell surrounding the core.
834. The method according to embodiment 835, wherein the shell fully surrounds the core.
835. The method according to embodiment 835, wherein the shell partially surrounds the core.
836. The method according to embodiment 835, each pellet including an internal pressure which is above ambient pressure, wherein the shell is hermetically sealed to maintain the internal pressure of the pellet.
837. The method according to embodiment 838, wherein the internal pressure is above ambient pressure by an amount up to about 15 psi.
838. The method according to embodiment 839, wherein the shell is harder than the core.
839. The method according to embodiment 840, the shell having a shape selected from generally spherical, generally lozenge-like, generally cylindrical, generally discoidal, generally tabular, generally ellipsoidal, generally flaky, generally acicular, generally ovoidal, generally pillow shaped and any combinations thereof.
840. The method according to embodiment 840, wherein the shell has a thickness less than about 5 mm.
841. The method according to embodiment 840, wherein the shell has a thickness within the range of from about 10 µm to about 4.5 mm.
842. The method according to embodiment 840, wherein the shell has a thickness within the range of from about 20 µm to about 3 mm.
843. The method according to embodiment 840, wherein the shell has a thickness within the range of from about 20 µm to about 2 mm.
844. The method according to embodiment 840, wherein the shell has a thickness within the range of from about 20 µm to about 1 mm.
845. The method according to any one of embodiments 840 to 846, wherein the shell includes an outwardly extending flash.
846. The method according to embodiment 840, wherein the shell includes a crimp seal.
847. The method according to embodiment 848, wherein the crimp seal extends transversally to a longitudinal axis of the pellet.
848. The method according to embodiment 848, wherein the crimp seal extends along a longitudinal axis of the pellet.
849. The method according to embodiment 850, wherein the crimp seal is formed by thermally sealing to each other opposing walls of the shell.
850. The method according to embodiment 848, wherein the crimp seal is substantially free of bitumen.
851. The method according to embodiment 840, wherein the shell includes first and second crimp seals which are in a spaced apart relationship to one another.
852. The method according to embodiment 834, wherein the shell is in the form of a flexible film.
853. A method for unloading of bitumen from a shipping container, the method comprising unloading a load of solid bitumen pellets with automated unloading equipment from the shipping container and accumulating the pellets on a heap, the load including at least 100 bitumen pellets having a probability, per pellet, of failing an impact-resistance test that does not exceed 0.25, when the dropping height is of 1 meter.
854. A method for unloading of bitumen from a shipping container, the method comprising unloading a load of solid bitumen pellets with automated unloading equipment from the shipping container and accumulating the pellets on a heap, the load including at least 100 bitumen pellets having a probability, per pellet, of failing an impact-resistance test that does not exceed 0.25, when the dropping height is of 5 meters.
855. A method for unloading of bitumen from a shipping container, the method comprising unloading a load of solid bitumen pellets with automated unloading equipment from the shipping container and accumulating the pellets on a heap, the load including at least 100 bitumen pellets having a probability, per pellet, of failing an impact-resistance test that does not exceed 0.25, when the dropping height is of 10 meters.

856. A method for unloading of bitumen from a shipping container, the method comprising unloading a load of solid bitumen pellets with automated unloading equipment from the shipping container and accumulating the pellets on a heap, the load including at least 100 bitumen pellets having a probability, per pellet, of failing an impact-resistance test that does not exceed 0.25, when the dropping height is of 20 meters.

857. A method for unloading of bitumen from a shipping container, the method comprising unloading a load of solid bitumen pellets with automated unloading equipment from the shipping container and accumulating the pellets on a heap, the load including at least 100 bitumen pellets having a probability, per pellet, of failing an impact-resistance test that does not exceed 0.25, when the dropping height is of 30 meters.

858. A method for unloading of bitumen from a shipping container, the method comprising unloading a load of solid bitumen pellets with automated unloading equipment from the shipping container and accumulating the pellets on a heap, the load including at least 100 bitumen pellets having a probability, per pellet, of failing an impact-resistance test that does not exceed 0.25, when the dropping height is of 40 meters.

859. A method for unloading of bitumen from a shipping container, the method comprising unloading a load of solid bitumen pellets with automated unloading equipment from the shipping container and accumulating the pellets on a heap, the load including at least 100 bitumen pellets having a probability, per pellet, of failing an impact-resistance test that does not exceed 0.25, when the dropping height is of 50 meters.

860. The method according to any one of embodiments 855 to 861, wherein said shipping container is a maritime vessel.

861. The method according to embodiment 862, wherein said shipping maritime vessel is a bulk freighter.

862. The method according to any one of embodiments 855 to 863, wherein said unloading equipment includes a mechanized conveyor, a clamshell scoop or mechanical bucket.

863. The method according to embodiment 864, wherein said shipping container includes a cargo hatch, and wherein said unloading equipment is maneuvered through the cargo hatch of the shipping container such as to pick up the load of pellets.

864. The method according to any one of embodiments 855 to 863, wherein said unloading equipment includes a conveyor belt, a pneumatic transfer system, or a gravity loading system.

865. The method according to any one of embodiments 855 to 866, each pellet including a mixture of bitumen and an additive operating to increase viscosity of the mixture.

866. The method according to embodiment 867, wherein solubility of the additive into bitumen at a temperature of 150° C. is less than 5 wt. %.

867. The method according to embodiment 867, wherein solubility of the additive into bitumen at a temperature of 150° C. is less than 1 wt. %.

868. The method according to embodiment 867, wherein solubility of the additive into bitumen at a temperature of 150° C. is less than 0.5 wt. %.

869. The method according to embodiment 867, wherein solubility of the additive into bitumen at a temperature of 150° C. is less than 0.1 wt. %.

870. The method according to embodiment 867, wherein solubility of the additive into bitumen at a temperature of 150° C. is less than 0.05 wt. %.

871. The method according to any one of embodiments 867 to 872, wherein the additive includes a hydrocarbonaceous polymer.

872. The method according to embodiment 873, wherein the hydrocarbonaceous polymer includes a polyethylene.

873. The method according to embodiment 873, wherein the hydrocarbonaceous polymer includes high density polyethylene (HDPE), polypropylene (PP), polyethylene-co-vinyl acetate (PEVA), linear low-density polyethylene (LLDPE), low-density polyethylene (LDPE), or any combinations thereof.

874. The method according to any of embodiments 873 to 875, wherein the hydrocarbonaceous polymer is present in a relative quantity of from about 1 to about 20 wt. % relative to bitumen.

875. The method according to any of embodiments 873 to 875, wherein the hydrocarbonaceous polymer is present in a relative quantity of at least 10 wt. % relative to bitumen.

876. The method according to any one of embodiments 867 to 877, each pellet including an external shell.

877. The method according to embodiment 878, each pellet having a core and the shell surrounding the core.

878. The method according to embodiment 879, wherein the shell fully surrounds the core.

879. The method according to embodiment 879, wherein the shell partially surrounds the core.

880. The method according to embodiment 879, each pellet including an internal pressure which is above ambient pressure, wherein the shell is hermetically sealed to maintain the internal pressure of the pellet.

881. The method according to embodiment 882, wherein the internal pressure is above ambient pressure by an amount up to about 15 psi.

882. The method according to embodiment 878, wherein the shell is harder than the core.

883. The method according to embodiment 884, the shell having a shape selected from generally spherical, generally lozenge-like, generally cylindrical, generally discoidal, generally tabular, generally ellipsoidal, generally flaky, generally acicular, generally ovoidal, generally pillow shaped and any combinations thereof.

884. The method according to embodiment 884, wherein the shell has a thickness less than about 5 mm.

885. The method according to embodiment 884, wherein the shell has a thickness within the range of from about 10 μm to about 4.5 mm.

886. The method according to embodiment 884, wherein the shell has a thickness within the range of from about 20 μm to about 3 mm.

887. The method according to embodiment 884, wherein the shell has a thickness within the range of from about 20 μm to about 2 mm.

888. The method according to embodiment 884, wherein the shell has a thickness within the range of from about 20 μm to about 1 mm.

889. The method according to any one of embodiments 884 to 890, wherein the shell includes an outwardly extending flash.

890. The method according to embodiment 884, wherein the shell includes a crimp seal.

891. The method according to embodiment 892, wherein the crimp seal extends transversally to a longitudinal axis of the pellet.

892. The method according to embodiment 892, wherein the crimp seal extends along a longitudinal axis of the pellet.

893. The method according to embodiment 894, wherein the crimp seal is formed by thermally sealing to each other opposing walls of the shell.

894. The method according to embodiment 892, wherein the crimp seal is substantially free of bitumen.

895. The method according to embodiment 884, wherein the shell includes first and second crimp seals which are in a spaced apart relationship to one another.

896. The method according to embodiment 878, wherein the shell is in the form of a flexible film.

897. An additive material retrieved from a solid bitumen pellet, the additive material comprising a component operative to increase the viscosity of bitumen when the component is admixed with the bitumen, and the additive material further comprising bitumen material.

898. The additive material according to embodiment 899, comprising bitumen material in an amount not exceeding about 70 wt. % of the additive material.

899. The additive material according to embodiment 899, comprising bitumen material in an amount not exceeding about 60 wt. % of the additive material.

900. The additive material according to embodiment 899, comprising bitumen material in an amount not exceeding about 40 wt. % of the additive material.

901. The additive material according to embodiment 899, comprising bitumen material in an amount not exceeding about 30 wt. % of the additive material.

902. The additive material according to any one of embodiments 899 to 903, wherein the component includes a hydrocarbonaceous polymer.

903. The additive material according to embodiment 904, wherein the hydrocarbonaceous polymer includes a polyethylene.

904. The additive material according to embodiment 904, wherein the hydrocarbonaceous polymer includes high density polyethylene (HDPE), polypropylene (PP), polyethylene-co-vinyl acetate (PEVA), linear low-density polyethylene (LLDPE), low-density polyethylene (LDPE), or any combinations thereof.

905. The additive material according to any one of embodiments 899 to 906, being in the form of beads or pellets.

906. A solid bitumen pellet comprising an external shell and an internal bituminous core, the shell operating to protect the core, the pellet having a burst pressure of 0.5 psi or more.

907. A solid bitumen pellet comprising an external shell and an internal bituminous core, the shell operating to protect the core and having a burst pressure of 5 psi or more.

908. A solid bitumen pellet comprising an external shell and an internal bituminous core, the shell operating to protect the core and having a burst pressure of 10 psi or more.

909. A solid bitumen pellet comprising an external shell and an internal bituminous core, the shell operating to protect the core and having a burst pressure of 30 psi or more.

910. A solid bitumen pellet comprising an external shell and an internal bituminous core, the shell operating to protect the core and having a burst pressure of 40 psi or more.

911. A solid bitumen pellet comprising an external shell and an internal bituminous core, the shell operating to protect the core and having a burst pressure of 50 psi or more.

912. A solid bitumen pellet comprising an external shell and an internal bituminous core, the shell operating to protect the core and having a burst pressure of 75 psi or more.

913. The pellet according to any one of embodiments 908 to 914, wherein the shell is harder than the core.

914. The pellet according to embodiment 915, wherein the shell includes an outwardly extending flash.

915. The pellet according to embodiment 915, wherein the shell has an outer surface including irregularities to reduce slipperiness of the pellet.

916. The pellet according to embodiment 915, wherein the shell includes a crimp seal.

917. The pellet according to embodiment 918, wherein the crimp seal extends transversally to a longitudinal axis of the pellet.

918. The pellet according to embodiment 915, wherein the shell includes first and second crimp seals in a spaced apart relationship to one another.

919. The pellet according to embodiment 918, wherein the crimp seal extends along a longitudinal axis of the pellet.

920. The pellet according to embodiment 921, wherein the crimp seal is formed by thermally sealing to each other opposing walls of the shell.

921. The pellet according to embodiment 918, wherein the crimp seal is substantially free of bitumen.

922. The pellet according to embodiment 915, wherein the core includes a mixture of bitumen and an additive operating to increase viscosity of the bitumen.

923. The pellet according to embodiment 924, wherein solubility of the additive into bitumen at a temperature of 150° C. is less than 5 wt. %.

924. The pellet according to embodiment 924, wherein the solubility of the additive into bitumen at a temperature of 150° C. is less than 1 wt. %.

925. The pellet according to embodiment 924, wherein the solubility of the additive into bitumen at a temperature of 150° C. is less than 0.5 wt. %.

926. The pellet according to embodiment 924, wherein the solubility of the additive into bitumen at a temperature of 150° C. is less than 0.05 wt. %.

927. The pellet according to embodiment 924, wherein the additive includes a hydrocarbonaceous polymer.

928. The pellet according to embodiment 929, wherein the hydrocarbonaceous polymer has a melting point temperature of at least 50° C.

929. The pellet according to embodiment 929, wherein the hydrocarbonaceous polymer has a melting point temperature within the range of from about 50° C. to about 150° C.

930. The pellet according to embodiment 929, wherein the hydrocarbonaceous polymer includes a polyethylene.

931. The pellet according to embodiment 929, wherein the hydrocarbonaceous polymer includes high density polyethylene (HDPE), polypropylene (PP), polyethylene-co-vinyl acetate (PEVA), linear low-density polyethylene (LLDPE), low-density polyethylene (LDPE), or any combinations thereof.

932. The pellet according to any one of embodiments 929 to 933, wherein the hydrocarbonaceous polymer is present in the core in a relative quantity of from about 1 wt. % to about 20 wt. % relative to bitumen.

933. The pellet according to any one of embodiments 929 to 933, wherein the hydrocarbonaceous polymer is present in the core in a relative quantity of at least 10 wt. % relative to bitumen.

934. The pellet according to embodiment 915, the shell having a shape selected from generally spherical, generally lozenge-like, generally cylindrical, generally discoidal, generally tabular, generally ellipsoidal, generally flaky, generally acicular, generally ovoidal, generally pillow shaped and any combinations thereof.

935. The pellet according to embodiment 915, wherein the shell has a thickness less than about 5 mm.
936. The pellet according to embodiment 915, wherein the shell has a thickness within the range of from about 10 μm to about 4.5 mm.
937. The pellet according to embodiment 915, wherein the shell has a thickness within the range of from about 20 μm to about 3 mm.
938. The pellet according to embodiment 915, wherein the shell has a thickness within the range of from about 20 μm to about 2 mm.
939. The pellet according to embodiment 915, wherein the shell has a thickness within the range of from about 20 μm to about 1 mm.
940. The pellet according to any one of embodiments 908 to 941, having a maximal extent of less than a quarter inch.
941. The pellet according to any one of embodiments 908 to 941, having a maximal extent of less than half an inch.
942. The pellet according to any one of embodiments 908 to 941, each pellet having a maximal extent of less than an inch.
943. The pellet according to any one of embodiments 908 to 941, each pellet having a maximal extent of less than 2 inches.
944. The pellet according to any one of embodiments 908 to 941, having a maximal extent of less than 3 inches.
945. The pellet according to any one of embodiments 908 to 941, having a maximal extent of less than 4 inches.
946. The pellet according to any one of embodiments 908 to 941, having a maximal extent of less than 5 inches.
947. The pellet according to any one of embodiments 908 to 941, having a maximal extent of less than 12 inches.
948. A method of making a solid bitumen pellet, the method comprising mixing bitumen with an additive material, the additive material including a component operative to increase the viscosity of bitumen when the component is admixed with the bitumen, and the additive material further including bitumen material.
949. The method according to embodiment 950, said additive including bitumen material in an amount not exceeding 70 wt. % of additive material.
950. The method according to embodiment 950, said additive including bitumen material in an amount not exceeding 60 wt. % of additive material.
951. The method according to embodiment 950, said additive including bitumen material in an amount not exceeding 40 wt. % of additive material.
952. The method according to embodiment 950, said additive including bitumen material in an amount not exceeding 30 wt. % of additive material.
953. The method according to any one of embodiments 950 to 954, wherein a solubility of the additive into bitumen at a temperature of 150° C. is less than 5 wt. %.
954. The method according to embodiment 955, wherein a solubility of the additive into bitumen at a temperature of 150° C. is less than 1 wt. %.
955. The method according to embodiment 955, wherein a solubility of the additive into bitumen at a temperature of 150° C. is less than 0.5 wt. %.
956. The method according to embodiment 955, wherein a solubility of the additive into bitumen at a temperature of 150° C. is less than 0.1 wt. %.
957. The method according to any one of embodiments 950 to 958, wherein the additive includes a hydrocarbonaceous polymer.
958. The method according to embodiment 959, wherein the hydrocarbonaceous polymer includes a polyethylene.
959. The method according to embodiment 959, wherein the hydrocarbonaceous polymer includes high density polyethylene (HDPE), polypropylene (PP), polyethylene-co-vinyl acetate (PEVA) linear low-density polyethylene (LLDPE), low-density polyethylene (LDPE), or any combinations thereof.
960. The method according to embodiment 959, wherein the hydrocarbonaceous polymer is present in a relative quantity of from about 1 wt. % to about 20 wt. % relative to bitumen.
961. The method according to embodiment 962, wherein the hydrocarbonaceous polymer is present in a relative quantity of at least 10 wt. % relative to bitumen.
962. The method according to embodiment 959, the method including heating the bitumen and the polymer such that the polymer liquefies, and mixing when the polymer is in liquid state.
963. The method according to embodiment 964, wherein said heating is performed to a temperature in the range of from about 50° C. and about 150° C.
964. The method according to embodiment 964, the method including extruding the mixture.
965. The method according to embodiment 964, the method including molding the mixture.
966. The method according to embodiment 964, the method including forming a shell around a core made of the mixture.
967. The method according to embodiment 968, wherein the hydrocarbonaceous polymer is a first hydrocarbonaceous polymer, the method including co-extruding the mixture with a material including a second hydrocarbonaceous polymer to form the shell.
968. The method according to embodiment 968, the method including spraying the mixture with a material which upon solidification forms the shell.
969. The method according to embodiment 968, the method including enclosing the mixture into a container forming the shell.
970. The method according to embodiment 971, the method including extruding the container and filling the container with the mixture.
971. The method according to embodiment 972, the method including sealing the container that is filled with the mixture.
972. The method according to embodiment 973, the method being a blow-fill-seal process.
973. The method according to embodiment 971, the method including providing material in sheet form and forming the container from the material in sheet form around the core.
974. The method according to embodiment 975, the method including forming a tube from the sheet material and depositing the core into the tube.
975. The method according to embodiment 976, the method including sealing longitudinal edges of the sheet material to form a crimp seal extending longitudinally on the tube.
976. The method according to embodiment 976, the method including making spaced apart crimp seals to close the tube.
977. The method according to embodiment 978, the method being a fill-form-seal process.
978. The method according to embodiment 975, the method including providing opposing sheets and sealing the opposing sheets to each other to enclose the core between the sheets.
979. The method according to any one of embodiments 950, wherein the pellet includes an external shell.

980. The method according to embodiment 981, wherein the pellet has a core and the shell surrounds the core.
981. The method according to embodiment 982, wherein the shell fully surrounds the core.
982. The method according to embodiment 982, wherein the shell partially surrounds the core.
983. The method according to embodiment 982, wherein the pellet includes an internal pressure which is above ambient pressure, wherein the shell is hermetically sealed to maintain the internal pressure of the pellet.
984. The method according to embodiment 985, wherein the internal pressure is above ambient pressure by an amount up to about 15 psi.
985. The method according to embodiment 982, wherein the shell includes an outwardly extending flash.
986. The method according to embodiment 982, wherein the shell is harder than the core.
987. The method according to embodiment 988, the shell having a shape selected from generally spherical, generally lozenge-like, generally cylindrical, generally discoidal, generally tabular, generally ellipsoidal, generally flaky, generally acicular, generally ovoidal, generally pillow shaped and any combinations thereof.
988. The method according to embodiment 988, wherein the shell has a thickness less than about 5 mm.
989. The method according to embodiment 988, wherein the shell has a thickness within the range of from about 10 μm to about 4.5 mm.
990. The method according to embodiment 988, wherein the shell has a thickness within the range of from about 20 μm to about 3 mm.
991. The method according to embodiment 988, wherein the shell has a thickness within the range of from about 20 μm to about 2 mm.
992. The method according to embodiment 988, wherein the shell has a thickness within the range of from about 20 μm to about 1 mm.
993. The method according to embodiment 982, wherein the shell includes a crimp seal.
994. The method according to embodiment 995, wherein the crimp seal extends transversally to a longitudinal axis of the pellet.
995. The method according to embodiment 995, wherein the crimp seal extends along a longitudinal axis of the pellet.
996. The method according to embodiment 997, wherein the crimp seal is formed by thermally sealing to each other opposing walls of the shell.
997. The method according to embodiment 995, wherein the crimp seal is substantially free of bitumen.
998. The method according to embodiment 982, wherein the shell includes first and second crimp seals, in opposing relationship.
999. The method according to embodiment 973, the method including enclosing the container in a second container.
1000. The method according to embodiment 1001, the method including sealing the second container forming nested containers.
1001. The method according to embodiment 465, the method including enclosing the container in a second container.
1002. The method according to embodiment 1003, the method including sealing the second container forming nested containers.
1003. The method according to embodiment 612, wherein said bitumen includes droplets of said material, the method including inducing coalescence of said droplets and removing the material by gravity separation.
1004. The method according to embodiment 657, wherein said bitumen includes droplets of said material, the method including inducing coalescence of said droplets and removing the material by gravity separation.
1005. A method for unloading of bitumen from a shipping container, the method comprising unloading a load of solid bitumen pellets with automated unloading equipment from the shipping container and accumulating the pellets on a heap, the load including at least 100 bitumen pellets having a probability, per pellet, of failing a crush-resistance test that does not exceed 0.25, when subjected to a load of pellets having a height of 1 meter.
1006. A method for unloading of bitumen from a shipping container, the method comprising unloading a load of solid bitumen pellets with automated unloading equipment from the shipping container and accumulating the pellets on a heap, the load including at least 100 bitumen pellets having a probability, per pellet, of failing a crush-resistance test that does not exceed 0.25, when subjected to a load of pellets having a height of 5 meters.
1007. A method for unloading of bitumen from a shipping container, the method comprising unloading a load of solid bitumen pellets with automated unloading equipment from the shipping container and accumulating the pellets on a heap, the load including at least 100 bitumen pellets having a probability, per pellet, of failing a crush-resistance test that does not exceed 0.25, when subjected to a load of pellets having a height of 10 meters.
1008. A method for unloading of bitumen from a shipping container, the method comprising unloading a load of solid bitumen pellets with automated unloading equipment from the shipping container and accumulating the pellets on a heap, the load including at least 100 bitumen pellets having a probability, per pellet, of failing a crush-resistance test that does not exceed 0.25, when subjected to a load of pellets having a height of 20 meters.
1009. A method for unloading of bitumen from a shipping container, the method comprising unloading a load of solid bitumen pellets with automated unloading equipment from the shipping container and accumulating the pellets on a heap, the load including at least 100 bitumen pellets having a probability, per pellet, of failing a crush-resistance test that does not exceed 0.25, when subjected to a load of pellets having a height of 30 meters.
1010. A method for unloading of bitumen from a shipping container, the method comprising unloading a load of solid bitumen pellets with automated unloading equipment from the shipping container and accumulating the pellets on a heap, the load including at least 100 bitumen pellets having a probability, per pellet, of failing a crush-resistance test that does not exceed 0.25, when subjected to a load of pellets having a height of 40 meters.
1011. A method for unloading of bitumen from a shipping container, the method comprising unloading a load of solid bitumen pellets with automated unloading equipment from the shipping container and accumulating the pellets on a heap, the load including at least 100 bitumen pellets having a probability, per pellet, of failing a crush-resistance test that does not exceed 0.25, when subjected to a load of pellets having a height of 50 meters.
1012. The method according to any one of embodiments 1007 to 1013, wherein said shipping container is a maritime vessel.
1013. The method according to embodiment 1014, wherein said shipping maritime vessel is a bulk freighter.

1014. The method according to any one of embodiments 1007 to 1015, wherein said unloading equipment includes a mechanized conveyor, a clamshell scoop or mechanical bucket.
1015. The method according to embodiment 1016, wherein said shipping container includes a cargo hatch, and wherein said unloading equipment is maneuvered through the cargo hatch of the shipping container such as to pick up the load of pellets.
1016. The method according to any one of embodiments 1007 to 1015, wherein said unloading equipment includes a conveyor belt, a pneumatic transfer system, or a gravity loading system.
1017. The method according to any one of embodiments 1007 to 1018, each pellet including a mixture of bitumen and an additive operating to increase viscosity of the mixture.
1018. The method according to embodiment 1019, wherein solubility of the additive into bitumen at a temperature of 150° C. is less than 5 wt. %.
1019. The method according to embodiment 1019, wherein solubility of the additive into bitumen at a temperature of 150° C. is less than 1 wt. %.
1020. The method according to embodiment 1019, wherein solubility of the additive into bitumen at a temperature of 150° C. is less than 0.5 wt. %.
1021. The method according to embodiment 1019, wherein solubility of the additive into bitumen at a temperature of 150° C. is less than 0.1 wt. %.
1022. The method according to embodiment 1019, wherein solubility of the additive into bitumen at a temperature of 150° C. is less than 0.05 wt. %.
1023. The method according to any one of embodiments 1019 to 1024, wherein the additive includes a hydrocarbonaceous polymer.
1024. The method according to embodiment 1025, wherein the hydrocarbonaceous polymer includes a polyethylene.
1025. The method according to embodiment 1025, wherein the hydrocarbonaceous polymer includes high density polyethylene (HDPE), polypropylene (PP), polyethylene-co-vinyl acetate (PEVA), linear low-density polyethylene (LLDPE), low-density polyethylene (LDPE), or any combinations thereof.
1026. The method according to any of embodiments 1025 to 1027, wherein the hydrocarbonaceous polymer is present in a relative quantity of from about 1 to about 20 wt. % relative to bitumen.
1027. The method according to any of embodiments 1025 to 1027, wherein the hydrocarbonaceous polymer is present in a relative quantity of at least 10 wt. % relative to bitumen.
1028. The method according to any one of embodiments 1019 to 1029, each pellet including an external shell.
1029. The method according to embodiment 1030, each pellet having a core and the shell surrounding the core.
1030. The method according to embodiment 1031, wherein the shell fully surrounds the core.
1031. The method according to embodiment 1031, wherein the shell partially surrounds the core.
1032. The method according to embodiment 1031, each pellet including an internal pressure which is above ambient pressure, wherein the shell is hermetically sealed to maintain the internal pressure of the pellet.
1033. The method according to embodiment 1034, wherein the internal pressure is above ambient pressure by an amount up to 15 psi.
1034. The method according to embodiment 1030, wherein the shell is harder than the core.
1035. The method according to embodiment 1036, the shell having a shape selected from generally spherical, generally lozenge-like, generally cylindrical, generally discoidal, generally tabular, generally ellipsoidal, generally flaky, generally acicular, generally ovoidal, generally pillow shaped and any combinations thereof.
1036. The method according to embodiment 1036, wherein the shell has a thickness less than about 5 mm.
1037. The method according to embodiment 1036, wherein the shell has a thickness within the range of from about 10 µm to about 4.5 mm.
1038. The method according to embodiment 1036, wherein the shell has a thickness within the range of from about 20 µm to about 3 mm.
1039. The method according to embodiment 1036, wherein the shell has a thickness within the range of from about 20 µm to about 2 mm.
1040. The method according to embodiment 1036, wherein the shell has a thickness within the range of from about 20 µm to about 1 mm.
1041. The method according to any one of embodiments 1036 to 1042, wherein the shell includes an outwardly extending flash.
1042. The method according to embodiment 1036, wherein the shell includes a crimp seal.
1043. The method according to embodiment 1044, wherein the crimp seal extends transversally to a longitudinal axis of the pellet.
1044. The method according to embodiment 1044, wherein the crimp seal extends along a longitudinal axis of the pellet.
1045. The method according to embodiment 1046, wherein the crimp seal is formed by thermally sealing to each other opposing walls of the shell.
1046. The method according to embodiment 1044, wherein the crimp seal is substantially free of bitumen.
1047. The method according to embodiment 1036, wherein the shell includes first and second crimp seals which are in a spaced apart relationship to one another.
1048. The method according to embodiment 1030, wherein the shell is in the form of a flexible film.
1049. The set of bitumen pellets according to embodiment 21, wherein the pellet includes a nested shell configuration including an internal shell and the external shell.
1050. The set of bitumen pellets according to embodiment 74, wherein the pellet includes a nested shell configuration including an internal shell and the external shell.
1051. The pile of bitumen pellets according to embodiment 121, each pellet including a nested shell configuration including an internal shell and the external shell.
1052. The bitumen pellet according to embodiment 163, wherein the pellet includes a nested shell configuration including an internal shell and the external shell.
1053. The bitumen pellet according to embodiment 212, wherein the pellet includes a nested shell configuration including an internal shell and the external shell.
1054. The method according to embodiment 267, wherein each pellet includes a nested shell configuration including an internal shell and the external shell.
1055. The method according to embodiment 298, wherein each pellet includes a nested shell configuration including an internal shell and the external shell.
1056. The method according to embodiment 341, wherein each pellet includes a nested shell configuration including an internal shell and the external shell.

1057. The method according to embodiment 383, wherein each pellet includes a nested shell configuration including an internal shell and the external shell.
1058. The method according to embodiment 426, wherein each pellet includes a nested shell configuration including an internal shell and the external shell.
1059. The method according to embodiment 474, wherein the pellet includes a nested shell configuration including an internal shell and the external shell.
1060. The method according to embodiment 533, wherein the pellet includes a nested shell configuration including an internal shell and the external shell.
1061. The set of bitumen pellets according to any one of embodiments 1 to 53, 795 and 796, wherein the probability of failing the crush-resistance test per pellet does not exceed 0.20.
1062. The set of bitumen pellets according to any one of embodiments 1 to 53, 795 and 796, wherein the probability of failing the crush-resistance test per pellet does not exceed 0.15.
1063. The set of bitumen pellets according to any one of embodiments 1 to 53, 795 and 796, wherein the probability of failing the crush-resistance test per pellet does not exceed 0.10.
1064. The set of bitumen pellets according to any one of embodiments 54 to 103 and 797 to 801, wherein the probability of failing the impact-resistance test per pellet does not exceed 0.20.
1065. The set of bitumen pellets according to any one of embodiments 54 to 103 and 797 to 801, wherein the probability of failing the impact-resistance test per pellet does not exceed 0.15.
1066. The set of bitumen pellets according to any one of embodiments 54 to 103 and 797 to 801, wherein the probability of failing the impact-resistance test per pellet does not exceed 0.10.
1067. The method according to any one of embodiments 251 to 286, wherein the probability of failing the crush-resistance test per pellet does not exceed 0.20.
1068. The method according to any one of embodiments 251 to 286, wherein the probability of failing the crush-resistance test per pellet does not exceed 0.15.
1069. The method according to any one of embodiments 251 to 286, wherein the probability of failing the crush-resistance test per pellet does not exceed 0.10.
1070. The method according to any one of embodiments 287 to 317 and 806 to 809, wherein the probability of failing the impact-resistance test per pellet does not exceed 0.20.
1071. The method according to any one of embodiments 287 to 317 and 806 to 809, wherein the probability of failing the impact-resistance test per pellet does not exceed 0.15.
1072. The method according to any one of embodiments 287 to 317 and 806 to 809, wherein the probability of failing the impact-resistance test per pellet does not exceed 0.10.
1073. The method according to any one of embodiments 318 to 360, wherein the probability of failing the crush-resistance test per pellet does not exceed 0.20.
1074. The method according to any one of embodiments 318 to 360, wherein the probability of failing the crush-resistance test per pellet does not exceed 0.15.
1075. The method according to any one of embodiments 318 to 360, wherein the probability of failing the crush-resistance test per pellet does not exceed 0.10.
1076. The method according to any one of embodiments 361 to 402, wherein the probability of failing the impact-resistance test per pellet does not exceed 0.20.
1077. The method according to any one of embodiments 361 to 402, wherein the probability of failing the impact-resistance test per pellet does not exceed 0.15.
1078. The method according to any one of embodiments 361 to 402, wherein the probability of failing the impact-resistance test per pellet does not exceed 0.10.
1079. The method according to any one of embodiments 403 to 446, wherein the probability of failing the crush-resistance test per pellet does not exceed 0.20.
1080. The method according to any one of embodiments 403 to 446, wherein the probability of failing the crush-resistance test per pellet does not exceed 0.15.
1081. The method according to any one of embodiments 403 to 446, wherein the probability of failing the crush-resistance test per pellet does not exceed 0.10.
1082. Method according to any one of embodiments 811 to 854, wherein the probability of failing the crush-resistance test per pellet does not exceed 0.20.
1083. Method according to any one of embodiments 811 to 854, wherein the probability of failing the crush-resistance test per pellet does not exceed 0.15.
1084. Method according to any one of embodiments 811 to 854, wherein the probability of failing the crush-resistance test per pellet does not exceed 0.10.
1085. Method according to any one of embodiments 855 to 898, wherein the probability of failing the impact-resistance test per pellet does not exceed 0.20.
1086. Method according to any one of embodiments 855 to 898, wherein the probability of failing the impact-resistance test per pellet does not exceed 0.15.
1087. Method according to any one of embodiments 855 to 898, wherein the probability of failing the impact-resistance test per pellet does not exceed 0.10.
1088. Method according to any one of embodiments 1007 to 1050, wherein the probability of failing the crush-resistance test per pellet does not exceed 0.20.
1089. Method according to any one of embodiments 1007 to 1050, wherein the probability of failing the crush-resistance test per pellet does not exceed 0.15.
1090. Method according to any one of embodiments 1007 to 1050, wherein the probability of failing the crush-resistance test per pellet does not exceed 0.10.

All features of embodiments, which are described in this disclosure, are not mutually exclusive, and could be combined with one another. Elements of one embodiment can be utilized in the other embodiments without further mention. Other aspects and features of the present invention will become apparent to those ordinarily skilled in the art upon review of the following description of specific embodiments in conjunction with the accompanying Figures.

BRIEF DESCRIPTION OF THE DRAWINGS

The following drawings show exemplary embodiments of the present invention, in which:

(FIG. 40B);

FIG. 45 is a vertical cross-sectional view of a blow-molding system, where the open mold receives a parison from an extruder head;

FIG. 46 shows the blow-molding system of FIG. 45 closed, where the parison bottom portion is pinched between two mold halves;

FIG. 47 shows the blow-molding system of FIG. 46, where pressurised gas is injected into the molten parison such that the parison is expanded against the internal mold surface;

FIG. 48 shows the closed mold of FIG. 46, where liquid bitumen (or bitumen/additive mixture) is injected into the shaped parison;

FIG. 49A and FIG. 49B shows how the shell of FIG. 47 or FIG. 48 is closed to prevent the bitumen from leaking out;

Figure 1:
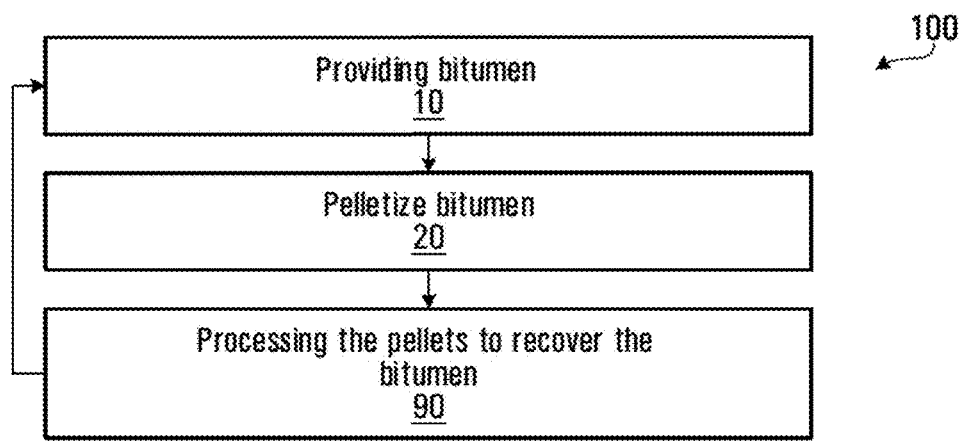
FIG. 1 shows a generalized flow chart of a method for handling bitumen in accordance with an embodiment of the present disclosure.

In the drawings, embodiments are illustrated by way of example. It is to be expressly understood that the description and drawings are only for the purpose of illustrating certain embodiments and are an aid for understanding. They are not intended to be a definition of the limits of the invention.

DETAILED DESCRIPTION

Illustrative embodiments of the invention will now be more particularly described. The same features are denoted in all figures by the same reference signs.

Reversibly Solidifying Bitumen

FIG. 1 is a flow chart of a general method 100 of handling bitumen in accordance with an embodiment of the present disclosure. The method 100 includes a step 10 of providing viscid bitumen. The viscid bitumen is then pelletized in a step 20, thus producing solid bitumen pellets (or "particles"). At step 90, the bitumen from the pellets is retrieved by processing the pellets to revert them into a coherent mass of bitumen. In other words, the method 100 allows the reversible solidification of bitumen, which is illustrated by the arrow returning from step 90 to step 10.

For the purpose of this specification, "bitumen" refers to crude oil that is intended to be processed in a downstream refinery where it is separated into high-value fractions. For more clarity; "bitumen" encompasses both heavy crude feedstock and also upgraded crude oil. Without intent of being bound by a particular definition of what "upgrading" means, that process is generally understood in the industry to involve processing of the heavy crude feedstock to improve its quality. Examples of steps that may be involved in an upgrading operation, include:

a) Removal of water, sand, physical waste and lighter products;
b) Viscosity reduction to increase flowability, such as by dilution with one or more lighter petroleum products (Dilbit, Synbit);
c) Catalytic purification by hydrodemetallisation (HDM), hydrodesulfurization (HDS) and hydrodenitrogenation (HDN);
d) Hydrogenation through carbon rejection or catalytic hydrocracking (HCR)
e) Conversion of heavy portion of the bitumen into lighter hydrocarbons through fractionation, distillation and/or cracking;
f) Blending the different fractions to produce the desired synthetic crude oil specification;
g) Processes performed for the purpose of transportation such as visbreaking, solvent de-asphalting (SDA), hydrotreating, thermal cracking and olefin alkylation.

A specific example of crude oil, which can be processed with the methods and devices, disclosed herein, is crude oil extracted from oil sands.

For the purpose of this specification the expression "viscid bitumen" refers to bitumen, which has a density generally in the range between 8 to 17 degrees API. As used herein, API degrees refers to the American Petroleum Institute gravity, or API gravity, which is understood as being a measure of how heavy or light a petroleum liquid is compared to water: if its API gravity is greater than 10, it is lighter and floats on water; if less than 10, it is heavier and sinks. API gravity is thus an inverse measure of a given petroleum liquid's density relative to that of water (also known as specific gravity). It is used to compare densities of petroleum liquids. For example, if one petroleum liquid is less dense than another, it has a greater API gravity.

For the purpose of this specification the expression "solidifying" means conferring to the bitumen, characteristics such that the bitumen behaves practically as a solid mass. For clarity, "solidifying" does not imply a change of phase between a liquid phase and a solid phase, as it is traditionally understood in science. A "solid" bitumen pellet is further defined as a bituminous structure that does not flow to take the shape of a container and that also manifests a structural integrity (i.e. resist being torn apart) in the course of handling with mechanized dry-bulk processing equipment or also during transport in bulk.

Generally speaking, several options exist to solidify bitumen. A first option is to solidify bitumen by increasing its viscosity to the point at which it behaves as a solid. That can be achieved by incorporating into the bitumen an additive, which creates a mixture that has a significantly higher viscosity than the bitumen without the additive. For example, when a lump of that mixture, at room temperature, is placed on a solid surface, the lump is self-standing and retains its shape. In other words, the bitumen mixture would not flow and spread on the surface as bitumen without the additive normally would. Furthermore, the solidified bitumen constitutes a structure that resists deformation when subjected to an external load.

Lowering the temperature of the bitumen can also assist in increasing the viscosity of the bitumen. That approach may be useful in applications where the bitumen will constantly remain at low temperatures, hence its fluidity characteristics will be similar to those of a solid.

A second option to solidify bitumen is to encase it into a shell. The shell constitutes a mechanism to retain the bitumen such that it would not flow out. The shell can be a hard crust, which constitutes a structure that resists deformation when subjected to an external load. Alternatively, the shell can be a softshell, which has a sufficient tensile strength to retain its integrity even when subjected to external loading.

The different options to solidify bitumen outlined above have respective advantages and drawbacks that need to be taken into consideration depending on the specific practical application of the solidification method. When the practical application is to solidify the bitumen such that it is suitable for transport at a remote location, the second option is preferred since the shell creates a non-stick external surface. In this fashion, when the bitumen is pelletized, the pellets will not stick to each other and/or to surfaces of transportation containers and can be handled with conventional mechanized equipment used for loading or unloading commodities in bulk.

In a most preferred example of implementation, the first and the second options are combined. A solid pellet is provided having a core, which is a mixture of bitumen and an additive that increases the viscosity of the mixture. In the case where the core is hard enough so as to minimize its mobility in case of shell failure and spillage, however, it is not hard enough to resist deformation when subjected to the external load exerted on the pellet during the course of various stages of handling/storage/transport, the core is preferably provided with a shell providing in addition to a non-stick surface, increased crush resistance, impact resistance and abrasion resistance. Alternatively, in the case where the core is hard enough so as to minimize its mobility in case of shell failure and spillage, and is hard enough to resist substantial/irreversible deformation when subjected to the external load exerted on the pellet during the course of various stages of handling/storage/transport, the core can be provided with a soft shell, which provides a non-stick surface and is also resistant to abrasion or diffusion of bitumen in order to minimize exposure of the core.

Advantageously, pelletized bitumen according to the present disclosure may present one or more characteristics, which facilitate the handling (e.g., loading/unloading), transport and/or storage of bitumen. For example, loading pelletized bitumen in train railcars, containers, freighters or trucks can be performed with pelletized or granular commodity material loading systems such as but without being limited to conveyor belts, conventional pneumatic transfer systems, conventional gravity loading systems, mechanical spreaders, and the like.

Alternatively or additionally, transporting pelletized bitumen does not require any diluent, thus saving on diluent costs and moving more bitumen on a volume basis. It is easier to recover in case of spill, as picking up pelletized bitumen is easier than recovering liquid bitumen. Further, transportation over rails does not need special tank cars—existing conventional cargo railcars, such as gondola, hopper railcars or intermodal containers, can be used, thereby avoiding the need for expensive tank car upgrades. Further, maritime transportation would not require double-hull tankers—instead, the pelletized bitumen can be transported using bulk freighters.

Alternatively or additionally, storage of pelletized bitumen does not require storing in expensive heated bitumen storage tanks, and instead may be simply stored in storage silos or outdoors with minimal weather protection measures and/or containment measures, as a function of, for example, pelletized bitumen characteristics such as pellet hydrophobicity, pellet crush resistance and the like.

Applying a Shell

Figure 2:
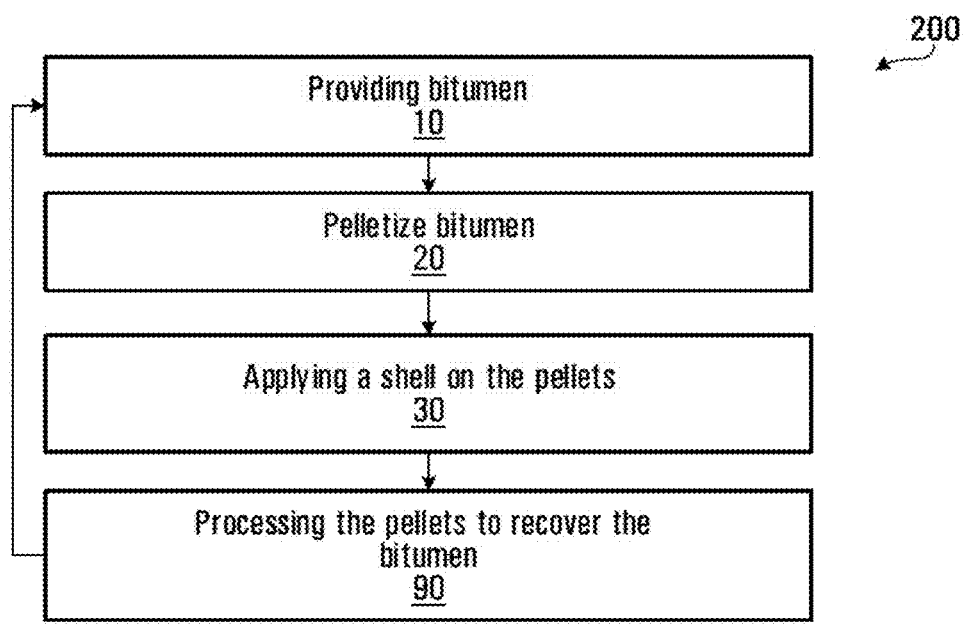
FIG. 2 is a variant of FIG. 1, which includes the additional step of applying a shell on the pellets.

FIG. 2 shows the steps of a method 200, which is a specific example of the general method 100 of FIG. 1, characterized by the optional step 30 of applying a shell on the pellets, thus obtaining bitumen pellets with a shell. Likewise, the method 200 allows the reversible solidification of bitumen. Examples of methods for applying the shell include co-extrusion, spraying, dipping, blow molding, form-fill-sealing, and injection molding stretch wrapping and shrink-wrapping, which will be described further later in this text.

Advantageously, applying a shell on pelletized bitumen may confer enhanced structural strength to the pellets, thus allowing one to use a less viscous mixture in the pellet core, while still retaining the overall structural integrity of the pellet. In other words, while less viscous mixture on its own may not behave practically as a solid, applying a shell onto less viscous mixture confers sufficient structural strength to the resulting pellets so that it behaves as a solid.

Alternatively or additionally, applying a shell on pelletized bitumen may affect the adhesion properties of the bitumen pellet, such as reducing pellet self-adhesion (e.g., thus avoiding or minimizing the formation of difficult-to-handle bitumen cakes) and/or minimize adhesion of foreign materials to the pellet and/or minimize adhesion of the pellet to equipment.

Alternatively or additionally, the shell applied on pelletized bitumen would act as an oxygen barrier increasing the resistance of the bitumen to deterioration as a result of oxidation.

The external shell can be crust-like or flexible but having sufficient tensile strength such as to prevent exposure of the core during handling/transport of the pellet. Preferably, the shell completely encloses the bitumen core. It is also possible to use a shell, which only partially encloses the bitumen core.

Alternatively or additionally, applying a shell on pelletized bitumen may confer an increased hydrophobicity (water resistance) to the bitumen pellet, thus allowing for example storage of pellets in outdoor settings without dissolution of bitumen into nature when exposed to water. Advantageously, the increased hydrophobicity of the bitumen pellet may also minimize or prevent water intake when the pellets are exposed to water, thus preserving the bitumen quality. Advantageously, the increased hydrophobicity of the bitumen pellet may minimize or prevent water intake in case of spill in water, thus reduce dissolution of some components of bitumen in water and possible breakdown of bitumen and its dispersion on the surface of the body of water. Advantageously, the increased hydrophobicity of the bitumen pellet may minimize or prevent adherence of particles (such as debris) to the pellets in case of spill in water, thus preserving buoyancy. Accordingly, bitumen pellets with a shell would retain their buoyancy over a significant time period, if dropped into water.

Alternatively or additionally, applying a shell on pelletized bitumen may confer an increased resistance to UV light deterioration of the bitumen, for example, by the addition of one or more UV light barrier compound to the shell. Advantageously, the addition of one or more UV light barrier compound to the shell may allow one to store the pelletized bitumen in an outdoor setting with minimal protection from UV light while minimizing or preventing photochemical induced damage to the bitumen.

Alternatively or additionally, applying a shell on pelletized bitumen may allow incorporating one or more color signals to the bitumen pellet by addition of the one or more color signals to the shell. Advantageously, the addition of one or more color signals to the pellet allows one of skill to make visually discernible a particular physical property of the bitumen. For instance, the bitumen pellets may have a color signal on at least a portion of the pellet surface which correlates with particular physical property of the bitumen, such as but without being limited to a percentage of asphaltenes, diluent, and/or solids found in the pellets; the range of ignition, flash point, and/or melting temperature of the pellets; and the like. As such, the color signal may be used to convey grading of properties/risks associated with particular bitumen/additive products. Advantageously, the use of a color signal may make the pellets more visible and facilitate recovery in case of a spill in dense vegetation, marine environment or in snow. Advantageously, the use of a color signal may convey trademark/ownership information.

Note that while FIG. 2 shows the step of application of the shell 30 as following the pelletization step 20, that illustration is intended to demonstrate only one possible sequence of events. As it will be discussed later, methods for making the bitumen pellets may use the illustrated sequence where pellets are formed first and a shell is applied on the existing pellets. Methods are also discussed where the shell is formed first and the bitumen pellets come into existence only when bitumen is placed into the shells. Finally, it is possible to use methods where both the pellets and the shell are formed at the same time, in which case steps 20 and 30 would be performed simultaneously.

Pelletizing Step

FIGS. 3-7 each show a specific embodiment for the pelletizing step 20 of method 100 of FIG. 1.

Figure 3:
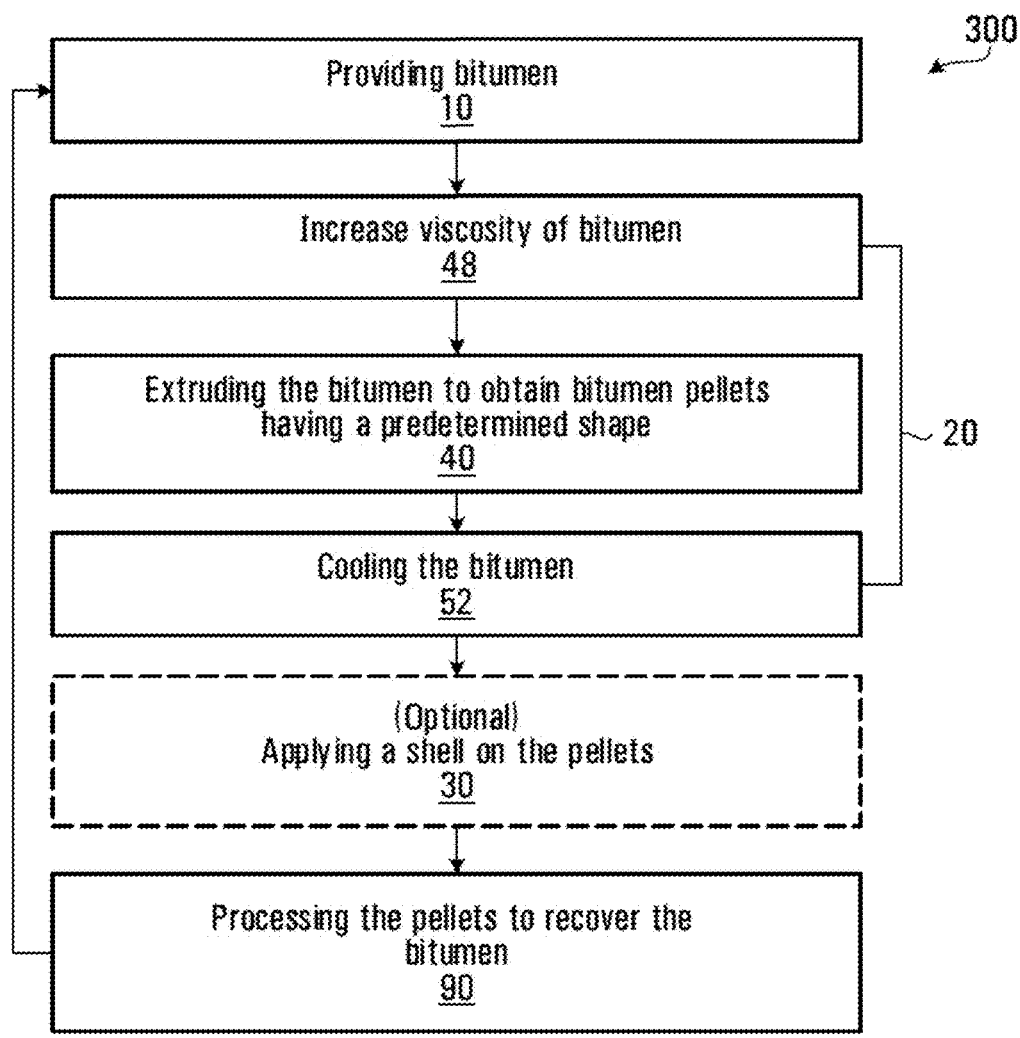
FIG. 3 is a specific embodiment of the method illustrated in FIG. 1 and FIG. 2.

FIG. 3 describes a method 300 where the step 20 of pelletizing the bitumen includes a step 48 of increasing the viscosity of the bitumen followed by a step 40 of extruding the bitumen to obtain bitumen pellets having a predetermined shape. For example, the extruding step can be implemented in an extruder functioning in an intermittent fashion or there can be a gate mechanism at an outlet of the extruder that temporarily closes the outlet thereof, thus producing discrete pellets. Specifically, pellets with a predetermined shape may be produced by extrusion through a rotating die thus producing discreet droplets that solidify upon cooling, extrusion of a continuous stream that is cooled and solidified in the extruder and is then cut or formed into discreet pieces at the outlet, or injection of the hot mix into dies followed by cooling and release of the formed pellets.

The method 300 then includes a step 52 of cooling the bitumen, which solidifies it, thereby retaining the predetermined shape of the extruded bitumen. Optionally, the method includes applying a shell on the pellets in step 30. In FIG. 3, steps 48, 40, 52 and 30 collectively constitute an example of a bitumen solidification/pelletization operation.

Figure 4:
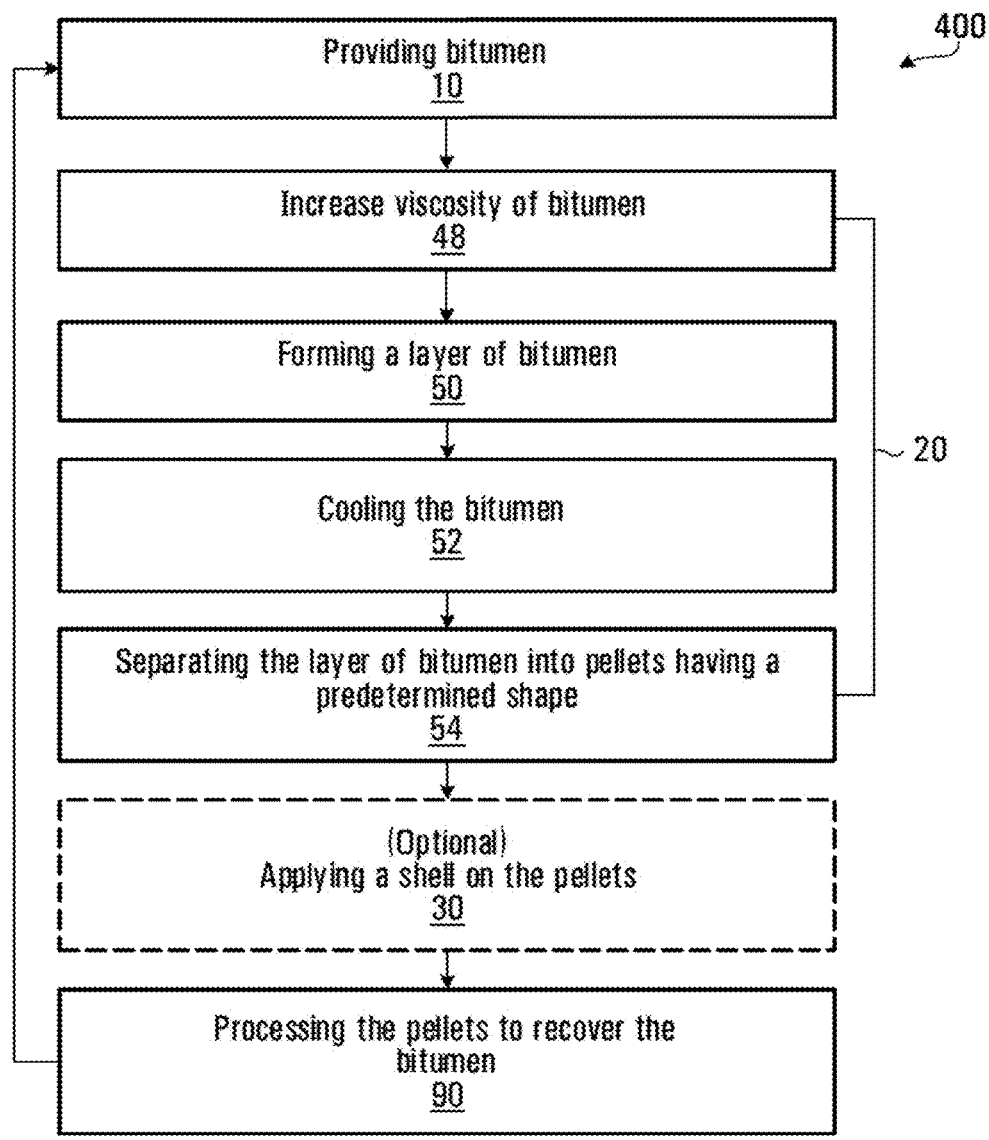
FIG. 4 is another specific embodiment of the method illustrated in FIG. 1 and FIG. 2.

Referring to FIG. 4, there is shown a method 400 where the step 20 of pelletizing the bitumen includes a step 48 of increasing the viscosity of the bitumen followed by a step 50 of forming a layer of bitumen, which can be performed by laying the bitumen material over a flat surface to create a layer of generally constant thickness. The method 400 then includes the step 52 of cooling the bitumen layer, thus obtaining a substantially solid bitumen layer. The solidified bitumen is then separated into discrete pellets having a predetermined shape in a step 54. Optionally, the method further includes applying the shell on the individual pellets in step 30. In FIG. 4, steps 48, 50, 52, 54 and 30, collectively constitute a different example of a bitumen solidification/pelletization operation.

Figure 5:
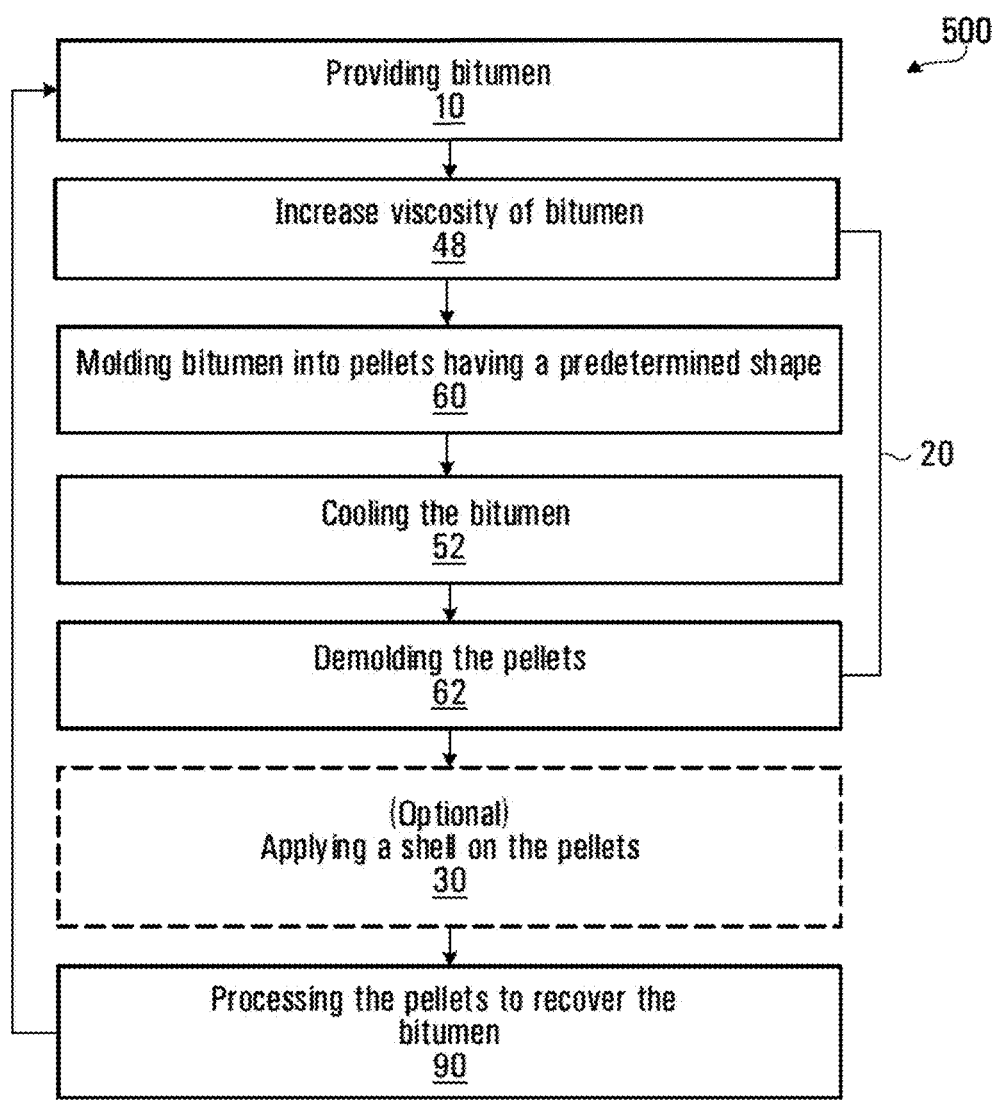
FIG. 5 is yet another specific embodiment of the method illustrated in FIG. 1 and FIG. 2.

Referring to FIG. 5, there is shown a method 500 where the step 20 of pelletizing the bitumen includes step 48 of increasing the viscosity of the bitumen followed by molding the bitumen into discrete pellets at step 60, then cooling the pellets at step 52 to solidify them. The molded pellets are then demolded in a step 62. Optionally, the method further includes applying the shell on the pellets in step 30. In FIG. 5, the steps 48, 60, 52, 62 and 30 constitute yet another example of a bitumen solidification/pelletization operation.

Figure 6:
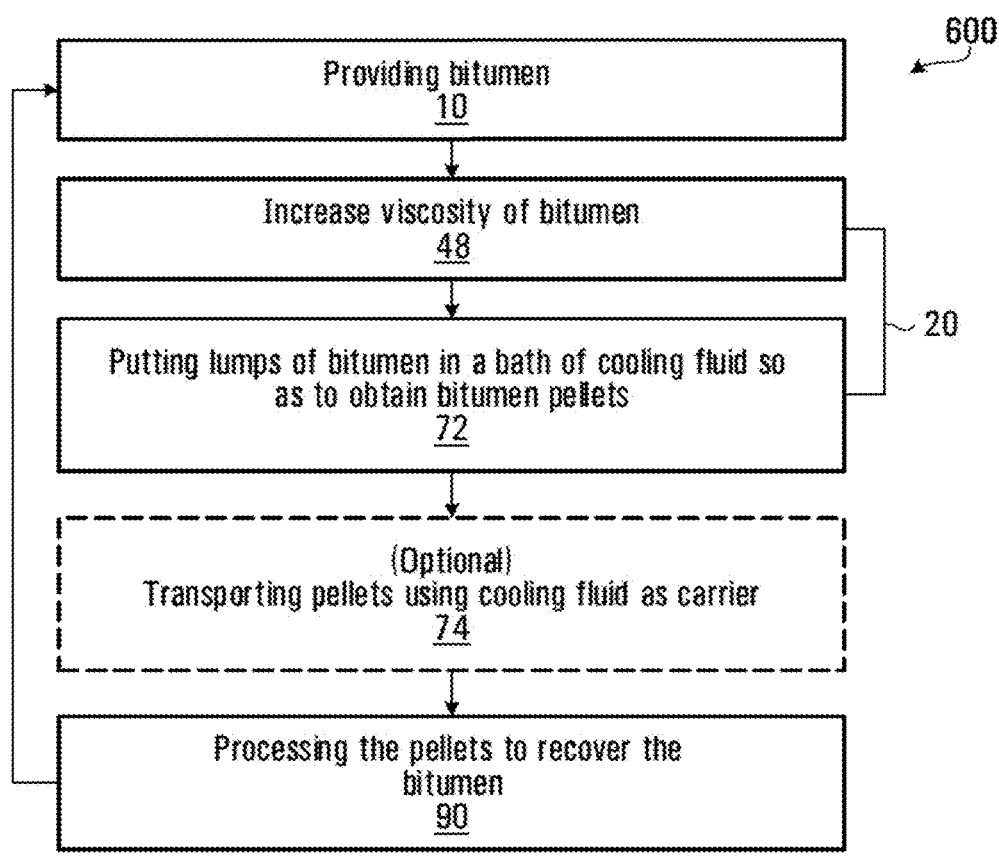
FIG. 6 is yet another specific embodiment of the method shown in FIG. 1 and FIG. 2.

Referring to FIG. 6, there is shown a method 600 where the step 20 of pelletizing the bitumen includes step 48 of increasing the viscosity of the bitumen followed by producing lumps of bitumen at step 72 and cooling the lumps by putting them in a bath of cooling fluid. For example, the cooling fluid can be water or another liquid. Alternatively, the cooling fluid can be a gaseous stream. Optionally, the pellets are transported to a remote location in a step 74 using the cooling fluid as a carrier. FIG. 6 is an example of a solidification/pelletization operation where no shell is applied to the bitumen pellets. In that example, steps 48 and 72 collectively form the solidification/pelletization operation.

Figure 7:
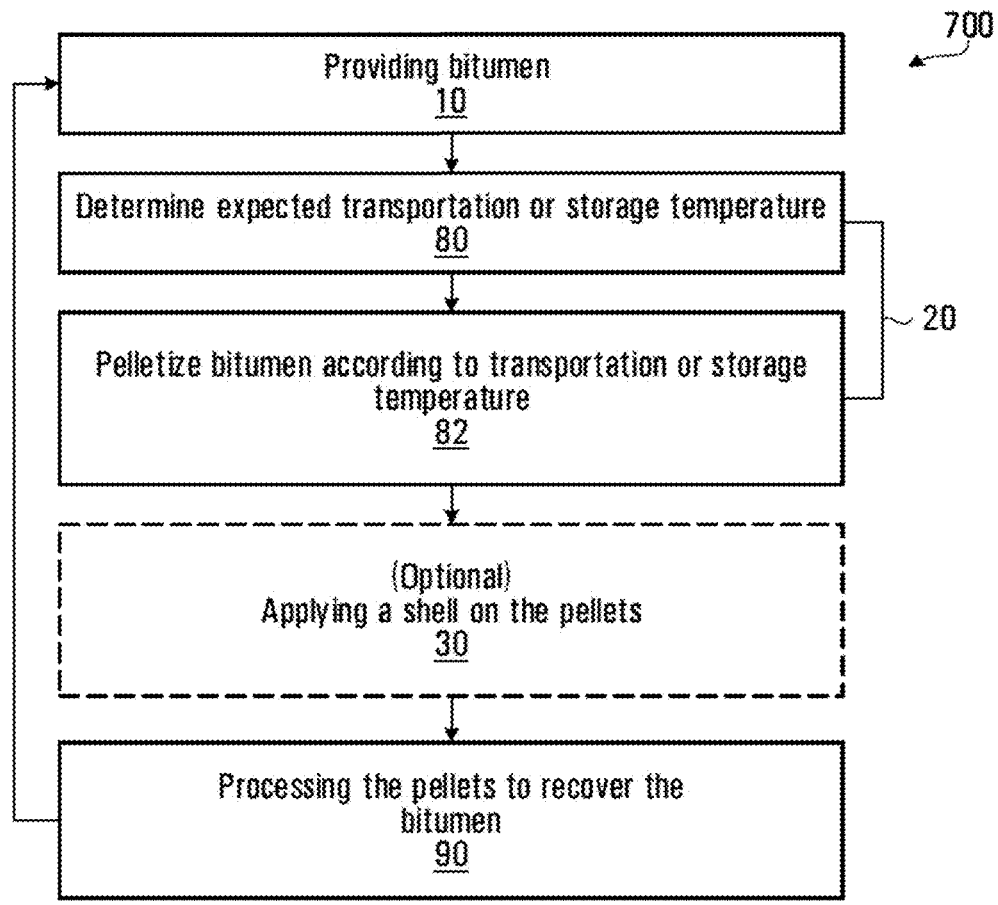
FIG. 7 is yet another specific embodiment of the method shown in FIG. 1 and FIG. 2.

Referring to FIG. 7, there is shown a method 700 where the solidification/pelletization operation is modulated according to the environment in which the bitumen pellets will ultimately be used. Step 20 of pelletizing the bitumen includes determining the expected transportation or storage temperature of the pelletized bitumen at step 80. The method 700 then includes a step 82 of pelletizing the bitumen such that its viscosity will be within a desired range, selected according to the expected transportation or storage temperature. Optionally, the method further includes applying a shell on the pellets in step 30. The reader will readily understand that the step 82 may make use of any one of the herein described step 20 of pelletizing bitumen with the specific addition of a step of adjusting the viscosity to a value which is suitable for maintaining the structural integrity of the pellets at the expected transportation or storage temperature.

Figure 8:
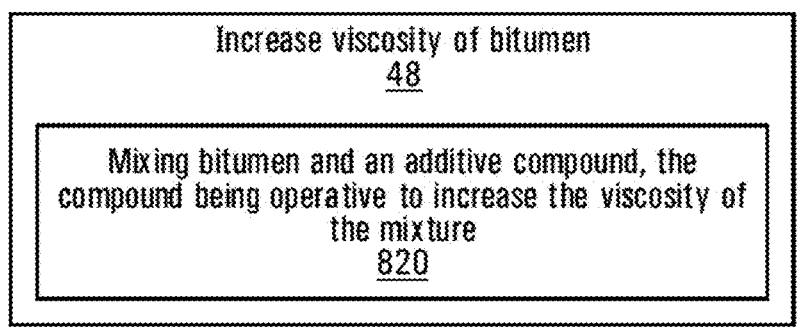
FIG. 8 is a specific example of operations that can be used to perform the step of increasing the viscosity of bitumen of the methods of FIG. 4 to FIG. 6.

Referring to FIG. 8, there is shown an example of implementation of step 48 in FIGS. 3, 4, 5 and 6. Generally, there are two mechanisms that can induce bitumen solidification. One is by lowering the bitumen temperature. For instance, hot bitumen extrudate, will become a solid and will no longer flow when brought to a low enough temperature (Pour point). For applications where the bitumen will remain to a low enough temperature during transportation, such as in winter, the solidification may in principle be performed only by a cooling step and naturally the bitumen will become solid since it is held at or below its pour point. However, in most practical applications, where bitumen needs to remain solid at room temperature, a second mechanism is relied upon which is illustrated by optional step 820 where bitumen is mixed with an additive operating to increase the viscosity of the bitumen in the temperature range at which the bitumen will be exposed in use. The amount and type of additive is selected such that the bitumen will be sufficiently viscous at the desired temperature range such as to behave as a solid. Generally, increasing the additive content in the mixture will have the effect of increasing the temperature at which viscosity analogous to solid material behaviour is achieved. Additive compounds, which are suitable for this purpose, will be further described later. Since, in most practical implementations of step 820, the mixing of the additive with the bitumen is facilitated at an elevated temperature, the increase in viscosity is manifested when the hot mixture is cooled down to ambient temperature.

Transporting Pelletized Bitumen

Figure 9:
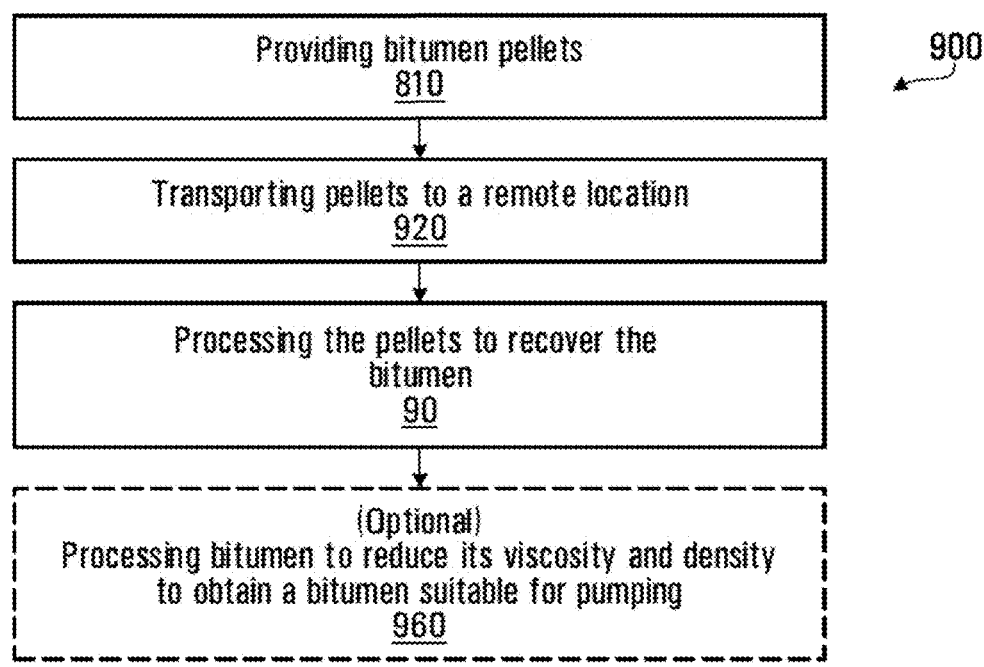
FIG. 9 shows a flow chart of a general method of handling and transporting bitumen in accordance with an embodiment of the present disclosure.

FIG. 9 is a flow chart of a generalized method 900 of handling and transporting bitumen in accordance with an embodiment of the present disclosure.

The method 900 includes a step 910 of providing bitumen pellets. The bitumen pellets are then transported to a remote location via a transporting step 920. At or near the remote location, the solid bitumen pellets, optionally with a shell, are then processed to recover the bitumen, in step 90. Optionally, the bitumen is then processed at step 960 to further reduce its viscosity and density which is more suitable for pumping the bitumen. For instance, step 960 can be implemented by adding a diluent and/or heating the bitumen to a temperature sufficient to obtain a viscosity of the desired value.

Figure 10:
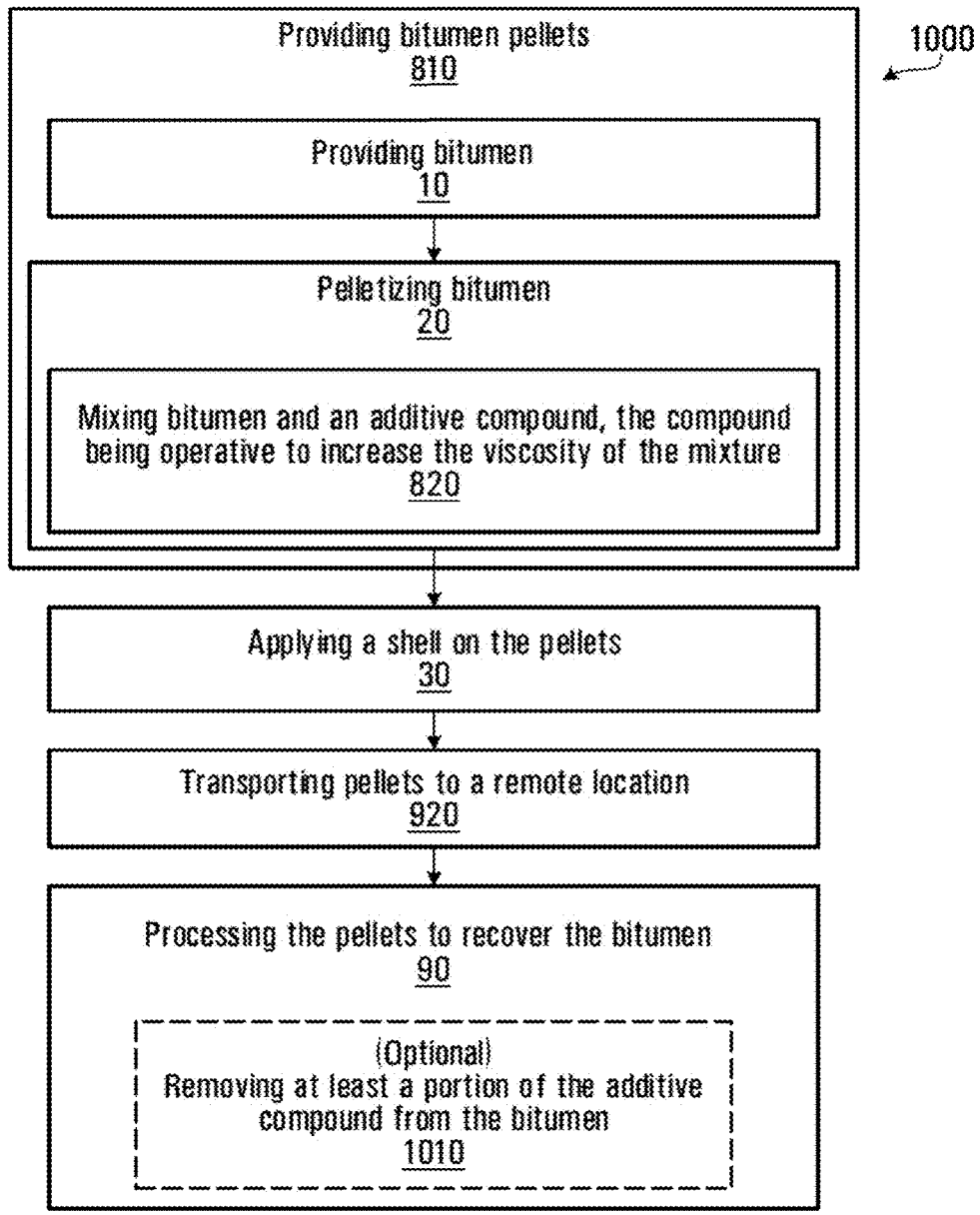
FIG. 10 is a specific example of implementation of the generalized method of FIG. 9.

FIG. 10 shows a flow chart of a method 1000, which is a specific example of implementation of the method 900 of FIG. 9.

The method 1000 includes the step 910 of providing bitumen pellets. In this specific embodiment, step 910 includes at step 20 of pelletizing the bitumen, the sub-step 820 of providing an additive compound in the bitumen, where the additive compound is operative to increase the viscosity of the mixture. A shell is then applied to the pellets in step 30 and the pelletized bitumen core with a shell is then transported to a remote location via the transporting step 920. At or near the remote location, the bitumen pellets with a shell are then processed to recover the bitumen, in step 90. The bitumen is then processed to remove at least a portion of the additive compound from the bitumen in a step 1010. Details of suitable processing for removing at least a portion of the additive compound from the bitumen are further described later in the text.

General Infrastructure

Figure 11:
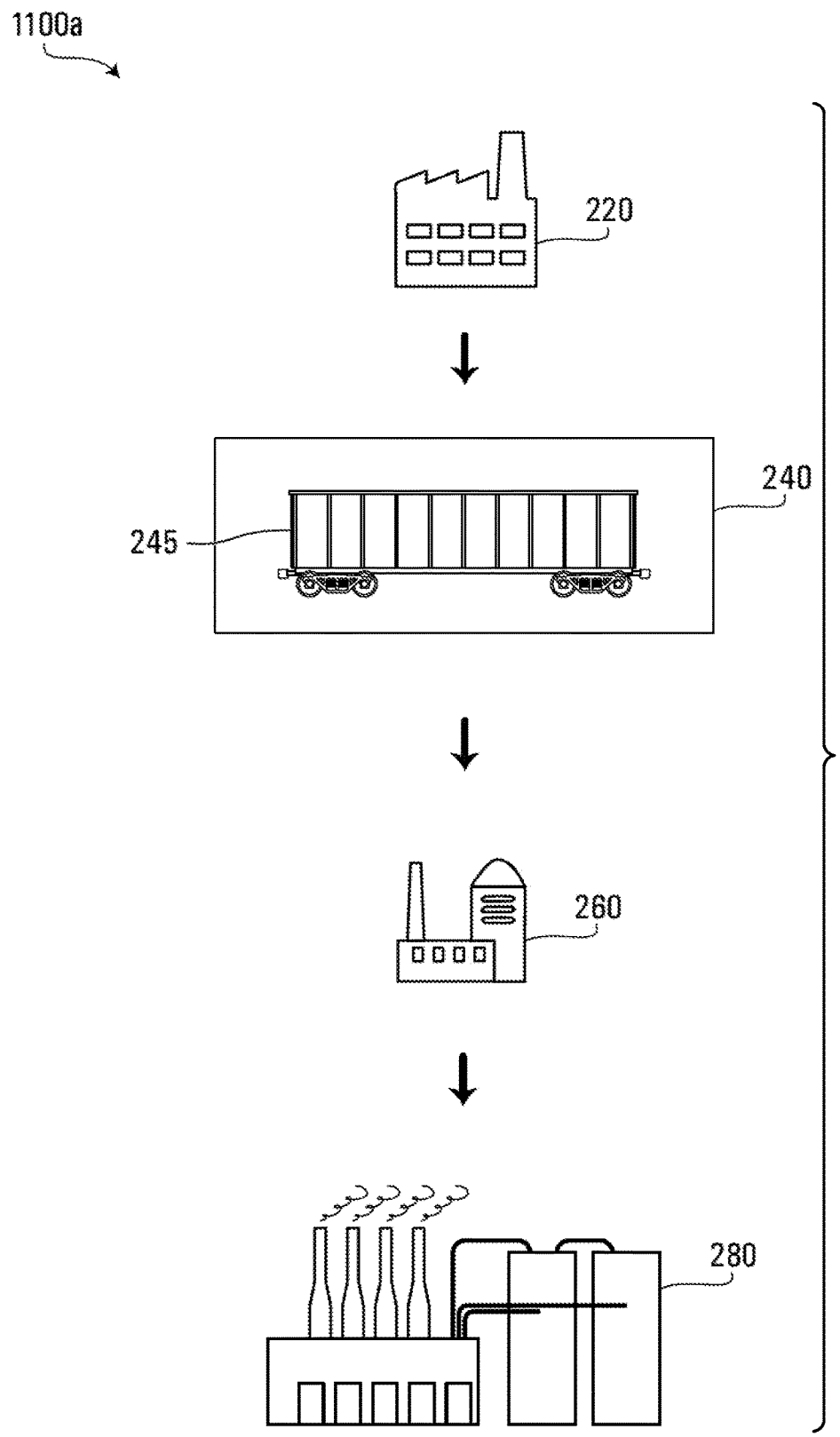
FIG. 11 shows a general infrastructure for implementing the method of FIG. 10, where the transportation link is over land.

FIG. 11 shows a general infrastructure 1100*a* for implementing the method 900 of FIG. 9.

The pelletizing step 20, and optionally the shell application step 30, can be performed at a solidification location 220. The bitumen is processed at the solidification location 220 so as to obtain bitumen pellets, optionally with a shell. The bitumen pellets, optionally with a shell, are then transported via a transportation link 240 to a remote location 260. In the specific embodiment shown in FIG. 11, the transportation link 240 includes transportation over land in a railcar 245, which can be for example but without being limited to a gondola or hopper railcar or within an intermodal container. The reader will readily understand that a truck could be used instead of or in addition to the railcar 245. Optionally, the bitumen pellets (optionally with a shell) can be stored in a container (e.g., a silo) or accumulated in the form of a free standing pile prior to and/or after the transportation link 240. At or near the remote location 260, the bitumen pellets are processed to revert to a coherent bitumen-based core in the step 90. The bitumen can then be refined at refinery location 280. Note that the operations performed at the location 260 can be integrated within the refinery 280.

The general infrastructure 1100*a* may also be suitable for implementing the method 1000 of FIG. 10.

The pelletizing step 20 and the shell application step 30 can be performed at the solidification location 220. The bitumen is processed at the solidification location 220 so as to obtain bitumen pellets with a shell by implementing step 820 of mixing the bitumen and additive compound, where the additive compound is operative to increase the viscosity of the mixture, and applying the shell in the step 30. The bitumen pellets with a shell are then transported via the transportation link 240 to the remote location 260. Optionally, the bitumen pellets with a shell can be stored in a container (e.g., a silo) or accumulated in the form of a free standing pile prior to and/or after the transportation link 240. At or near the remote location 260, the bitumen pellets are processed to recover the bitumen from the pellets, and to remove at least a portion of the additive compound in step 1010. The bitumen is then processed at step 960 to reduce its viscosity and density to a value more suitable for pumping bitumen. The bitumen can then be refined at refinery location 280.

Figure 12:
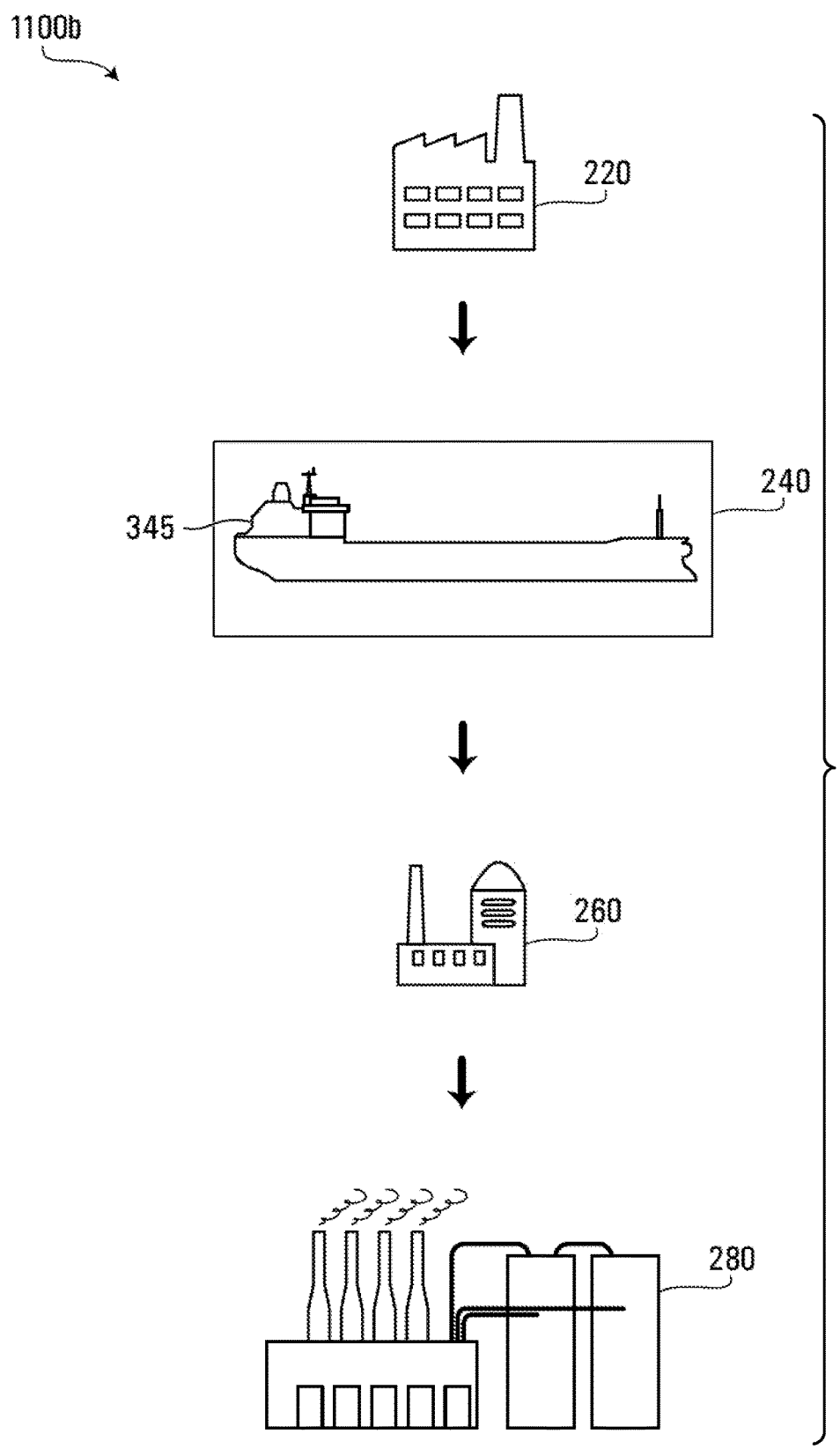
FIG. 12 is a variant of FIG. 11, where the transportation link is over water.

FIG. 12 shows a variant 1100*b* of the general infrastructure 1100*a* of FIG. 11, where the transportation link 240 alternatively includes transportation over water and is performed by a maritime vessel 345 (e.g., a bulk freighter). In other words, in a specific case where the solidification location 220 is located near or at a port, the transportation link 240 would not require a railcar 245 and could instead use the maritime vessel 345 to transport the bitumen pellets to remote location 260. As mentioned above, the bitumen pellets with a shell can be stored in a container (e.g., a silo) or accumulated in the form of a free standing pile prior to and/or after the transportation link 240.

Figure 13:
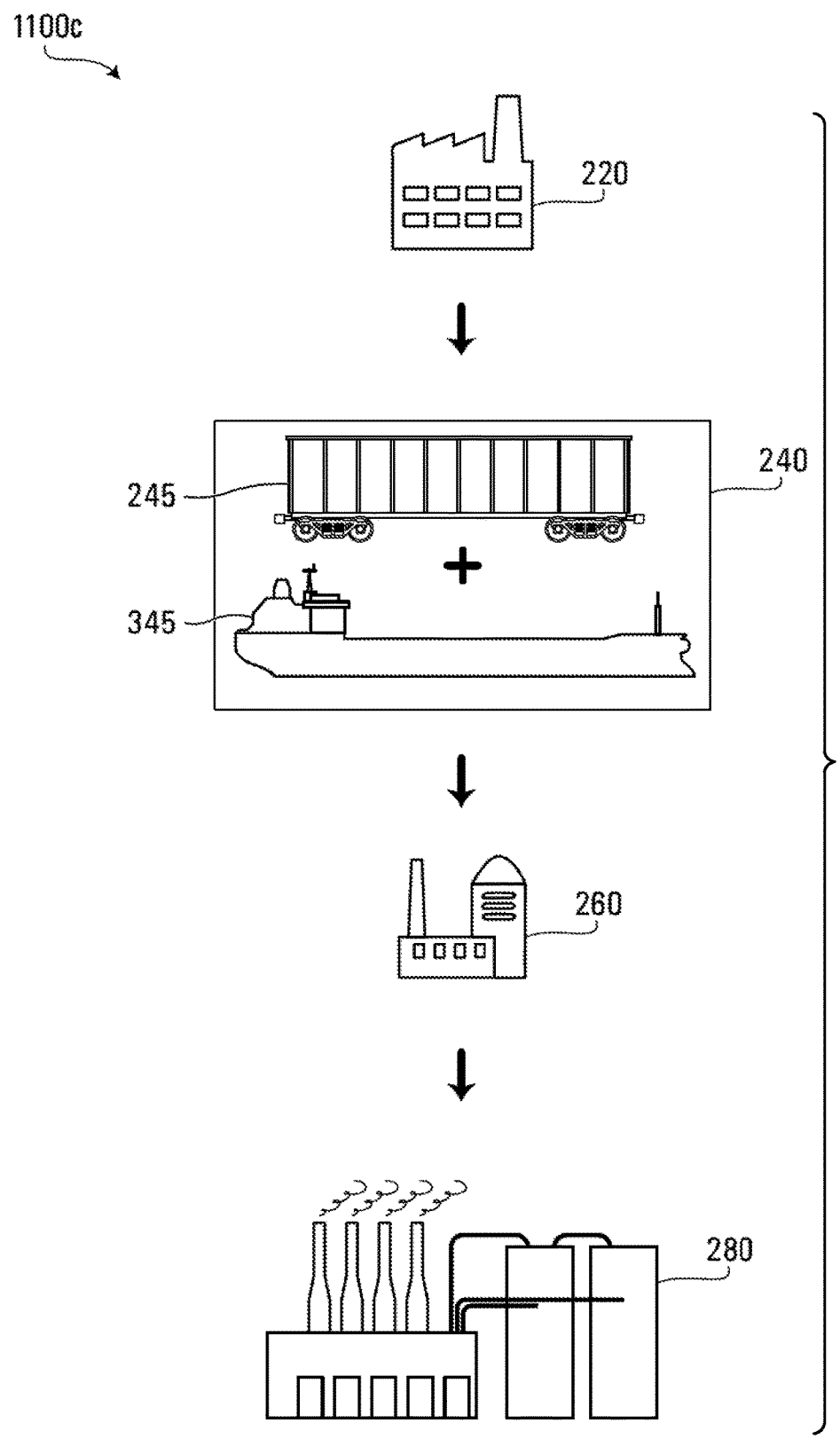
FIG. 13 is a variant of FIG. 11, where the transportation link is over land and water.

FIG. 13 shows a variant 1100*c* of the general infrastructure 1100*a* of FIG. 11, where the transportation link 240 alternatively includes transportation over land and water, and is performed by a railcar 245 and by a maritime vessel 345 (i.e., a bulk freighter). As mentioned above, the bitumen pellets with a shell can be stored in a container (e.g., a silo) or accumulated in the form of a free standing pile prior to and/or after the transportation link 240. In the specific case where the solidification location 220 is remote from a port, the transportation link 240 may thus include a railcar 245 and a maritime vessel 345 to transport the bitumen pellets to the remote location 260. The reader will readily understand that a truck could be used instead of or in addition to the railcar 245.

Figure 58A:
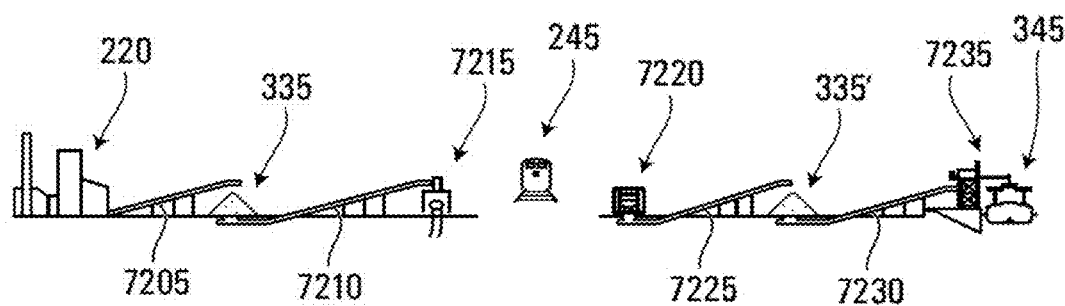
FIG. 58A and FIG. 58B show a specific practical implementation of the general infrastructure 1100c of FIG. 13.
Figure 58B:
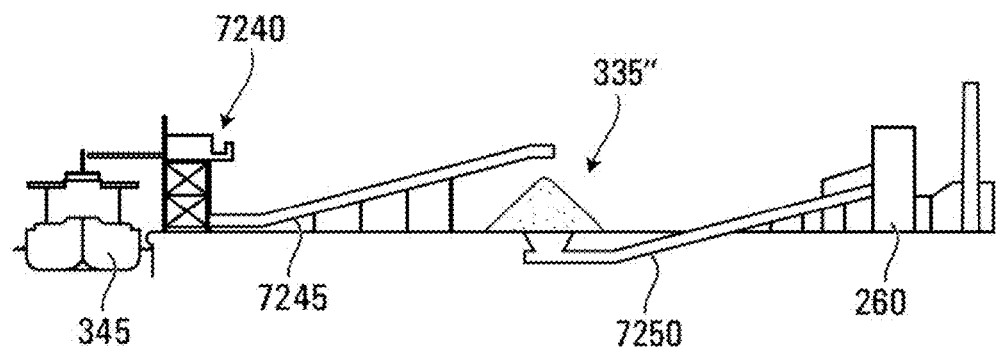

The previously discussed concept of storing bitumen pellets with a shell in a container (e.g., a silo) or accumulated in the form of a free standing pile prior to and/or after transportation steps represents a way of implementing a management system, where storage locations may constitute buffer zones for mitigating different rates of pellet handling/processing along the supply chain. FIG. 58A and FIG. 58B illustrate how storage locations can be used to implement such management system in the context of transportation over land and water.

In FIG. 58A, the pelletizing step 20 and the shell application step 30 are performed at the solidification location 220. The pellets with a shell are then transported from the solidification location 220 over conveyor belt 7205 to a storage location 335, where the pellets with a shell are dropped from a predetermined height to form a pile. When a train car 245 is available at a railcar loading station 7215, the pellets with a shell are transported from the storage location 335 over conveyor belt 7210 to the loading station 7215, where the pellets with a shell are loaded into the train car 245 using automated loading equipment. The presence of storage location 335, thus, constitutes a buffer zone which allows the solidification location 220 to operate at a given rate without necessarily being limited with the maximal loading capacity at the railcar loading location 7215, the overflow of produced pellets with a shell being stored in the storage location 335 while waiting for the next railcar to enter the railcar loading location 7215 and/or allowing a different rate of car train loading to occur.

The pellets with a shell are then transported by the train car 245 to a maritime port, where they are unloaded at railcar unloading station 7220 using automated unloading equipment. The unloaded pellets with a shell are then transported from the unloading station 7220 over conveyor belt 7225 to a storage location 335' where the pellets with a shell are dropped from a predetermined height to form a pile. When a maritime vessel 345 is available at a maritime vessel loading station 7235, the pellets with a shell are transported from the storage location 335' over conveyor belt 7230 to the maritime vessel loading station 7235, where the pellets with a shell are loaded into the maritime vessel 345. Similarly to the situation described with respect to storage location 335, the presence of storage location 335' also constitutes a buffer zone offering similar advantages with respect to the rate of train car unloading not being necessarily limited with the maximal rate of maritime vessel loading and/or with the presence of a maritime vessel at the maritime vessel loading station 7235.

The pellets with a shell are then transported in the maritime vessel 345 to a remote destination where they are unloaded at maritime vessel unloading station 7240 using automated unloading equipment. The unloaded pellets with a shell are then transported from the unloading station 7240 over conveyor belt 7245 to a storage location 335", where the pellets with a shell are dropped from a predetermined height to form a pile. The pellets with a shell are then transported over conveyor belt 7250 to the location 260, where the pellets with a shell are processed in order to recover the bitumen. Similarly to the situation described with respect to storage locations 335 and 335', the presence of storage location 335" also constitutes a buffer zone offering similar advantages with respect to the rate of maritime vessel unloading not being necessarily limited with the maximal rate of bitumen pellet processing at the location 260.

While conveyor belts 7205, 7210, 7245 and 7250 are shown in FIG. 58A and FIG. 58B, the reader will understand that any other equipment for handling commodities in bulk can be used. Also, while at storage locations 335, 335' and 335", the pellets are shown as being stored in the form of a freestanding pile, the reader will readily understand that the pellets could be stored in a container, for example a silo.

The reader will also readily understand that at the destination, the pellets can be unloaded by using automated unloading equipment for handling commodities in bulk. An example of such unloading equipment includes a mechanized conveyor, which is preferably telescopic, a clamshell scoop or mechanical bucket, and which can be maneuvered through the cargo hatch of the shipping container (e.g., truck, rail car, maritime vessel, etc.) such as to automatically pick up the load of pellets.

Pellet Characteristics

Figure 14A:
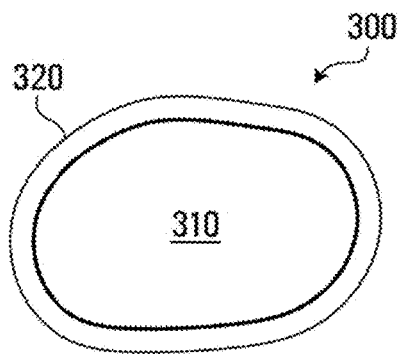
FIG. 14A shows a cross-section of a bitumen pellet with a shell in accordance with an embodiment of the present disclosure.

FIG. 14A shows a cross section view of a bitumen pellet 300 in accordance with an embodiment of the present disclosure.

In the specific embodiment illustrated in FIG. 14A, the bitumen pellet 300 includes a shell 320 over a bitumen-based core 310. While the bitumen-based core 310 can include a more or less viscous mixture of bitumen, overall the bitumen pellet 300 behaves as a solid pellet even if the core 310 may not be characterized as a solid.

For some specific applications, the bitumen pellet 300 does not have a shell 320 (not shown). In this particular embodiment, the pellet 300 behaves as a solid pellet, however, objectively its surface could be sticky.

Advantageously, the pellet 300 has buoyancy, which has a specific gravity less than 1.0 thereby allowing the pellet to float if dropped in water.

The bitumen pellet 300 can have different dimensions and shapes. In a specific example of implementation, bitumen pellets 300 can have a maximal extent of less than ¼", less than ½", less than an inch, less than two inches, less than three inches, less than four inches, less than five inches or less than a foot, or more. In the present text, the maximal extent is the maximal dimension that can be recorded from one end of the pellet to another opposite end, irrespective of which way the measurement is made. In following the teachings of the present disclosure, the person of skill will readily understand which maximal extents are more suitable for a given case, for example to obtain pellets that are suitable for handling with common solids loading and transport equipment.

The desired maximal extents can thus depend on the specifications of the transportation means, which can be different in the case where the pellets are transported in a fluid moving within a pipeline or in a sluice-type system, as opposed to the case where the pellets are transported in a railcar. An additional consideration when determining the maximal extent of the pellets is to reduce the likelihood of ingestion by animals in the wild in the case of a spill and also ease of recovering the pellets.

In a non-limiting embodiment, the pellets can have a shape selected from generally spherical, generally lozenge-like, generally cylindrical, generally discoidal, generally tabular, generally ellipsoidal, generally flaky, generally acicular, generally ovoidal, generally pillow shaped and any combinations thereof. The shape can depend on the particular transportation method, for example, a lozenge shape may increase in certain circumstances railcar settling and efficient conveyor handling.

During in-plant applications and/or handling, conveyors such as belt-conveyors are often used at high conveying angles. Such high angles, in turn, require bulk solid stability on the inclined belt-conveyors during conveying, feeding, and discharge so as to minimize pellets slip-back and spillage. In other words, the pellets 300 should have suitable flow properties to ensure that there is sufficient stability of the bulk on the conveyor belt during motion under various loading conditions and along a combination of horizontal and vertical curves, particularly, during starting and stopping of the conveyor, so as to minimize pellets slip-back and spillage.

There is a relationship between the shell 320 and the bitumen-based core 310 in that a more viscous bitumen-based core 310 requires a thinner shell 320 (i.e., less % by weight for the shell, for example in the range of 0.1-1 wt. % relative to bitumen) while, conversely, a less viscous bitumen-based core 310 will need a thicker shell (i.e., more % by weight for the shell, for example 1-20 wt. % relative to bitumen) to obtain similar structural strength. The reader will readily understand that larger pellet size will generally require a relatively lower amount of shell material.

In a specific example of implementation, the shell 320 has a thickness less than 5 mm. Specific shell thickness ranges include from about 10 µm to about 4.5 mm, from about 20 µm to about 3 mm, from about 20 µm to about 2 mm and from about 20 µm to about 1 mm. A shell having a thickness from about 10 µm to about 0.5 mm is likely to have film-like behaviour, in other words the shell is flexible. Shells above 0.5 mm in thickness tend to be less flexible and more crust-like. In a specific and non-limiting example of implementation a pellet having a maximal extent of about 2 inches can have a shell thickness of about 25 µm. In another specific and non-limiting example of implementation a pellet having a maximal extent of about 3 inches can have a shell thickness of about 0.3 mm.

Figure 14B:
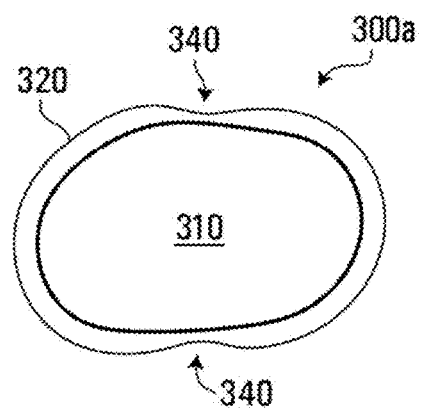
FIG. 14B is a variant of FIG. 14A, where the shell is non-uniform in terms of variable thickness.

FIG. 14B is a more realistic representation of the shell 320 of a pellet 300*a*, showing inevitable variations in thickness that are inherent in some of the shell application processes. The variations in thickness 340 inherently constitute weakness areas and they need to be taken into consideration when design the manufacturing parameters of the pellet in order to meet the strength requirements of the pellet. Accordingly, the shell thickness values stated previously, are averages and do not imply a constant thickness of the shell. To measure the shell thickness of pellet, the shell is physically separated from the core and then the thickness of the shell is measured at 10 randomly selected points and then the results are averaged. Alternatively, the shell is produced separately on the same equipment as the one making the pellets, but bypassing the step of loading the bitumen into the shell. The later option is useful in instances where there is significant risk that the shell will be damaged by the removal of the bitumen, in particular the cutting and cleaning stages to a point where no thickness measurement can be made.

Figure 14C:
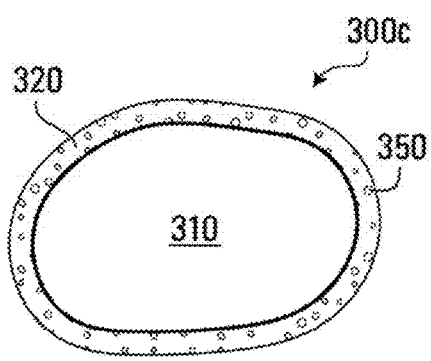
FIG. 14C is a variant of FIG. 14A, which includes pores in the shell.
Figure 14D:
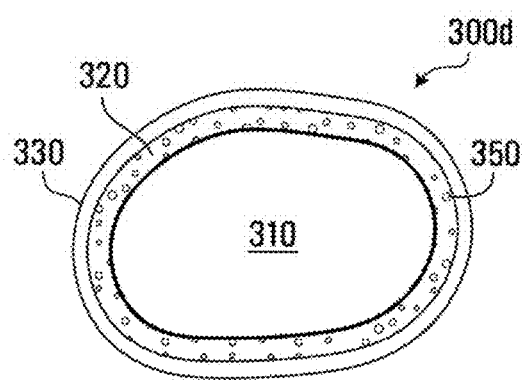
FIG. 14D is a variant of FIG. 14C, which includes an additional surface coating to seal the pores open at the surface.

With reference to FIG. 14C, the shell 320 of a pellet 300*c* may have a closed-pore foam layer morphology. In other words, the shell may include pores 350 made by injecting air/gas in the shell material. Advantageously, a closed-pore foam layer morphology may require less material for making the shell due to the presence of void areas 350 and may increase the buoyancy of the resulting pellets 300*c*. The reader will appreciate that increased buoyancy may be a desirable characteristic if there is any risk that the pellets are spilled in water during transportation. With reference to FIG. 14D, the shell 320 of FIG. 14C may further include an additional surface coating 330 to seal the pores open at the surface of pellet 300d.

Alternatively the shell may be composed of laminated layers of polymer sheet or film reinforced by a layer polymer mesh or woven polymer. Advantageously, reinforced polymer may require less material for making the shell with a similar level of strength of a thicker polymer sheet due to the presence of void areas.

Preferably, bitumen pellets 300 are crush resistant and impact resistant, which can be advantageously afforded by the compressive strength properties of the shell 320, when present. When the shell 320 is absent or is not thick enough to withstand the required pressure without deforming, the pellets 300 include sufficient additive to afford the structural strength that the specific application requires.

A parameter that can be used to characterize the structural resistance of solid bitumen pellets that have an internal bituminous core encased in a shell is the burst resistance test. The burst resistance test is an indicator of the ability of the shell of the solid pellet to withstand external forces and thus to maintain its structural integrity during transport. The burst resistance test is described in section 7.2 later in this text.

Another parameter that can be used to characterize the structural resistance of solid bitumen pellets is the crush-resistance test. This test is further described in section 7.3 later in this text.

Another parameter that can be used to characterize the structural resistance of solid bitumen pellets is the impact-resistance test. This test is further described in section 7.4 later in this text.

Advantageously, the impact-resistance, crush-resistance and burst resistance properties of the bitumen pellets 300 minimize the structural damages that could otherwise occur to the pellets when these are pressed by the weight of a material in the pile during storage or are stressed during transport in rail cars or maritime vessel cargo holds and during mechanical transport by elevators, or screw, belt or chain-conveyors and/or when the pellets are dropped from relatively high heights (e.g., conveyor drops) during handling.

As discussed previously, the shell 320 may provide the pellets with at least one of the following properties: enhanced structural strength, enhanced resistance to fire, non-stickiness, surface hydrophobicity, increased resistance to UV light, increased resistance to oxidation-induced bitumen deterioration, and incorporation of one or more color signals to the pellets.

The color signal of the pellets can be measured by reflectance spectrophotometer ASTM standard test methodology. Tristimulus $L^*$, $a^*$, $b^*$ values are measured from the viewing surface of the pellets. These $L^*$, $a^*$, $b^*$ values are reported in terms of the CIE 1976 color coordinate standard. Color differences can be calculated according to method ASTM D2244-99 "Standard Test Method for Calculation of Color Differences from Instrumentally Measured Color Coordinates."

Advantageously, the bitumen pellets are made so as to have a non-white color when being transported during winter. In other words, the value $L^*$ of the colored solidified bitumen particle is chosen so as to facilitate spill recovery in snow, i.e., where $L^*=0$ represents the darkest black and $L^*=100$ represents the lightest white.

Therefore, applying a color to the pellets that is contrasting with snow, thereby affords an easier localization of spilled pellets in snow. Similarly, applying on the pellets a color that is contrasting in marine environment would make the pellets easier to locate on water. For instance, the pellets could be made of light color to easier to see on a dark body of water. Another possible variant is to apply on the pellets material that is reflective to an external source of illumination, such as UV light. This approach would make the pellets easier to locate when there is little or no ambient light; a UV light source would make the pellets visible in the dark.

Advantageously, the color signal is applied on the shell of the pellet. The color signal may be a die that is mixed with the additive (e.g., polymer) material used to make the shell. Note that the color signal is not necessarily uniform over the pellet. Applications are contemplated where the color signal is applied on only a portion of the pellet, the remainder of the pellet being without a color signal. It is also possible to apply to the pellet two or more color signals.

In a specific and non-limiting example of implementation, a color signal that has been found adequate in order to create a contrast in a snowy environment is one where the value $L^*$ is in the range from 0 to 50. In that range, the parameters $a^*$, $b^*$ can take any valid value, still the color signal will create a contrast against the snow.

In a different environment such as a dark body of water, the value $L^*$ could be in the range from 60 to 100 to produce a light shade that would stand out on a dark background.

Additive Compound

In one embodiment, increasing the viscosity of the bitumen can be performed by mixing bitumen and an additive, which thickens the mixture. In a specific example of implementation, the amount of additive mixed with the bitumen is selected such that the mixture exhibits a paste-like consistency at room temperature. If desired, a solid-like behaviour at room temperature can also be achieved by further increasing the amount of additive.

In a practical implementation, the additive includes a hydrocarbonaceous polymer, which operates to increase the viscosity of the mixture. The additive can be a single material or a blend of different materials. Optionally, the rate of addition of the additive to the bitumen can be adjusted according to expected transportation or storage temperatures.

Advantageously, the additive used in the present disclosure does not reduce the quality of the bitumen; in other words, the bitumen recovered from the solid pellets remains suitable for further processing such as refining. For example, the additive may have low adsorption tendency for low molecular weight hydrocarbons comprised in the bitumen avoiding, thereby, significant changes in the properties of the bitumen undergoing the solidification procedure.

As discussed elsewhere in this specification, the interaction between the additive and the bitumen is important for economic and performance considerations. Generally, it is desired that the bitumen retrieved from the solid bitumen pellets has physicochemical properties, which are substantially similar to those of the bitumen before having the additive incorporated therein. One reason is to retain compatibility with the existing refining equipment. If the properties of the bitumen change too much, the product may no longer be suitable for processing in existing refineries. Accordingly, in a specific and non-limiting example of implementation, the additive is selected such that one or more of the following properties of the bitumen will not vary by more than the indicated value between the retrieved bitumen and the bitumen before the inclusion of the additive therein: the flash point (not more than the reproducibility of the method), the boiling point distribution (not more than about 5% in degree Celsius), the density (not more than about 1%), and the pour point (not more than about 3° C. which is the repeatability of the standard measurement method).

In a specific example of implementation, when the additive is a hydrocarbonaceous polymer, there are a number of factors to consider when evaluating the suitability of the particular polymer for the bitumen solidification, from the perspective of maintaining compatibility with existing refining equipment. Examples of factors include:

a) Solubility of the Polymer into the Bitumen.

Generally, the lower the solubility the better. If too much polymer is dissolved into the bitumen, it can foul the refining equipment, which is to be avoided. In addition, the polymer that is dissolved in the bitumen is hard to remove, hence difficult to recycle, which is economically undesirable as some polymer would be lost during the refining of the bitumen.

Specific examples of polymers that have been found satisfactory for solidifying bitumen, can exist in two different phases when mixed with bitumen: one phase is a miscible phase, which is dissolved into the bitumen, and the other phase is a non-miscible phase where discrete polymer droplets are dispersed throughout the body of bitumen. In order to retrieve the bitumen from the solid pellets, the non-miscible phase is removed, such as by gravity separation, as it will be discussed later.

Advantageously, the polymer is selected such that its solubility in bitumen measured at 150° C. is less than 5 wt. %, or less than 1 wt. %, or less than 0.5 wt. %, or less than 0.1 wt. %, or less than 0.05 wt. %, or less than 0.01 wt. %. If the solubility of the polymer in bitumen is found to be too high, the polymer in solution can be removed, at least to some extent, by using a suitable solvent extraction process. In practice that process is to be avoided as it adds cost and complexity.

b) Entrapment of Bitumen in the Polymer

The inventors have found that following removal of the above non-miscible polymer phase, for instance by gravity separation, the non-miscible phase of the polymer entraps bitumen. That is not desirable since it constitutes a loss of valuable product and from an economics perspective it is desirable to reduce the level of bitumen entrapment. For example, the polymer phase can entrap bitumen material in a relative amount not exceeding about 70 wt. %, or not exceeding about 60 wt. %, or not exceeding about 40 wt. %, or not exceeding about 30 wt. %, or not exceeding about 10 wt. % relative to the polymer phase, which may vary depending on extraction/clean up parameters.

One option to reduce the economic impact of bitumen entrapment is to recycle the non-miscible phase of polymer removed from the bitumen during the bitumen retrieval operation. In this fashion, the entrained bitumen effectively remains in a closed loop such that there is substantially minimal overall loss of bitumen over several cycles. That approach, however, adds complexity in that the bitumen saturated polymer extracted from the bitumen needs to be transported back to the solidification plant for re-use, which involves transportation costs and logistical considerations.

In a particular embodiment, the additive is a hydrocarbonaceous polymer having a melting point which is low enough to allow a processing temperature of less than about 180° C., preferably of less than about 160° C., for example but without being limited to a melting point temperature of at least 50° C. For example, the melting point temperature can be between about 50° C. and about 150° C.

In a particular embodiment, the pellet includes an emulsion of bitumen and the hydrocarbonaceous polymer. The emulsion can include discrete droplets of the hydrocarbonaceous polymer dispersed throughout the bitumen. In one embodiment, upon subjecting the pellet to a process for retrieving the bitumen, which includes a coalescence step of the droplets, results in a fusion of at least a portion of said discrete droplets of hydrocarbonaceous polymer. Additionally or alternatively, the additive is a hydrocarbonaceous polymer, which advantageously has a relatively low solubility in bitumen at high temperature so as to minimize the processing efforts required to separate the additive compound from the bitumen. For example, in a particular practical embodiment, the polymer can be low-density polyethylene (LDPE) which has a solubility in bitumen at 150° C. of less than 0.03 wt. %.

Additionally or alternatively, the additive is a hydrocarbonaceous polymer, which has low attraction to water to ensure integrity of the solidified bitumen in case of a spill into a body of water and avoid moisture absorption.

Additionally or alternatively, the additive is a hydrocarbonaceous polymer, which has low density relative to water so as to minimize sinking of the solidified bitumen in case of a spill into a body of water.

Bitumen produced by a Steam Assisted Gravity Drainage (SAGD) extraction site is in most cases cleaned and separated from water by addition of a solvent. Preferably, the solvent is removed prior to processing the bitumen to convert it into pellets. Therefore, in most cases the feed to the solidification process would come from a diluent recovery unit rather than being the raw bitumen.

Generally, the bitumen from the diluent recovery unit is heated at a temperature between about 50° C. and about 180° C., preferably between about 80° C. and about 180° C., which is sufficient for blending the bitumen and the additive compound.

In an advantageous non-limiting embodiment, a single hydrocarbonaceous polymer is added to the bitumen. This simplifies the solidification of the bitumen. However, it is also conceivable for two or more different hydrocarbonaceous polymers to be added to the bitumen, especially when particular further advantageous properties are to be obtained.

In one embodiment, the hydrocarbonaceous polymer includes a polyethylene (PE) or polypropylene (PP), optionally ramified and/or substituted.

In one embodiment, the polyethylene (PE) may include high density polyethylene (HDPE), polyethylene-co-vinyl acetate (PEVA), linear low-density polyethylene (LLDPE), low-density polyethylene (LDPE), or any combinations thereof.

In one non-limiting embodiment, the hydrocarbonaceous polymer is mixed with the bitumen to obtain the bitumen-based core in a quantity of 1-20 wt. %, e.g., 1-5 wt. %, or 5-15 wt. % relative to bitumen. For certain bitumen types, addition of the hydrocarbonaceous polymer in a quantity of about 1 to about 5 wt. % relative to bitumen results in a mixture which behaves like a paste with low mobility at room temperature. Addition of the hydrocarbonaceous polymer at higher rates (e.g., above 10 wt. % relative to bitumen), results in a mixture which behaves as a quasi-solid. The reader will readily understand that the amount of the hydrocarbonaceous polymer required to obtain a certain behavior is dependent on the type of bitumen, the type of polymer and the method of mixing. Increasing the temperature of the polymer/bitumen mixture would decrease its viscosity and increase its mobility. The polymer/bitumen mixture will thus show liquid-like behavior at elevated temperatures. The temperature at which the mixture would readily flow depends on the type of polymer and bitumen and the rate of polymer addition.

In a practical implementation, the pellet includes a bitumen core and a shell 320.

In a particular embodiment, the shell includes a hydrocarbonaceous polymer which is the same as the hydrocarbonaceous polymer present in the bitumen core.

In a particular embodiment, the shell includes a hydrocarbonaceous polymer which is different from the additive present in the bitumen core.

In one embodiment, the shell includes the hydrocarbonaceous polymer in a quantity of from about 0.01 to about 20 wt. % relative to bitumen, e.g., from about 0.01 to about 5 wt. % relative to bitumen.

In a particular embodiment, the shell includes a hydrocarbonaceous polymer which includes a cross-linked polymer. In such particular case, the shell may include 0.3-0.5 wt. % of cross-linked polymer relative to bitumen, since cross-linked polymer is much stronger than non-cross-linked polymer.

As discussed previously, where there is a sufficient amount of the hydrocarbonaceous polymer mixed with the bitumen to give it enough structural strength for handling/storage/transportation, for example, an amount above 10 wt. % relative to bitumen, then the shell can be made with a soft shell including hydrocarbonaceous polymer in an amount of 0.01-5 wt. % relative to bitumen. For example, the shell may include 2-5 wt. % polymer relative to bitumen with the core mixture including about 10 wt. % polymer relative to bitumen.

The mechanical properties of the polymer used in the context of the shell/bitumen-based core can be tested, for example, for resistance to stretching (yield and tensile strength), stiffness (yield modulus), toughness (tensile energy to break, impact resistance), and resistance to tear (flexural strength) using standard tests such as ASTM D882 which is a standard test method for tensile properties of thin plastic sheeting, ASTM D790 which is a standard test methods for flexural properties of unreinforced and reinforced plastics and electrical insulating materials, ASTM D1922 which is a standard test method for propagation tear resistance of plastic film and thin sheeting by pendulum method, or ASTM F1306 which is a standard test method for slow rate penetration resistance of flexible barrier films and laminates.

Note that while a shell is preferred such as to protect the bitumen-based core of the pellet, there are applications where the shell may be dispensed with. As it will be discussed below, pellets, without a shell can be transported in a fluid medium that will isolate the pellets from each other and reduce the possibility of the pellets caking. In addition, the pellets can also be handled and transported at very low temperatures, which renders the bituminous-based mixture practically solid, obviating the need for a shell.

Equipment and Processes for Industrial Applicability of the Invention

Figure 15:
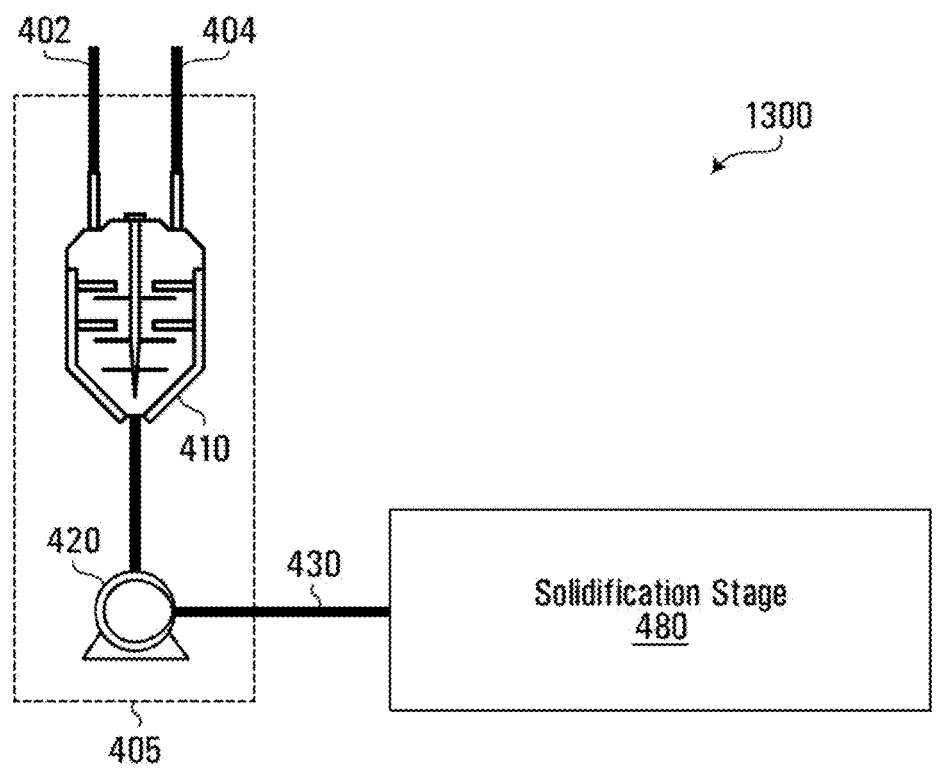
FIG. 15 is a schematic view of an apparatus for performing the pelletizing process step of FIG. 10.

FIG. 15 illustrates a system 1300 for pelletizing bitumen. The system 1300 includes a mixing stage 405 and a solidification stage 480. As it will be described below in greater detail, the purpose of the mixing stage 405 is to mix together bitumen and an additive that operates to increase the viscosity of a mixture of the bitumen and the additive. The mixing stage 405 includes a mixer 410 that has a first inlet 402 receiving bitumen and a second inlet 404 receiving the additive. While this is not shown in the drawings, it will be understood that a metering device is provided on the inlet 404 to adjust the quantity of additive with relation to the quantity of bitumen 402. Optionally, one or more additional elements can be added to the bitumen and/or the additive.

It is necessary to heat the bitumen and the additive such as to obtain a reasonably homogeneous mixture. When the additive is in the form of a hydrocarbonaceous polymer, it is heated to its melting temperature or above such that it becomes liquid and mixes well with the bitumen. One possibility is to heat the bitumen and introduce the polymer at the second inlet 404 in powder form or in fine granular form. The polymer mixes with the bitumen and heats up, melts and homogeneously distributes itself throughout the bitumen-based core.

In a specific example implementation, the polymer introduced at the second inlet 404 has a melting point which is of at least 50° C., for example within the range of 50° C. and about 150° C. Accordingly, the bitumen and the polymer are heated at a temperature of at least 50° C., for example within the above temperature range before being introduced in the mixer 410. Alternatively, the bitumen is heated within that temperature range and its temperature is maintained during the mixing operation. The polymer is introduced in solid form but as it contacts the hot bitumen it melts and it is distributed uniformly throughout the bitumen-based core as a result of the mechanical agitation.

The mixing temperature is maintained above the melting temperature of the polymer in order to maintain the mixture at the viscosity at which the mixing operation can be carried out. It may be advantageous to maintain the mixing temperature even higher such as to reduce the viscosity of the bitumen sufficiently and increase the pumpability of the mixture.

In addition to the in-vessel mixing shown in FIG. 15, in-line mixing combined with recirculation, or single and multi-pass in-line mixing at elevated temperatures can also be used to mix the bitumen and the additive.

The hot mixture leaves the outlet of the mixer 410 and is directed to the inlet of a pump 420, which pumps the heated mixture through a conduit 430. The mixture is discharged from the conduit 430 into a solidification stage 480. Examples of solidification stages include:

1. Injecting the liquid into pre-fabricated molds followed by cooling of the material inside the mold to less than the melting point of the additive, preferably less than 80° C., preferably less than 50° C., and release of the pellets from the mold.
2. Injecting the liquid mixture through a long-hollow extrusion die (e.g., with a circular cross section) along the length of which the liquid stream is cooled to less than the melting point of the additive, preferably less than 80° C., preferably less than 50° C., and cutting the continuous rod of hardened material coming out of the end of the extrusion die.
3. Injecting the liquid mixture through a rotating die into a stream of water where individual droplets are formed and cooled to harden prior to being transported with the liquid.

Figure 16:
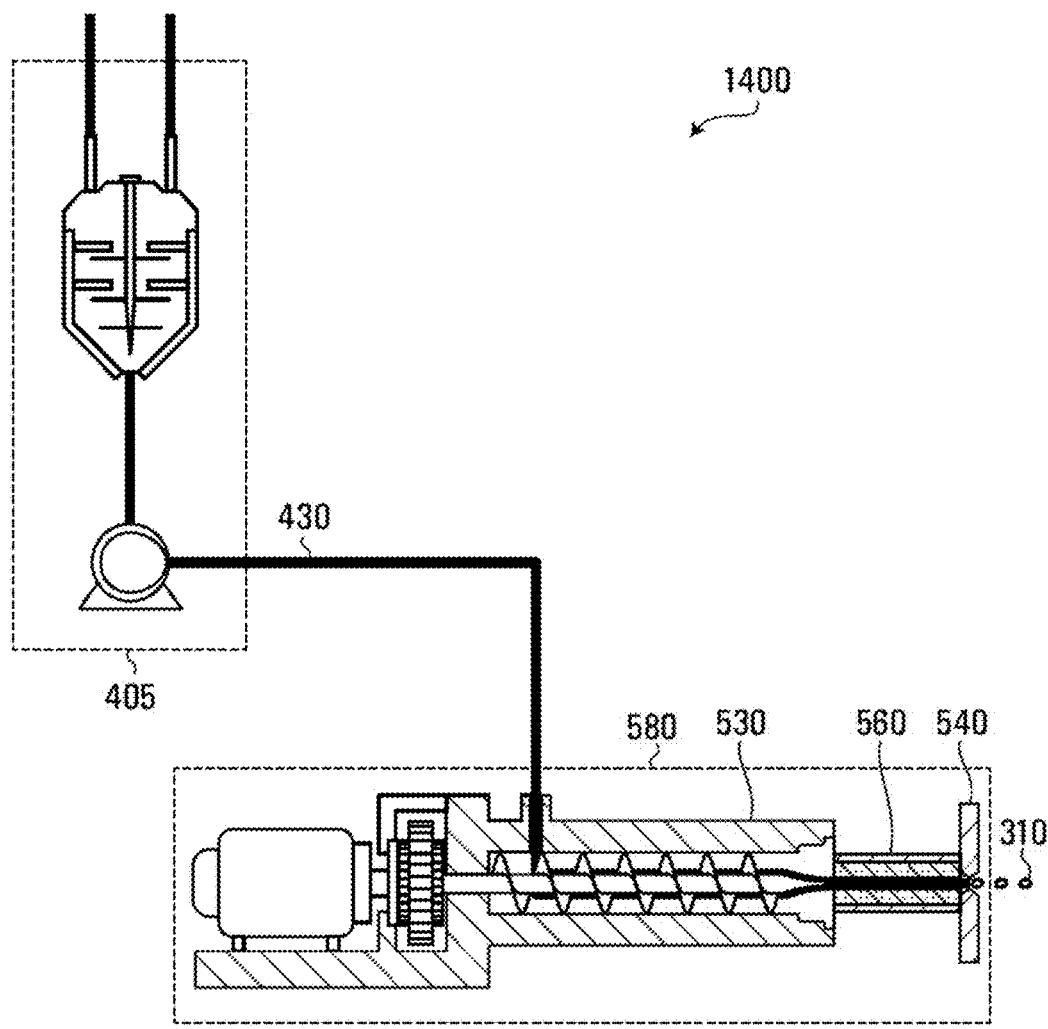
FIG. 16 shows a variant of the apparatus illustrated at FIG. 15.

FIG. 16 illustrates a system for pelletizing bitumen according to a variant. The system 1400 includes a mixing stage 405 which is identical to the one described above in connection with FIG. 15. The hot mixture is pumped through the conduit 430 into a solidification stage 580, which includes an extruder 530. The extruder 530 includes a screw that further mixes the additive (e.g., polymer) and the bitumen and extrudes the mixture through a die 560. The die 560 has a predetermined cross-sectional shape, such that the mixture discharged from the die acquires that cross-sectional shape. A shutter device 540 operates to slice the length of extruded mixture into individual pellets 310. The shutter device 540 includes a pair of blades that are synchronously operated between a closed position, in which they close the die 560, thus preventing the mixture from being pumped out, and an open position in which the mixture can egress the die 560. The shutter device 540 is cycled at the required speed in order to obtain pellets 310 of the desired size. The faster the cycling, the smaller the pellets 310 will be. In contrast, the slower the cycling, the larger the pellets 310.

The die 560 has an internal channel through which the mixture is conveyed. The internal channel is surrounded by a cooling jacket, which cools the mixture below the solidification temperature. Accordingly, the pellets, which are discharged from the solidification stage 580, are solid. The cooling jacket is a cavity through which is pumped a cooling medium, such as water. The rate at which the cooling medium circulates through the cooling jacket is selected depending upon the desired temperature of the mixture to be achieved at the outlet of the die 560.

Optionally, a liquid bath can be provided to cool the pellets. An advantage of a liquid bath is that it can also be used as a conveyance medium to transport the pellets to a remote location.

The apparatus shown in FIG. 16 can be modified to introduce into the bitumen mixture, before the formation of the pellets 310, an additional additive such as a dye. The dye can be injected before the mixture is introduced into the extruder 530. In this fashion, the additive will be adequately dispersed throughout the mixture by the screw of the extruder 530 before the pellets 310 are formed.

Figure 17:
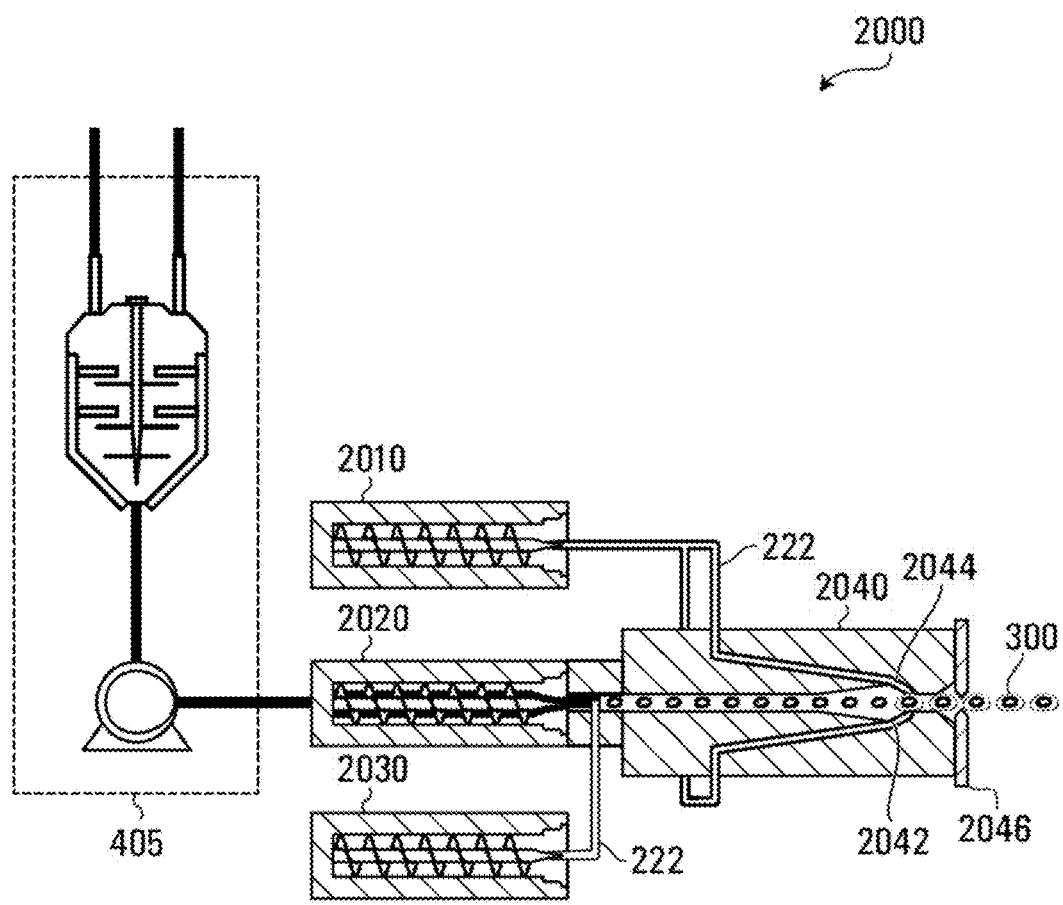
FIG. 17 a schematic view of an apparatus for performing the pelletizing step and also the step of applying a shell of the method of FIG. 10.

FIG. 17 illustrates yet another variant of the system for pelletizing bitumen. The system 2000 is characterized by its ability to provide the pellets with an external shell. As discussed elsewhere in the application, the external shell can be useful for applications where the pellets need to be handled which involves inter-pellet contact or contact between pellets and transportation/handling equipment. The shell reduces the likelihood of the pellets sticking to each other or sticking to walls of transportation/handling equipment.

More particularly, the shell creates a non-stick outer surface, physically protecting the bitumen core inside and preventing the pellets from being crushed when a certain weight is applied on them. For example, when the pellets are transported in bulk into a freight railroad car, the pellets at any depth within the pile in the car are exposed to the weight of the pellets above them. In this mode of transport, it would be undesirable that the weight of the pellets crush or deform the lowermost layer of pellets. The risk is that if the pellets are crushed, the shell may break and the bitumen core may ooze out and stick to adjacent pellets or to the equipment, thus requiring a clean-up. Also crushing would change the shape of the pellets and cause difficulty in the downstream handling and transport of the solids.

The system 2000 includes the mixing stage 405 described earlier in connection with other embodiments. The heated bitumen/additive mixture is supplied to an extruder 2020, which includes an internal screw that further homogenizes the mixture and supplies it to an extrusion die 2040. While not shown in the drawings, the die 2040 is cooled such as to reduce the temperature of the bitumen/additive mixture below the solidification temperature.

An optional extruder 2030 feeds additional additive (e.g., polymer) to the mixture that leaves the extruder 2020. The additional additive may be the same additive that is used in the mixture produced by the mixing stage 405, or a different additive. The additional additive is transported through a conduit 222 and discharged into the mixture bitumen/additive before the extrusion die 2040 solidifies that mixture. The additional additive may further include another ingredient, such as for example a dye.

Preferably, the additional additive is the same additive that will be used to make the shell of the pellets. The additional additive discharged by the extruder 2030 is delivered in a way to create an outer layer around the mixture bitumen/additive delivered from the extruder 2020. To elaborate, the additional additive is delivered into the channel through which the extruded mixture bitumen/polymer is transported, through a series of nozzles. The nozzles are periphery distributed around the circumference of the channel. In this fashion, the nozzles deposit on the bitumen/additive mixture an additional additive layer that forms at least a portion of the final shell. Accordingly, the extruders 2020 and 2030, operate such as to perform a co-extrusion operation in which bitumen/additive mixture is forced through the die of the extruder 2020 in order to form the core of the extrusion while the extruder 2030 deposits an outer layer on that core.

The two layered extrusion core/outer layer is directed through the extrusion die 2040. The two-layered extrusion is cooled as it progresses through the die 2040 to increase its viscosity.

A third extruder 2010 is provided to complete the formation of the shell such that the pellets are completely enclosed. The extruder 2010 supplies additional additive, which may be the same or different from those used in the extruder 2030 and in the mixture pumped by the extruder 2020. Preferably, the additive discharged by the extruder 2010 is the same as the one discharged by the extruder 2030. In this fashion, a uniform shell structure is provided which completely encloses the pellets. The extruder 2010 supplies additive through a pair of channels feeding respective nozzles 2042 and 2044 that are located a short distance upstream from the discharge port of the die 2040. It will be understood that the additional additive supplied by extruder 2010 may further include a dye. In case where the extruder 2030 supplies a first dye, the extruder 2010 may supply a second dye, which can be the same or different as the first dye. When the first and second dyes are different, the addition of the additives through the pair of channels feeding respective nozzles 2042 and 2044 may afford the formation of coloured visual pattern effects on the pellets. In one embodiment, the dye content is controlled to avoid negatively affecting the quality of bitumen upon recovery of the bitumen. Typically, that would involve determining the minimal degree of coloration on the pellet to accomplish the desired objective and adjusting the amount of dye accordingly. In another embodiment, the dye material is selected such that it can be removed from the liquefied bitumen material upon recovery of the bitumen from the pellets or from the liquefied shell material upon separating the shell from the bitumen-based core. The dye so removed can be re-cycled to color a new batch of pellets or discarded.

The nozzles 2042 and 2044 are located a sufficient distance downstream the inlet port of the extrusion die 2040 such as to leave enough time for the 2 layer extrusion to solidify. Accordingly, the nozzles 2042 and 2044 deposit a layer of molten additive (e.g., polymer) on a layer of solid bitumen-based mixture. Since the nozzles 2042 and 2044 are located a short distance from the outlet port of the extrusion die 2040, the final layer of additive (e.g., polymer) does not have enough time to cool down sufficiently and solidify before leaving the outlet port of the extrusion die 2040.

A shutter device 2046 separates the multilayer extrusion into individual pellets. However, since the outermost layer of the extrusion is still more or less liquid, it will stick by capillarity to the working surfaces of the blades of the shutter device 2046. As a result of that capillary adhesion, molten additive (e.g., polymer) is entrained as the blades slice through the extrusion, thus coating the exposed freshly cut ends of the extrusion. In this fashion, the shell is formed which completely encloses the pellet on all sides. It will be understood that at least the longitudinal ends of the shell may be relatively thicker to other portions of the shell in order to provide extra strength and/or to facilitate effective high-speed cutting. Objectively, for this operation to occur the shell layer needs to have a certain minimum thickness. For the proposed process with intermittent additive injection the plugs of additive coming out of the die (prior to cutting) would need to be solid or very near solid otherwise the pellets could burst during the cutting process.

The pellets 300 that leave the shutter device 2046 are essentially solid with the exception of the outermost additive layer, which is still more or less liquid. While not shown in the drawings, it will be understood that the pellets 300 are cooled in order to completely solidify the external shell.

Once the external shell is completely solidified, the pellets 300 can be handled for loading/unloading and transportation, by using suitable mechanical equipment, without significant risk of exposing the core of bitumen.

Figure 18:
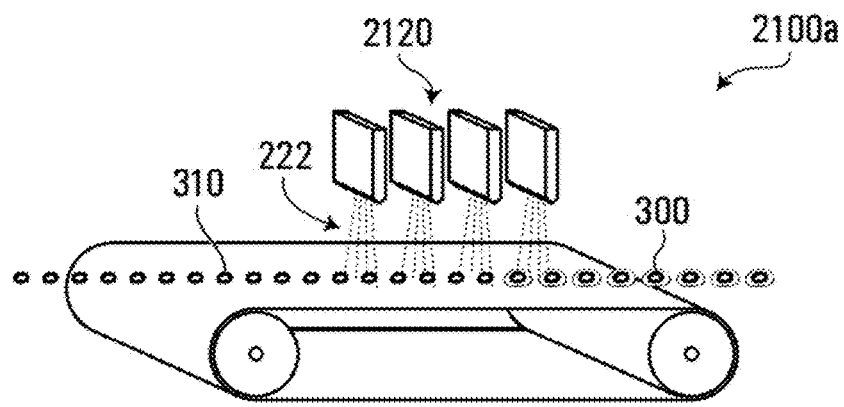
FIG. 18 is a variant of the apparatus shown in FIG. 17, where the shell is applied by spraying.

FIG. 18 illustrates a variant of the system for applying a shell on the pellets 310. It will be understood that the pellets 310 shown at FIG. 18 are the cores of the final pellets 300, in other words the pellets 310 are constituted only by a mixture of bitumen/additive. The system 2100a includes a conveyor belt on which solidified pellets 310 travel. A series of spray heads 2120 spray additive (e.g., polymer) dissolved in a solvent on the pellets 310. A number of spray heads 2120 are used such as to progressively build on the surface of the pellets 310a shell of the desired thickness upon evaporation of the solvent. Advantageously, the conveyor belt may be vibrated to cause the pellets 310 to move such as to expose the entirety of their surface to the spray generated by the spray heads 2120. Note that the optional step of recovering the solvent can be considered.

Alternatively, a coating can be formed by deposition of fine additive (e.g., polymer) particles either by electrostatic force or by spinning the pellet in a fluidized bed of fine additive (e.g., polymer) particles followed by melting. Dip coating using a solution of additive (e.g., polymer) in a solvent is also another option.

Although not shown in the drawings, it will be understood that a cooling device such as one of those discussed previously may also be provided downstream the spray heads 2120 in order to cool and solidify the additive (e.g., polymer) deposited on the pellets.

Figure 19:
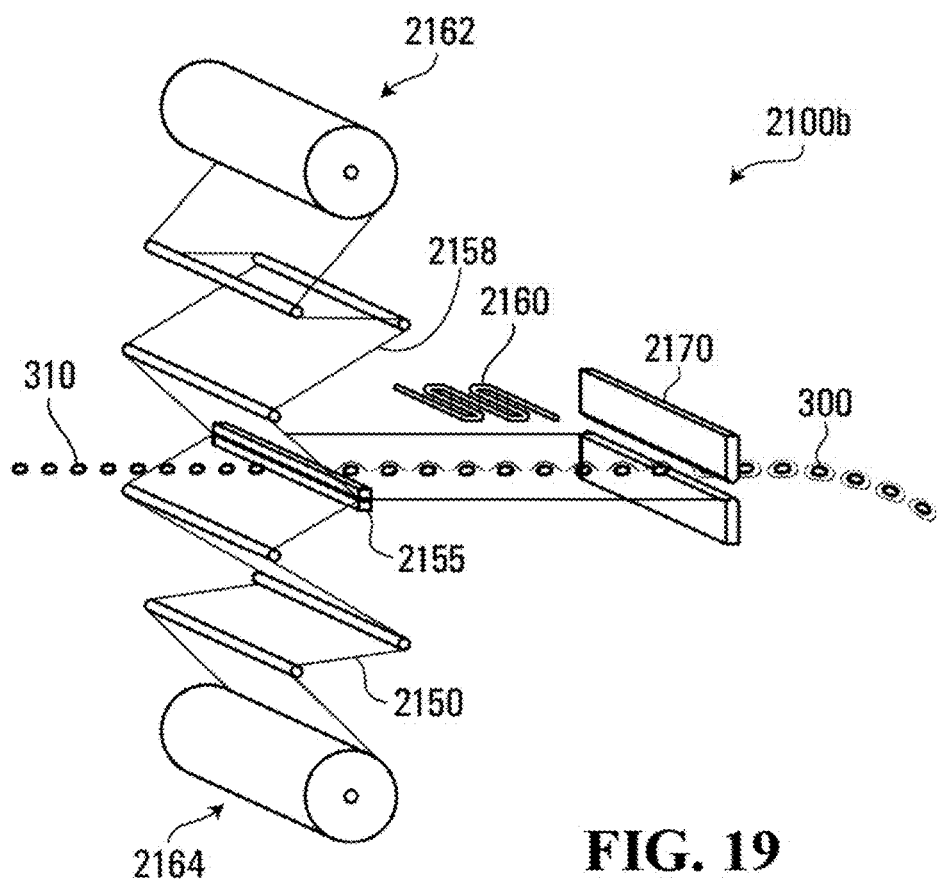
FIG. 19 is another variant of FIG. 17, where the shell is applied by encapsulating the bitumen core between polymeric films.

FIG. 19 is yet another variant of a system for applying a shell on the pellets. In contrast to the system 2100a, the system 2100b uses a film of polymeric material in order to form the shell on the pellets 310. The system 2100b includes a pair of film supply stations 2162 and 2164 that feed an upper layer and a lower layer of film towards a supply of pellets 310 advancing to the station 2100b. Each film supply station includes a supply roll feeding a layer of film through a series of guide rollers, which direct the film layers towards an assembly station 2155, which essentially positions the film layers one on top of the other, with the pellets 310 in between.

A sealing station 2160 operates to fuse the film layers to each other and enclose the pellets 310 individually. The sealing station 2160 uses a heater device in order to melt or at the very least soften the uppermost film layer such that it bonds to the lowermost film layer. As the uppermost film layer softens, it acquires drapability characteristics such that it will fall due to gravity and mold itself around the individual pellets 310. At the same time, the uppermost film layer will fuse the surface of the lowermost film layer, with which it is in contact, creating a strong bond between the layers.

As shown in FIG. 19, the sealing station 2160 includes a convective heater. Alternatively, a radiant heater or hot air heater could be envisaged.

It is important to note that the temperature of the uppermost film as it is processed through the sealing station 2160 should be precisely controlled in order to regulate the softness of the film material. If the temperature is not high enough, the film will not be sufficiently soft, as a result it will not mold itself correctly around the pellets 310. Conversely, if the temperature is too high, the film could lose its integrity and fail to completely enclose the pellets 310.

It should be noted that the thickness of the films 2150, 2158 could vary within large ranges. For example, the range could be from about 0.01 mm to about 5 mm. When the film is near the lower end of the range, the resulting shell is relatively thin and flexible. Thicker films could be advantageous from the perspective of providing a shell that has a higher structural integrity. Thinner films can be processed with the equipment shown at FIG. 19, where gravity is sufficient to cause the upper film to drape sufficiently and adopt the pellet shape. Thicker films may require a vacuum assist to properly mold themselves to the pellet cores. An example of an adequate setup is shown at FIG. 55.

Figure 55:
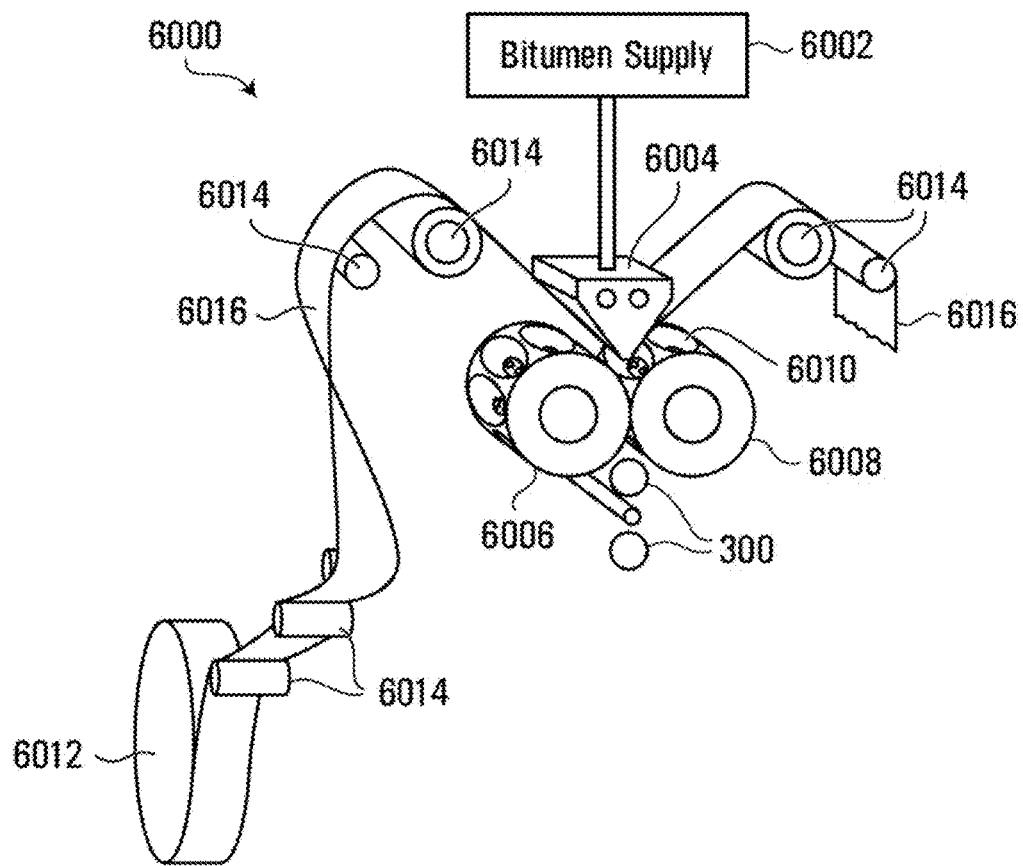
FIG. 55 is a schematic view of a system for making pellets using vacuum assist rolls to mold polymeric sheets in order to form the pellet shells.
Figure 56:
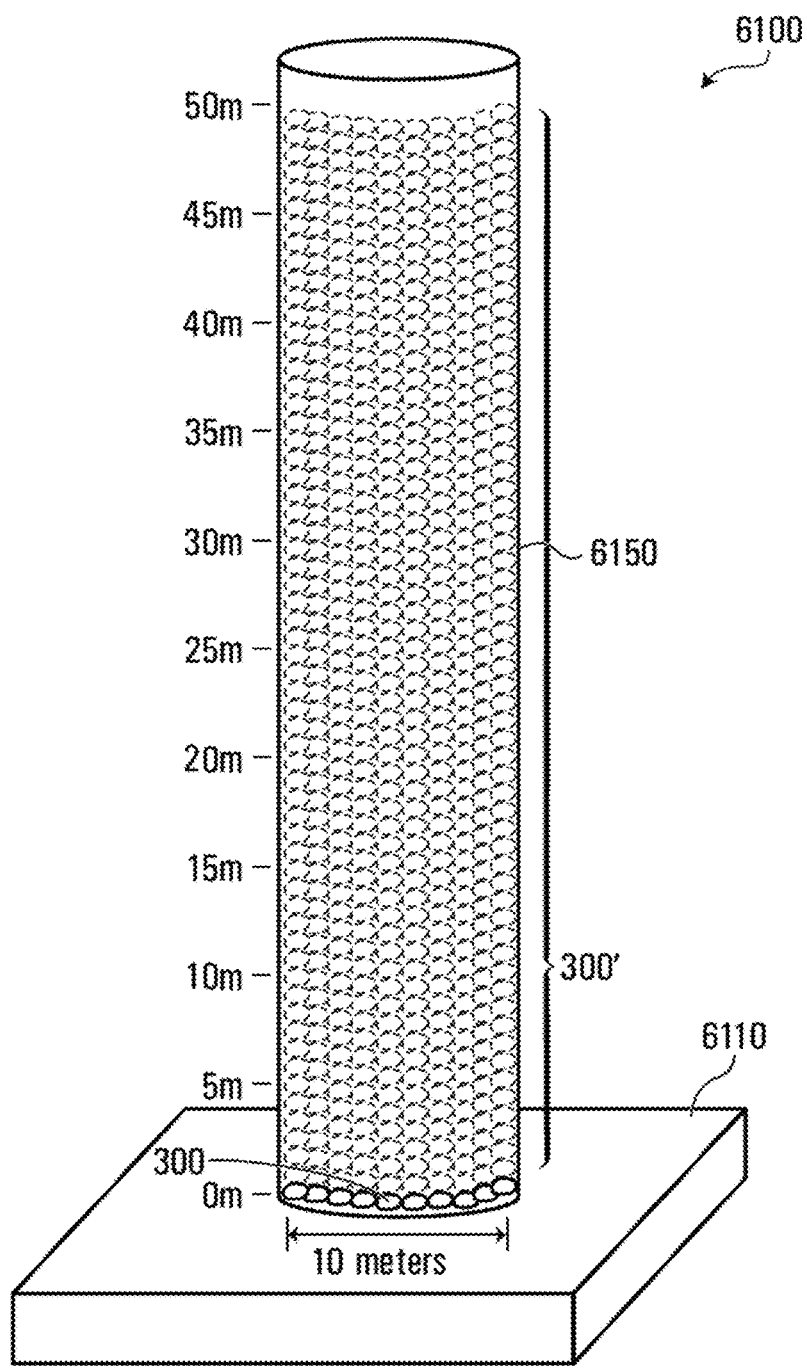
FIG. 56 is a schematic view of a test setup for performing a crush-resistance test.

In FIG. 55, the system 6000 uses vacuum assisted die rolls to continuously form pellets using a thick polymer sheet. More specifically, the system 6000 has a bitumen supply station 6002, which supplies bitumen (which can be virgin or a bitumen/polymer mixture) to an injection wedge 6004. The injection wedge delivers the bitumen at a controlled rate at the nip between two die rolls 6006 and 6008. Each die roll 6006, 6008 has a peripheral surface defining a series of cavities 6010. The registration between the rolls 6006 and 6008 is such that as the rolls turn, the cavities 6010 on the respective rolls face each other to form a molding cavity in which a pellet can be shaped. The roll surface defining each cavity 6010 includes apertures (not shown) which are connected to a source of vacuum such as a vacuum pump. For instance, the central portion of each die roll 6006 and 6008, which is shown empty in FIG. 55, is connected to a source of vacuum, the apertures on the peripheral surface of both die rolls, opening into central void area.

A supply roll of polymer material film 6016 is shown at 6012, it being understood that an identical companion roll (not shown) is provided on the opposite side of the setup. Guides 6014 support the polymer film 6016 as it is being dispensed from the rolls 6012 and fed toward the nip between the die rolls 6006 and 6008.

The two film layers 6016 join at the nip between the rolls 6006 and 6008 while simultaneously the injection wedge deposits bitumen between the films. The injection wedge may be designed to continuously pump out bitumen or to do it intermittently to coincide with the respective cavities 6010 as they travel through the nip. In other words, bitumen is deposited at the nip only when two opposing cavities 6010 are open and no bitumen is deposited at the nip when there are no cavities exposed to accept the bitumen load.

A source of heat, not shown is provided along the feed path of the films 6016 to heat the polymer material and soften it. As the softened films pass through the nip the vacuum created in the cavities 6010 draws the film layers 6016 against the cavity wall. The pressure created by the bitumen load entrapped between two opposing cavities 6010 also assists the film expansion against the wall cavity.

The rolls 6006 and 6008 can be designed to provide crimp seal zones, at the peripheral roll areas that surround each cavity 6010, at which the film layers 6016 are compressed against each other to fuse together and thus completely enclose the bitumen load. Completed pellets 300, ready for transport/storage are released from the respective cavities 6010 as the cavities part away.

Figure 20:
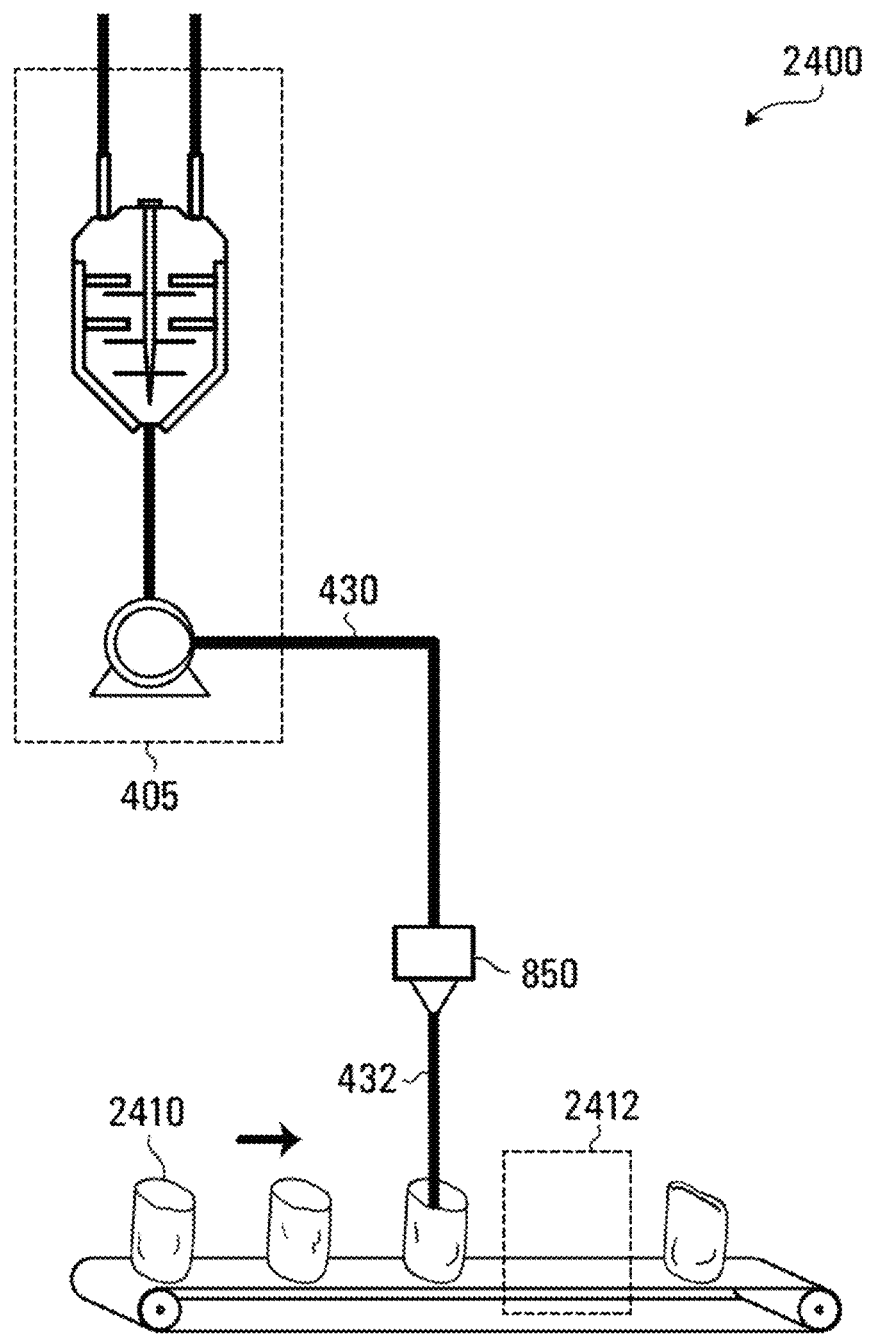
FIG. 20 is yet another variant of FIG. 15, where the shell is applied by bagging the bitumen cores in individual pouches of polymeric material.

FIG. 20 is yet another variant of the station for applying a shell on the pellets. The station 2400 receives the mixture of bitumen/additive from the mixing station 405 through a conduit 430 that leads to a metering device 850. The bitumen/additive mixture is delivered into individual pouches of polymeric material, where each individual pouch constitutes the shell of the final pellet. The individual pouches 2410 are transported on the conveyor belt in a spaced apart relationship. The pouches 2410 move along the direction of the arrow. A synchronization mechanism is provided in order to stop the movement of the conveyor belt as a pouch 2410 aligns with the discharge nozzle 432 of the metering device 850. The metering device 850 is then operated to discharge a predetermined quantity of bitumen/additive mixture in order to fill the pouch 2410. The conveyor belt is then operated such as to position the subsequent pouch 2410 in registration with the discharge nozzle 432. A pouch sealing station generically shown at 2412 seals the open end of the pouch. An example of a sealing station is one that includes a pair of jaws that mechanically close the open ends of the pouch while heating them in order to fuse them together.

To avoid the mixture bitumen/additive discharged from the metering device 850 from solidifying, a heating mechanism may be provided such as to maintain the temperature of the metering device 850 high enough and avoid the mixture of bitumen/additive becoming too viscous to be pumped.

Figure 43:
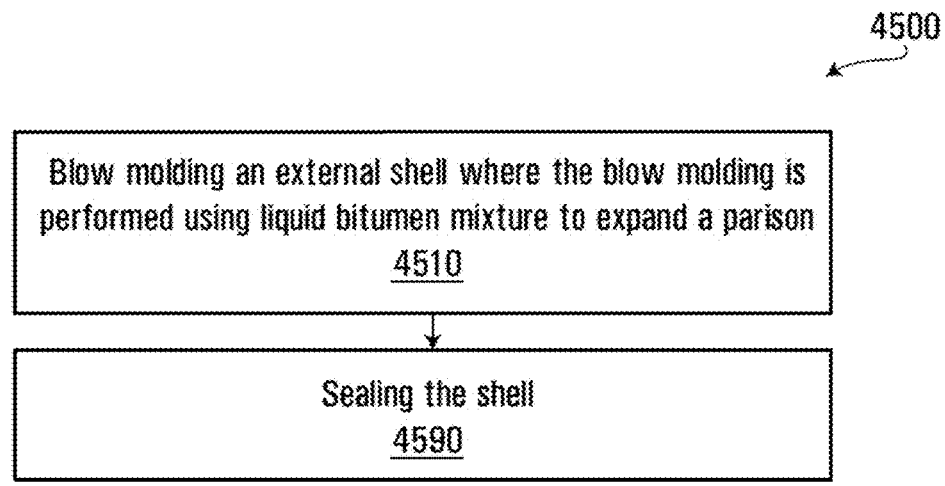
FIG. 43 shows a flow chart of a general method of applying a shell by using a blow-molding process, where the blow molding is performed using liquid bitumen to expand a parison.

FIG. 43 is a flowchart of another process variant for applying a shell on the pellet. In this variant, at step 4510, the shell is formed using blow-fill-seal technology. Typically, in blow-fill-seal manufacturing processes, a semi-molten, hollow, cylindrical plastic parison is extruded downwardly between cavities provided in a pair of open and opposed mold halves; the mold cavity being shaped according to the desired pellet structure. The mold halves are then closed around the lower portion of the plastic parison to pinch and seal the bottom of the parison after which a cutting knife (not shown) severs the upper portion of the parison to separate it from the extruder.

In the method 4500 of FIG. 43, liquid bitumen (or bitumen/additive mixture) is injected into the parison to expand it against the inner walls of the mold cavity such as to form the pellet shell. Advantageously, the mold and/or the liquid bitumen (or bitumen/additive mixture) is at a sufficiently elevated temperature so as to maintain the polymer material of the parison in a soft semi-molten condition such as to allow the polymer to expand against the mold cavity walls. The sealing mechanism of the mold is then closed to seal the upper portion of the shell such as to form a continuous and liquid tight structure completely surrounding the bitumen core.

Figure 44:
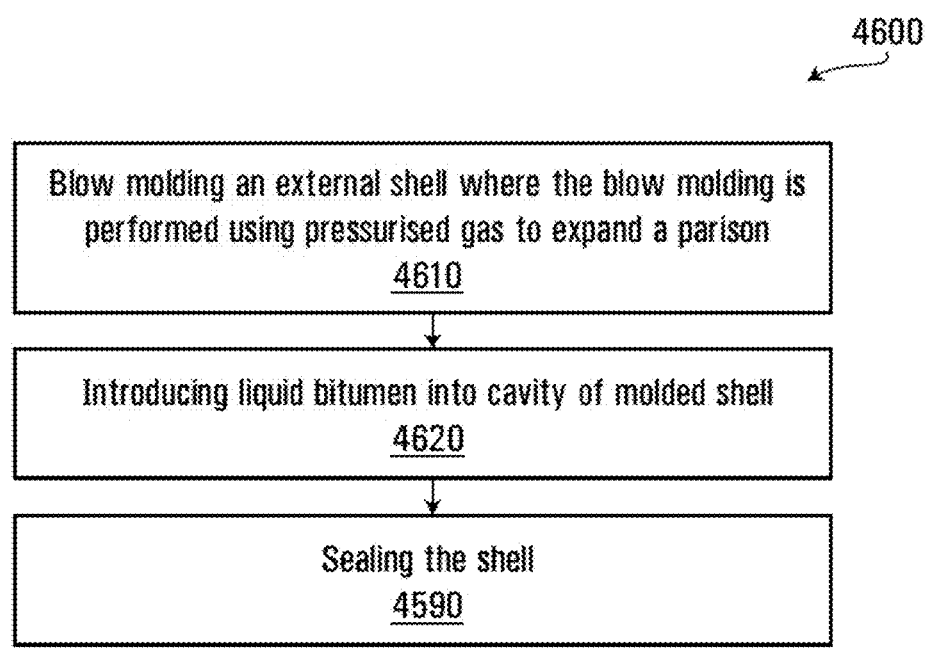
FIG. 44 shows a variant of the method of FIG. 43, where the blow molding is performed using pressurised gas to expand a parison.

FIG. 44 is a variant method 4600 of the method 4500 of FIG. 43, where at step 4610, pressurized gas instead of the liquid bitumen of FIG. 43 is injected into the parison to blow mold it. Thereafter, at step 4620, liquid bitumen (or bitumen/additive mixture) is dispensed into the blow molded polymer shell. At step 4590, the sealing mechanism of the mold is closed to seal the upper portion of the parison and complete the shell structure.

While the above general description of a process for blow-fill-seal technology involves extrusion of the parison directly between the mold halves, the person of skill will readily realize that in a variant, the parison can be pre-formed and in such variant, the parison would thus not be extruded directly into the mold.

The above methods may be carried out in a variety of blow-fill-seal machines that are commercially available.

As seen in FIG. 45, a blow-fill-seal apparatus 4700 that may be used to fabricate bitumen pellets 300 includes mold halves 4710 and 4710'. As shown in FIG. 45, initially the mold halves 4710 and 4710' are separated and receive there between a parison tube 38.

FIG. 46 shows the mold halves moved into mutual engagement to close the mold cavity 4720 and pinch the lower parison extremity such as to form a fluid-tight seal that would allow the parison 38 to be blow-molded.

As shown in FIG. 47 the parison 38 is blow molded by injection of pressurized gas and acquires the shape of the mold cavity and thus form the pellet shell. While the shell remains in the mold cavity, it is filled with liquid bitumen (or bitumen/additive mixture) supplied from a suitable pumping station.

FIG. 48 shows a variant of FIG. 47, which corresponds to step 4510 of process 4500, where the parison 38 is blow molded by injection of liquid bitumen (or bitumen/additive mixture) instead of pressurized gas in order to blow mold the shell and fill it with bitumen in one operation.

Figure 49B:
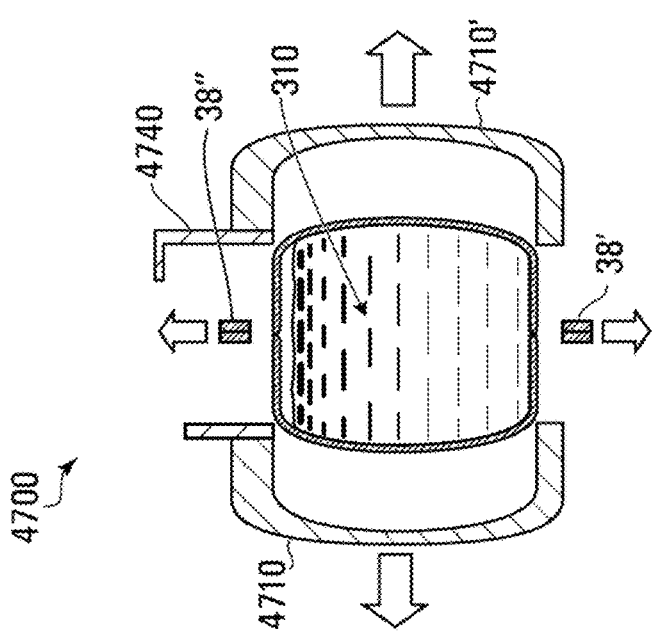

FIG. 49A and FIG. 49B show conceptually how the shell formed in either FIG. 47 or FIG. 48 is closed. The polymer shell has an upstanding ridge at the top through which was injected the pressurised gas and/or the liquid bitumen (or bitumen/additive mixture). That ridge is pinched for sealing the shell. A protruding flash 38" remains at the top portion of the pellet structure, similar to the flash 38' at the bottom. The mold halves are opened to remove the pellet. Optionally, either or both flashes can be removed from the pellet by using known flash removal techniques.

Figure 50:
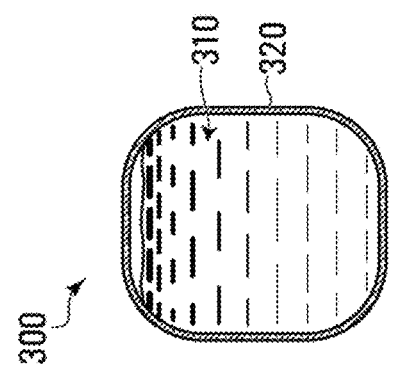
FIG. 50 shows a cross section of a pellet with a shell as obtained with the method of FIG. 43 or FIG. 44.

FIG. 50 shows the resulting pellet 300 having shell 320 enclosing liquid bitumen (or bitumen/additive mixture) 310, which may be more or less viscous.

Figure 51:
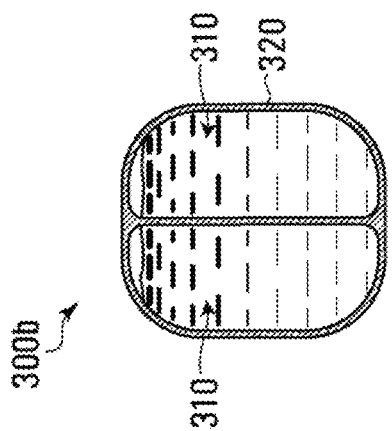
FIG. 51 shows a variant of FIG. 50, where the pellet has an internal web structure, which essentially partitions the internal space in the shell in 2 or more compartments.

FIG. 51 shows a variant of FIG. 50, where the pellet 300b has a shell 320 and an internal web structure, which essentially partitions the internal space in the shell in 2 compartments, each internal compartment being filled with liquid bitumen 310. The person of skill will readily understand that a pellet variant may include an internal web structure which partitions the internal space in more than 2 compartments.

The advantage of partitioning the pellet in several compartments is twofold. First, the internal partition rigidifies the pellet, thus making it more crush and impact resistant. A shell with an internal web structure can be made by extruding a multi-lumen parison within the moulding cavity.

In a possible variant, the blow-fill-seal process described above can be supplemented with the additional step of creating an overpressure in the pellet shell such as to ensure that the formed pellet would retains its shape under load. Naturally, the process for manufacturing the shell is designed such that the shell is hermetically sealed to maintain the overpressure over time. Typical polymers that can be used for making the shell have a high tensile resistance and the resulting shell can sustain a large pressure differential that prevents the shell from buckling when the pellet is subjected to a compressive force.

If the shell is pressurized a small positive pressure (e.g., up to about 15 psig) in the formed shell could suffice to resist shell deformation. As external pressure applied to the shell increases, for example arising during transport or storage, the resulting deformation will produce an increase in the internal pressure of the pellet to compensate the pressure from the outside. Therefore, a high degree of initial overpressure is not required.

Even when the shell is not over pressurized, in other words the internal pressure is the same as the external pressure at rest, as long as the shell is hermetically sealed an internal over pressurization will occur naturally as the shell is subjected to an external compression, as a result of a momentary impact against a surface or when a constant loading is applied on the pellet. The resulting shell deformation will create an over pressurization which will compensate to at least some extent the external load. The higher the loading, the higher the over pressurization will be which makes it possible to use a thinner shell. As long as the shell manifests the necessary burst strength, a relatively thin shell can withstand a significant loading.

An ancillary advantage of using a hermetically sealed shell is to reduce the exposure of the bituminous core to ambient oxygen in order to slow down or eliminate oxygen induced degradation of the bituminous material. From that perspective, the polymeric material that is selected for making the shell should be one that has a low oxygen transmission rate. Another factor, which determines the ability of the shell to reduce the ingress of oxygen, is the gas-tightness of the different seal crimps or closures of the shell. In other words, the manufacturing process should be fine-tuned to provide crimp seals or closures that are sufficiently strong to remain gas-tight even when the shell is subjected to a loading.

One possibility to create the overpressure in the pellet shell in the absence of an external loading which compresses the shell is to inject pressurized gas into the shell at some point of the blow molding or filling process to create the desired degree of overpressure and then seal the shell to maintain the overpressure.

Another possible variant is to provide the shell outer surface with irregularities to control the mobility of shells one with relation to another. Those irregularities can be used to form a non-slip surface, which will make it less likely for pellets to roll back on conveyor belts or other automatic handling equipment. The irregularities can be formed by machining the mold cavity with the proper pattern.

Figure 52:
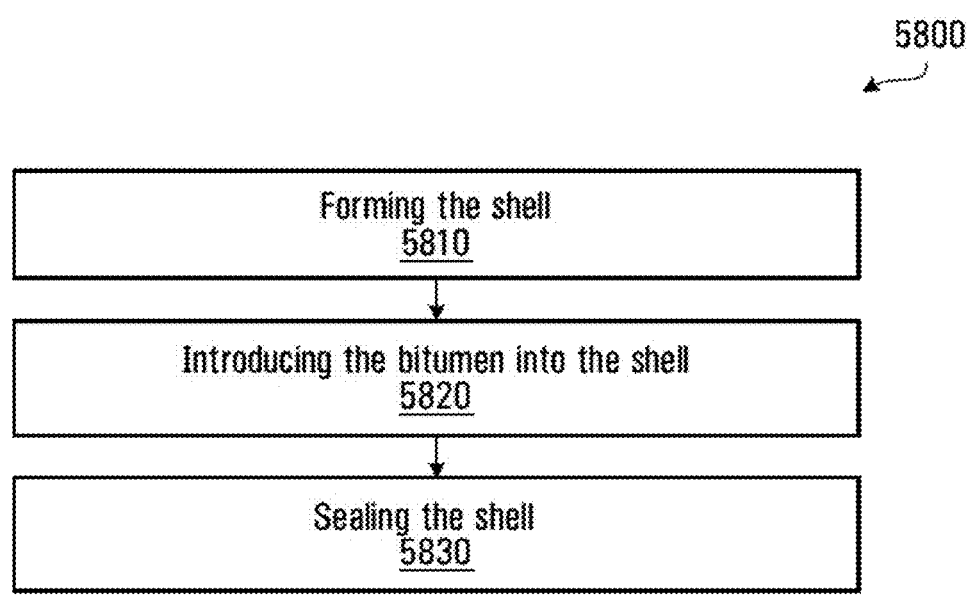
FIG. 52 a flow chart of a method for creating a shell by a form-fill-seal process which uses a polymer sheet like material unwound from a roll, instead of directly extruding the polymer into the mold cavity at each molding cycle.

FIG. 52 is a flowchart of another process variant for applying a shell on the pellet. In this variant, at step 5810, the shell is formed using form-fill-seal technology. Typically, in form-fill-seal technology manufacturing processes, a tube is formed from a film and then filled with bitumen (or bitumen/additive mixture). In one example of implementation a single film layer is used to form the tube. The film layer in a planar condition is directed toward a conical mandrel, which is called the forming tube. The reader will understand that this film may be provided directly from the outlet of an extruder or unwound from a roll.

When the center of the film is near the forming tube, the outer edges of the film form flaps that are progressively wrapped around the forming tube in order to form the film in a tubular structure in which the longitudinal edge portions overlap. The tubular structure is pulled downward around the outside of the forming tube and a vertically extending heat-sealing bar pinches the overlapping edge portions tubular structure against the forming tube to create a "fin seal", thus bonding the overlapping areas of film to each other to form a seam. A horizontal sealing bar creates a bottom crimp seal by pinching the tube horizontally, bonding the film together, and cutting off any film below. This sealing bar can be on a fixed height, which is called an intermittent sealing process. Faster systems include a sealing bar that moves down with the bag while sealing. This is called a continuous process.

As described herein, a crimp seal can, thus, be formed by applying heat and pressure to the opposing walls of the shell that are to be joined.

At step 5820, liquid bitumen (or bitumen/additive mixture) is injected into the shell formed by the film tube. The amount of liquid bitumen (or bitumen/additive mixture) is metered through the forming tube in the center of the bag.

At step 5830, the horizontal sealing bar seals the top of the shell, simultaneously forming the bottom seal of the next shell above. This filled shell is then cut off from the tube and is now a pellet. Advantageously, shrink film may be used as the shell material and the process may include the addition of an optional step 5440 where a radiant heat source can be used to shrink wrap the film to the bitumen-based core after filling and sealing.

During the final sealing process step 5830, the shell may be further filled with pressurised air from a blower or from an inert gas supply, such as nitrogen, creating an overpressure in the pellet such as to ensure that the formed pellet would retains its shape under load.

Figure 53:
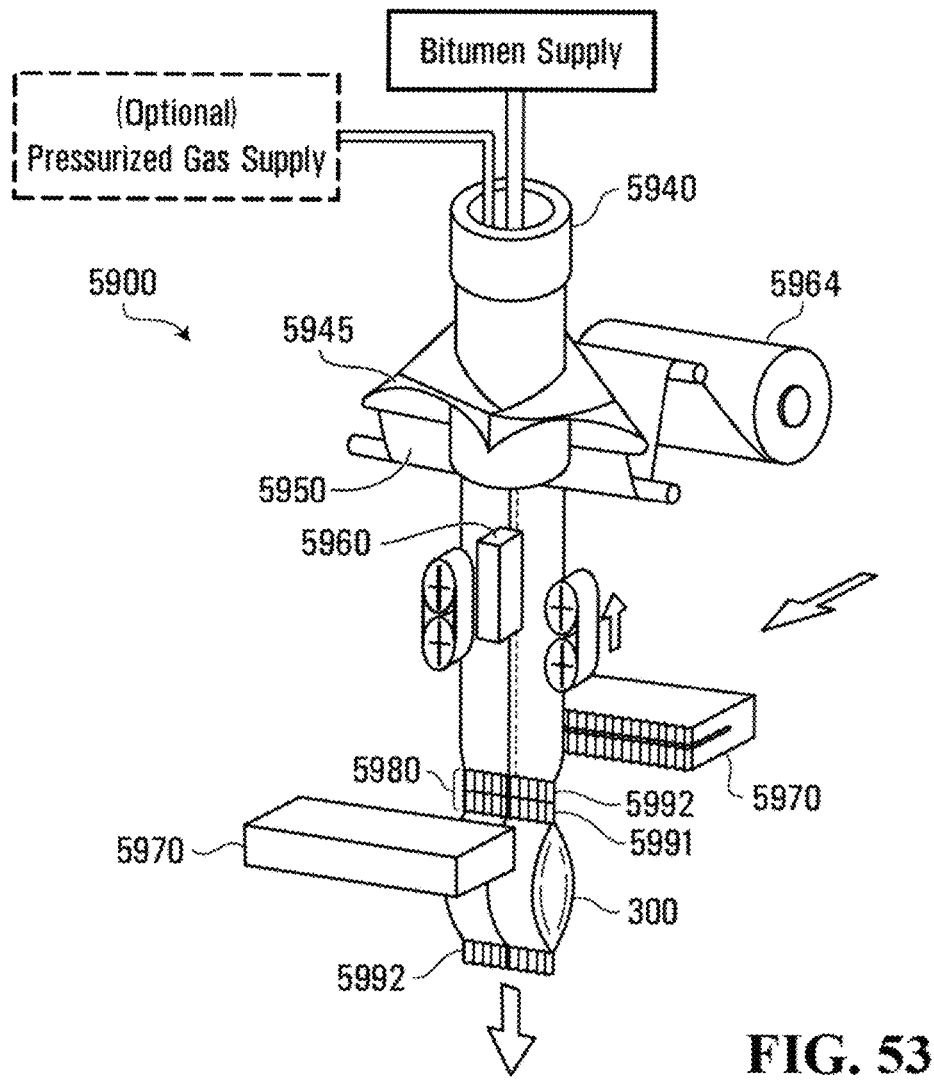
FIG. 53 is a perspective view of a form-fill-seal system using a polymer sheet to form the pellet shell.

An example of a form-fill-seal apparatus that can be used to implement the process of FIG. 52 is shown at FIG. 53.

A form-fill-seal apparatus 5900 that makes bitumen pellets 300 includes a vertical hollow conical forming tube 5940. The apparatus 5900 includes a film supply station 5964 that feeds a layer of film 5950 towards the forming tube 5940. The film supply station 5964 includes a supply roll feeding a layer of film 5950 through a series of guide rollers, which direct the film towards the tube 5940. A guide structure 5945 adjacent the conical forming tube 5940 progressively closes the film over the conical forming tube 5940, essentially wrapping the film around the conical forming structure 5940 in a way such that the longitudinal edges of the film slightly overlap each other. The tubular film structure that is supported and guided over the conical forming tube 5940 is pulled downward, by a pair of rotating belts. A vertical heat-sealing bar 5960 clamps overlapping edges of the film so as to form a seam. The vertical heat-sealing bar operates on a continuous basis, in other words it defines a gap with the surface of the forming tube 5940 and the overlapping edges of the film are guided in that gap. As the overlapping edges slide through the gap of the sealing station 5960 the heat and applied pressure fuses the overlapping edges to each other, thus forming the seam.

Note that variations are possible. For example, the bag formed in the process may be gusseted, or twisting the bag etc. may perform the sealing. These all fall into the category of form-fill-sealing.

The film structure downstream the heat-sealing bar 5960 is thus completely closed peripherally and it is ready to receive a load of liquid bitumen (or bitumen/additive mixture). Pressurized bitumen is pumped through the upper open end of the forming tube 5940 and it is guided by the forming tube 5940 toward the peripherally closed tube where it accumulates. Horizontal sealing bars 5970 create a bottom crimp seal 5980, effectively sealing the bottom of the tube. The crimp seal is a double crimp: it has the effect of sealing the upper end of the outgoing pellet 300 and also the bottom end of next pellet in line. The crimp seal is such that the tube is completely severed between the two crimp seals such as to separate the pellets 300 from each other.

Optionally, the form-fill-seal apparatus 5900 may include a radiant heat source (now shown) positioned downstream from the horizontal sealing bars 5970, which can be used to shrink wrap the film to the bitumen-based core after filling and sealing.

Figure 54:
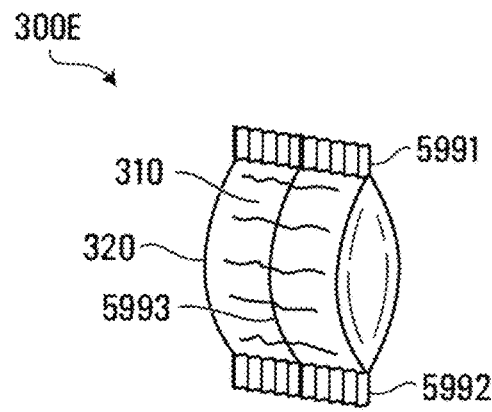
FIG. 54 is a perspective view of the pellet with a shell as obtained with the method of FIG. 52 and the apparatus of FIG. 53.

The structure of the pellet produced by the apparatus 5900 is shown at FIG. 54.

The pellet 300E includes a central bag-shaped portion including a crimp seal area 5991 at the upper end and a crimp seal area 5992 at the lower opposite end. The crimp seal areas 5991 and 5992 extend generally transversally to the longitudinal axis of the pellet 300E. Note that while the crimp seal areas 5991 and 5992 are shown as being straight, variations are possible. The crimp seal areas 5991 and 5992 can be oblique with relation to the longitudinal axis or of an arcuate (either convex or concave shape). A longitudinal crimp 5993 forming the tube seam runs from the top crimp seal 5991 to the bottom crimp seal 5992. Note that the longitudinal crimp seal 5993 is sealed at the top and bottom crimp seals 5991 and 5993, which occurs when the sealing bars 5970 pinch the tube including the horizontal seam to form the crimp seal.

In a possible variant, the blow-fill-seal process described above can be modified so as to include a two stage form-fill-seal process to obtain nested shells. In other words, the resulting pellet has an internal (inner) shell and an external (outer) shell. In this variant process, the liquid bitumen (or bitumen/additive mixture) is loaded into an internal shell, which advantageously is made of a thin polymer film. The resulting sacs are cooled to make them into firmer pieces that can be handled with automatic equipment. Note that the structural strength of the internal shell is not a primary consideration since the equipment handling the bitumen pieces is designed to avoid overstressing them. The purpose of the internal shell is primarily to form a non-sticky surface to avoid the bitumen pieces from sticking to equipment surfaces and to each other. The bitumen pieces are then placed into outer shells made with optionally thicker polymer film. The outer shells are inflated, such as by pressing them, followed by a hermetic sealing operation to completely enclose the bitumen piece. This is essentially a form-fill-sealing of a liquid stream followed by a form-fill-sealing of discrete bitumen pieces. Advantageously, such variant process avoids bitumen contamination of the thicker container and/or seal thereof. Also note that it is possible to design the two-stage form-fill-seal process such as to place two or more bitumen pieces into a single outer (external) shell.

Figure 21:
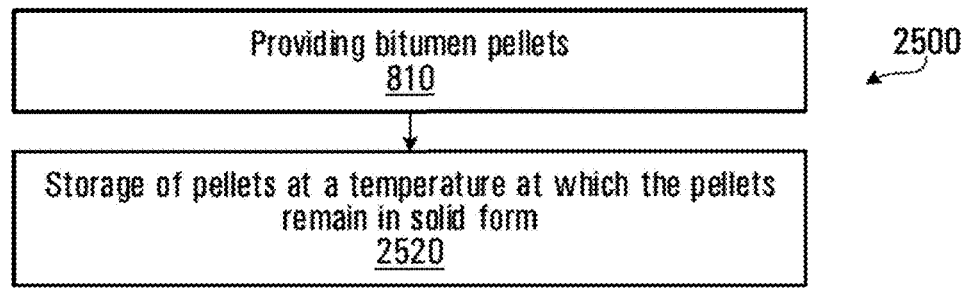
FIG. 21 is a flow chart of a general method of storing bitumen pellets in accordance with an embodiment of the present disclosure.

FIG. 21 is a flowchart of a process for performing the storage of bitumen in pelletized form. Traditionally, bitumen is stored in liquid form into large tanks. The bitumen is pumped into the tank and remains there until it is needed. The problem of storing bitumen in liquid form in a tank is that the tank can eventually develop a leak, which would create an environmental hazard. Additionally, tank storage typically requires heating the bitumen and/or adding diluent to the bitumen and/or adapting means heating to the tank so as to keep the bitumen at a viscosity state which allows pumping the bitumen out of the tank. The novel methods proposed in this application perform the storage of bitumen in solid form. In particular, the bitumen is pelletized by any one of the methods and devices described earlier. The resulting pellets are stored at a desired location and can remain there indefinitely without risk of leakage. Since the pelletized bitumen cannot leak, a fluid tight storage tank is no longer required to hold the bitumen. Any installation, such as a warehouse or silo can be used for storing the bitumen pellets, as long as it provides a shelter to prevent direct exposure of the pellets to the elements. Alternatively, the pellets can be stored outside in bulk, optionally covered by a tarp.

Since the pellets, especially those provided with an external shell, are crush resistant and also non-sticky, automatic handling equipment can be used to transfer the pellets to the storage location and later to pick up the pellets from the storage location and transport them elsewhere. Examples of such handing equipment will be described later.

A factor to take into consideration when storing the bitumen in pelletized form is to provide storage conditions in which the pellets will maintain their structural integrity. Storage temperature is one of those conditions. Since temperature affects the viscosity of the bitumen core of the pellet and also the structural integrity of the shell, the storage temperature should be maintained within the range at which the pellet remains solid. In practice, the storage temperature would rarely be an issue because the temperature at which the pellets begin to lose their structural integrity is rarely encountered in practice.

To summarize, the method 2500 of storing pellets includes the step of providing bitumen in pelletized form, as illustrated at step 810, followed by placing the pellets at the desired storage location at which the temperature is controlled such that the pellets will remain solid, as illustrated at step 2520.

Figure 22:
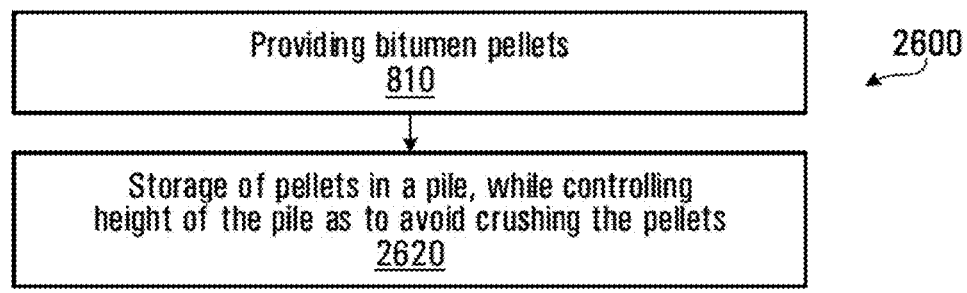
FIG. 22 is a flow chart of a general method of storing bitumen pellets in accordance with another embodiment of the present disclosure.

The flowchart of FIG. 22 illustrates a different aspect of the storage method, which takes into consideration a different factor in order to maintain the structural integrity of the pellets. The methods 2600 includes the step 810 of providing the bitumen pellets and then storing the pellets (step 2620) while controlling the height of the bulk such as not to exceed the crush resistance of the pellets that are at the bottom of the pile. Since the crush resistance of the pellets is known, or can be determined by the test disclosed in this application, the maximal height of the bulk that pellets at the bottom can carry without breaking up, can be computed. A safety factor can be applied to this maximal height computation to take into consideration dynamic forces arising during the loading or unloading of the pellets from the bulk.

Figure 23:
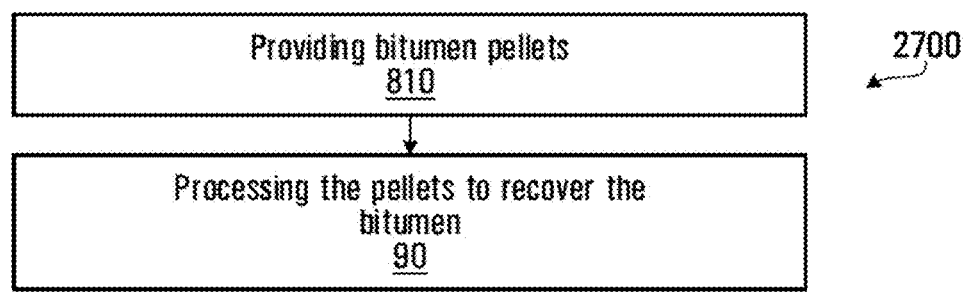
FIG. 23 is a high-level flow chart of a method of recovering the bitumen from bitumen pellets in accordance with an embodiment of the present disclosure.

FIG. 23 illustrates a flow chart showing the main steps of the most common industrial use of the bitumen pellets. The flowchart has two main steps including step 810 of providing bitumen pellets and step 90 at which the pellets are amalgamated into a coherent bitumen-based mass that can be subjected to further processing such as refining.

Figure 26:
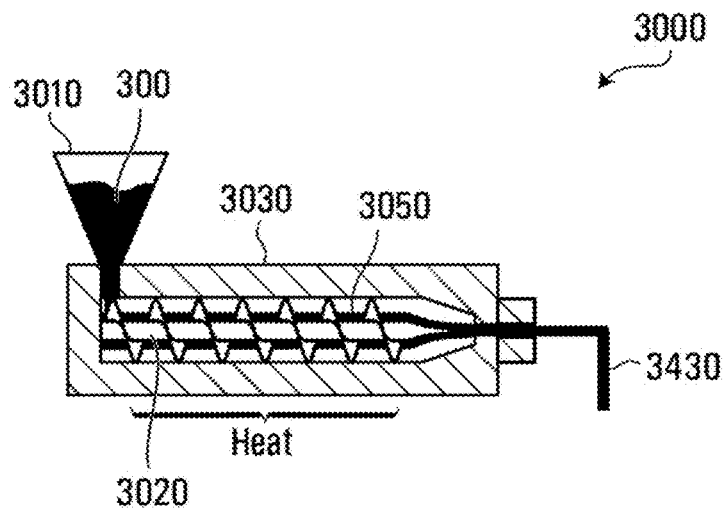
FIG. 26 is a schematic view of an apparatus for implementing the method of FIG. 23.

FIG. 26 illustrates a system for amalgamating pellets into a coherent bitumen-based mass. The system 3000 is essentially an extruder that uses heat and mechanical pressure to shred the pellets and agglomerate them together. The extruder 3030 includes a feed hopper 3010 in which pellets 300 are loaded. The extruder 3030 has an internal screw mechanism 3020 that shreds the pellets 300 into small bits, which are then subjected to heat in order to melt the additive(s) (e.g., polymer or polymers) that have been used originally to pelletize the bitumen. The temperature at which the bitumen/additive(s) mixture is exposed is above the melting temperature of the additive(s) used. At that temperature, the additive(s) are mixed with the bitumen and the mixture is expressed through the outlet of the extruder 3030 at 3430. The mixture at the outlet 3430, therefore, contains a major fraction of bitumen and a minor fraction of additive.

Figure 24:
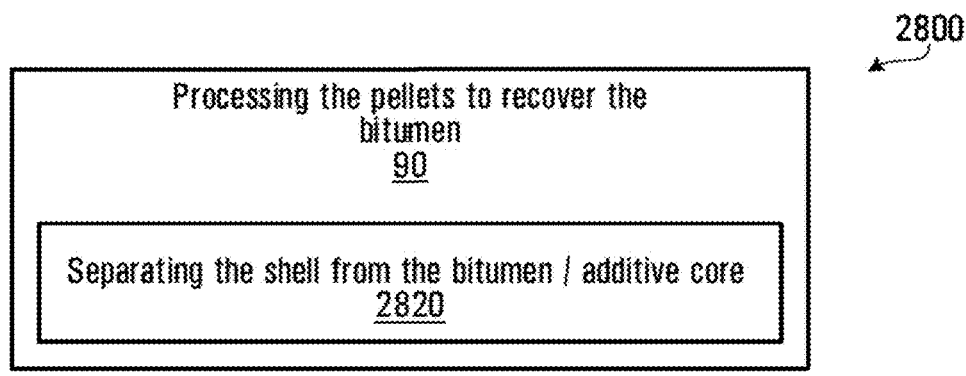
FIG. 24 is a flowchart that details the step in FIG. 23 of recovering the bitumen from the pellets.

The flowchart in FIG. 24 illustrates in greater detail step 90 of the flowchart of FIG. 23, performed according to a variant in which the additive (e.g., polymer) in the bitumen/additive mixture is removed at least partially before the refining operation. The advantage of removing the additive (e.g., polymer), at least partially, is that the refining operation can be performed without any modification. There is no need to modify the process such as to recover the additive (e.g., polymer) fraction.

One of the concepts underlying the removal of additive from the pellets 300 is that upon application of sufficient heat for sufficient time, the pellets liquefy and the resulting liquid may be further processed (e.g., heated or processed to induce coalescence) or sent as is to a vessel for gravity separation. Alternatively, when the pellets 300 include a shell 320, one can apply heat on the pellets according to a three-step process. In a first step, the pellets 300 are preheated to soften the encapsulating additive. In a second step, the heated pellets are fragmented into small pieces either through shears, rollers, grinder or a rotating screw. In a third step, the small pieces are heated until one obtains a final hot liquid stream. Further, in order to be more effective with heat energy management, the final hot liquid stream (before additive separation) can be looped back around and fed into the incoming pellets, thereby acting as a form of heat transfer from the liquid to the solid pellets.

Once liquefied, if the heated mixture of additive (e.g., polymer) and bitumen is undisturbed, the additive (e.g., polymer) will separate from the bitumen. For example polyethylene (PE) which has a lower density than bitumen would cream to the top after a residence time required for separation in the separation vessel in the range of about 5 min to about 2 h. Advantageously, the rate and efficiency separation of the additive may be enhanced by using a cyclone, centrifuge, in-line coalescer, or shearing/mixing of the mixture (optionally in the presence of heat) to induce coalescence of additive pieces/droplets. The top phase rich in additive (e.g., polymer) may be skimmed off, continuously drained or collected on a screen depending on the temperature of operation and additive content. Further settling with or without increase in temperature and/or use of a screen may be required to remove as much bitumen from the additive phase as possible.

As shown in FIG. 24, step 90 optionally includes the sub-step 2820 at which the shell is separated from the bitumen/additive core mixture.

Figure 27:
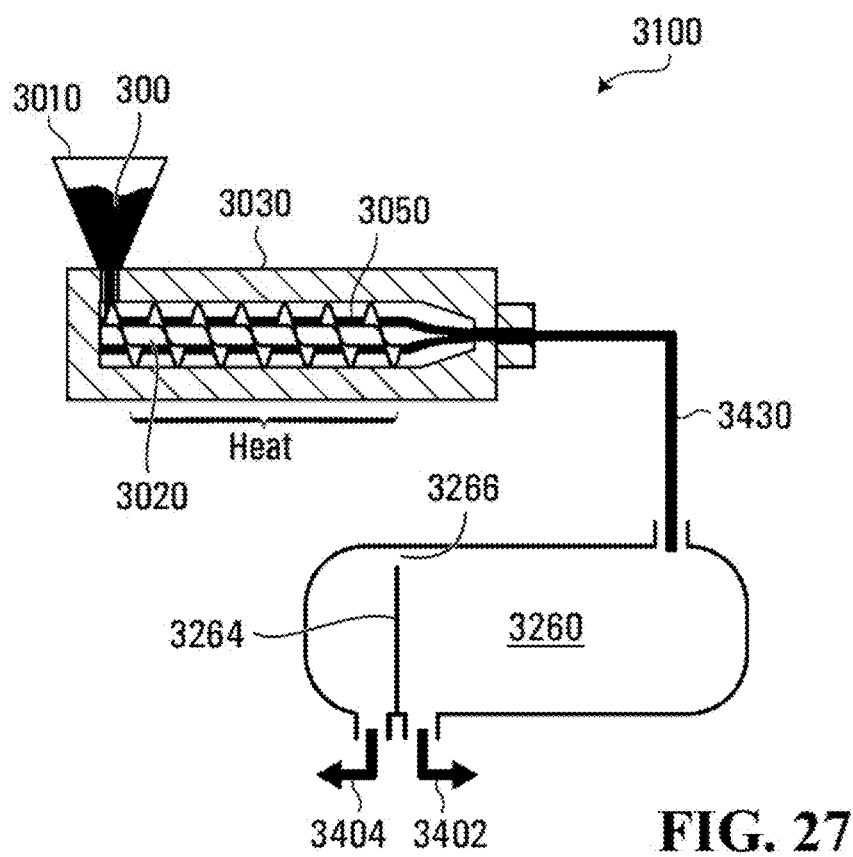
FIG. 27 is a schematic view of an apparatus for implementing the method of FIG. 24.

An apparatus for performing the removal of the additive is shown at FIG. 27. The apparatus 3100 includes the extruder 3030 that was described in connection with FIG. 26. The difference is that instead of directing the bitumen/additive (e.g., polymer) mixture at the outlet 3430 directly to the inlet of the refining process, the bitumen/additive mixture is directed to a separator 3260 that separates the additive from the mixture. In this example of implementation, the separator 3260 operates on the basis of gravity. Since the bitumen and the additive have different densities and the additive has low solubility into bitumen, they will naturally separate from each other. More particularly, the separator 3260 includes a vessel with an inlet in which is discharged the mixture bitumen/additive. The vessel has 2 outlets 3404 and 3402. The outlet 3402 releases the heavier fraction of the mixture bitumen/additive, which is the bitumen. The outlet 3404 releases the lighter fraction, which is the additive. While not shown here, as discussed previously, in order to enhance the rate and efficiency of separation of the additive, a device to induce coalescence of additive droplets can receive the mixture from the outlet 3430 upstream of the separator 3260, process the mixture (optionally with the addition of heat), and then the processed mixture is directed to the separator 3260.

An internal partition 3264 separates the vessel into zones, the 1st zone which is the largest is associated with the outlet 3402 while the 2nd zone which is the smaller one is associated with the outlet 3404. The partition 3264 leaves a gap 3266, defined between the top of the partition and the vessel inner top wall through which material in the larger zone of the vessel can overflow in the smaller zone. Note that this description is intended as a generalized explanation of gravity separation. In practice, the apparatus for performing the process would need to be designed by taking into consideration the high viscosity of the different materials and may require pressurized vessels and mechanical conveying devices that can displace highly viscous streams.

Although not shown in the drawings, it will be understood that each one of the outlets 3404 and 3402 are provided with suitable valves that can selectively control the flow of material through the outlets.

In operation, the mixture bitumen/additive is released into the vessel. The level of fill is selected such that it is slightly below the top of the partition 3264. The mixture is allowed to settle for some time; the additive fraction and the bitumen fraction will separate into layers, with the additive fraction floating on the bitumen fraction, as it is less dense. Once the separation has been made, additional mixture is introduced in the vessel, which raises the level of fill and causes the additive layer to overflow in the 2nd smaller zone. The additive can be extracted from the outlet 3404 periodically. Similarly, by periodically opening the valve at the outlet 3402, bitumen is removed from the vessel. The reader will understand that the additive fraction may include a mixture of more than one polymer (e.g., a mixture of LDPE and HDPE) resulting, for example, from using one polymer in the shell and another polymer in the core.

Note that during the separation process, heat must be applied to the vessel such as to maintain the various fractions of the mixture, in particular the additive (e.g., polymer), in a liquid state.

Figure 25:
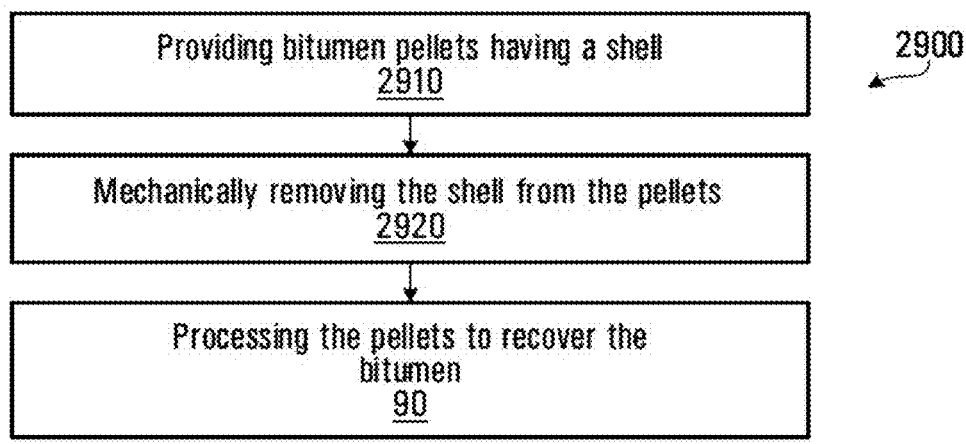
FIG. 25 is a flow chart of variant of the method in FIG. 24.

FIG. 25 is a flowchart of a variant of the process for separating the additive (e.g., polymer) from the mixture bitumen/additive. The variant is characterized by the fact that it is less energy intensive as it does not require melting the entire additive in the pellets before a separation can be performed. The process 2900 includes the step 2910, which consist of providing bitumen pellets with a shell, as described earlier in this application. At step 2920 the pellets are processed such as to mechanically remove the shells from the pellets, thus separating the pellets into shells on the one hand and cores on the other hand. Then, the cores are processed as described above in connection with step 90 to separate the bitumen from the additive intermixed therewith.

Figure 28:
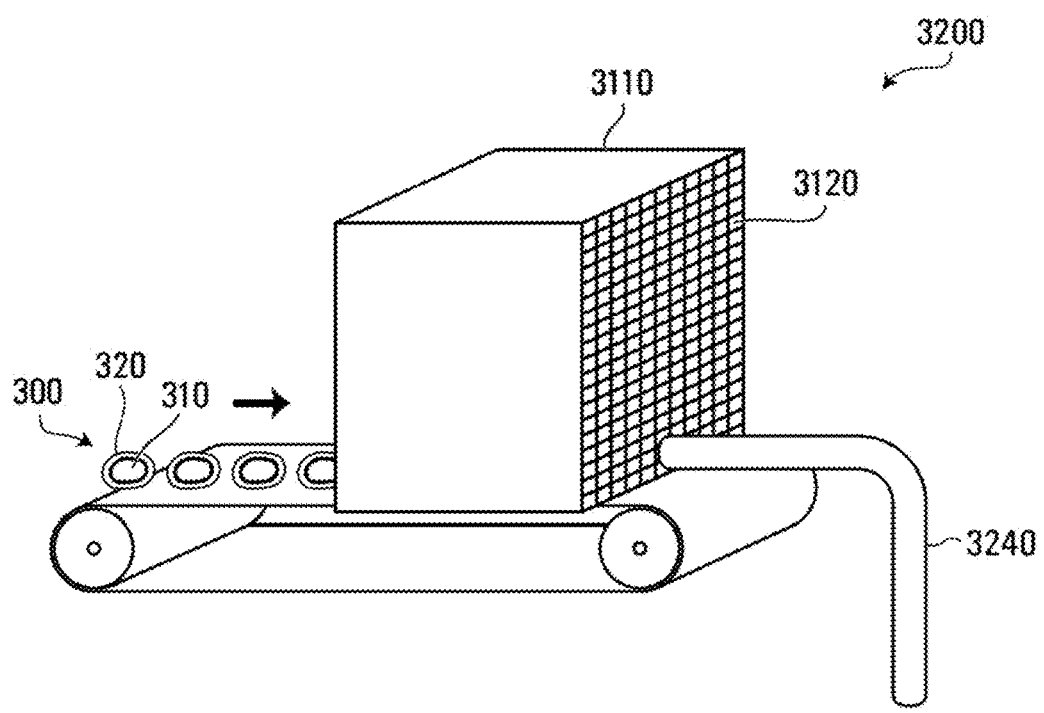
FIG. 28 is a schematic view of an apparatus for implementing the method of FIG. 25.

Step 2920 can include a pre-heat treatment of the pellets to a specific temperature so as to reach the softening point of the additive. By doing so, the shell softens and can be readily crushed and or shredded by exertion of relatively small amount of force. Breaking or cutting of the packaging/shell additive releases the filling (bitumen/additive mixture) that is liquid-like at that temperature. The shredded additive material in the case of a thicker shell will float in the liquefied mixture and transferred in the liquid in the form of a slurry. The heating and breaking of the pellets can be performed in a heated extruder type unit or a shredder with pre-heating e.g., with a sharp screw cutting through the softened shell, for example a screw auger. The pieces of the broken shell float in the liquefied filling stream at the outlet of the shell removal unit. These pieces can be collected on a screen or skimmed off of the top after gravity settling. The pieces are coated with a layer of bitumen that may be effectively washed from the surface using a hydrocarbon solvent upon cooling. The same system may be used to break down the pellets and melt them if a thin film (either co-extruded or deposited) or bag is used as the shell material. An apparatus for performing step 2920 is illustrated at FIG. 28. The apparatus includes a conveyor belt that supplies pellets 300 at a separator station 3110. The pellets 300 include cores 310 and shells 320. The separator station 3110 operates to mechanically break the shells 320 and express the bitumen cores 310. That operation is performed by mechanical action and also by the selective application of heat.

More specifically, the separator 3110 includes a screen 3120 and an outlet 3240 through which is recovered the bitumen. While not shown in the drawings, the separator station 3110 includes a piston, which compresses the pellets 300 against the screen 3120. The temperature during this compression operation is controlled such as to be high enough in order to decrease the viscosity of the bitumen as much as possible while not surpassing the melting point of the shell. To achieve this objective, the use of two different types of polymers, one for mixing with the bitumen and another for making the shell 320 is advantageous. By using a polymer for making the shell 320 which has a higher melting temperature, it is possible to elevate the process temperature at a level which is above the melting temperature of the polymer in the cores 310 while being below the melting temperature of the shells 320. In this fashion, the viscosity of the cores 310 is reduced and at the same time, the shells 320 remain solid.

When the mechanical piston applies pressure on the pellets 300 at that temperature, the shells 320 will crack open allowing the bitumen/additive (e.g., polymer) mixture in the cores 310 to ooze out and be expressed through the outlet 3240. When the compression cycle is completed and the piston reaches the end of its travel, the cracked shells 320 are retained inside the screen 3120, while the majority of the bitumen has been recovered through the outlet 3240.

The piston is then retracted and the shells 320 are removed to clean the screen 3120. The apparatus is then ready for another cycle of operation.

The advantage of the apparatus at FIG. 28 is that it requires a lesser amount of energy to separate the additive (e.g., polymer) from the bitumen in that no melting of the shells 320 is required as they are mechanically separated from the bitumen cores 310.

Note that the bitumen released from the outlet 3240 still contains additive (e.g., polymer). That additive can be removed by using the apparatus illustrated at FIG. 27.

Figure 57:
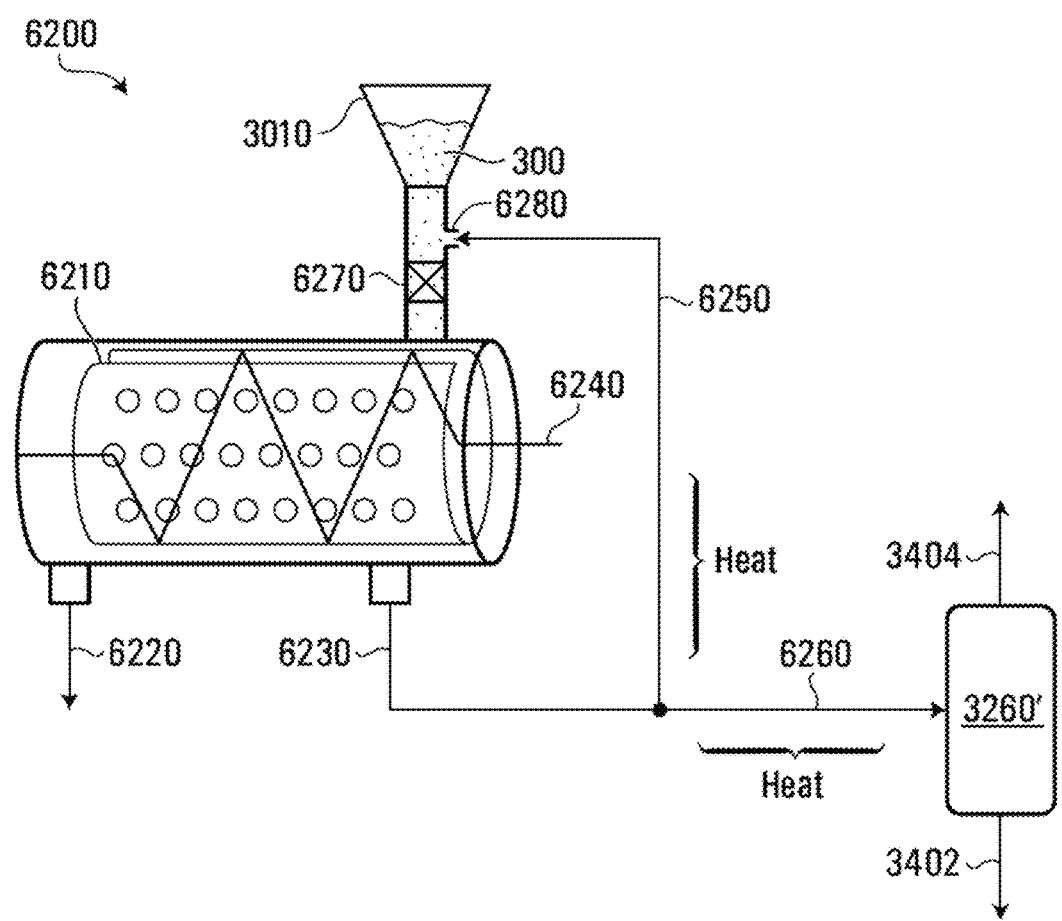
FIG. 57 is a schematic view of a variant of an apparatus for implementing the method of FIG. 25.

FIG. 57 illustrates another apparatus for performing the removal of the additive. The apparatus 6200 includes a feed hopper 3010 in which pellets 300 are loaded. The apparatus 6200 also includes an in-line shredder 6270 that shreds the pellets 300 into small bits. Prior to shredding a batch of incoming pellets, however, the apparatus 6200 feeds through inlet 6280 hot liquid bitumen/additive mixture onto the batch of incoming pellets, where the mixture is at a temperature sufficient to soften the pellet additive. The hot liquid mixture is diverted from the outlet 6230 of the apparatus 6200 and it is heated at a temperature close to the softening point of the additive. The incoming pellets and the diverted mixture pass through the in-line shredder 6270, which cuts the pellets in small bits. The hot mixture facilitates the shredding operation by softening the pellets. The shredded pellets are delivered to an auger 6240 leading to a screen 6210 that filters out shredded shell material, which can be recovered at outlet 6220. The bitumen/additive mixture passing through the screen 6210 is recovered at the outlet 6230, and contains a major fraction of liquid bitumen and a minor fraction of additive. A portion of the bitumen/additive mixture is diverted back, as described above while the rest of the mixture is further heated to above the melting point of the additive and sent into a separator 3260' for separation of bitumen and additive. While not shown here, as discussed previously with respect to apparatus 3100, in order to enhance the rate and efficiency separation of the additive, a device to induce coalescence of droplets in the bitumen phase can receive the mixture from the outlet 6230 upstream of the separator 3260', process the mixture (optionally with the addition of heat), and then the processed mixture is directed to the separator 3260'. The separator 3260' can be similar in structure to the separator 3260 described previously. The separated fractions exit through outlets 3402 and 3404.

Figure 29:
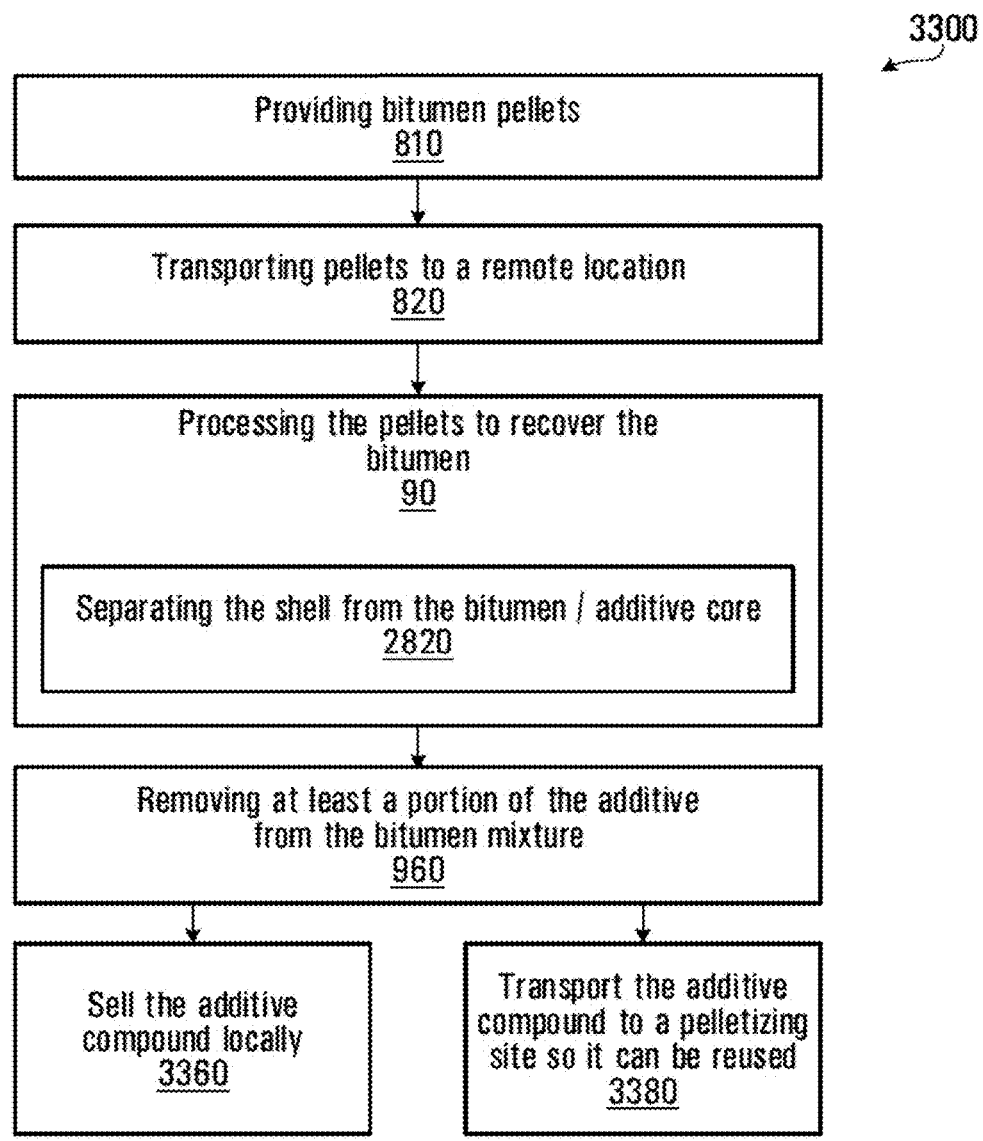
FIG. 29 is a flowchart another specific embodiment of the method illustrated at FIG. 9.

FIG. 29 illustrates a flowchart of a process for recycling the additive when this additive is a polymer, which is recovered when the bitumen is extracted from the bitumen pellet before the refining process. The polymer has economic value and can be reused for pelletizing bitumen again or for another purpose.

The process 3300 includes the step 810 of providing bitumen pellets, the step 820 of transporting the pellets to a remote location, and the step 90 of processing the pellets to recover the bitumen such that it can be processed further as into a refinery. The step 90 includes the optional sub step 2820 at which the shell can be removed from the pellets for instance by using the apparatus shown at FIG. 28. Next, at least a portion of the additive (e.g., polymer) is separated from the bitumen mixture at step 960, by solvent-assisted extraction or by gravity separation by using the apparatus shown in FIG. 27 or FIG. 57.

The additive (e.g., polymer) recovered from sub step 2820 and/or from step 960 can be reused. One option, illustrated by step 3380 is to transport the additive (e.g., polymer) back to the same or a different pelletizing site where it can be reused to pelletize bitumen again. For convenience, the recovered additive (e.g., polymer) can be processed to grind into fine particles, and pelletized into solid beads which are easier to transport. The additive (e.g., polymer) is then loaded into containers, ships, railcars or trucks and shipped back to the pelletizing site where it is reused.

Another option, as shown by the step 3360 is to sell the additive (e.g., polymer) locally. This option may be preferred if transporting the additive (e.g., polymer) back to the pelletizing site is too inconvenient or not sufficiently economical.

FIG. 30 to FIG. 37 each illustrates different ways for handling and transporting pellets 300 in bulk.

Figure 30:
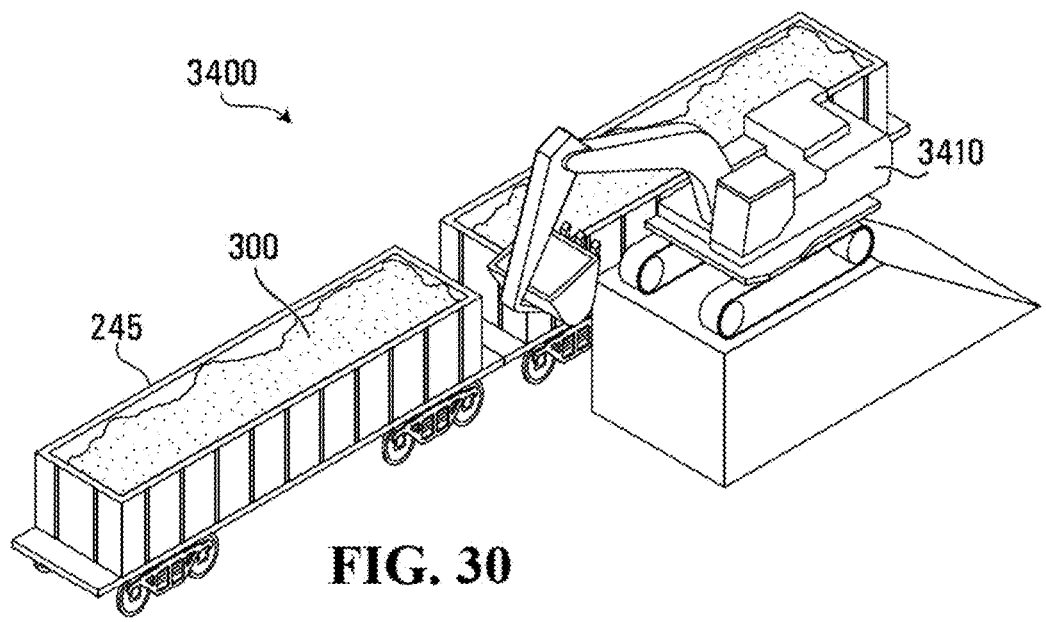
FIG. 30 shows an implementation of a process for loading/unloading bitumen pellets using conventional equipment for handling material in bulk, in accordance with an embodiment of the present disclosure.

As shown in FIG. 30, the pellets 300 are carried in freight railcars 245. The railcars shown are of the gondola type, which is normally used to transport loose bulk commodities. The railcars 245 are open top railcars; they have no roof, thus allowing loading and unloading the bulk material from the top. The system 3400 includes equipment to load the railcars 245 which includes a mechanized loader 3410, which has a scoop mounted on an articulated boom. The loader 3410 operates the scoop to either load or unload the railcars 245. It will be understood that the ability of the pellets to resist crushing and their non-stick surfaces makes this operation possible. Otherwise, they will stick to each other and also adhere to the walls of the railcars 245 and also to the equipment for loading and unloading them, thus making the operation more complicated and uneconomical.

Figure 31:
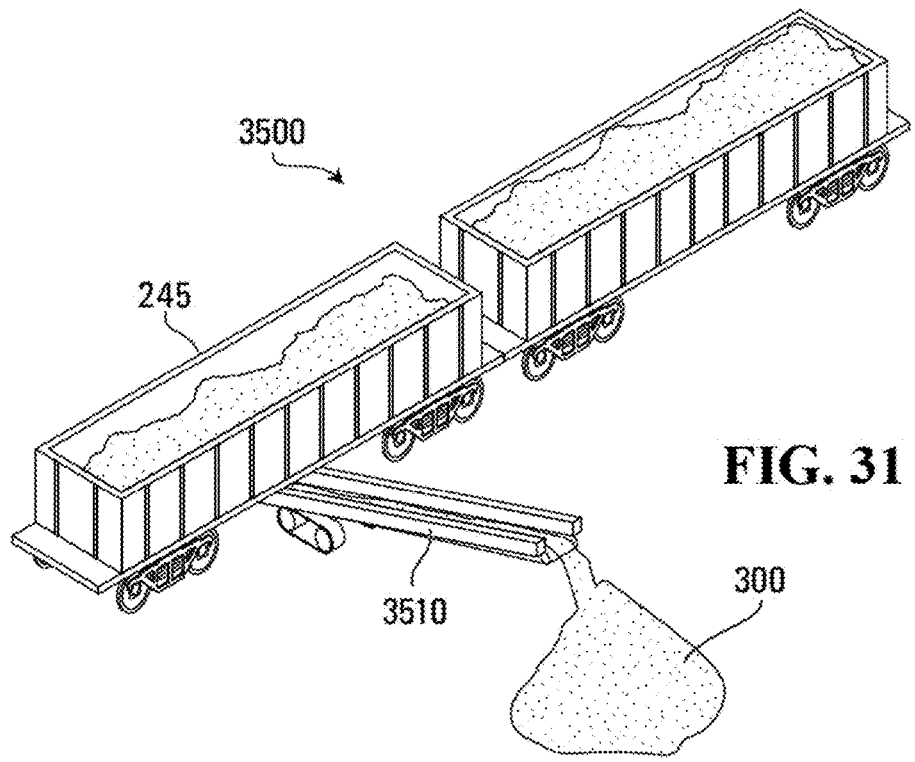
FIG. 31 is a variant of FIG. 30.

FIG. 31 illustrates a variant system 3500 in which the freight railcars 245 are unloaded from the bottom by using a mechanized conveyor system 3510. The railcars 245 are equipped at the bottom with discharge gates (not shown in the drawings) that allow discharging the contents of the railcars 245 by gravity. In this example, the discharge gate is located above the end of a mechanized conveyor 3510 that transports the pellets 300 discharged from the gate and accumulates the pellets 300 on a heap. This operation is made possible due to the fact that the pellets 300 can flow in bulk under the effect of gravity; they will not stick to each other or to the equipment, which otherwise would make the flow impossible.

Figure 32:
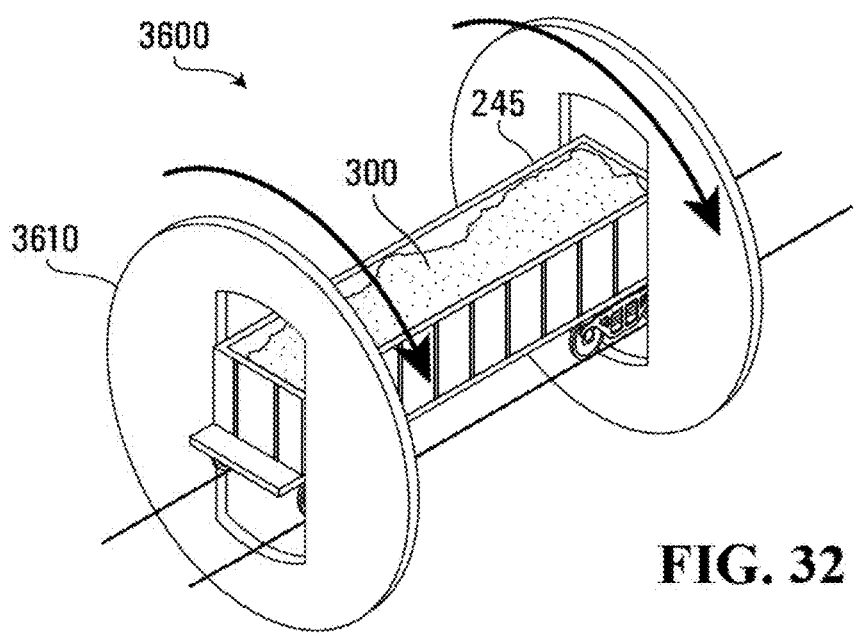
FIG. 32 is another variant of FIG. 30.

FIG. 32 illustrates another option of system 3600 for unloading a freight railcar 245 that also relies on gravity. In this example, the freight railcar 245 is mounted on a rotary structure 3610 that can rotate the car 245 about its longitudinal axis, essentially flipping it over such that its contents flow out through the top and accumulate on a heap. Again, the ability to unload the railcar 245 by flipping it over is made possible by the non-stick/crush resistance properties of the pellets 300, which otherwise would stick to the walls of the railcar 245 and/or would crush when dropped from the railcar onto the heap.

Figure 33:
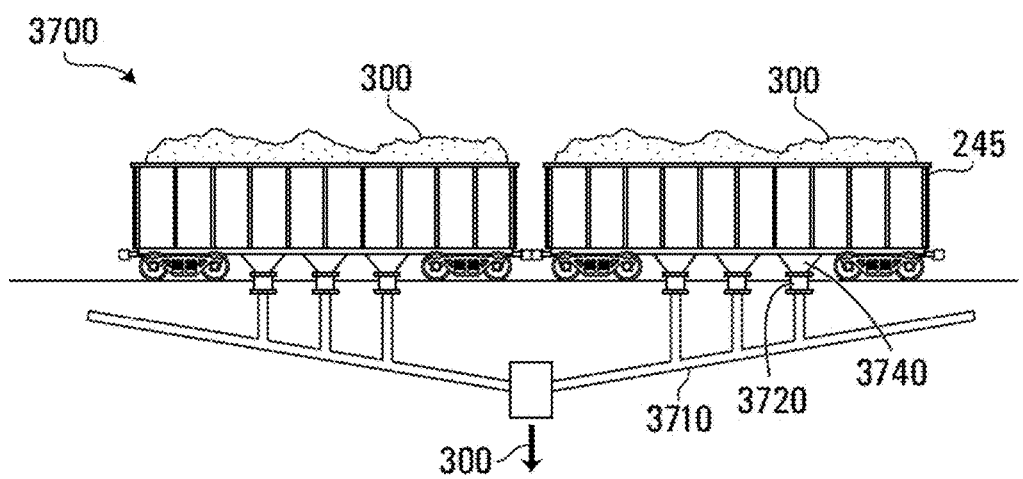
FIG. 33 is yet another variant of FIG. 30.

FIG. 33 illustrates yet another possible method 3700 for unloading the railcars 245 which uses gravity assisted by vacuum. The railcars 245 have discharge gates 3740 which connect to a collection system 3710. The collection system 3710 has a series of inlets 3720 that connect to respective discharge gates 3740 of the railcars 245. Vacuum is created in the collection system 3710 such that the pellets 300 are sucked away from the railcars 245 through the discharge gates 3740. The pellets 300 are ejected from an outlet shown by the arrow. As mentioned above, the ability of the pellets to resist crushing forces and to resist adhering to each other or to the equipment makes this form of handling possible.

Figure 34:
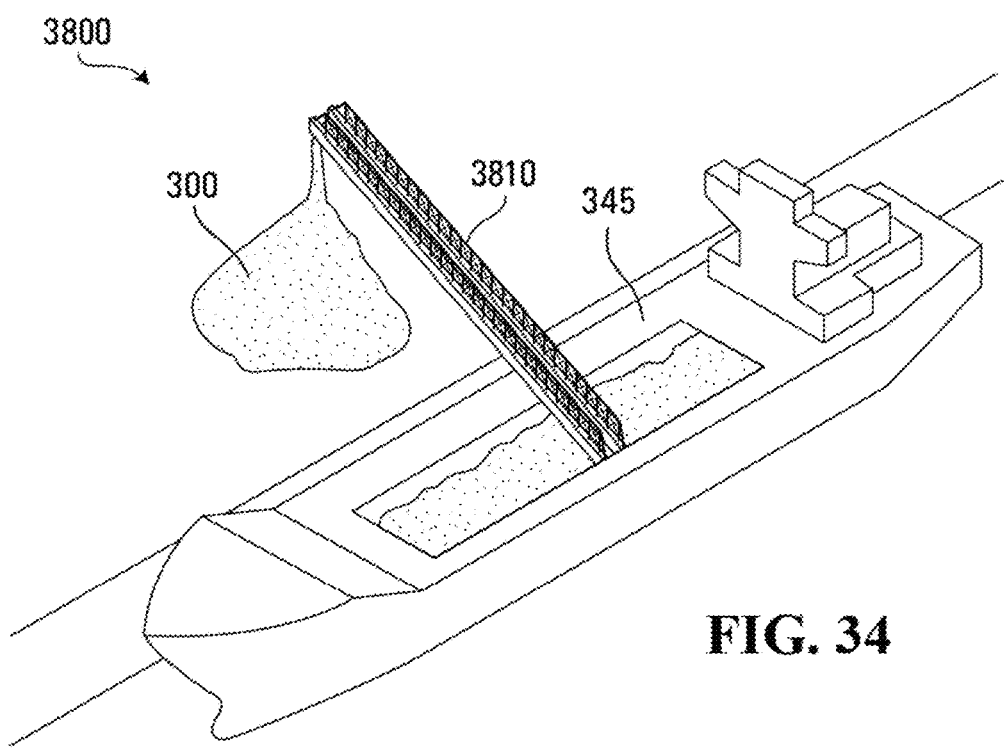
FIG. 34 is yet another variant of FIG. 30.

FIG. 34 illustrates a method 3800 for unloading a freighter 345. The method involves a mechanized conveyor 3810 that reaches into the cargo bay of the freighter 345 to carry the pellets 300 and accumulate them on a heap.

Figure 35:
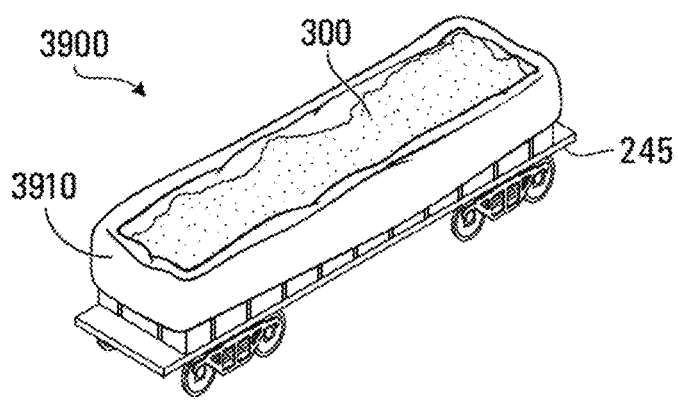
FIG. 35 shows a railcar for transporting bitumen pellets including a protective liner.

FIG. 35 illustrates a variant 3900 for transporting pellets 300 that includes freight railcar 245, which is protected by a liner 3910 to prevent the walls of the railcar 245 from being soiled by bitumen released from the pellets 300. Although the pellets are intended to be crush resistant and non-adherent, some parts of a pellet 300 can chip away exposing the bitumen core that can stick to the walls of the railcar 245. In addition, some dust or loose particles from the pellets 300 will likely accumulate at the bottom of the railcar 245. This is undesirable since the railcar isn't likely to be reserved only for transporting bitumen pellets 300. In most instances, the railcar 245 is likely to be used to carry different commodities, which may be polluted by the bitumen residue. For that reason, a liner 3910 is used that will collect all residue and avoid the necessity of cleaning the railcar 245 after the pellets 300 have been unloaded. Although the installation and the removal of the liner 3910 constitute additional operations, they may be preferred over the necessity to clean the railcar walls.

Figure 36:
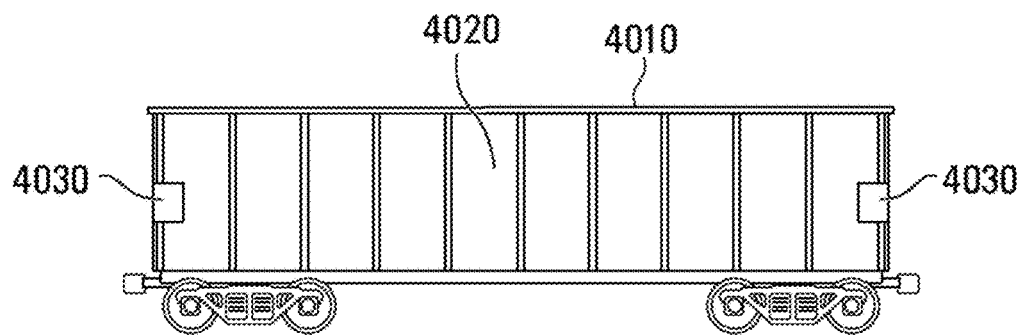
FIG. 36 shows a railcar for transporting solidified bitumen pellets with a temperature monitoring system.

FIG. 36 illustrates schematically a railcar 4010, which is provided with a temperature sensing system to identify potentially hazardous conditions during which the bitumen pellets might be exposed to high temperatures and may start liquefying. Although these situations are unlikely to occur in practice due to the large temperature range at which the pellets remain solid, there may be some applications where such warning system is useful. For instance, as discussed earlier it is possible to reduce the amount of additive added to the bitumen in instances where the bitumen pellets will be transported at very low temperatures, such as during wintertime. When the pellets will remain at a low temperature less additive is needed since the low temperatures will keep the bitumen/additive mixture highly viscous. This option is economically interesting for two reasons. First, less additive is required to pelletize the bitumen. Second, less energy is required to recover the bitumen before refining it since less additive needs to be brought to its melting temperature.

However, if low temperature is being relied upon to maintain the pellets in solid form, there may be instances during which the train crew may not be able to fully control the temperature; the temperature may increase sufficiently during an unexpectedly warm weather to soften the pellets enough such that they start sticking to each other or to the walls of the equipment.

The temperature sensing system 4030 includes one or more temperature sensing probes that sense the temperature inside the cargo area 4020 of the railcar 4010. If the temperature exceeds a threshold, the temperature sensing system 4030 sounds an alarm. The alarm can be communicated to the crew of the train, preferably wirelessly or through a wayside detector system, to let them know that the pelletized bitumen is softening. Optionally, the railcar 4010 may include an emergency cooling system, operating on the basis of the refrigeration cycle to cool the cargo area of the railcar 4010 sufficiently and avoid the pellets from melting. While the temperature sensing system 4030 has been shown in the context of sensing the temperature inside the cargo area 4020 of a railcar 4010, it will be understood that the temperature sensing system 4030 can also be implemented in the context of sensing the temperature inside the cargo area of a maritime vessel or of a truck.

Figure 37:
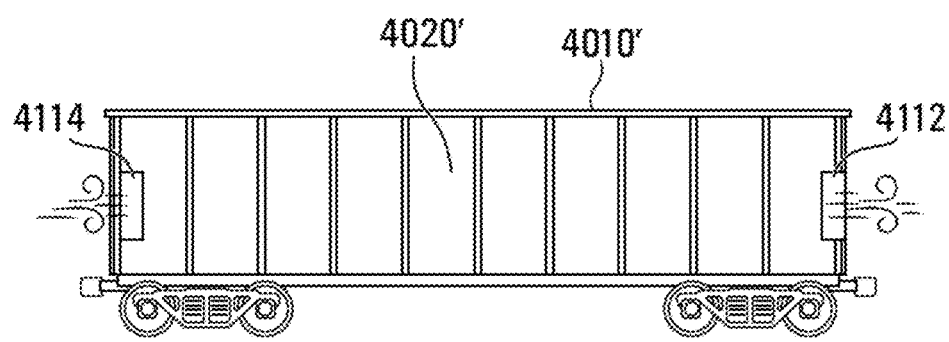
FIG. 37 shows a railcar for transporting bitumen pellets with a cooling system to cool the railcar.

FIG. 37 illustrates a variant of a cooling system, which is simpler and is based on airflow. The railcar 4010' includes vents 4114 and 4112 that can create an airflow through the cargo area 4020' such as to lower the temperature of the cargo area when the train is in motion. Note that the vents 4114 and 4112 should be made small enough to avoid the pellets from flying out on the vents. One option is to provide the vents with a screen that will permit airflow but will block the egress of the pellets. Again, a similar cooling system can be adapted for implementing in the cargo area of a maritime vessel or of a truck.

EXAMPLES

Details of specific practical implementation of the present disclosure will be further described in the following examples.

In the following examples, there are described experimental studies to determine the impact of addition of a polymer on the properties of bitumen, assess the separation efficiency of polymer from bitumen at elevated temperature, quantify the entrained bitumen in polymer upon gravity separation at elevated temperature, and evaluate the quality of the bitumen separated from the polymer phase.

1. Materials

The materials used in the following experimental studies are detailed in Table 1 below:

TABLE 1

| Material | Source |
| --- | --- |
| Naphthalene | |
| Paraffin Wax | |
| Polyethylene Wax | |
| Beeswax | |
| Polyethylene Glycol Wax | |
| Soap | |
| Polycaprolactone | |
| Polyethylene-co-vinyl Acetate (PEVA) | |
| Polypropylene (PP) | |
| LDPE | Glad Plastic Wrap |
| LDPE | DOW 959S |
| Thermoplatic Poly Olefin | DOW 8402 |
| LLDPE | DOW DNDB1077 |
| HDPE | — |
| Bitumen | Fort McKay |
| Toluene | Fisher, Reagent Grade |

Where LDPE means "Low-density polyethylene", TPO means "thermoplastic polyolefin", LLDPE means "Linear low-density polyethylene" and HDPE means "High-density polyethylene". Bitumen is typical cleaned bitumen from SAGD operation, and having an initial boiling point of about 200° C. The toluene used had >99% purity.

Out of the above listed materials, PEVA and PP both performed relatively well in providing structural strength to bitumen when used as an additive compound. Optimization of their performance as additive compound in the herein described solidification process may be performed by proper selection of polymer grades, e.g., in case of PEVA: the vinyl acetate content for lower adsorption capacity and in case of PP: a grade with a higher plasticizer content for higher impact resistance.

Various grades of polyethylene (PE) demonstrated all the main properties identified for a desirable additive for the reversible solidification of bitumen. They showed adequate compatibility with bitumen and consistently increase the viscosity of bitumen upon addition and the PE/bitumen mixtures showed solid-like behavior at room temperature at a high enough level of polymer content. Despite the adequate miscibility of PE/bitumen mixtures, even at low polymer contents, such mixtures readily separated into two phases in a matter of minutes once heated to >100° C. and left undisturbed. Overall, polyethylene such as LDPE, LLDPE and HDPE showed low cost, low solubility, good structural strength, good separation, and relatively low melting point.

2. Methods 2.1. Solubility of Polymer in Bitumen and in Organic Solvents

Solubility of polymer LDPE was first tested in organic solvents toluene and n-decane.

In order to test the solubility of polymer in toluene at room temperature, 0.020 g of low-density polyethylene (LDPE) was added to 200 g of toluene (0.01 wt. % LDPE in toluene) and the mixture was heated to 80° C. to solubilize a fraction of the polymer in the solvent. Once the mixture was cooled to room temperature the liquid phase turned milky indicating that a fraction of the solubilized polymer had precipitated. Therefore, the solubility of LDPE in toluene at room temperature was determined to be lower than 0.01 wt. %.

A similar procedure was followed to determine the solubility of LDPE in n-decane. 0.01 wt. % LDPE (in pellet form) was added to n-decane and the mixture was heated to >100° C. before a significant decrease in the size of the pellet was observed (indicating dissolution of the pellet in the solvent). The mixture turned turbid as it cooled to below 80° C. indicating precipitation of polymer and a solubility less than 0.01 wt. %.

Solubility of LDPE was then Tested in Bitumen.

To determine the solubility of LDPE in bitumen at 150° C., 20 g of polymer was added to 80 g of bitumen (20 wt. %) and the mixture was heated to 150° C. and held at that temperature for 2 h. The bitumen phase was then drained and analyzed for polymer content using the method described in the next section. The concentration of LDPE polymer in the bitumen phase obtained at 150° C. was <0.03 wt. %. This indicates a very low solubility of LDPE in bitumen at the elevated temperatures tested for efficient mixing of polymer and bitumen.

2.2. Analysis of the Polymer Content in Bitumen/Polymer Mixtures

To quantitate polymer content in bitumen/polymer mixtures, a series of polymer/bitumen mixtures with known polymer content were prepared. Each sample was then solvent-extracted using toluene. Briefly, the polymer/bitumen mixture was mixed with toluene at a ratio of 1:5-1:10 (mass sample:mass toluene, where the ratio of added toluene was higher for samples with higher polymer content) and filtered using a 0.2 μmm (nominal pore size) filter. The amount of polymer recovered after drying in the fume hood for 24 h was quantitated and compared to the amount of polymer used to prepare the sample. The results are provided in Table 2:

TABLE 2

| | Polymer Content | | Deviation |
| --- | --- | --- | --- |
| Sample # | In Prepared Sample | From Analysis | % |
| 1 | 0.50% | 0.58% | 16.0 |
| 2 | 1.0% | 1.08% | 8.0 |
| 3 | 1.0% | 1.05% | 5.0 |
| 4 | 16.6% | 16.3% | −1.8 |
| 5 | 40% | 41.4% | 3.5 |
| 6 | 40% | 43.8% | 9.5 |

As shown in table 2, the estimated polymer contents are in most cases within 10% of the original value. The polymer contents appear to be consistently overestimated, as expected, because some of the entrained bitumen could not be accessed by the solvent at room temperature. The entrained bitumen in the polymer phase would cause a positive error in the polymer content estimated based on the total weight of the separated polymer phase. Nevertheless, the obtained results indicate the adequacy of the developed method for estimating the polymer content in bitumen/polymer for the purpose of this study.

2.3. Analysis of the Bitumen/Polymer Mixture

Samples prepared for demonstration and characterization purposes were subjected to compression and impact to demonstrate the possibility of producing solidified bitumen samples with reasonable levels of durability using polyethylene as an additive and/or shell material.

Quantitative assessment of some non-mechanical properties relevant to transportation of bitumen as a solid was performed. The analyses performed include: determination of the impact of polymer addition on the flash point of bitumen, and determination of the impact of polymer content on the viscosity of the mixture with 0.5 wt. % polymer addition. The viscosity measurements demonstrated the decrease in the mobility of the material upon addition of small quantities of polymer, which is of particular interest for pellets with thicker shells.

2.4. Preparation and Separation of Polymer/Bitumen Mixtures

The samples were prepared by mixing a premeasured amount of polymer (in most cases in the form of beads) with 100-150 g of bitumen in a 250 ml glass jar at an elevated temperature. To minimize the loss of lighter hydrocarbons vaporized during the heating and cooling cycles, the glass jar was covered by a lid equipped with tight hole for insertion of the mixer shaft and the thermocouple. The mixture was heated to 140-145° C. on a hot plate while mixing at 250 rpm and held at that temperature for 15-30 min until the polymer beads (or pieces) would not be visible on the top once the mixing was stopped for 10-15 seconds. Subsequently, the heating was stopped and the mixture was then cooled to about 80° C. while mixing at 80 rpm for sampling.

In order to assess the effectiveness of gravity settling for separation of the polymer from the bitumen, the prepared mixture was transferred to a capped separator funnel and heated in an oven at a set temperature for a period of time of from 30 min to 1 hr. The polymer phase samples were scraped from the top phase of the funnel upon cooling to about 80° C. and the separated bitumen samples were obtained from the bottom of the funnel through the sampling valve. For enhanced separation using a screen, a special sealed set-up was designed and fabricated. The system consisted of two glass jars that were sealed together with an internally threaded cylinder and Teflon gasket system that could allow placing a steel mesh disc between the jars. The bitumen/polymer mixture was added to one of the jars prior to assembly. The sealed unit was then placed in an oven and inverted in order to pass the liquid bitumen through the mesh while leaving the separated polymer behind.

2.5 Analysis of the Separated Bitumen

The following analyses were performed on both the original bitumen and the bitumen obtained after polymer separation to determine the impact of residual polymer and the separation process on the quality of bitumen.

| Test Method | Parameter |
|---|---|
| ASTM D3828, Procedure B | Flash Point |
| ASTM D445 | Kinematic Viscosity (cSt) @ 25° C. |
|  | Kinematic Viscosity (cSt) @ 50° C. |
|  | Kinematic Viscosity (cSt) @ 149° C. |
| ASTM D4807 | Sediment In Crude (Filtration), ppm |
| ASTM D5002 | API Gravity, ° API @ 15° C. |
|  | Relative Density @ 15° C. |
|  | Absolute Density @ 15° C, kg/m3 |
| ASTM D5853 | Pour Point, ° C./° F. |
| ASTM D6304 | Water content, mass % |
| ASTM D664M | Total Acid Number, mgKOH/g |
| ASTM D7169 | Simulated Distillation (° C.), mass % off |
| GL-59 | Asphaltenes, C5 Insolubles, mass % |

Furthermore, the boiling point distribution of the bitumen entrained in the polymer phase after gravity separation was also analyzed to determine whether certain fractions of bitumen were preferentially sorbed by the polymer phase.

3. Results 3.1. Effect of Polymer Addition on the Viscosity of Bitumen

The viscosity (at 25° C. and 50° C.) of original bitumen and bitumen/LDPE mixtures is reported in Table 3. Addition of 2 wt. % polymer (on bitumen basis) to the bitumen increases the viscosity by ~60% while adding 5 wt. % polymer more than doubles the viscosity. The mixture also shows some non-Newtonian behaviour and has a higher viscosity at lower shear rates. The product has the appearance of a paste with significantly decreased mobility compared to the original bitumen. The viscosity of bitumen and bitumen/polymer mixtures at 25° C. and 50° C. is shown in Table 3.

TABLE 3

| LDPE Content | Viscosity, cP | | % Increase in Viscosity over original Bitumen | |
|---|---|---|---|---|
|  | 25° C. | 50° C. | 25° C. | 50° C. |
| 0 | 201600 | 8836 | — | — |
| 2 wt. % | 335300 | 13900 | 66% | 57% |
| 5 wt. % | 469100 | 20220 | 133% | 129% |

The high intrinsic viscosity of bitumen limits the tendency of this material to spread upon spillage or release. Emulsifying a small amount of polymer in bitumen further reduces the mobility of this material limiting the risks involved in possible release of the material to the surrounding environment in the case of an accident. It is noteworthy that the increase in the viscosity caused by addition of 2-5 wt. % of polymer is almost an order of magnitude larger than the expected increase from emulsification of an inert material in oil indicating strong interactions between bitumen and emulsified polymer droplets.

3.2. Effect of Polymer Addition on the Flash Point of Bitumen

The flash point of the original bitumen and bitumen/ LDPE mixture was measured using ASTM D3828 in order to determine if the addition of polymer would have an effect on the dangerous goods classification of the product.

Under Part 2 of the Transportation of Dangerous Goods (TDG) regulations of Canada, a flammable liquid is defined as a liquid that has a flashpoint less than or equal to 60° C. (using a closed cup method) or is expected to be at a temperature greater than or equal to its flash point at any time while in transport. Flammable liquids are assigned to one of the following packing groups for the purpose of transportation based on thresholds for initial boiling point (IBP) and flashpoint (FP):

a) Packing Group I: initial boiling point of 35° C. or less at an absolute pressure of 101.3 kPa and any flash point;
b) Packing Group II: initial boiling point greater than 35° C. at an absolute pressure of 101.3 kPa and a flash point less than 23° C.; or
c) Packing Group III: if the criteria for inclusion in Packing Group I or II are not met.

The results of the flashpoint test are reported in Table 4.

| Sample | Flash Point (° C.), ASTM D3828, Procedure B |
|---|---|
| Bitumen | 141.5 |
| Bitumen + 5 wt. % LDPE | 147.5 |

Both the bitumen and the bitumen/LDPE mixtures have a flashpoint >60°; thus, neither product would be classified as a flammable liquid. It is to be noted that addition of LDPE polymer to bitumen increases the flash point of the mixture of bitumen/polymer relative to that one of the bitumen without addition of polymer by at least 4%.

4. Separation of Polymer and Bitumen

For removal of the polymer from bitumen, the mixture was heated and the phases were allowed to separate under gravity, allowing the mixture to split into a polymer rich phase on top and a bitumen rich phase at the bottom. Once the mixture turned fluid at a temperature higher than 100° C., the polymer almost immediately creamed to the top of the liquid as a result of its lower density.

However, depending on the shear used for the initial mixing of the polymer and the bitumen, 0.5-1.5 wt. % of polymer may remain in the bitumen phase after 30 minutes of settling.

Figure 38:
FIG. 38 shows a microscopic image of the cross section of the bottom phase of a 5% polymer in bitumen mixture after 30 minutes of settling at 100° C.

FIG. 38 shows a microscopic image of the cross section of the bottom phase of a mixture comprising 5 wt. % polymer (LDPE) in bitumen after 30 minutes of settling at 100° C. The bitumen rich phase in the image contains 1.5 wt. % LDPE. As shown in the image, almost all the polymer droplets that remain suspended in the bitumen have a diameter of less than 20 μm as a result of high shear mixing. For a droplet that small to separate effectively under gravity the required time is in the order of several hours.

In order to decrease the time required for polymer/bitumen separation and the content of residual polymer in the bitumen phase, either dispersion of fine polymer droplets needs to be avoided or coalescence of such droplets needs to be induced. Using a polymer with a higher melt viscosity and interfacial tension or mixing at a lower shear for a longer period would avoid dispersion of fine droplets in the bitumen phase. Coalescence of polymer droplets can be enhanced by high shear mixing of the polymer bitumen mixture at moderately elevated temperatures (100-120° C.) prior to gravity separation to increase the probability and energy of droplet collisions. The effectiveness of both of these strategies is reflected in the results reported in Table 5, which shows the polymer content in the bottom (bitumen rich) phase after gravity settling of bitumen/polymer mixtures at elevated temperature. The polymer content in the bitumen phase was decreased to 0.3-0.5 wt. % by using a low shear rate during mixing and inducing coalescence by high shear mixing at moderate temperatures during the re-melting of the mixture.

TABLE 5

| Sample # | Preparation | Separation | Polymer Before Settling | Content After Settling |
|---|---|---|---|---|
| 1 | Mixed at low shear | at 65° C. on Screen | 10% | 0.51% |
| 2 | Mixed at high shear | High shear mixing: 5 min, 140° C. - 30 min settling* at 100° C. | 5% | 0.26% |
| 3-1 | Mixed at high shear | High shear mixing: 5 min, 110° C. - 45 min settling* at 100° C. | 2% | 0.47% |
| 3-2 | | Same as previous, closer to interface** | | 0.49% |
| 4 | Wrapped in a 0.5 mil LDPE film | Heated to 130° C. to melt polymer and sampled | 3% | 0.31% |

*Settling was performed in a separatory funnel and the samples were obtained by drainage from the bottom of the funnel at the end of the settling time.
**Sampled obtained from a higher position in the separatory funnel closer to the top phase.

As mentioned earlier, the polymer creams to the top of the mixture at elevated temperature. The polymer content of the creamed phase upon gravity separation is tabulated in Table 6. Sample #1 was collected directly from the top of the creamed phase upon gravity separation and has a polymer content of <30%. However, when the collected polymer phase is transferred to a separate jar to continue separation at the same temperature the bitumen can drain more effectively from the polymer phase to reach a polymer content of about 40%. Drainage through a screen can further decrease the bitumen content and produce a mixture with more than 50% polymer. The best results were obtained when the top polymer rich phase was collected and heated to a high enough temperature to melt the polymer and decrease the viscosity of the polymer phase to release as much of the entrained bitumen as possible. This is the case for sample #5 which was separated at 150° C. and produced a separate polymer with less than ⅓ bitumen.

TABLE 6

| Sample # | Separation Temperature (° C.) | Gravity Settling Time | Draining on a screen | Polymer Content in creamed top phase | |
|---|---|---|---|---|---|
| | | | | Before Settling | After Settling |
| 1 | 100 | 60 min | No | 5% | 27.9% |
| 2 | 100 | 30 min + 30 min for polymer phase | No | 10% | 38.1% |
| 3 | 90 | 30 min | 30 min | 3% | 58.8% |
| 4 | 115 | 30 min | 30 min | 5% | 58.6% |
| 5* | 150 | 30 min + 30 min for polymer phase | No | 10% | 67.8% |

*For Sample #5 the original mixture was heated to 100° C. and separated by gravity settling for 30 min. The top phase (polymer rich) was then collected and left in a separate container at 150° C. for 30 min before sampling of the top phase.

Washing of these bitumen contaminated polymer samples with toluene was shown to decrease the bitumen content of the polymer phase to <10-20%.

To summarize, the amount of bitumen entrained in the polymer after gravity separation only, can be lowered to about 30 wt. % of the mixture (30 g of bitumen in 70 g of polymer). The reported bitumen content is for the phase produced by separation of emulsified polymer droplets. The level of entrainment would be significantly lower for the shredded shell material not heated to above the melting point of the polymer. If the polymer phase is recycled in the process, the overall loss of bitumen in this process can be <1% depending on the rate of polymer addition and the fresh bitumen requirement.

Despite containing some bitumen, the separated polymer shows satisfactory structural strength and does not have the tendency to stick to surfaces upon cooling to room temperature and may therefore be formed into beads or pellets and recycled to be used again in a similar process.

Testing has shown that entrainment of some bitumen in the polymer phase does not have a measurable impact on the properties and quality of the separated bitumen, i.e. preferential sorption of certain components of bitumen by the polymer is insignificant. The polymer separated may be rinsed or mixed with a hydrocarbon solvent to remove the extra bitumen. If the polymer is washed, it needs to be dried at elevated temperature to recover the solvent prior to preparing the polymer for recycling (i.e., in the form of pellets/beads/shredded pieces) or local sale. The solvent in the bitumen washed off of the polymer is recovered and the dried bitumen can be added to the final bitumen product. If the final product is diluted bitumen (e.g., bitumen with the addition of 30% solvent, which is the product most commonly delivered to refineries) and the diluent is used for washing, there is no need to recover the solvent from the bitumen.

Finally, the bitumen rich phase obtained by shearing the polyethylene/bitumen mixture at a temperature of from 100° C. to 120° C. and gravity separation at 100° C. for 1 h contained ~0.3 wt. % polymer. Therefore, the loss of polymer in the process is <5%. Upon dilution and filtration the polymer content in the bitumen may be decreased to <0.1 wt. %.

4.1. Enhancement of the Gravity Separation

The solubility of LDPE polymer in bitumen at 150° C. is <0.03 wt. %. Therefore, the theoretical minimum polymer content in the bitumen achievable by gravity separation at elevated temperatures is more than one order or magnitude lower than that obtained in this study. Effective removal polymer from the bitumen is impeded by dispersion and emulsification of fine droplets during the mixing process. Coalescence of these fine droplets would produce larger droplets that separate more rapidly an efficiently. Increasing the likelihood of droplet collision and the energy of the colliding droplets are the most common strategies for inducing coalescence in emulsions. The energy intensity of the collisions may be increased by applying shear forces (through mixing) or by application of vortex and enhanced gravity (in a cyclone or centrifugal separator). The likelihood of droplet collision may be increased by sending the emulsion through narrow channels and immobilizing emulsion droplets by absorption on a provided surface. Using packing for inducing droplet coalescence is a well-established method commonly used in the chemical and petroleum industries.

In order to test the viability of inducing coalescence in dilute polymer/bitumen mixtures a 0.5 wt. % polymer in bitumen emulsion was prepared and sent through a simulated packing structure at 120° C.

The two connected jar system described earlier was used for this experiment and the packing material was simulated by rolling a sheet of 100 mesh screen into a cylinder and securing it between the two Teflon insert between the two jars. The liquid in the top jar containing 100 ml of 0.5% LDPE in bitumen would pass through the rolled mesh packing once the system was placed in an oven at 120° C. The jar was rotated 3 times to allow for 3 passes of the liquid through the packing in the span of 30 min.

Figure 40A:
FIGS. 40A and 40B show microscopic images of emulsified polymer droplets (lighter color) in bitumen (darker background) at a polymer content of 0.5 wt. % as prepared sample (FIG. 40A), and sample after passing through the rolled screen packing at 120° C.
Figure 40B:
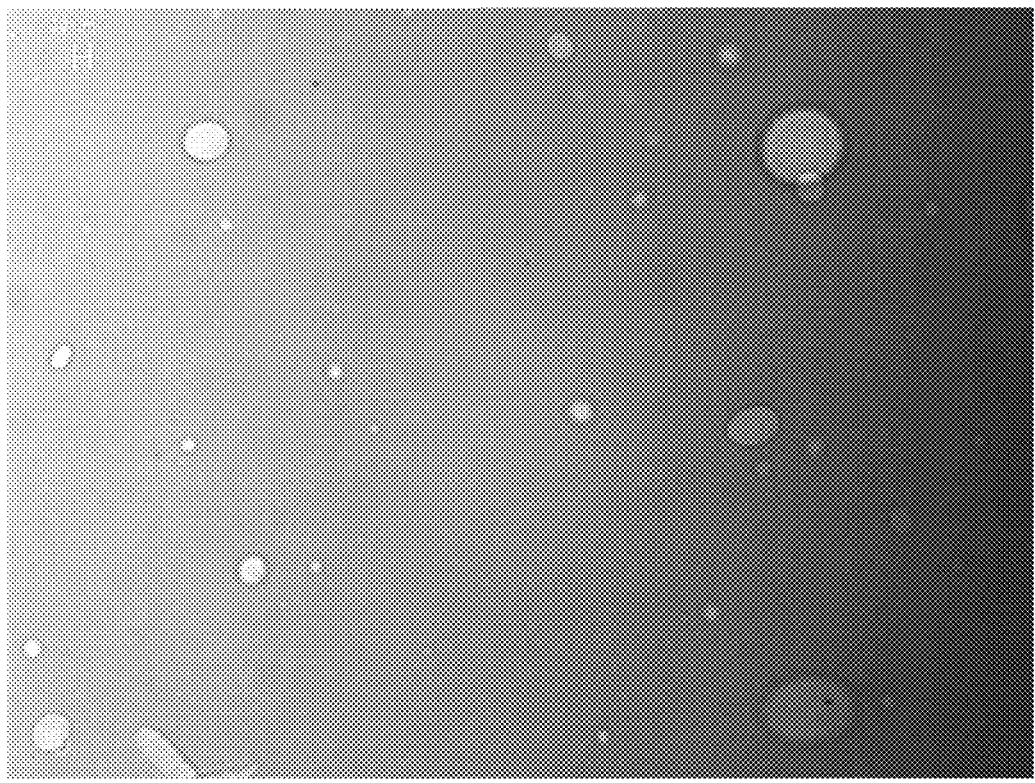

Microscopic images were obtained from the original sample after preparation and the sample obtained after passing through the packing at 120° C. The images are shown in FIG. 40A and FIG. 40B, respectively. Almost all the emulsified polymer droplets in the original sample had a diameter of less than 10 μm. On the other hand, the droplets sizes increased dramatically upon passing through the fine channels produced by the steel filaments of the rolled mesh reaching diameter size of more than about 10 μm, for example a diameter size of up to about 50 or more. These results confirm the viability of achieving high levels of polymer removal by addition of coalescence inducing packings to the gravity separation vessel used for polymer/bitumen separation.

4.2. Properties of Separated Materials

Figure 41:
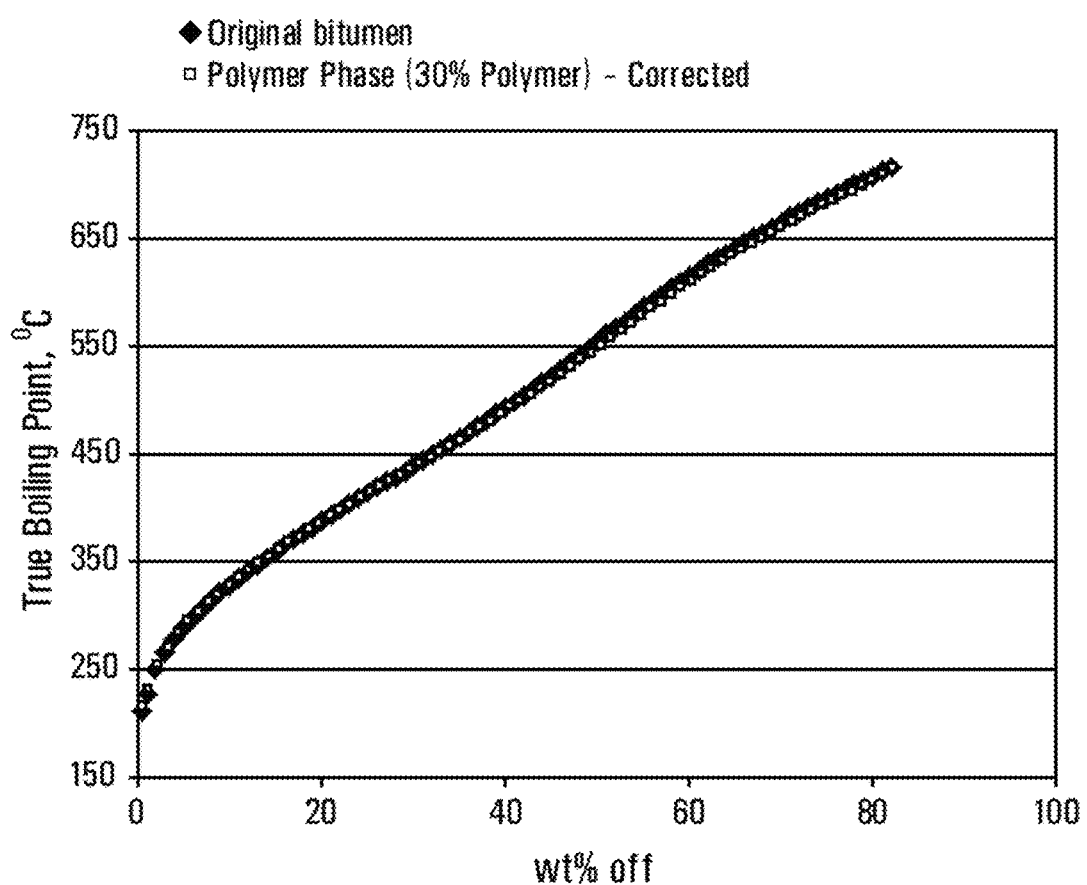
FIG. 41 shows a graph plotting the boiling point distribution of the original bitumen and polymer phase (30 wt. % polymer)—corrected.

The polymer-rich phase collected after a single stage of gravity settling contained 60-70% bitumen. The bitumen entrained in the polymer phase after gravity separation was analyzed to determine whether certain fractions of bitumen were preferentially sorbed by the polymer phase. This would have significant ramifications as possible preferential sorption of the lighter fraction of bitumen onto the polymer would diminish the quality of the separated bitumen product which would be depleted of lighter compounds. The boiling point distribution of the extracted bitumen (by carbon disulfide) and the original bitumen are plotted and compared in FIG. 41. The boiling point data for the extracted bitumen was corrected for the residual polymer content. As shown in FIG. 41, there is no significant difference in the boiling point distribution of the two samples indicating that preferential sorption of certain components of bitumen by the polymer is in fact insignificant.

The separated bitumen phase, containing 0.4-0.5 wt. % residual polymer, and the original bitumen were subjected to a host of analysis to determine the impact of undergoing the solidification and subsequent melting and separation process on the properties of the recovered bitumen. The test methods used are listed in the following Table:

TABLE 7

| Test Method | Parameter | Unit | Original Bitumen | Recovered Bitumen |
|---|---|---|---|---|
| ASTM D445 at 149° C. | Kinematic Viscosity | mm2/s (cSt) | 34.31 | 38.52 |
| ASTM D445 at 25° C. | Kinematic Viscosity | mm2/s (cSt) | 211800 | 267800 |
| ASTM D445 at 50° C. | Kinematic Viscosity | mm2/s (cSt) | 8752 | 11020 |
| ASTM D4807 | Sediment | Mass % | 0.025 | 8.39E−02 |
| ASTM D5002M | Density | kg/m3 | 1013 | 1013 |
| ASTM D5002M | Measurement Temperature | ° C. | 15.0 | 15 |
| ASTM D6304 | Water Content (mass %) | % | 0.070 | 0.038 |
| ASTM D664 - CCQTA Modified | Acid Number | mg KOH/g | 3.49 | 4.11 |
| ASTMD664 - CCQTA Modified | Type of End Point | | Inflection | Inflection |
| ASTMD7169 | Simulated Distillation | | Figure 41 | Figure 41 |
| ASTMD97 | Pour Point | ° C. | 17 | 18 |
| GL-59 | Pentane Insolubles Asphaltene Content | Mass % | 15.6 | 16.4 |

Figure 39:
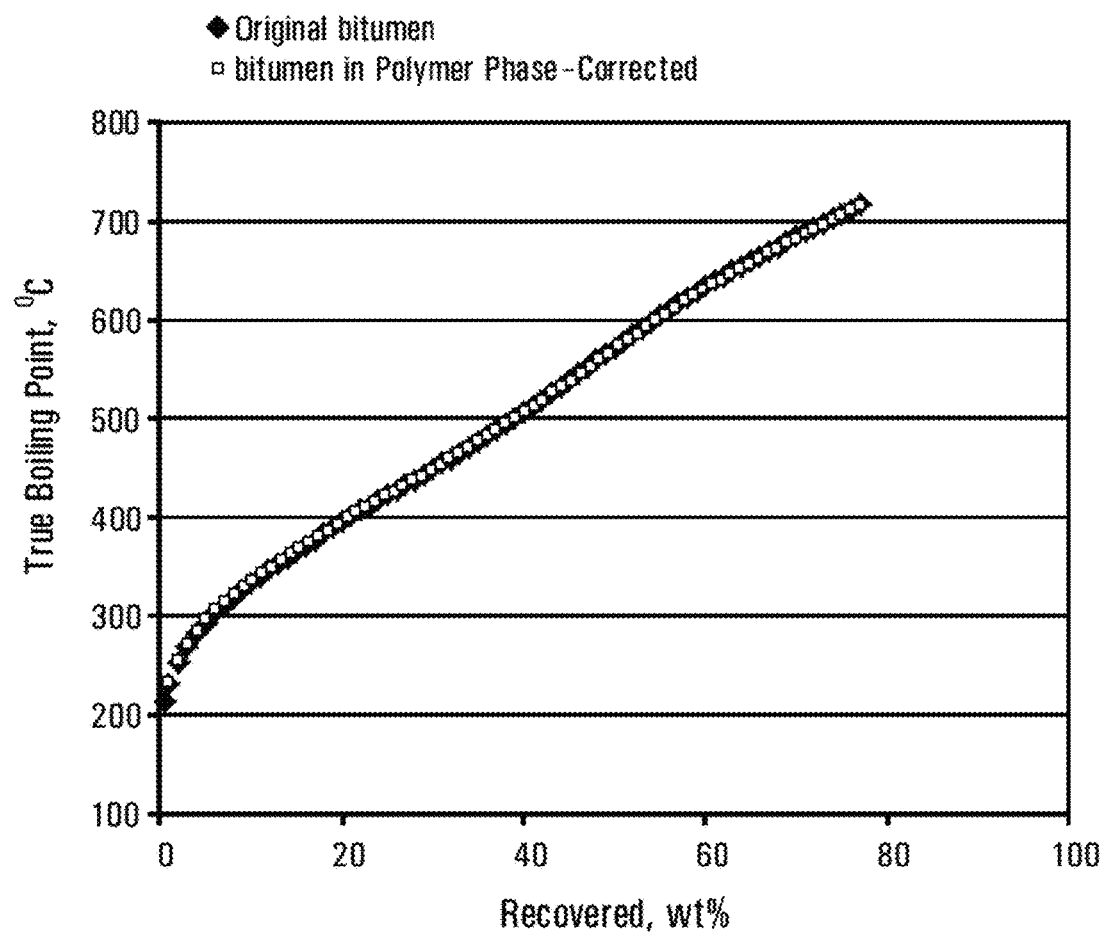
FIG. 39 shows a graph plotting the boiling point distribution of the original bitumen and bitumen in polymer phase—corrected.

The viscosity, density, sediment and water content, total acid number (TAN), boiling point distribution, pour point (the minimum temperature at which oil flows), and asphaltene content of the original bitumen and the final product are reported in Table 7 and FIG. 39. The 20-25% increase in the viscosity of bitumen as a result of undergoing the process is caused by the possible loss of a small fraction of the lighter components during the heating and transfer of bitumen, possible oxidation as a result of exposure of hot bitumen to air, as well as the presence of the residual polymer. This increase in viscosity is well within the variation range of the viscosity of the bitumen produced from the same site and is not expected to have a measurable impact on the product value.

The boiling point distribution of the bitumen recovered from the polymer phase (extracted by carbon disulfide) and the original bitumen are plotted and compared in FIG. 39. The boiling point data for the extracted bitumen was corrected for the residual polymer content. As shown in FIG. 39, there is no significant difference in the boiling point distribution of the two samples indicating that preferential sorption of certain components of bitumen by the polymer is insignificant.

Similarly, the change in the density and pour point of the bitumen upon processing is also negligible. Despite the similarity of the method used for determining the residual polymer content and the sediment content, only a fraction (<0.1%) of the residual polymer (measured at 0.4%) of the recovered bitumen was accounted for in the sediment fraction. The apparent increase in the asphaltene content by 0.8% shows that the remainder of the residual polymer most likely precipitated with asphaltenes (the discrepancy in the values. Based on these results asphaltene precipitation may be considered as a potential method for removal of the residual polymer from the bitumen phase. The increase in the total acid number shown in Table 7 is unexpected as LDPE should not contain any organic acid compounds. Without being bound by any theory, it is believed that this increase may be caused by possible oxidation of a small fraction of hot bitumen by the residual air trapped in the mixing and separation jars.

As shown in FIG. 39, the boiling point distribution of bitumen recovered from the polymer phase is almost identical to that of the original bitumen confirming the conclusion drawn from the results shown in FIG. 41 that the separated polymer phase does not retain a certain fraction of the bitumen. These results demonstrate the potential of the devised process in reversing the impact of bitumen solidification by polymer addition with little impact on the quality of the feed material.

5. Rate of Addition of Polymer

The rate of polymer addition to bitumen to produce a solid material with the required properties depend on the properties of bitumen and the polymer.

When wrapping the surface of the pellets produced by adding polymer to the bitumen with a polymer film, one can use low density polyethylene (LDPE). LDPE has a tensile strength (yield) of 1500-2000 psi and a tensile elongation at break of >300%, therefore, a very thin wrapping film can easily handle the stress exerted by the bed of solids on the pellet. Wrapping the surface of the pellet with a maximal extent of 2" by 2" (diameter by height) using a 25 μm thick film of polyethylene requires a wrap to filling ratio of <0.3% or <1 lb per bbl (barrel unit).

For an encased pellet, the shell needs to withstand the weight of the column of pellets in the car or the storage bin and the impact of falling from heights. The static pressure at the bottom of a bed of pellets can be calculated using the following equation:

$$P=\rho_{bed}gh$$

Where P is the pressure, g is the gravitational acceleration and h is the height of the bed. Assuming a density of 900 kg/m$^3$ for the bed (10% void space) and a bed height of 5 m, the pressure at the bottom of the bed would be 44 kPa or 6.5 psi. Considering the effect of the movement on the pressure exerted on the material adjacent to the walls and in the middle of the car the pressure exerted on the bottom pellets would be in the range of 10-15 psi. It has been shown that using <10% polymer to encase ~500 g of bitumen showed satisfactory mechanical performance.

Assuming a 75% loss in the yield strength of LDPE as a result of exposure to bitumen and repetitive heating and cooling cycles, and a 50% variation in the wall thickness during processing, the required thickness of the shell for a 2" by 2" cylinder to handle 15 psi of pressure would be 0.018" (<0.5 mm). This wall thickness would give a skin to filling mass ratio of 5%. The ratio would be slightly lower for a 4" by 4" cylinder.

6. Packing Density in a Railcar

Among the various shapes possible for pelletized materials, the theoretical maximum packing density (i.e., minimum void space between the pieces when placed in a container in the most efficient way) of cubes and cuboids are the highest. However, shapes with sharp edges have significantly lower mobility than round shapes. Among the shapes with an adequate level of mobility, spheres have the lowest theoretical packing efficiency with the minimum void volume of 26%.

Figure 42A:
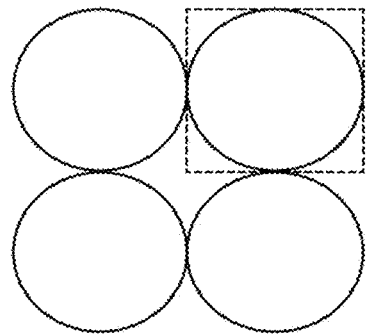
FIG. 42A, FIG. 42B and FIG. 42C each show a schematic diagram of patterns for layers of cylinders set adjacent to one another to illustrate how shapes affect the fill volume of a container.
Figure 42B:
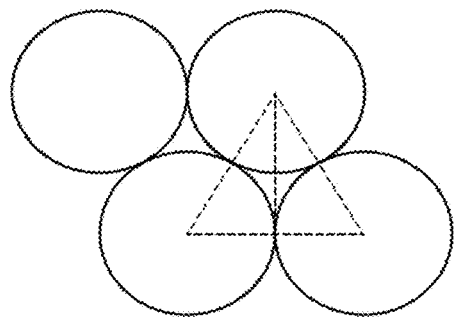
Figure 42C:
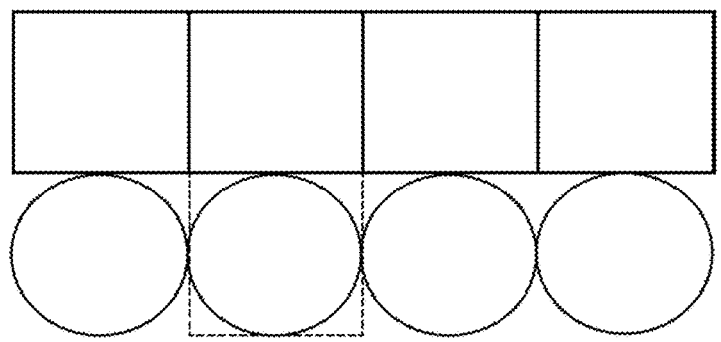

The theoretical maximum density for a system of identical cylinders may be calculated by assessing the void volume in the three possible patterns shown in FIG. 42A, FIG. 42B and FIG. 42C for the configuration of layers of cylinders with equal length and diameters adjacent to one another. The pattern in FIG. 42A is the most inefficient pattern with 25% void space, the void space is 10% for FIG. 42B and 12.5% for FIG. 42C. In practice, the packing efficiencies are significantly lower than the theoretical values, as misalignment of objects during loading of a container will likely significantly increase the void space among the solid pieces.

In the case of rail transport, the movements during filling of the car will likely result in a more or less efficient minimization of the void space caused by misplacing of the pellets. Therefore, the packing efficiency of a bed of pellets in the rail car would be equal to that of "random close packing" of particles. Random close packing is defined as the maximum volume fraction of solid objects obtained when they are packed randomly. This value, which accounts for randomness of the packing caused by the fall of moving particles as well as the impact of shaking or moving the container in minimizing the void space, has been estimated through simulation by many researchers for various shapes of particles.

The packing density of cylinders and similar shapes such as spherocylinders and ellipsoids is a function of their shape factors such as length to diameter ratio. The maximum theoretical values for packing efficiencies (based on literature data) are in the range of 0.7-0.75 (25-30% void space) and the densities are slightly higher for close packed spherocylinders compared to ellipsoids.

Using a packing efficiency of 70% and an overall density of the packaged material with 10-20% LDPE (0.99-1 g/cm$^3$) the weight capacity of a rail car may be calculated from its volumetric capacity. The weight of the bed of pellets filling a rail car with the capacity of 4400 ft$^3$ would be about 86 metric tonnes (about 95 short tons). Therefore, the capacity of the rail cars may be limited by the volume, rather than the space for transportation of pelletized solidified bitumen.

7. Test Procedures 7.1 Angle of Repose

The fluidity and dispersibility of the bitumen pellets can be assessed in the context of unconfined solid piles using the angle of repose as an indicator of the pellets' fluidity. The angle of repose is the angle formed between a horizontal plane and the slope line extending along the face of a pile of material. The angle of repose can be measured by a method that consists of "pouring" the solid bitumen pellets from a funnel onto a flat surface. As the bitumen pellets accumulate, the funnel is raised to avoid interfering with the top of the growing cone of material. The funnel is raised at the rate at which the cone grows such as to maintain the same distance between the lower funnel extremity and the top of the cone. The pouring operation continues until the cone reaches a desired height H. After the pouring operation stops, the pile is left undisturbed for 5 minutes to let the pellets settle. To determine the angle of repose, the width W of the cone base is measured. Since the cone has a circular base, the width would essentially be the diameter of the cone base. To make the test results more consistent and avoid variations due to non-uniform distribution of the pellets at the base of the cone angle, the width is measured at several angular positions about the vertical cone angle and the results averaged to obtain the W measurement. More particularly, a diameter measurement is made at each 20 degrees interval about the vertical axis, which would result into 18 individual measurements, which are then averaged to obtain dimension W. The angle of repose is computed by the following formula:

$$\text{Angle of repose} = \tan^{-1}(2H/W)$$

The entire operation is repeated three times, where at each instance the pellets are re-poured to re-generate the pile completely and the angle of repose re-computed at each instance to obtain three separate measurements, which are then averaged to obtain a final angle of repose value, which is more consistent than a single measurement would be. It is to be understood that the pellets used to measure the angle of repose need to be identical or substantially identical. This is achieved by making the pellets by the same process and also the same equipment.

An angle of repose that is in the range of 20 degrees to 45 degrees has been found advantageous since that angle is produced with pellets that have a morphology providing good fluidity and at the same time sufficient retention on automated handling equipment, such as conveyor belts. Good fluidity is advantageous to allow the pellets to naturally flow by gravity to fill a receptacle, such as a railcar in which the pellets are to be transported to a remote location, or discharged from a receptacle. However, extreme fluidity is not always desirable because it will make the pellets more difficult to carry with a conveyor belt, which occasionally is oriented at an angle in which case the pellets may roll back on the conveyer due to gravity. The inventors have found that an angle of repose in the range of 20 to 45 degrees is a suitable compromise between these two somewhat conflicting requirements. More specifically, at an angle of repose of less than 20°, the pellets are very free-flowing which can result in undesirable slippage when the pellets are conveyed on a belt conveyor at a given angle. At an angle of repose of more than 45°, the pellets become too cohesive for proper handling.

According to a specific and non-limiting example of implementation, the angle of repose in the range of 25 degrees to 40 degrees has been found to be advantageous. More advantageously, the angle of repose is in the range of 30 degrees to 40 degrees.

In principle, the angle of repose is independent of the value H. However, in practice there are certain extreme situations where an angle of repose measurement may not be possible, in particular when the value H is too small in relation to the maximal extent of the pellets. To avoid these situations, the minimal value H at which the above-described test should be applied is 50 times the maximal extent of the pellets. For example, for pellets having a maximal extent of 3 inches the minimal value H at which the angle repose can be computed is of 12.5 feet.

7.2 Burst-Resistance

The burst-resistance test consists of progressively increasing the internal pressure in the shell up to the point at which the pressure will burst the shell. The test procedure relies on ASTM F1140/F1140M and consists of the following:

1. The test specimen is a sealed empty shell identical to the one used for packaging the produced solid bitumen pellets. The specimen is conditioned for 24 hours at a temperature of 20° C. and at a humidity level of 40%.
2. The specimen conditioned at step 1 is tested for burst strength by using a suitable pressure tester, which subjects the pellet to a progressively increasing internal pressure. The pressure level at which the shell bursts is recorded and constitutes the burst pressure of the pellet. An example of a suitable pressure tester is the 2600 seal strength tester and the 1320 closed package test fixture by Cobham. The test fixture includes a needle, which punctures the shell of the pellet to inject air in the shell, while the tester measures the increasing pressure and records the pressure at the moment the shell bursts.

Note that for the purpose of the present description, the above defined test procedure will be referred to as "Burst-resistance test".

According to the invention, the burst pressure is of 0.5 psi or more.

According to the invention, the burst pressure is of 5 psi or more.

According to the invention, the burst pressure is of 10 psi or more.

According to the invention, the burst pressure is of 30 psi or more.

According to the invention, the burst pressure is of 40 psi or more.

According to the invention, the burst pressure is of 50 psi or more.

According to the invention, the burst pressure is of 75 psi or more.

7.3 Crush-Resistance

The crush-resistance test consists of determining the height of a pellet load that a test pellet can support without failing. The test set-up requires providing a horizontal ceramic or concrete support surface, which constitutes an unyielding support. An open bottom test vessel is erected to stand up on the surface. The purpose of the open bottom vessel is to constrain the load of pellets into a vertical column that will create a pressure on multiple test pellets at the very bottom of the column to emulate the inter-pellet physical stresses that arise when the pellets are arranged in a pile, such as in a storage silo, a rail car or in the cargo hull of ship. The test procedure is as follows:

1. 100 pellets to be simultaneously tested (herein referred as "test pellets 300"), which are all made in a single batch or individually but in a sufficiently controlled environment such as to ensure a high degree of uniformity between the pellets are provided.
2. A sufficient quantity of load pellets 300' to create the desired column height in the test vessel is provided. The load pellets 300' are of identical construction to the test pellets 300. To allow distinguishing the test pellets from the load pellets, the load pellets can be tagged with an identification feature. One-way of tagging the test pellets 300 is to incorporate a color in the test pellets 300, namely with the addition of a dye.
3. The test pellets 300 are conditioned for 24 hours at a temperature of 20° C. and at a humidity level of 40%.
4. The test vessel is provided. The dimensions of the test vessel are determined on the basis of the dimensions of the test pellets. The test vessel is cylindrical and its diameter is determined such that it can accommodate a horizontal layer of 100 test pellets.

5. The 100 test pellets 300 are arranged in substantially a single layer, to rest on the support surface at the bottom of the vessel. For pellets, which are not spherical, the test pellets 300 are placed on the support surface in a random orientation such that different sides of the test pellets 300 face up, and thus different sides of the test pellets will be exposed to the loading by the pile of load pellets above. Once the 100 test pellets are put in place, a sufficient quantity of load pellets 300' are poured in the vessel, on top of the test pellets 300 to achieve a column of predetermined height. The set-up remains undisturbed for one hour. The load pellets 300' on top of the test pellets 300 are removed and the test pellets 300 are visually examined individually to assess their structural integrity. Either one of the following conditions denotes a loss of structural integrity of a test pellet:
   a. Damage to the shell that creates a pathway for the bituminous core to escape is considered to be a failure. For instance, a crack in the shell, or missing shell pieces, which expose the core, indicate a failure of the test. Note that other shell damages, even permanent deformations do not indicate a failed test as long as no direct pathway is created for the bituminous material to escape through the shell. Note that for pellet configurations where the shell does not fully encase the bituminous core, as discussed in connection with the impact-resistance test, the opening in the shell made by design is not considered in assessing if the pellet fails or passes the test. Only the shell is observed and if there is a pathway through the shell to the core as a result of the impact, where no pathway previous existed, then that pathway is indicative of a failure.
   b. In the case of shell-less pellets, separation of the pellet into two or more pieces. Note that pieces smaller than 10% of the weight of the original pellet are ignored.
6. Each of the 100 test pellets is classified into respective pass/fail groups based on the visual examination of the pellet. The probability of failure per single pellet is then computed. The probability of failure is computed by dividing the number of pellets that have failed by 100, which is the total number of test pellets.

Note that for the purpose of the present description, the above defined test procedure will be referred to as "Crush-resistance test".

According to the invention, the probability of failure per pellet does not exceed 0.25 when the height of the load of pellets is of 1 meter. For example, in one non-limiting embodiment, the probability of failure per pellet does not exceed 0.20, or does not exceed 0.15, or does not exceed 0.10, when the height of the load of pellets is of 1 meter.

According to the invention, the probability of failure per pellet does not exceed 0.25 when the height of the load of pellets is of 5 meters. For example, in one non-limiting embodiment, the probability of failure per pellet does not exceed 0.20, or does not exceed 0.15, or does not exceed 0.10, when the height of the load of pellets is of 5 meters.

According to the invention, the probability of failure per pellet does not exceed 0.25 when the height of the load of pellets is of 10 meters. For example, in one non-limiting embodiment, the probability of failure per pellet does not exceed 0.20, or does not exceed 0.15, or does not exceed 0.10, when the height of the load of pellets is of 10 meters.

According to the invention, the probability of failure per pellet does not exceed 0.25 when the height of the load of pellets is of 15 meters. For example, in one non-limiting embodiment, the probability of failure per pellet does not exceed 0.20, or does not exceed 0.15, or does not exceed 0.10, when the height of the load of pellets is of 15 meters.

According to the invention, the probability of failure per pellet does not exceed 0.25 when the height of the load of pellets is of 20 meters. For example, in one non-limiting embodiment, the probability of failure per pellet does not exceed 0.20, or does not exceed 0.15, or does not exceed 0.10, when the height of the load of pellets is of 20 meters.

According to the invention, the probability of failure per pellet does not exceed 0.25 when the height of the load of pellets is of 30 meters. For example, in one non-limiting embodiment, the probability of failure per pellet does not exceed 0.20, or does not exceed 0.15, or does not exceed 0.10, when the height of the load of pellets is of 30 meters.

According to the invention, the probability of failure per pellet does not exceed 0.25 when the height of the load of pellets is of 40 meters. For example, in one non-limiting embodiment, the probability of failure per pellet does not exceed 0.20, or does not exceed 0.15, or does not exceed 0.10, when the height of the load of pellets is of 40 meters.

According to the invention, the probability of failure per pellet does not exceed 0.25 when the height of the load of pellets is of 50 meters. For example, in one non-limiting embodiment, the probability of failure per pellet does not exceed 0.20, or does not exceed 0.15, or does not exceed 0.10, when the height of the load of pellets is of 50 meters.

7.4 Impact-Resistance

For pellets that have bituminous core surrounded by an external shell, irrespective of whether the shell fully or partially encloses the pellet core, impact-resistance can be assessed by performing a modified ASTM D5276 test. Generally, the test procedure consists of dropping the pellet from a predetermined height on a hard, horizontal, flat and unyielding surface, such as cement or ceramic. After the drop, the pellet is visually observed, according to established failure criteria to determine if the shell has structurally failed. The details of the test procedure are as follows:
1. 100 pellets, which are all made in a single batch or individually but in a sufficiently controlled environment such as to ensure a high degree of uniformity between the pellets are provided.
2. The pellets conditioned for 24 hours at a temperature of 20° C. and at a humidity level of 40%.
3. The pellets conditioned at step 2 are individually dropped, one by one, against the hard, horizontal surface and inspected to ascertain the effect of the shock. For pellets, which are not spherical, the pellets are randomly oriented before the drop such that the entire population of 100 pellets is subjected to impacts at different locations on the shell. An acceptable procedure is to drop the pellets by hand. Each pellet is held in a random orientation and released carefully to avoid imparting a rotation to the pellet.
4. After the impact, the condition of pellet shell is visually assessed to determine if the shell still retains it structural integrity. Damage to the shell that creates a pathway for the bituminous core to escape is considered to be a failure. For instance, a crack in the shell, or missing shell pieces, which expose the core, indicate a failure of the test. Note that other shell damages, such as scuffing, scratches, deformations such as depressions, do not indicate a failed test as long as no direct pathway is created for the bituminous material to escape through the shell. Note that there may be some pellet configurations where the shell does not fully encase the bituminous core, by design. For instance, the shell may be hard enough and the bituminous core viscous enough such that an opening in the shell may be provided without significant risk of core leakage or oozing out under pressure. With such pellets, the opening in the shell is not considered in assessing if the pellet fails or passes the test. Only the shell is observed and if there is a pathway through the shell to the core as a result of the impact, where no pathway previous existed, then that pathway is indicative of a failure.

5. After the 100 pellets are individually dropped and visually assessed and classified into respective pass/fail groups, the probability of failure per single pellet is determined. The probability of failure is computed by dividing the number of pellets that have failed the test by 100, which is the total number of pellets.

For pellets that have no shell, which surrounds a bituminous core, the test is the same as above, however, different failure criteria are applied. Separation of the pellet into two or more pieces as a result of the impact denotes a failure. Note that pieces smaller than 10% of the weight of the original pellet are ignored.

Note that for the purpose of the present description, the above defined test procedure, whether for pellets with shells or for pellets without a shell, will be referred to as "Impact-resistance test".

According to the invention, the probability of failure per pellet does not exceed 0.25 when the height of the drop is of 1 meter. For example, in one non-limiting embodiment, the probability of failure per pellet does not exceed 0.20, or does not exceed 0.15, or does not exceed 0.10, when the height of the load of pellets is of 1 meter.

According to the invention, the probability of failure per pellet does not exceed 0.25 when the height of the drop is of 5 meters. For example, in one non-limiting embodiment, the probability of failure per pellet does not exceed 0.20, or does not exceed 0.15, or does not exceed 0.10, when the height of the load of pellets is of 5 meters.

According to the invention, the probability of failure per pellet does not exceed 0.25 when the height of the drop is of 10 meters. For example, in one non-limiting embodiment, the probability of failure per pellet does not exceed 0.20, or does not exceed 0.15, or does not exceed 0.10, when the height of the load of pellets is of 10 meters.

According to the invention, the probability of failure per pellet does not exceed 0.25 when the height of the drop is of 15 meters. For example, in one non-limiting embodiment, the probability of failure per pellet does not exceed 0.20, or does not exceed 0.15, or does not exceed 0.10, when the height of the load of pellets is of 15 meters.

According to the invention, the probability of failure per pellet does not exceed 0.25 when the height of the drop is of 20 meters. For example, in one non-limiting embodiment, the probability of failure per pellet does not exceed 0.20, or does not exceed 0.15, or does not exceed 0.10, when the height of the load of pellets is of 20 meters.

According to the invention, the probability of failure per pellet does not exceed 0.25 when the height of the drop is of 30 meters. For example, in one non-limiting embodiment, the probability of failure per pellet does not exceed 0.20, or does not exceed 0.15, or does not exceed 0.10, when the height of the load of pellets is of 30 meters.

According to the invention, the probability of failure per pellet does not exceed 0.25 when the height of the height of the drop is of 40 meters. For example, in one non-limiting embodiment, the probability of failure per pellet does not exceed 0.20, or does not exceed 0.15, or does not exceed 0.10, when the height of the load of pellets is of 40 meters.

According to the invention, the probability of failure per pellet does not exceed 0.25 when the height of the height of the drop is of 50 meters. For example, in one non-limiting embodiment, the probability of failure per pellet does not exceed 0.20, or does not exceed 0.15, or does not exceed 0.10, when the height of the load of pellets is of 50 meters.

Other examples of implementations will become apparent to the reader in view of the teachings of the present description and as such, will not be further described here.

Note that titles or subtitles may be used throughout the present disclosure for convenience of a reader, but in no way these should limit the scope of the invention. Moreover, certain theories may be proposed and disclosed herein; however, in no way they, whether they are right or wrong, should limit the scope of the invention so long as the invention is practiced according to the present disclosure without regard for any particular theory or scheme of action.

All references cited throughout the specification are hereby incorporated by reference in their entirety for all purposes.

It will be understood by those of skill in the art that throughout the present specification, the term "a" used before a term encompasses embodiments containing one or more to what the term refers. It will also be understood by those of skill in the art that throughout the present specification, the term "comprising", which is synonymous with "including," "containing," or "characterized by," is inclusive or open-ended and does not exclude additional, un-recited elements or method steps.

Unless otherwise defined, all technical and scientific terms used herein have the same meaning as commonly understood by one of ordinary skill in the art to which this invention pertains. In the case of conflict, the present document, including definitions will control.

As used in the present disclosure, the terms "around", "about" or "approximately" shall generally mean within the error margin generally accepted in the art. Hence, numerical quantities given herein generally include such error margin such that the terms "around", "about" or "approximately" can be inferred if not expressly stated.

Although various embodiments have been described and illustrated, it will be apparent to those skilled in the art in light of the present description that numerous modifications and variations can be made. The scope of the claims should not be limited by the preferred embodiments set forth in the examples, but should be given the broadest interpretation consistent with the description as a whole. The scope of the invention is defined more particularly in the appended claims.

The invention claimed is:

1. A solid pellet comprising
a core surrounded by a shell,
the core comprising a mixture of crude oil refinery feedstock and a hydrocarbonaceous polymer, the polymer having a melting point temperature of at least 50° C., wherein the crude oil refinery feedstock before being mixed with the polymer to form the mixture is suitable for use as a feedstock to an oil refinery to separate the crude oil refinery feedstock into constituents that can be used as fuels, lubricants and feedstocks in petrochemical processes, the mixture having a first and a second non-miscible phases, the first phase being a crude oil refinery feedstock rich phase and the second phase being a polymer rich phase, the polymer having a solubility in the crude oil such that the crude oil refinery feedstock rich phase maintains compatibility with the oil refinery to allow separation of the crude oil refinery feedstock rich phase into said constituents.

2. The solid pellet according to claim 1, wherein the solubility of the polymer in the crude oil refinery feedstock at 150° C. is less than 5 wt. %.

3. The solid pellet according to claim 1, wherein the solubility of the polymer in the crude oil refinery feedstock at 150° C. is less than 1 wt. %.

4. The solid pellet according to claim 1, wherein the solubility of the polymer in the crude oil refinery feedstock at 150° C. is less than 0.5 wt. %.

5. The solid pellet according to claim 1, wherein the solubility of the polymer in the crude oil refinery feedstock at 150° C. is less than 0.05 wt. %.

6. The solid pellet according to claim 1, wherein the solubility of the polymer in the crude oil refinery feedstock at 150° C. is less than 0.01 wt. %.

7. The solid pellet according to claim 1, wherein the solubility of the polymer in the crude oil refinery feedstock is such that the crude oil refinery feedstock rich phase has a boiling point distribution which does not vary by more than about 5% in degree Celsius compared to the boiling point distribution of the crude oil refinery feedstock before being mixed with the polymer.

8. The solid pellet according to claim 1, wherein the solubility of the polymer in the crude oil refinery feedstock is such that the crude oil refinery feedstock rich phase has a pour point which does not vary by more than about 3° C. compared to the pour point of the crude oil refinery feedstock before being mixed with the polymer.

9. The solid pellet according to claim 1, wherein the solubility of the polymer in the crude oil refinery feedstock is such that the crude oil refinery feedstock rich phase has a flash point which is substantially identical to the flash point of the crude oil refinery feedstock before being mixed with the polymer.

10. The solid pellet according to claim 1, wherein the hydrocarbonaceous polymer has a melting point temperature of less than about 180° C.

11. The solid pellet according to claim 1, wherein the hydrocarbonaceous polymer includes a polyethylene.

12. The solid pellet according to claim 1, wherein the hydrocarbonaceous polymer includes high density polyethylene (HDPE), polypropylene (PP), polyethylene-co-vinyl acetate (PEVA), linear low-density polyethylene (LLDPE), low-density polyethylene (LDPE), or any combinations thereof.

13. The solid pellet according to claim 12, the hydrocarbonaceous polymer being a crossed-linked polymer.

14. The solid pellet according to claim 1, wherein the hydrocarbonaceous polymer is present in the core in a quantity of from about 1 wt. % to about 20 wt. % relative to a total weight of the pellet.

15. The solid pellet according to claim 1, the hydrocarbonaceous polymer being a first hydrocarbonaceous polymer, wherein the shell includes a second hydrocarbonaceous polymer.

16. The solid pellet according to claim 15, the first hydrocarbonaceous polymer and the second hydrocarbonaceous polymer being different.

17. The solid pellet according to claim 15, wherein the second hydrocarbonaceous polymer includes a polyethylene.

18. The solid pellet according to claim 15, wherein the second hydrocarbonaceous polymer includes high density polyethylene (HDPE), polypropylene (PP), polyethylene-co-vinyl acetate (PEVA), linear low-density polyethylene (LLDPE), low-density polyethylene (LDPE), or any combinations thereof.

19. The solid pellet according to claim 15, the second hydrocarbonaceous polymer being present in the shell in a quantity of from about 0.01 wt. % to about 20 wt. % relative to a total weight of the pellet.

20. The solid pellet according to claim 15, the second hydrocarbonaceous polymer being present in the shell in a quantity of from about 0.01 wt. % to about 5 wt. % relative to a total weight of the pellet.

21. The solid pellet according to claim 20, the first hydrocarbonaceous polymer being present in the core in a quantity of from about 1 wt. % to about 20 wt. % relative to a total weight of the pellet.

22. The solid pellet according to claim 1, wherein the shell is substantially free of crude oil refinery feedstock.

23. The solid pellet according to claim 1, wherein the shell has a thickness of less than about 5 mm.

24. The solid pellet according to claim 1, wherein the shell has a thickness within the range of from about 10 μm to about 4.5 mm.

25. The solid pellet according to claim 1, wherein the mixture is an emulsion of the polymer and the crude oil refinery feedstock.

26. The solid pellet according to claim 1, the shell having a shape selected from spherical, lozenge-like, cylindrical, discoidal, tabular, ellipsoidal, flaky, acicular, ovoid, pillow shaped and any combinations thereof.

27. The solid pellet according to claim 1, wherein the pellet has a maximal extent of less than 12 inches.

28. The solid pellet according to claim 1, wherein the pellet has a maximal extent of less than 5 inches.

29. The solid pellet according to claim 1, wherein the pellet has a maximal extent of less than 3 inches.

30. The solid pellet according to claim 1, wherein the crude oil refinery feedstock is derived from oil sands.

* * * * *